(12) United States Patent
O'Keeffe

(10) Patent No.: US 10,302,746 B2
(45) Date of Patent: May 28, 2019

(54) LIDAR SYSTEM WITH VEHICLE-INTEGRATED BEAM GUIDE

(71) Applicant: James Thomas O'Keeffe, Newark, CA (US)

(72) Inventor: James Thomas O'Keeffe, Newark, CA (US)

( * ) Notice: Subject to any disclaimer, the term of this patent is extended or adjusted under 35 U.S.C. 154(b) by 0 days.

(21) Appl. No.: 15/856,637

(22) Filed: Dec. 28, 2017

(65) Prior Publication Data

US 2018/0120440 A1    May 3, 2018

Related U.S. Application Data

(63) Continuation-in-part of application No. PCT/US2017/032585, filed on May 15, 2017.
(Continued)

(51) Int. Cl.
*G01S 7/48* (2006.01)
*G01S 17/02* (2006.01)
(Continued)

(52) U.S. Cl.
CPC ............ *G01S 7/4817* (2013.01); *G01S 7/003* (2013.01); *G01S 7/4802* (2013.01); *G01S 7/484* (2013.01);
(Continued)

(58) Field of Classification Search
CPC ....... G01S 17/89; G01S 7/4817; B60R 1/002; B60R 9/04; B60R 5/00
See application file for complete search history.

(56) References Cited

U.S. PATENT DOCUMENTS

| | | | |
|---|---|---|---|
| 3,927,402 A | 12/1975 | Thompson | |
| 4,464,115 A | 8/1984 | Simpson et al. | |

(Continued)

FOREIGN PATENT DOCUMENTS

WO    WO2016/011557 A1    1/2016

OTHER PUBLICATIONS

Vojnovic; Notes on optical fibres and fibre bundles; Gray Institute, Department of Oncology, University of Oxford; 15 pages; retrieved from the internet (http://users.ox.ac.uk/-atdgroup/referencematerial/Notes%20on%20optical%fibres%20and%fibre%20bundels.pdf); (year of pub. sufficiently earlier than effective US filing date and any foreign priority date) 2012.
(Continued)

*Primary Examiner* — Eric L Bolda
(74) *Attorney, Agent, or Firm* — Shay Glenn LLP

(57) ABSTRACT

Mounting a LIDAR above or external to a vehicle can enhance the LIDAR field of view but can conflict with vehicle aesthetics and ergonomics. Within embodiments, vehicle-integrated systems for distributing laser beams around a vehicle to increase coverage with a low-profile laser range finder are disclosed. A LIDAR can be embedded beneath a roof or body panel of a vehicle as part of a laser distribution system including a set of reflectors and lenses operable to adapt the LIDAR field of view to the vehicle shape. The set of embedded reflectors can guide laser beams parallel (e.g. within the roof structure), to and from the set of lenses at the roof edge to transmit the guided laser into regions of the surrounding beyond the direct field of view of the LIDAR. In other embodiments a beam guide (e.g. including a headlight assembly) can enable a LIDAR to perform ranging from behind a vehicle body panel.

20 Claims, 69 Drawing Sheets

Related U.S. Application Data

(60) Provisional application No. 62/337,867, filed on May 18, 2016, provisional application No. 62/350,670, filed on Jun. 15, 2016, provisional application No. 62/441,492, filed on Jan. 2, 2017, provisional application No. 62/441,563, filed on Jan. 3, 2017.

(51) Int. Cl.

| | | |
|---|---|---|
| *G01S 17/93* | (2006.01) | |
| *G01S 7/481* | (2006.01) | |
| *G01S 7/484* | (2006.01) | |
| *G01S 7/00* | (2006.01) | |
| *G01S 17/10* | (2006.01) | |
| *G01S 17/36* | (2006.01) | |
| *G01S 17/42* | (2006.01) | |
| *G01S 17/89* | (2006.01) | |
| *G01S 7/486* | (2006.01) | |

(52) U.S. Cl.
CPC ........ *G01S 7/4811* (2013.01); *G01S 7/4813* (2013.01); *G01S 7/4865* (2013.01); *G01S 17/026* (2013.01); *G01S 17/10* (2013.01); *G01S 17/36* (2013.01); *G01S 17/42* (2013.01); *G01S 17/89* (2013.01); *G01S 17/936* (2013.01); *G06T 2207/10028* (2013.01)

(56) References Cited

U.S. PATENT DOCUMENTS

| | | | |
|---|---|---|---|
| 4,688,937 A | 8/1987 | Konig et al. | |
| 4,943,157 A | 7/1990 | Reding | |
| 5,231,401 A | 7/1993 | Kaman et al. | |
| 5,638,164 A | 6/1997 | Landau | |
| 5,914,826 A | 6/1999 | Smallwood | |
| 6,055,490 A | 4/2000 | Dunne | |
| 6,091,037 A | 7/2000 | Bachschmid | |
| 7,064,817 B1 | 6/2006 | Schmitt et al. | |
| 7,089,114 B1 | 8/2006 | Huang | |
| 7,299,892 B2 | 11/2007 | Radu et al. | |
| 7,446,733 B1 | 11/2008 | Hirimai | |
| 7,608,948 B2 | 10/2009 | Nearhoof et al. | |
| 8,452,969 B2 | 5/2013 | Iyer et al. | |
| 8,666,104 B2 | 3/2014 | Ivey et al. | |
| 8,675,887 B2 | 3/2014 | Yuan et al. | |
| 8,752,969 B1 | 6/2014 | Kane et al. | |
| 8,786,835 B1 | 7/2014 | Reardon et al. | |
| 8,878,901 B2 | 11/2014 | Meinherz | |
| 8,948,591 B2 | 2/2015 | Scherbarth | |
| 9,002,511 B1 | 4/2015 | Hickerson et al. | |
| 9,069,059 B2 | 6/2015 | Vogt | |
| 9,097,800 B1 | 8/2015 | Zhu | |
| 9,121,703 B1 | 9/2015 | Droz | |
| 9,128,190 B1 | 9/2015 | Ulrich | |
| 9,199,643 B1 * | 12/2015 | Zeng | B60W 40/10 |
| 9,279,796 B1 | 3/2016 | Weisberg | |
| 9,285,477 B1 | 3/2016 | Smith | |
| 9,383,753 B1 | 7/2016 | Templeton | |
| 9,625,582 B2 * | 4/2017 | Gruver | G01S 17/93 |
| 2005/0057741 A1 | 3/2005 | Anderson et al. | |
| 2005/0237218 A1 | 10/2005 | Tang et al. | |
| 2006/0104585 A1 | 5/2006 | Cho | |
| 2006/0161270 A1 | 7/2006 | Luskin et al. | |
| 2007/0024841 A1 | 2/2007 | Kloza | |
| 2007/0289860 A1 | 12/2007 | Newman et al. | |
| 2008/0068584 A1 | 3/2008 | Mori et al. | |
| 2009/0147239 A1 | 6/2009 | Zhu et al. | |
| 2009/0219962 A1 | 9/2009 | Meyers et al. | |
| 2009/0262760 A1 | 10/2009 | Krupkin et al. | |
| 2009/0273770 A1 | 11/2009 | Bauhahn et al. | |
| 2011/0181201 A1 | 7/2011 | Hollis | |
| 2013/0222791 A1 | 8/2013 | Steffey et al. | |
| 2013/0265563 A1 * | 10/2013 | Vogt | G01S 7/4806 356/4.01 |
| 2014/0240721 A1 | 8/2014 | Herschbach | |
| 2014/0270237 A1 | 9/2014 | Wang et al. | |
| 2014/0270264 A1 | 9/2014 | Wang et al. | |
| 2014/0350836 A1 * | 11/2014 | Stettner | G01S 17/023 701/301 |
| 2015/0185246 A1 | 7/2015 | Dakin et al. | |
| 2015/0192677 A1 | 7/2015 | Yu | |
| 2015/0247703 A1 | 9/2015 | Teetzel et al. | |
| 2015/0286340 A1 | 10/2015 | Send et al. | |
| 2015/0307020 A1 * | 10/2015 | Salter | B60Q 1/2696 362/510 |
| 2016/0047896 A1 | 2/2016 | Dussan | |
| 2016/0096486 A1 * | 4/2016 | Dziurda | B60S 1/54 348/375 |
| 2016/0282468 A1 * | 9/2016 | Gruver | G01S 17/93 |
| 2017/0169703 A1 | 6/2017 | Carrasco et al. | |
| 2017/0176990 A1 | 6/2017 | Keller et al. | |
| 2018/0056993 A1 * | 3/2018 | Stettner | B62D 15/0265 |
| 2018/0059248 A1 | 3/2018 | O'Keeffe | |
| 2018/0074175 A1 | 3/2018 | O'Keeffe | |
| 2018/0088214 A1 | 3/2018 | O'Keeffe | |
| 2018/0095175 A1 | 4/2018 | O'Keeffe | |
| 2018/0100929 A1 | 4/2018 | O'Keeffe | |
| 2018/0106890 A1 | 4/2018 | O'Keeffe | |
| 2018/0156896 A1 | 6/2018 | O'Keeffe | |

OTHER PUBLICATIONS

O'Keeffe; U.S. Appl. No. 15/857,960 entitled "Planning a lidar scan with smart test vectors," filed Dec. 29, 2017.

\* cited by examiner

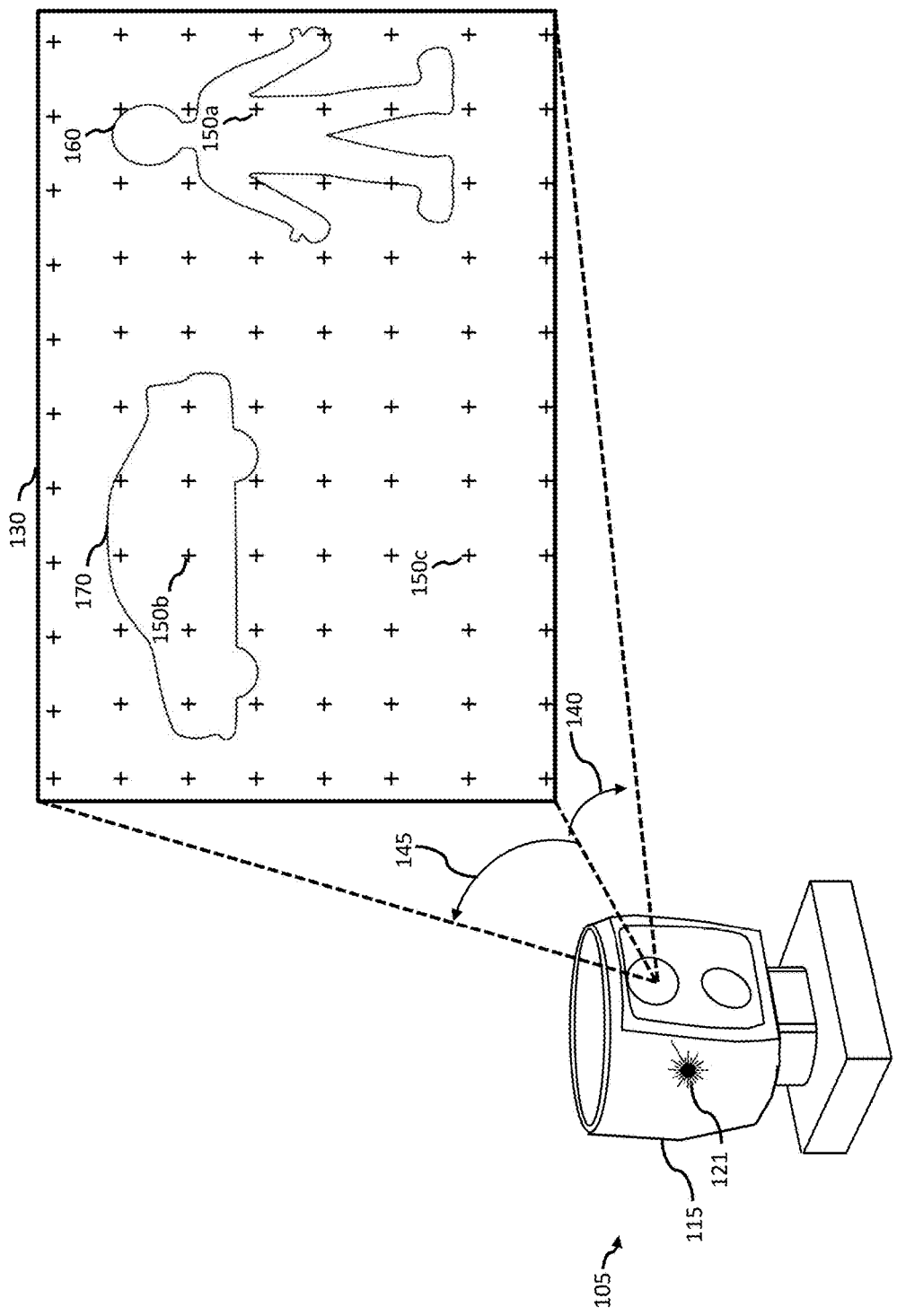

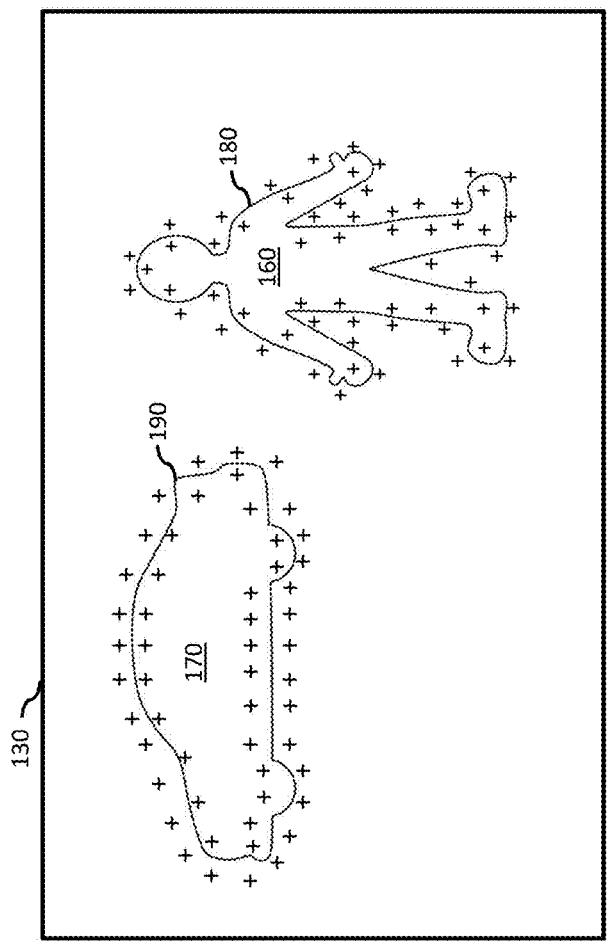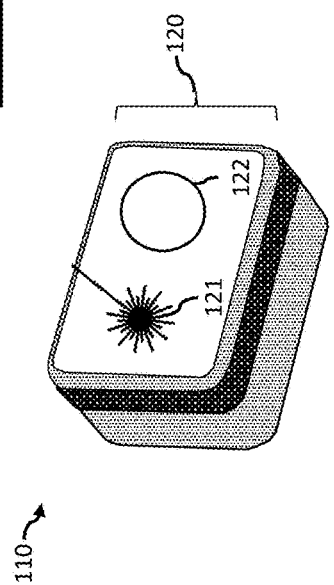
FIG. 1B

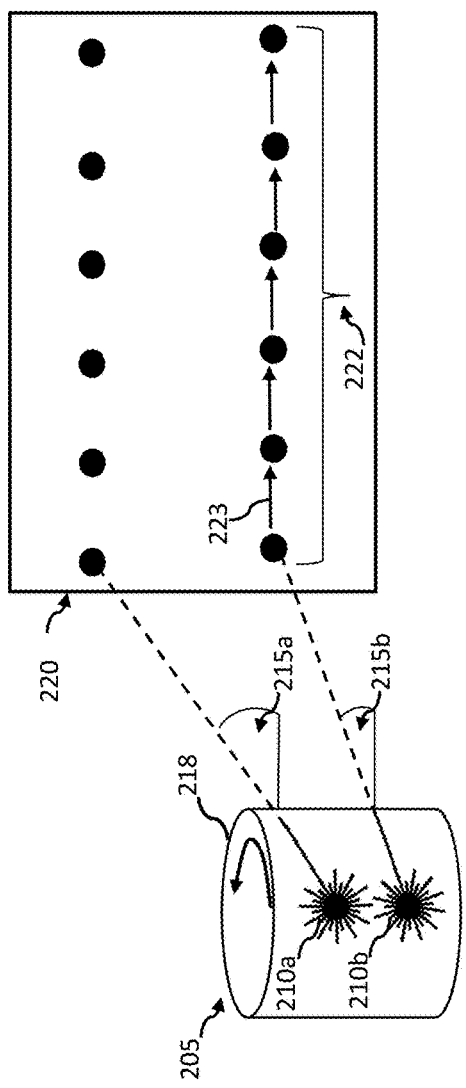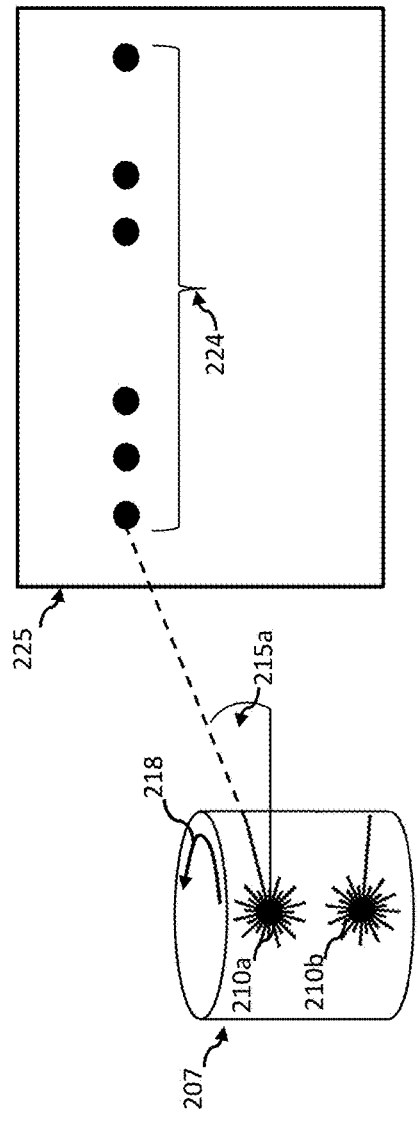

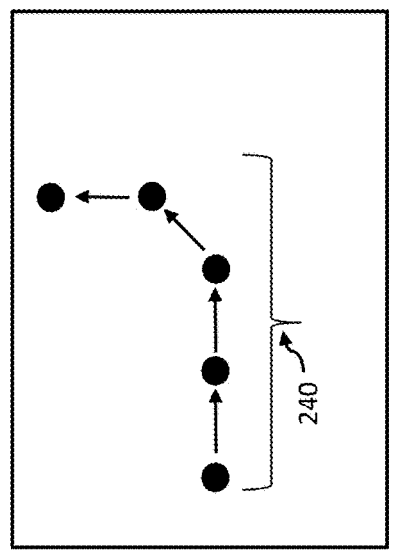
FIG. 2C
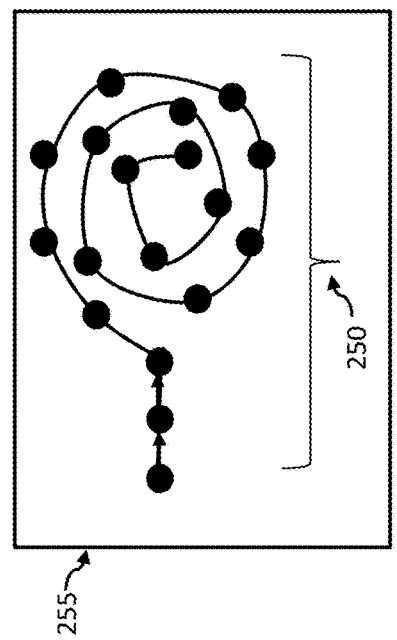
FIG. 2D
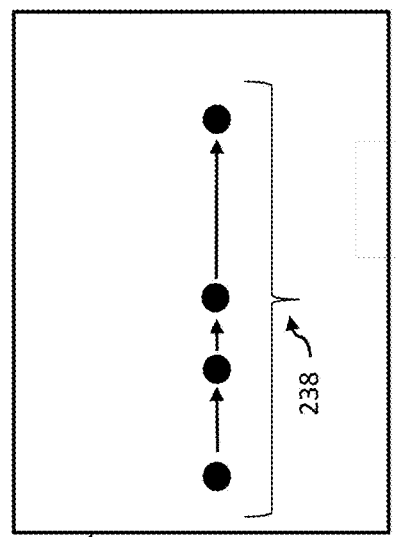
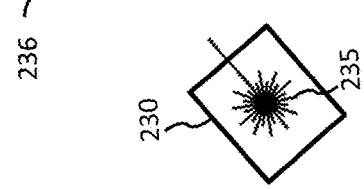
FIG. 2E
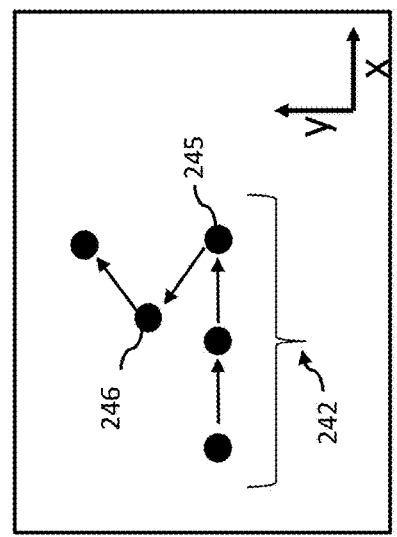
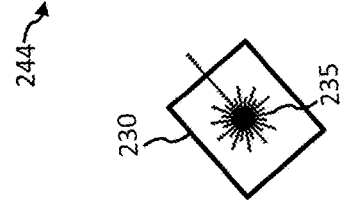
FIG. 2F

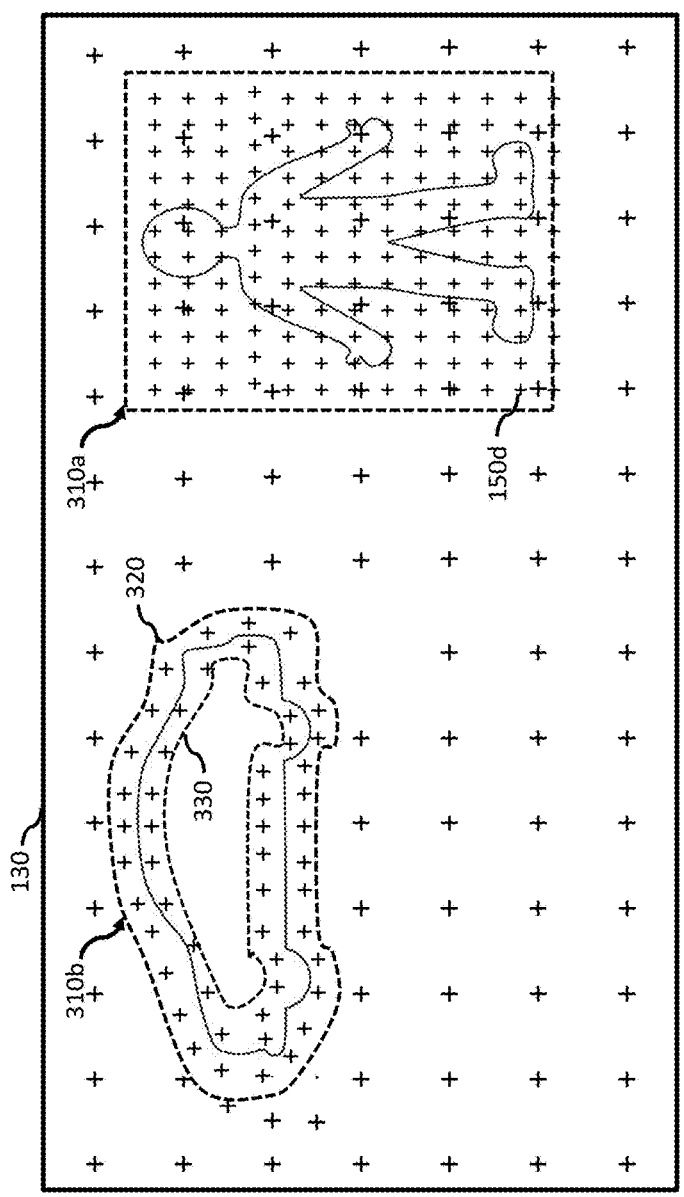
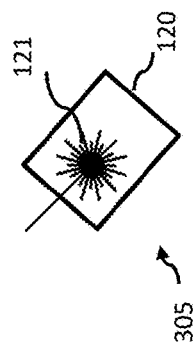
FIG. 3

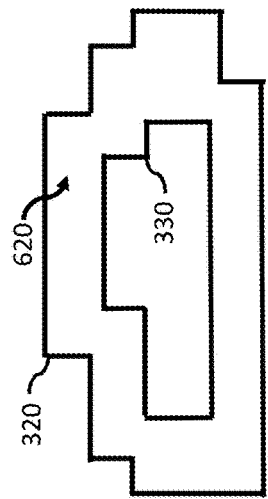
FIG. 6B
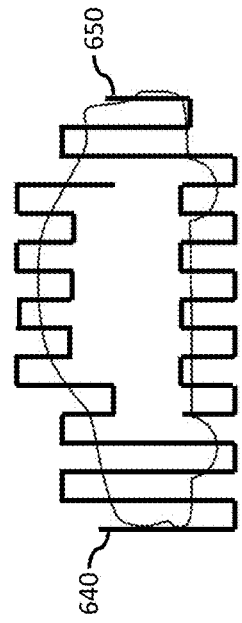
FIG. 6D
602 — Start Location: 30,10
604 — Region Width: 30
606 — Region Height: 30
608 — Region bounds: 30,10; 30,40; 60,40; 60,10
610 — Pulse Locations: 30,10; 30,40; 30,11; 30,12
612 — Path waypoints: 30,10; 30,40; 30,41; 30,11
614 — Laser scan speed: 5deg.millisecond
616 — Laser pulse size: 10mm, 4mm
618 — Number of Pulses: 300
FIG. 6A
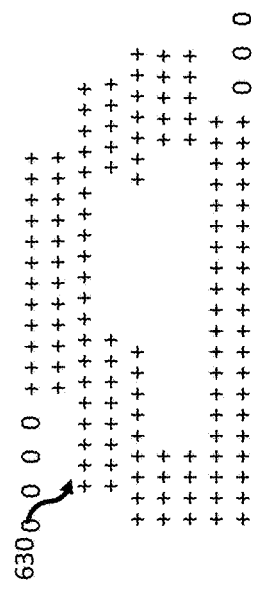
FIG. 6C

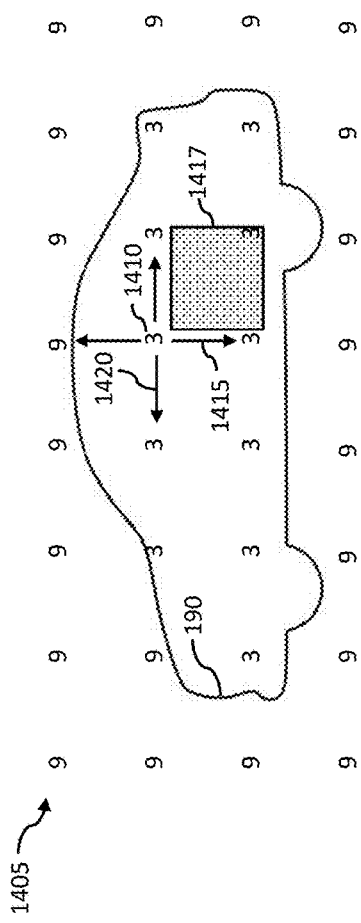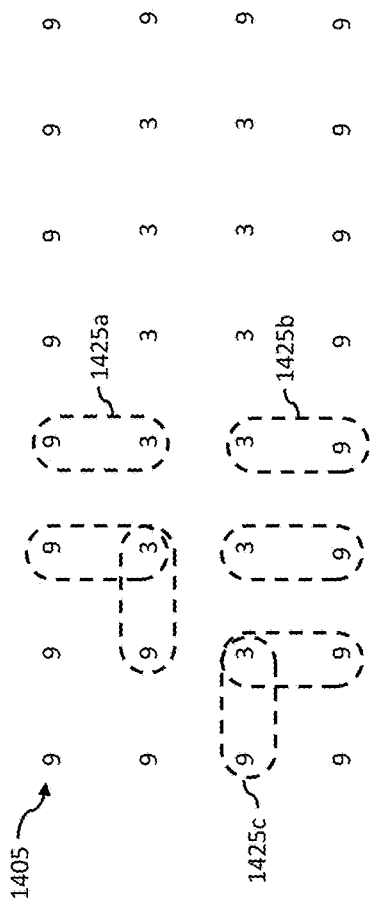

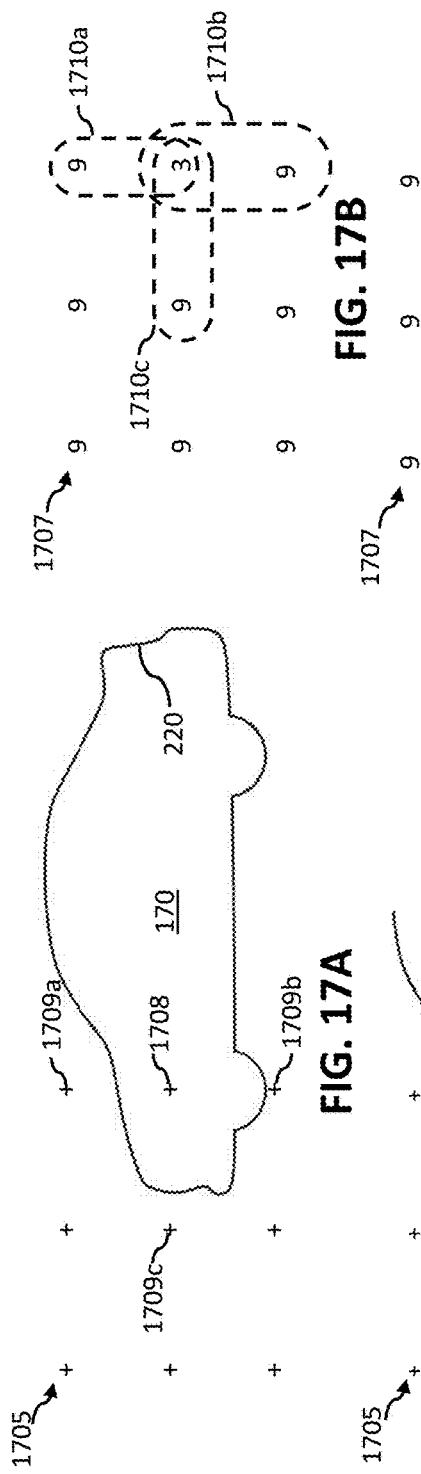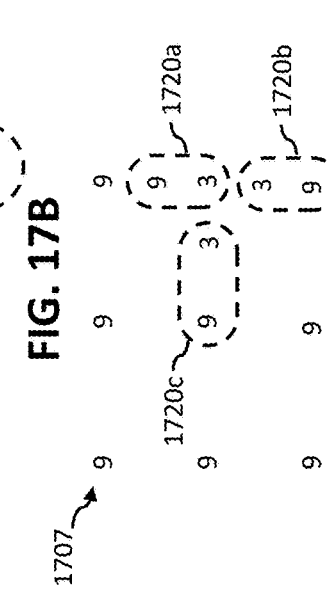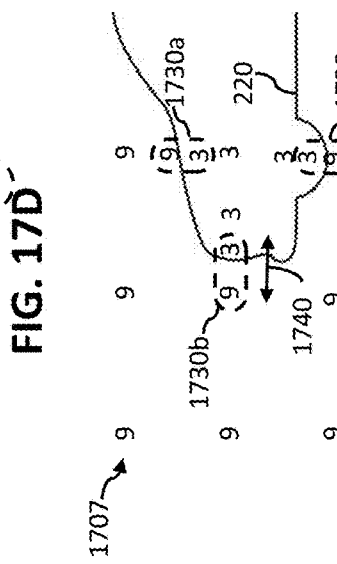

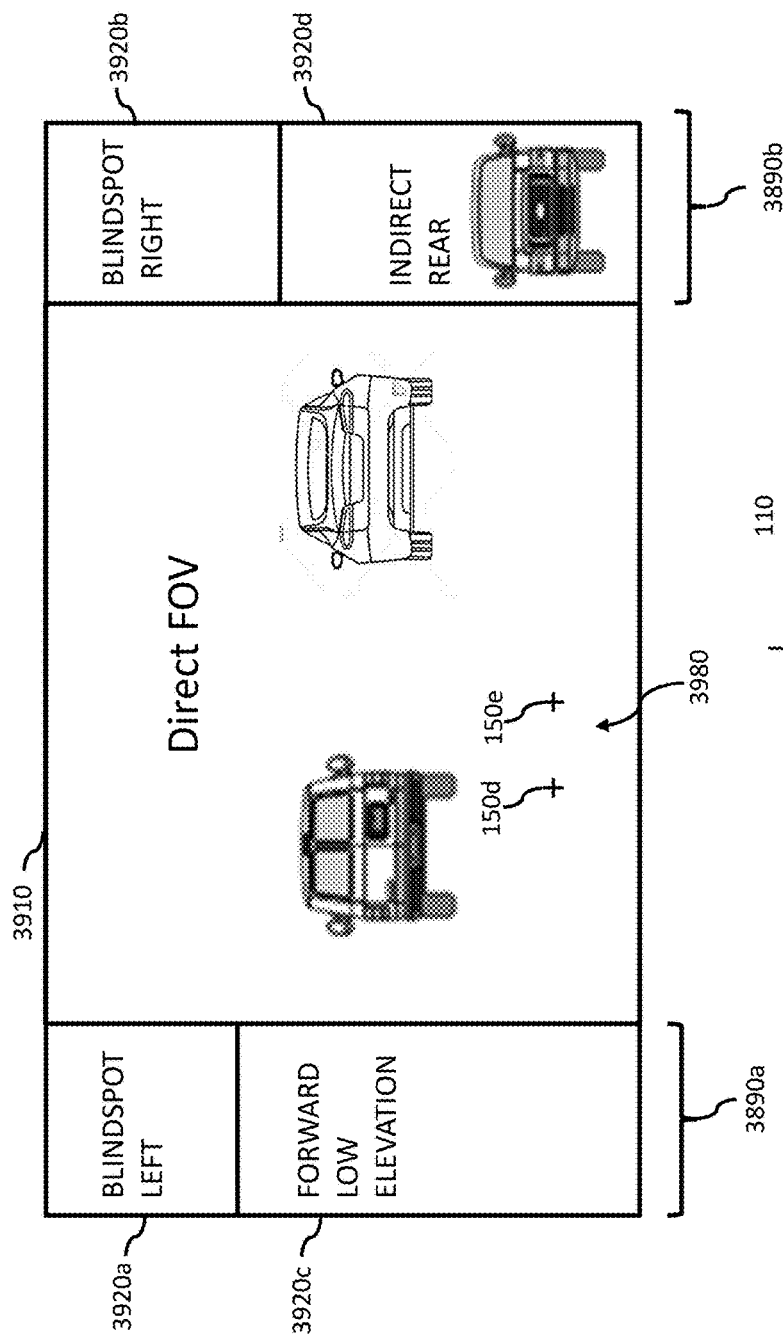

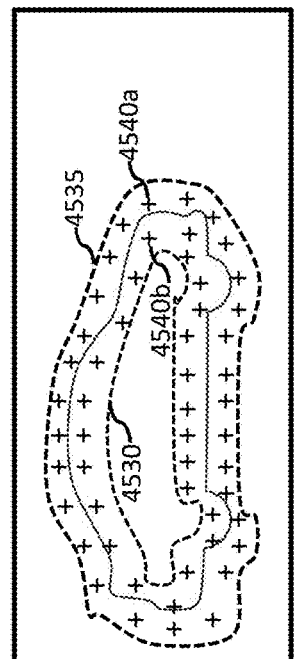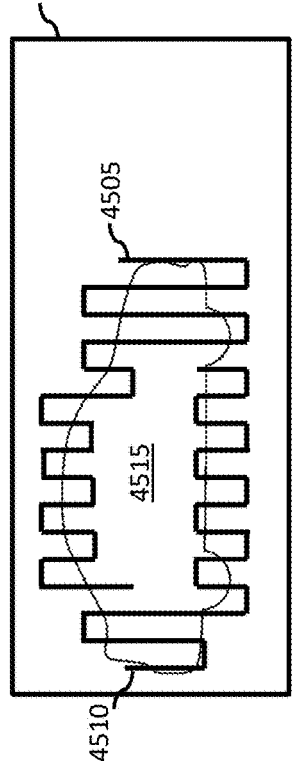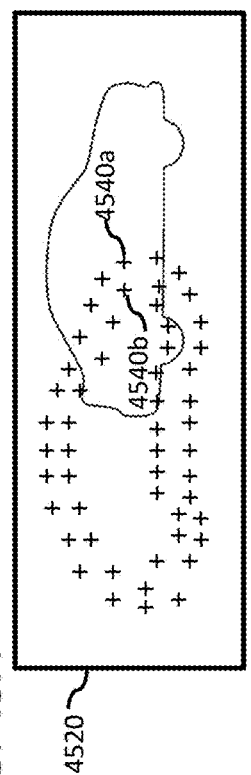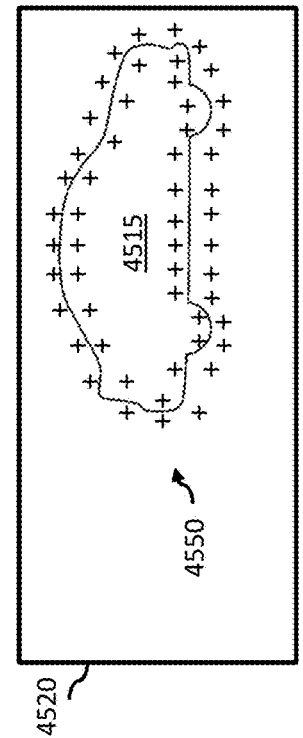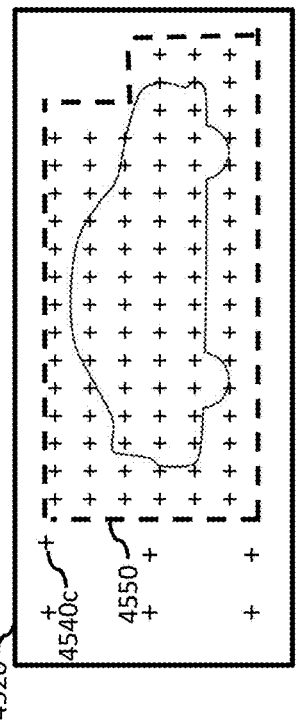
FIG. 45A
FIG. 45B
FIG. 45C
FIG. 45D
FIG. 45E

LIDAR SYSTEM WITH VEHICLE-INTEGRATED BEAM GUIDE

CROSS-REFERENCE TO RELATED APPLICATIONS

This application is a continuation in part of International Application No. PCT/US17/32585, filed May 15, 2017, which claims the benefit of priority to each of: U.S. provisional patent application Ser. No. 62/337,867, filed on May 18, 2016; U.S. provisional patent application Ser. No. 62/350,670, filed on Jun. 15, 2016; U.S. provisional patent application Ser. No. 62/441,492, filed on Jan. 2, 2017; and U.S. provisional patent application Ser. No. 62/441,563, filed on Jan. 3, 2017.

BACKGROUND

In digital photography a charge-coupled-device CCD sensor can gather light from several million local directions simultaneously to generate detailed images. In contrast, most laser range finders, such as a light detection and ranging system (LIDAR) scan or rotate laser beams and measure the time of flight (TOF) in much smaller number of directions. This sequential measurement approach limits the total number of range measurements per second. Hence a LIDAR that scans a field of view (FOV) in a uniform deterministic manner can provide poor angular resolution. For example, consider a LIDAR with an angular range of 40 degrees elevation and 360 degrees azimuthal that is rotating at 10 Hz and generating 1 million laser measurements per second. If the measurements are spread uniformly in the FOV (e.g. 40×360 degrees) the angular resolution would be 0.38 degrees in both the elevation and azimuthal directions. At 50 m range from the LIDAR such an angular resolution produces range measurements with a spacing of 30 cm. This measurement spacing (i.e. angular resolution) can be insufficient for identifying the detailed boundaries of objects.

U.S. Pat. No. 9,383,753 to Templeton discloses a LIDAR with dynamically adjustable angular resolution, but only describes dynamic angular velocity in a single axis for a rotating LIDAR. U.S. Pat. No. 9,383,753 further assumes a rotating LIDAR and does not provide for arbitrary laser orientation within a scan. U.S. Pat. No. 9,383,753 modifies the angular resolution of subsequent scans based on previous scans in part because the disclosed LIDAR has angular velocity that precludes rapid direction reversals and changes. Hence, dynamically adapting LIDAR measurement density within a scan, to improve the accuracy of object boundary detection in the FOV remains a challenge.

SUMMARY

Embodiments of the present disclosure provide a laser range finder (e.g. a LIDAR) comprising one or more steerable lasers that non-uniformly scans a FOV based on laser steering parameters. In a first group of embodiments a method is provided to non-uniformly scan a FOV with a LIDAR by dynamically steering the LIDAR based on sensor data. Laser steering parameters (e.g. instructions) are formulated using sensor data from the local environment. The laser steering parameters can function to configure or instruct a steerable laser in a LIDAR to scan a FOV, with a dynamic angular velocity, thereby creating a complex shaped region of increased or non-uniform laser pulse density during the scan. A plurality of important regions in a LIDAR FOV can be identified based on a variety of types or aspects of sensor data (e.g. previous laser ranging data or external data such as camera images, weather, GPS or inter-vehicle communication data). Such regions can be important because they contain information about boundaries of objects. Several embodiments provide for scanning these important regions with an increased laser pulse density in the course of a dynamically steered laser scan. In one aspect the proposed techniques are particularly useful for LIDAR on autonomous vehicles, which are often used in uncontrolled environments where an important object that warrants laser scanning with enhanced resolution, can exist in a wide variety of locations within the FOV. In one example, first data from the local environment can be inter-vehicle communication data from a first vehicle that causes a LIDAR in a second vehicle to obtain or generate a set of laser steering parameters and dynamically steer or configure a laser in a LIDAR to non-uniformly scan a FOV.

In a related second group of embodiments a method to complete a dynamically steered LIDAR scan of a FOV within a target time is disclosed. A time target to complete a LIDAR scan of a FOV can be combined with sensor data from the local environment to generate laser steering parameters operable to configure a LIDAR to dynamically steer a laser beam in the course of a laser ranging scan. In this way, laser steering parameters based in part on a target time for a scan can function to tailor the density of laser ranging measurements to ensure that the whole FOV or a defined portion of the FOV is scanned within the target time. During a first scan of the FOV a region of the FOV can be identified. During a second scan of the FOV the identified region can receive a dense scan with smaller point spacing than the average laser pulse spacing. The shape of the regions and the scan point density can be selected based on requirements to complete the scan in a reasonable time (e.g. a target time).

In a related third group of embodiment a method to dynamically configure a LIDAR by identifying objects or regions of interest in a FOV and dynamically apportioning LIDAR resources (e.g. number or density of laser pulses), based on a number or relative importance of identified objects is disclosed.

In one exemplary embodiment a laser range finding system obtains sensor data from an environment local to the LIDAR and thereby identifies a plurality of objects. The laser range finding system then assigns one or more weights to each of the plurality of objects, wherein the weights function to non-uniformly apportion laser range measurements in the FOV of the LIDAR. The laser range finding system uses the weights to generate laser steering parameters (e.g. instructions to configure a dynamically steerable laser in the LIDAR) and dynamically steers a steerable laser in the LIDAR according to the laser steering parameters. The method can thereby dynamically steer a LIDAR to generate a non-uniform density pattern of laser ranging measurements based on the number or relative importance of discovered objects.

In a fourth group of embodiments, a dynamically steered LIDAR can be configured based on the type (e.g. classification) of the local environment. Sensor data from the local environment can provide to a LIDAR a classification or location (e.g. a GPS location known to have many bicyclists or a scene with camera data indicating the presence of many joggers). The sensor data (e.g. GPS data or Camera data) can be used to classify the local environment. In this way, classification of the local surroundings (e.g. an urban street versus a rural highway) can be used to configure a dynamically steerable laser in a LIDAR to modify or adapt laser steering to account for changing probabilities of particular hazards or occurrences. GPS data can be used to provide location data. Laser steering parameters in portions of the FOV can be chosen based on the geographic location of a host vehicle. For example, in an urban (e.g. city) environment indicated by GPS data, laser steering parameters can steer a steerable laser to regions of the FOV known to be important for avoiding pedestrian accidents such as crosswalks or corners. Similarly, the laser point density can be increased at particular elevations where location-specific hazards are known to exist, such as car sideview mirrors on narrow streets, deer on rural roads or trains at railroad crossings. In another example, GPS data can indicating a geographic location known for rock slides can be used to steer the steerable laser in a laser range finder to increase the laser point density in regions of the FOV that might contain rocks (e.g. the edge or corners of the road).

A fifth group of embodiments of the present disclosure provides a method to dynamically steer a laser in a LIDAR and thereby progressively localize the boundary of an object in the FOV. The method iteratively scans the laser with a smaller point spacing in a region estimated to contain a time-flight-boundary (e.g. an object edge) and thereby iteratively generating smaller regions wherein the boundary is estimated in successive scans. Laser ranging data (e.g. times of flight) is analyzed (e.g. processed to identify TOF boundaries) and the processed laser ranging data is used to dynamically move or configure a steerable laser so as to non-uniformly distribute some scan points into regions estimated to contain more information (e.g. edges, boundaries, characteristic features). In another example, a dynamically steered laser range finder can react to very recent data, such as a large change in TOF between the last two laser reflections and use this data to perform a non-uniform scan spacing in a region between the two scan points. In this way the disclosed system can position the laser to bisect a region where the TOF exhibits a gradient. The point spacing and laser location can be dynamically steered to investigate a region until the TOF gradient is sufficiently localized or until a maximum number of iterations is reached. Hence this embodiment can improve boundary detection within a scan or across several scans. In another embodiment a computer could analyze some or all of the data from a scan and identify one or more regions to receive an increased density of scan points or a small laser spot size in a subsequent iteration.

In a sixth group of embodiments of the present disclosure a computer can estimate or classify an object in some or all of the FOV and can select a non-uniform laser scan point distribution (e.g. a higher density in a complex shaped region) based on the object classification. The laser can be dynamically steered to perform the non-uniform scan pattern and the object can be further identified based on the fit of the actual returned laser reflection with expected values. For example, an electronically steered laser LIDAR could perform a 1000 point scan of a FOV. The scan could initially be divided into 10 sweeps of the FOV, where each sweep is a 100 point grid and the sweeps are offset to generate the final point cloud. On one of the 10 sweeps a computer coupled to or incorporated in the electronically steered LIDAR can identify an object moving in part of the FOV and can estimate that the object is a vehicle (i.e. an object classification of "vehicle") is located in a portion of the FOV. The computer can select a non-uniform point distribution (e.g. a non-uniformly spaced sequence of laser measurements, based on a set of laser steering parameters), based on the object classification, and use reflection data from the non-uniform sequence of laser pulses to test the vehicle classification hypothesis. The disclosed classification method can dynamically steer the laser to perform the non-uniform scan point pattern during the remainder of the scan. For example, upon identification of an object and estimation of an object classification (e.g. classification=vehicle) sweeps 8,9,10 of the FOV can be devoted to performing the dynamically-steered non-uniform portion of the scan.

Several embodiment of this disclosure provide methods for using sensor data generated from the FOV in order to guide a steerable-laser to locations and regions containing the most data. Examples include laser steering parameters based on object classification and estimated object placement, seeding the scan pattern of a future scan based on an estimate of object velocity (e.g. where to generate a densely scanned region in a future scan of the FOV). Further examples of generating laser steering parameters for localized regions of the FOV (e.g. dense scan regions) include using object detection or edge detection from cameras.

In a seventh group of embodiments a LIDAR performs a progressive boundary localization (PBL) method to determine the location of time-of-flight (TOF) boundaries to within some minimum angular spacing in a FOV (i.e. progressively resolve the boundaries of objects in environment local to the LIDAR). The method can generate a sequence of laser pulses, measure a corresponding sequence of laser reflections and measure a time of flight and direction corresponding to each of the laser pulses. In response to identifying a nearest neighbor pair of laser pulses within a range of directions for which the TOF difference is greater than a TOF threshold, dynamically steering the LIDAR to generate one or more intervening laser pulses with directions based on at least one of the nearest neighbor pair directions. The method can continue until all nearest neighbor pairs for which the TOF difference is greater than a TOF threshold have an angular separation (i.e. difference in directions for the laser pulses in each pair) less than a direction threshold (e.g. less than 0.5 degrees direction difference). In this way a PBL method can localize the boundary by refining the angular ranges in which large changes in TOF occur until such ranges are sufficiently small.

In an eight group of embodiments a method to perform extrapolation-based progressive boundary localization method (EPBL) with a LIDAR is disclosed. The method can use a LIDAR to find a first portion of a boundary in the FOV, extrapolate the direction of the boundary and thereby dynamically steer the LIDAR to scan in a second region of the FOV for the boundary. Hence the continuous and "straight-line" nature of object boundaries can be used to dynamically steer a LIDAR to scan the boundary. Similarly a classified object (e.g. a Van) can have a predicted boundary such that finding one part of the object and extrapolating or predicting a second portion of the object boundary (e.g. based on classification or a straight line edge in an identified direction) is used to dynamically steer a LIDAR scan. In one example, a LIDAR scans a first search region within a FOV, identifies a first set of locations or sub-regions of the first search regions that are located on or intersected by a TOF boundary (e.g. an object edge). The exemplary EPBL method then extrapolates an estimated boundary location, outside the first search region, based on the first set of locations or sub-regions. The LIDAR then uses the estimated boundary location to configure or dynamically steer a laser within a second search region. The LIDAR can then process reflections form the second search region to determine if the boundary exists in the estimated boundary location.

A ninth group of embodiments provides a low profile LIDAR system with a vehicle-integrated laser distribution system. A laser beam from a LIDAR can be transmitted into a cavity region underneath a body panel of a vehicle and thereby guided beneath the body panel (e.g. roof) to a lens operable to transmit or refract the beam into a curtain of coverage around the vehicle. The interior reflectors and lenses can form a laser beam guide. The laser beam guide can augment the limited direct field of view of a fully or partially embedded LIDAR by providing a well-controlled indirect beam path (e.g. requiring several reflections). The output laser angle from the beam guide is a function of the input beam angle from the LIDAR. In this way the beam guide can utilize and modify existing cavities behind body panels that are common in automotive design to guide and distribute laser beams for laser ranging. The beam guide can extend LIDAR coverage into hard to reach parts of the FOV (e.g. parts of the FOV obscured by the roof or sides of a vehicle) while allowing the LIDAR to remain low profile or embedded in the vehicle structure.

In a tenth group of embodiments a LIDAR can quickly evaluate a FOV by selecting and evaluating a plurality of smart test vectors operable to provide early indications of important changes occurring in a FOV (e.g. a vehicle ahead changing lanes). Embodiments provides for improved reaction times by dynamically steering a laser beam to firstly laser scan the set of test locations associated with the plurality of test vectors early in a scan of a FOV. Early scanning based on dynamic steering of the laser is instead of gradually scanning the set of test point in the course of a uniform (i.e. non-dynamic) scan of the entire FOV. The results of one or more test vectors are used to obtain a set of laser steering parameters to dynamically scan the field of view with a non-uniform laser pulse density. Hence test vectors can be used to plan the spatial distribution of laser ranging measurements and thereby generate complex patterns of non-uniform measurement density in an upcoming scan. Test vectors can be based on defining features such as the location of a wing mirror, edges, or lane position variation of a vehicle. In some embodiments the scan is periodically interrupted to reacquire data from the test locations, reevaluate and update the test vectors.

Advantages

The techniques described in this specification can be implemented to achieve the following exemplary advantages:

Instead of generating a uniform laser pulse density throughout the FOV, the disclosed techniques provide for non-uniform laser pulse density by dynamically steering a laser based on data indicating the location of important features in the FOV (e.g. boundaries of an object, a person recognized in a digital image). This data-driven non-uniform laser pulse spacing has the further benefit of further localizing the important features. In another advantage the boundaries of objects in the FOV can be progressively localized by refining laser steering parameters in regions of the FOV.

In another advantage the laser pulse density can be selected in various parts of the FOV (e.g. left side, right side, or between −20 degrees and −30 degrees) based on aspects of the location of the laser range finder (e.g. the terrain, the GPS location, the time of day or a classification for the type of location such as urban or rural).

In a related advantage the disclosed techniques allow laser steering parameters to encode for a wide variety of predefined high-density laser pulse patterns. Upon instructing or configuring a steerable laser with such laser steering parameters, the steerable laser can generate the corresponding non-uniform pulse density region in the FOV. For example, a vehicle of model A with a dynamically steered laser range finder can develop and share a library of laser point patterns effective to test the hypothesis that a vehicle of model B is in the FOV. Using the one of more of the disclosed methods a vehicle of model A could estimate that a vehicle of model B is present in the FOV, access a database of laser steering parameters designed to test the hypothesis that the vehicle in the FOV is of model B and configure a dynamically steerable laser to generate a non-uniform laser pulse sequence to best test the hypothesis that the vehicle is model B. Therefore the disclosed techniques enable customized laser pulse patterns to be generated, shared and used to guide a steerable laser range finder. The laser pulse patterns can be customized to the geometry of vehicle model A and placement of the dynamically steered laser range finder. A dynamically steered range finder could be preprogrammed with a library of laser pulse patterns corresponding to the vehicle it is mounted on and placement on the vehicle.

The disclosed techniques can improve the cost effectiveness of a laser range finder. A lower price laser range finder may have fewer lasers or a slower laser pulse rate. The disclosed techniques enable a laser range finder with a smaller total number of laser pulses per second to distribute those laser pulses in a dynamic and intelligently selected manner. Similarly, electronically steered LIDARs can often scan fewer points per second than a rotating LIDAR. The disclosed techniques provide for dynamically steering the electronically steered LIDAR to regions containing the most information in a data-driven manner.

The disclosed techniques can improve speed detection for objects in the FOV. The accuracy of speed detection in a laser range finding scan is related to the ability to accurately determine the object boundary during each scan. The disclosed techniques can estimate the boundary location and dynamically steer the laser to investigate the boundary location. The disclosed techniques enhance the speed of object classification, using boundary localization and dynamic laser pulse density selection.

DRAWINGS

FIGS. 1A and 1B are exemplary diagrams of a laser range finder and a plurality of laser pulse locations in a field of view, according to an embodiment of the present disclosure.

FIG. 2A illustrates a uniformly steered rotating LIDAR generating a sequence of laser pulses in a field of view.

FIG. 2B-2F illustrate dynamically steered LIDARs generating a variety of non-uniformly distributed sequences of laser pulses, according to embodiments of the present disclosure.

FIG. 3 is an exemplary diagram of a laser range finder and a non-uniform laser pulse location distribution in a field of view, according to an embodiment of the present disclosure.

FIG. 6A-6D illustrates exemplary laser steering parameters according to an aspect of the technology.

FIG. 14A-14B illustrate several aspects of a progressive boundary localization method.

FIG. 17A-17F illustrate several aspects of a progressive boundary localization method.

FIG. 39 illustrates a field of view of a LIDAR, with a direct field of view and an indirect field of view providing laser reflections from several regions associated with the vehicle outside of the ranging region provided by direct line of site of the LIDAR.

FIGS. 45A, 45B, 45C, 45D and 45E illustrate a variety of steps of an exemplary laser scan planning method in accordance with an embodiment of the present disclosure.

DETAILED DESCRIPTION

Figure 4A:
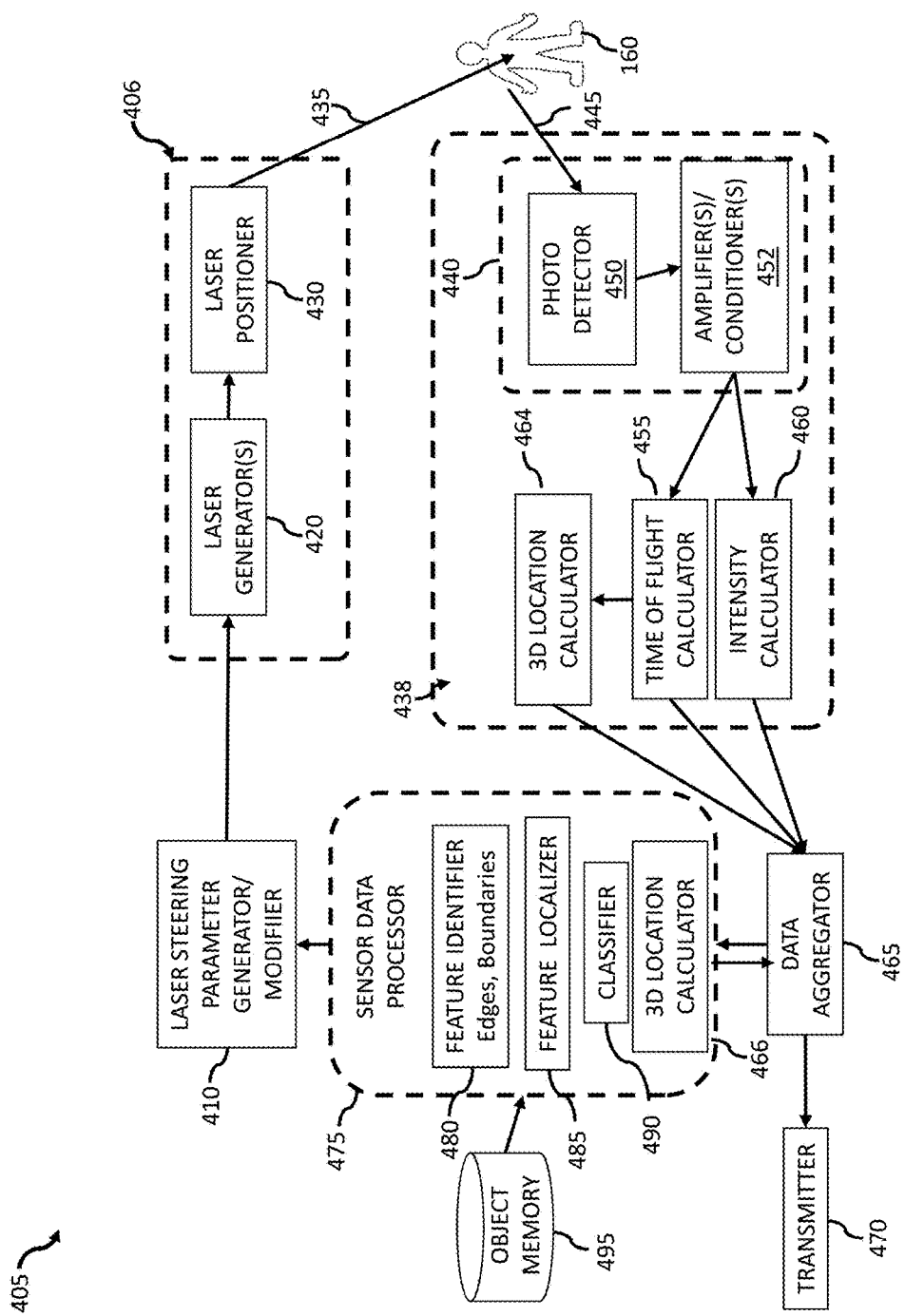
FIGS. 4A and 4B are functional diagrams illustrating several components of exemplary dynamically steered laser range finders in accordance with embodiments of the present disclosure.

In digital photography light from is received at a sensor form many points in the local environment at once. In contrast, a laser range finder can use a relatively small number of lasers (e.g. 1-64) to generate laser pulses aimed sequentially at a number of points (e.g. 100,000) to perform laser ranging scans of the FOV. Hence, the laser pulses (e.g. and corresponding time of flight measurements in discrete directions) represent a scarce resource and the FOV is often undersampled with respect to sensing detailed boundaries of objects in the local environment. Many LIDARs mechanically rotate with a constant or nearly constant angular velocity. Such rotating LIDARs can sweep one or more lasers through a deterministic range of directions (e.g. each laser sweeping through a 360 degree azimuthal range at a fixed elevation angle). This type of operation does not constitute dynamically steering the laser(s) in a LIDAR. The angular momentum of the spinning portion in a mechanical LIDAR prevents rapid changes in angular velocity. Each laser in a mechanical LIDAR can generate a uniformly spaced sequence of laser pulses in a 1-D angular range. The angular velocity can be selected for many mechanical LIDAR (e.g. 5-20 Hz for the HDL-64E from Velodyne Inc. or Morgan Hill, Calif.), but remains constant from one rotation to the next.

A uniform scan of the entire FOV is simple and somewhat inherent in rotating LIDARS, but is sub-optimal for gathering the most information from the FOV. For example, large sections of the FOV (e.g. Walls and roads) can return a predictable, time invariant, homogeneous response. A modern LIDAR can scan over 2 million points per second. Hence one embodiment of the present technology tries to select the 2 million scan points with the most information (e.g. edges or boundaries) by steering the laser in a dynamic manner.

Recently, advancements in electronically-steerable lasers and phased array laser beam forming have made it possible to dynamically steer a laser within a FOV. A steerable laser can be mechanically-steerable (e.g. containing moving parts to redirect the laser) or electronically-steerable (e.g. containing an optical phased array to form a beam at in one of many directions). For the purpose of this disclosure a steerable laser is a laser assembly (e.g. including positioning components) that can change the trajectory or power level of a laser beam. For the purpose of this disclosure a steerable laser is dynamically steerable if it can respond to inputs (e.g. user commands) and thereby dynamically change the power or trajectory of the laser beam in the course of a scan of the FOV. For the purpose of this disclosure dynamically steering a laser is the process of providing input data (e.g. instructions such as laser steering parameters) to a steerable laser that causes the laser to dynamically modulate the power or trajectory of the laser beam during a scan of the FOV. For example, a laser assembly that is designed to raster scan a FOV with a constant scan rate (e.g. 10 degrees per second) and pulse rate (e.g. 10 pulses per second) is not being dynamically steered. In another example, the previous laser assembly can be dynamically steered by providing input signals and circuitry that dynamically changes the angular velocity of the laser assembly to generate non-uniformly spaced laser pulses in the FOV, based on the input signals (e.g. thereby generating an image on a surface in the FOV). A trajectory change can be a direction change (i.e. a direction formed by a plurality of pulses) or a speed change (i.e. how fast the laser is progressing in a single direction across the FOV). For example, dynamically changing the angular speed across a FOV of a pulsed laser with a constant direction causes the inter-pulse spacing to increase or decrease thereby generating dynamically defined laser pulse density.

In the context of the present disclosure most rotating LIDAR do not comprise dynamically steerable lasers since neither the power nor the trajectory of the laser beam is dynamically controllable within a single scan. However a rotating or mechanical LIDAR can be dynamically steered. For example, by providing input data that causes the laser to dynamically vary the laser pulse rate within a scan of the FOV, since the net result is a system that can guide or steer the laser to produce a non-uniform density laser pulse pattern in particular parts of the FOV.

Recently, electronically scanned LIDAR such as the model S3 from Quanergy Inc. of Sunnyvale, Calif. have been developed. These solid-state electronically scanned LIDAR comprise no moving parts. The absence of angular momentum associated with moving parts enables dynamic steering of one or more lasers in electronically scanned solid-state LIDAR systems.

In many laser range finding systems the laser is periodically pulsed and the exact pulse location in the FOV cannot be controlled. Nevertheless such a periodic pulse laser can be used with the present disclosure to produce a complex shaped region of higher pulse density than the area surrounding the region by increasing the laser dwell time within the region. In this way a periodically pulsed laser will produce a greater density of pulses in the complex shaped region of a FOV. For the purpose of this disclosure a complex shaped region is a region having a complex-shaped perimeter such as a perimeter with more than four straight edges or a perimeter with one or more curved portions and two or more distinct radaii of curvature. Exemplary complex-shaped regions are, a region with a pentagonal perimeter, a hexagonal perimeter an elliptical perimeter or a perimeter capturing the detailed outline of a car. Other laser range finding systems transmit a continuous laser signal, and ranging is carried out by modulating and detecting changes in the intensity of the laser light. In continuous laser beam systems time of flight is directly proportional to the phase difference between the received and transmitted laser signals.

In one aspect the dynamically steered laser range finder can be used to investigate a FOV for boundaries associated with objects. For example, a small shift in the position of the LIDAR laser may identify a large change in TOF associated with the edge of an object 100 ft away. In contrast RADAR has much greater beam divergence and hence a much wider spot size impacts the object (often many times the object size). Hence the reflections from beam scanned RADAR represent the reflections from many points on the object, thereby making beam steered RADAR useful for object detection but impractical for performing detailed boundary localization. Hence, due in part to the large beam divergence of RADAR beams, a small change in radar beam direction can provide little if any actionable information regarding the edges of an object. In contrast the spot size of the laser remains small relative to the boundary of many important objects (people, dogs, curbs). The present technology can enable the boundaries (e.g. edges) of objects to be dynamically determined by a process of iteratively refining the scan points for the electronically steered LIDAR. For example, the LIDAR can use a bisection algorithm approach to iteratively search for the boundary of a pedestrian in the FOV. The LIDAR could first receive an indication that point P1 in a point cloud has a TOF consistent with the pedestrian and can scan iteratively to the right and left of P1 with decreasing angular range (e.g. in a bisection approach) to estimate the exact location of the boundary between the pedestrian and the surrounding environment. In general, this technique can be used to dynamically configure a laser in a LIDAR to investigate changes in TOF within a point cloud to iteratively improve boundary definition.

FIG. 1A illustrates a laser range finder system 105 (e.g. a LIDAR) that comprises a steerable laser assembly 115. Steerable laser assembly 115 scans one or more a lasers (e.g. steerable laser 121) within a field of view FOV 130. The field of view 130 can be defined by an azimuthal (e.g. horizontal) angular range 140 and an elevation (e.g. vertical) angular range 145. Steerable laser 121 scans FOV 130 and generates a plurality or sequence of laser pulses, (e.g. laser pulses 150a, 150b and 150c) in a sequence of directions. The direction in the FOV of the each of the plurality of laser pulses is illustrated with a "+" symbol. Some of the laser pulses (e.g. 150a and 150b) can be reflected by objects (e.g. person 160 and vehicle 170). In the embodiment of FIG. 1A the laser pulses are evenly spaced in the FOV, such that the angular separation between neighboring laser pulses is a constant value in one or both of the horizontal and vertical directions. Accordingly, only a few of the laser pulses (e.g. 5-6 pulses) reflect from each of the objects 160 and 170 due in part to the uniform laser pulse density throughout the FOV. For the purpose of this disclosure the FOV of laser range finder 110 can be defined as the set of all directions (e.g. combinations of elevation and azimuthal angles) in which the laser range finder can perform laser ranging measurements.

FIG. 1B illustrates a laser range finder 110, with a steerable laser assembly 120 that scans a steerable laser 121 in the same FOV 130 to generate approximately the same number of laser pulses. In the example of FIG. 1B the steerable laser is dynamically steered (instead of uniformly or non-dynamically steered) to generate a non-uniform high laser pulse density pattern surrounding the boundaries 180 and 190 or person 160 and vehicle 170 respectively. Steerable laser assembly 120 is an example of a dynamically-steerable laser assembly and can comprise circuitry to dynamically accept instructions (e.g. laser steering parameters) and configure laser 121 to rapidly change direction or pulse rate of a laser beam. Several embodiments of the present technology provide for using laser steering parameters to dynamically steer, guide, instruct or configure a steerable laser (e.g. an electronically steerable laser) to generate regions of increased laser pulse density or non-uniform pulse density. Laser range finder 110 can further comprise a laser detector 122 to detect reflections from laser pulses.

FIG. 2A illustrates some of the features and characteristics of a rotating LIDAR that is not dynamically steered (e.g. the HDL-64e from Velodyne Inc. or Morgan Hill, Calif.). Rotating LIDAR 205 has two lasers 210a and 210b each having a fixed corresponding elevation angle 215a and 215b. The lasers are mechanically rotated in azimuthal direction 218 (i.e. sweeps the azimuthal angle from 0-360 degrees). Lasers 210a and 210b rotate at a constant angular velocity and have a constant pulse rate. Each laser thereby produces a corresponding uniformly spaced sequence of laser pulses (e.g. sequence 222) with a constant elevation angle. The lasers proceed across FOV 220 in a predictable manner with each laser pulse in a sequence having a direction that is separated from the immediately previous laser pulse by a constant angular separation in the azimuthal plane. In particular, the lasers are not reconfigured during each scan to dynamically vary either the angular velocity or the pulse rate. For example, each laser pulse in sequence 222 has a direction that can be can be uniquely defined in spherical coordinates by an elevation angle (sometimes called a polar angle) and an azimuthal angle. In the case of sequence 222 each laser pulse has a constant elevation angle 215b and uniformly spaced azimuthal angles. In the case of FIG. 2A the range of azimuthal angle separations from one laser pulse to the next (e.g. angular separation 223) is single value.

In contrast FIG. 2B illustrates a LIDAR 207 that is dynamically steered by modulating the pulse frequency of a laser while rotating the laser at a constant angular velocity. The result of configuring laser 210a to dynamically modulate the pulse frequency is a sequence of laser pulses 224 with directions in a 1-D range that are separated by varying amounts. In the case of FIG. 2B the direction separations from one laser pulse to the next (e.g. angular separation 223) have a 1-D range and hence LIDAR 207 is dynamically steered in a 1 dimension. The directions in sequence 224 span a 1-D range.

In FIG. 2C an electronically steered LIDAR 230 is dynamically steered by modulating the angular velocity of laser 235 while maintaining a constant pulse rate. The result of configuring the electronically steerable laser to dynamically modulate the angular velocity (or position of the laser in the FOV 236) is a sequence 238 of laser pulses with directions in a 1-dimensional range that are separated by varying amounts. FIG. 2C illustrates dynamically steering a laser including at least three different velocities in the course of a single sweep of the FOV including an initial nominal velocity followed by slowing down the laser trajectory to group pulses more closely and then followed by speeding up the laser to separate laser pulses by more than the nominal separation.

FIG. 2D illustrates dynamically steering a laser in 2 dimensions to generate a sequence of laser pulses that span a 2-D angular range. The resulting sequence has a 2-D angular range from a single laser, in contrast to a rotating LIDAR where each laser generates a sequence with a 1-dimensional angular range. A LIDAR can be configured to dynamically steer a laser to produce sequence 240 by dynamically controlling the angular velocity or position of the laser in 2 dimensions (e.g. both azimuthal and elevation). Such a sequence cannot be performed by a rotating LIDAR due in part to the angular momentum of the rotating components preventing fast modulation of the elevation angle above and below azimuthal plane.

FIG. 2E illustrates dynamically steering a laser to generate a sequence of laser pulses, including several direction reversal during the sequence. For example, laser pulse sequence 242 begins by progressing the laser from left to right across the FOV 244. After laser pulse 245 the laser is reconfigured to reverse the X component of the laser direction from the positive X direction to the negative X direction. After laser pulse 246 the laser is configured to reverse direction again (i.e. back to a positive X direction). In contrast to merely modulating the speed of laser 235 in the positive X direction, direction reversals enable a dynamically steered laser to scan back and forth across a discovered boundary. In addition 2-D dynamic steering combined with direction reversal in the course of a scan of FOV 244 enables laser 235 to dynamically scan along a complex shaped boundary of an object.

FIG. 2F illustrates dynamically steering a steerable laser (e.g. electronically steerable laser 235 in FIG. 2E) to generate a sequence of laser pulses 250 that generate a complex (e.g. spiral) shape. Complex sequence 250 is not possible with a LIDAR that is not dynamically steered (e.g. a LIDAR that that merely rotates around a single axis). One advantage of generating a complex shaped sequence with non-uniform spacing is the ability to arbitrarily determine the order in which portions of the FOV 255 are scanned. For example, sequence 250 may eventually scan a similar region with a similar density as a rotating LIDAR but has the advantage of scanning the outer perimeter first and then gradually progressing towards the center of FOV 255.

FIG. 3 illustrates dynamically steering laser 121 in FOV 130 to generate two dense scan regions 310a and 310b, each with increased density of laser pulses (e.g. laser pulse 150d) relative to the average pulse density in the remainder of the FOV 130. In other embodiments dynamic steering can generate dense scan regions with greater laser pulse density (i.e. the number of laser measurements or pulses per unit solid angle) relative to an immediately surrounding area, relative to the average laser pulse density for a FOV, or relative to a previous scan of the same or a similar region. A solid state LIDAR 305 can perform a dynamically steered scan of a FOV by firstly identifying an object in the FOV (e.g. based on uniform low density scan of the FOV). Secondly, a steerable laser assembly 120 can receive laser steering parameters (e.g. instructions or configuration parameters) operable to generate increased laser pulse density in a region (e.g. 310a) surrounding the detected object. Laser steering parameters can generate a uniform shaped dense scan region (e.g. 310a), such as a square, rectangle or circle. Alternatively, the laser steering parameters can generate a more complex shaped dense scan region (e.g. 310b). Laser steering parameters that generate a uniform-shaped dense scan region such as 310a can be useful when the boundary of the object is unknown. (e.g. boundary 180 of person 160 in FIG. 1B)

Conversely, when the location of the boundary of an object is known with some degree of accuracy a set of laser steering parameters can be selected to instruct or configure the steerable laser to generate a more complex dense scan region (e.g. 310b) that is smaller, yet still contains the boundary. For example, the boundary 190 of vehicle 170 in FIG. 1B can be estimated from a previous laser scan data to lie between an outer perimeter 320 and an inner perimeter 330. Laser steering parameters can be selected to configure steerable laser 121 to perform a dense scan in the intervening region 310b. The ability of the dense scan regions 310a and 310b to encompass the boundary can easily be verified by a reflection detector operable to measure aspects of the time-of-flight or laser intensity of reflected pulses. In one embodiment a scan of FOV 130 by LIDAR 305 can comprise a first portion covering some or all of the FOV at a nominal laser pulse density followed by configuring the steerable laser to dynamically steer and thereby scan one or more dense scan regions with a greater laser pulse density. The dynamic steering can generate a laser pulse sequence within each dense scan region that includes 2-D direction changes and direction reversals.

Dynamically Steered Laser Range Finder

FIG. 4A illustrates several components of an exemplary dynamically steered laser range finder 405 in accordance with an embodiment of this disclosure. Laser range finder 405 can contain a steerable laser assembly 406. Laser range finder 405 can contain a laser steering parameter generator 410 to receive sensor data and generate laser steering parameters based on the sensor data. Sensor data can be received from sensor data processor 475 or directly from a sensor. Sensor data can indicate one or more aspects of the local environment. Laser steering parameter generator 410 can function to generate laser steering parameters (e.g. instructions) and transmit the parameters to the steerable laser assembly 406. Laser steering parameter generator 410 can transmit the parameters in a timed manner, such that upon receiving each laser steering parameter the steerable laser assembly 406 executes or reacts to the laser steering parameter. Alternatively, laser steering parameters can be transmitted in a batch or instruction file that is executed over a period of time by the steerable laser assembly 406.

Steerable laser assembly 406 can comprise one or more laser generators 420 and a laser positioner 430. The one or more laser generators 420 (often shortened to "lasers") can be laser diodes to produce one or more laser beams (e.g. beam 435) at one or more locations in the FOV determined by the laser positioner 430. Laser positioner 430 functions to steer one or more laser beams (e.g. beam 435) in the FOV based on the laser steering parameters. Laser positioner 430 can mechanically steer a laser beam from laser generator 420. Rotating LIDARs often use a mechanically steered laser positioner. An exemplary mechanically steered laser positioner 430 can include mechanical means such as a stepper motor or an induction motor to move optical components relative to the one or more laser generators. The optical components in an exemplary mechanical laser positioner can include one or more mirrors, gimbals, prisms, lenses and diffraction grating. Acoustic and thermal means have also been used to control the position of the optical elements in the laser positioner 430 relative to the one or more laser generators 420. Laser positioner 430 can also be a solid state laser positioner, having no moving parts and instead steering an incoming laser beam using electronic means to steer the laser beam in an output direction within the FOV. For example, an electronically steerable laser assembly can have a solid state laser position comprising a plurality of optical splitters (e.g. Y-branches, directional couplers, or multimode interference couplers) to split an incoming laser beam into multiple portions. The portions of the incoming laser beam can then be transmitted to a plurality of delay line where each portion is delayed by a selectable amount (e.g. delaying a portion by a fraction of a wavelength). Alternatively the delay lines can provide wavelength tuning (e.g. selecting slightly different wavelengths from an incoming laser beam). The variable delayed portions of the incoming laser beam can be combined to form an output laser beam at an angle defined at least in part by the pattern of delays imparted by the plurality of delay lines. The actuation mechanism of the plurality of delay lines can be thermo-optic actuation, electro-optic actuation, electro-absorption actuation, magneto-optic actuation or liquid crystal actuation. Laser positioner 430 can be combined with one or more laser generators 420 onto a chip-scale optical scanning system such as DARPA's Short-range Wide-field-of-view extremely agile electronically steered Photonic Emitter (SWEEPER). Laser positioner 430 can also be one or more electromechanically mirrors such as the array of electromechanical mirrors disclosed in U.S. Pat. No. 9,128, 190 to Ulrich et al. For the purpose of this disclosure a steerable laser assembly (e.g. 406 in FIG. 4A) is considered a dynamically steerable laser assembly if the laser positioner (e.g. positioner 430) can dynamically steer laser pulses in the course of a scan of a field of view. In some embodiments a dynamically steerable laser assembly has a laser positioner that comprises circuitry to process instructions (e.g. laser steering parameters) during a scan of a FOV and a reconfigurable mechanical or electronic tuning portion to direct one or more laser pulses during the scan. For example, a steerable laser assembly can have 64 lasers and a laser positioner comprising a simple rotating mirror. In contrast a dynamically-steerable laser assembly may have 64 lasers and a optical beam steering array operable to steer laser pulses form each of the lasers dynamically based on a stream of instructions (e.g. laser steering parameters) provided during a scan of a FOV.

Laser range finder 405 can further comprise a ranging subassembly 438. Ranging subassembly 438 can have a detector 440 that can comprise a photodetector 450 (e.g. photodiodes, avalanche photodiodes, PIN diodes or charge coupled devices CCDs, single photon avalanche detectors (SPADs), streak cameras). Photodetector 450 can also be a 2D photodetector array such as a CCD array or an InGaAs array. Detector 440 can further comprise, signal amplifiers and conditioners 452 (e.g. operational amplifiers or transconductance amplifiers) to convert photocurrent into voltage signals, Ranging subassembly 438 can further comprise circuitry such as a time of flight calculator circuit 455 (e.g. a phase comparator) and an intensity calculator 460. The construction of the steerable laser assembly 406 can co-locate detector 440 and steerable laser assembly 406 such that detector 440 is pointed in the direction of the outgoing laser beam and can focus the detector on a narrow part of the FOV where the reflected light is anticipated to come from.

Steerable laser assembly 406 can contain a time of flight calculator 455 to calculate the time of flight associated with a laser pulse striking an object and returning. The time of flight calculator 455 can also function to compare the phase angle of the reflected wave with the phase of the outgoing laser beam and thereby estimate the time-of-flight. Time of flight calculator 455 can also contain an analog-to-digital converter to convert an analog signal resulting from reflected photons and convert it to a digital signal. Laser range finder 405 can contain an intensity calculator 460 to calculate the intensity of reflected light. Laser range finder 407 can further comprise a 3D location calculator 464 to calculate a 3D location associated with a laser reflection 445.

Laser range finder 405 can contain a data aggregator 465 to gather digitized data from time of flight calculator 455 and intensity calculator 460 or 3D location calculator 464. Data aggregator 465 can group data into packets for transmitter 470 or sensor data processor 475. Laser range finder 405 can contain a transmitter 470 to transmit data packets. Transmitter 470 can send the data to a processing subassembly (e.g. a computer or a remote located sensor data processor) for further analysis using a variety of wired or wireless protocols such as Ethernet, RS232 or 802.11.

Laser range finder 405 can contain a sensor data processor 475 to process sensor data and thereby identify features or classifications for some or all of the FOV. For example, data processor 475 can identify features in the FOV such as boundaries and edges of objects using feature identifier 480. Data processor 475 can use feature localizer 485 to determine a region in which the boundaries or edges lie. Similarly a classifier 490 can use patterns of sensor data to determine a classification for an object in the FOV. For example, classifier 490 can use a database of previous objects and characteristic features stored in object memory 495 to classify parts of the data from the reflected pulses as coming from vehicles, pedestrians or buildings. In the embodiment of FIG. 4A sensor data processor 475 is located close to the steerable laser assembly (e.g. in the same enclosure), thereby enabling processing of the sensor data (e.g. reflection ranges) without the need to transmit the reflection data over a wired or wireless link. FIG. 4A is an example of an embedded processing architecture where the latency associated with a long distance communication link (e.g. Ethernet) is avoided when transmitting range data to the sensor data processor.

Figure 4B:
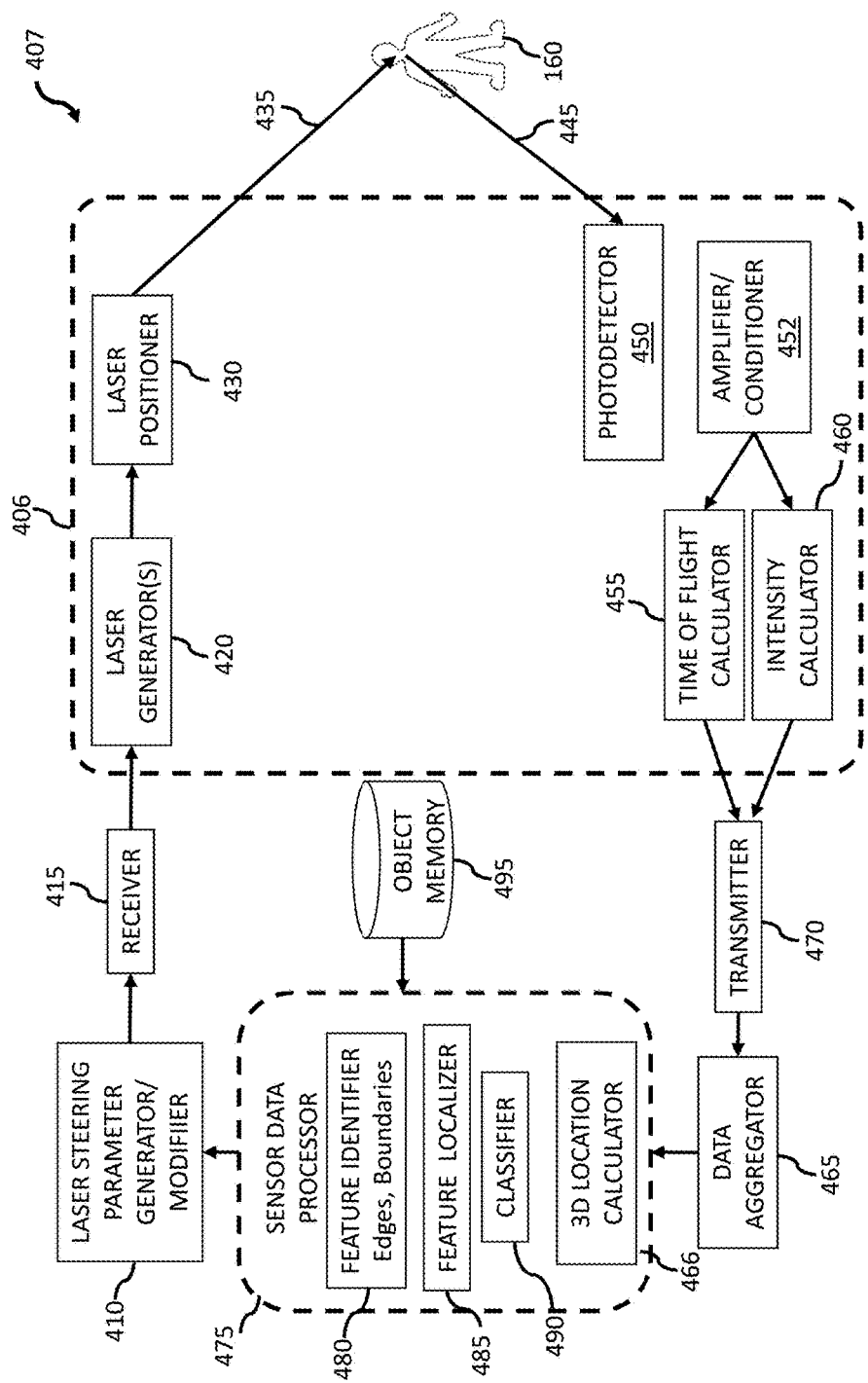

FIG. 4B illustrates several components of a dynamically steered laser range finder 407 in accordance with an embodiment of this disclosure. In this embodiment the data processing and laser steering parameter generation components are remotely located from the steerable laser assembly 406. Steerable laser assembly 406 can contain one or more lasers (e.g. laser generator 420), and a positioner 430, that can include circuitry to dynamically steer a laser beam from the laser generator based on processing laser steering parameters. Laser range finder 407 can contain a receiver 415 to receive laser steering parameters from the remotely located laser steering parameter generator 410. Receiver 415 can be a wired or wireless receiver and implement a variety of communication protocols such as Ethernet, RS232 or 802.11. Transmitter 470 can transmit data from the time of flight calculator 455 intensity calculators and 3D location calculator 464 (in FIG. 4A) to a remote located data aggregator 465.

Figure 5:
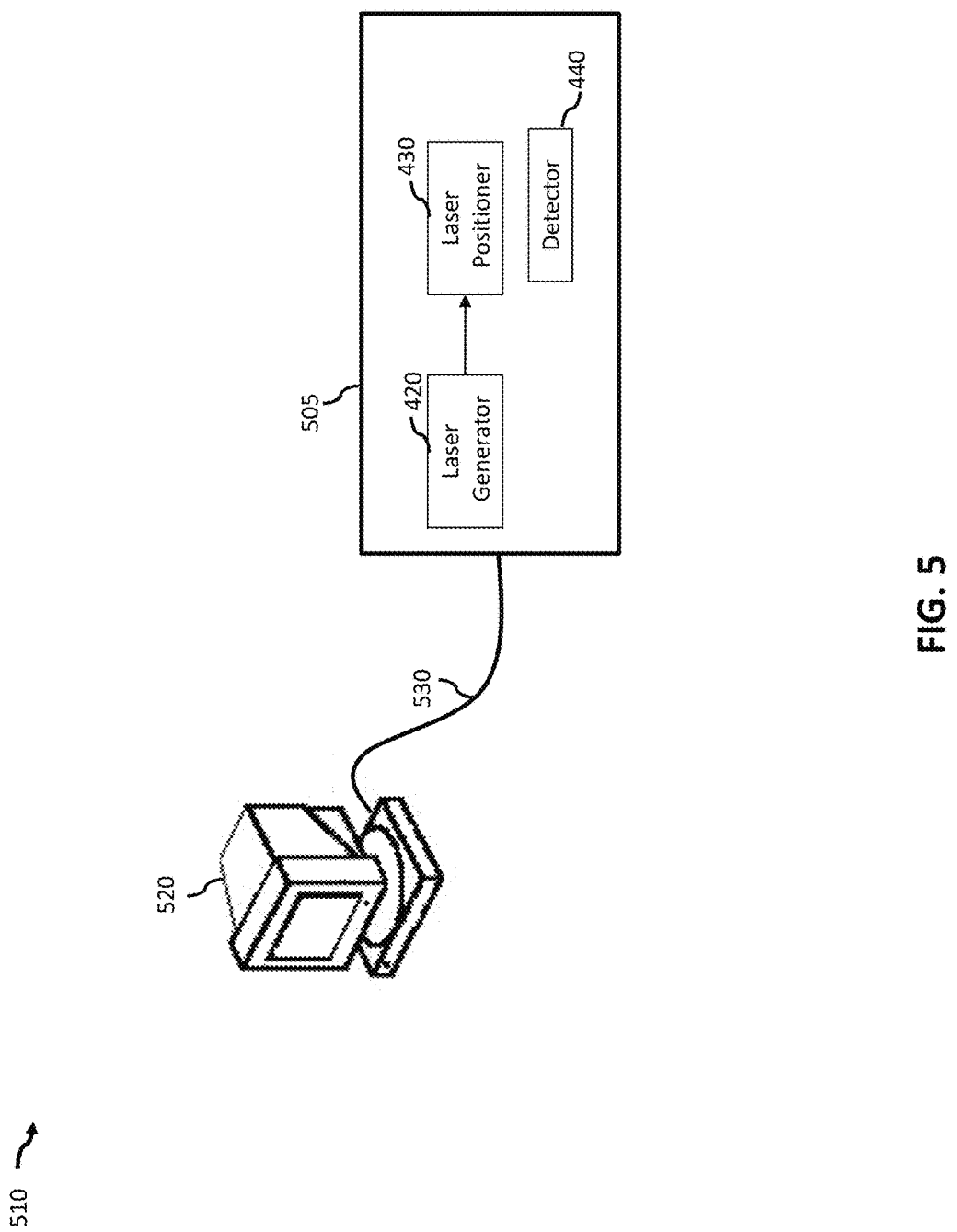
FIG. 5 illustrates an exemplary laser range finding system including a processing subassembly and a dynamically-steerable laser assembly connected by a communication link, according to an embodiment of the present disclosure.

FIG. 5 illustrates several components of a laser range finder 510 according to several embodiment of the present disclosure. Laser range finder 510 can contain a processing subassembly 520, a dynamically-steerable laser assembly 505 and a communication link 530 for linking the processing and steerable laser assemblies. Processing subassembly 520 can include one or more processors (e.g. sensor data processor 475 in FIGS. 4A and 4B) one or more transceivers (e.g. a transceiver including receiver 415 and transmitter 470) such as an Ethernet, RS485, fiber optic, Wi-Fi, Bluetooth, CANBUS or USB transceiver. Processing subassembly 520 can also include a computer-readable storage medium (e.g. flash memory or a hard disk drive) operable to store instructions for performing a method to detect and utilize a remote mirror (e.g. a roadside mirror). Dynamically-steerable laser assembly 505 can include a laser generator 420 and a laser positioner 430 to steer a laser beam at one or more locations in the FOV based on the laser steering parameters. Laser positioner 430 can include one or more optical delay lines, acoustic or thermally based laser steering elements. In a solid state steerable laser assembly laser positioner 430 can function to receive instructions (e.g. laser steering parameters) and thereby delay portions of a laser beam (i.e. create a phase difference between copies of the laser beam) and then combine the portions of the laser beam to form an output beam positioned in a direction in the FOV. A mechanical laser positioner 430 can be a mirror and mirror positioning components operable to receive input signals (e.g. PWM input to a steeper motor) based on laser steering parameters and thereby steer the mirror to position a laser in a direction in the FOV. Steerable laser assembly 505 can also include a detector 440 comprising components such as light sensor(s) 450, time of flight calculator 455 and light intensity calculator 460 and 3D location. Steerable laser assembly 505 can include one or more transceivers (e.g. receivers 415 and transmitters 470) such as Ethernet, RS485, fiber optic, Wi-Fi, Bluetooth, CANBUS, or USB transceivers. Communication link 530 can be a wired link (e.g. an Ethernet, USB or fiber optic cable) or a wireless link (e.g. a pair of Bluetooth transceivers). Communication link 530 can transfer laser steering parameters or equivalent instructions from the processing subassembly 520 to the steerable laser assembly 505. Communication link 530 can transfer ranging data from the steerable laser assembly to the processing subassembly 520.

FIG. 6A illustrates exemplary laser steering parameters according to aspects of the technology. A set of laser steering parameters 601 can include a start location 602 indicating where one or more other laser steering parameters should be applied. Start location 602 can be a point in a Cartesian coordinate system with an associated unit of measure (e.g. 20 mm to the right and 20 mm above the lower right corner of the lower left corner of the FOV). In several laser range finders the FOV is described in terms of angular position relative to an origin in the FOV. For example, a starting point could be +30 degrees in the horizontal direction and +10 degrees in the vertical direction, thereby indicating a point in the FOV.

A laser steering parameter can be a region width 604 or a region height 606. The width and height of can be expressed in degrees within the FOV. One exemplary set of laser steering parameters could include a start location, region width and region height thereby defining a four sided region in the FOV. Other laser steering parameters in the exemplary set of laser steering parameters can indicate how to tailor a scan within this region, such as laser scan speed 614, laser pulse size 616 (e.g. laser pulse cross sectional area at the exit of a LIDAR), number of laser pulses 618, or pulse intensity.

A laser steering parameter can be one or more region boundaries 608 defining the bounds of a region. For example, region 620 in FIG. 6B can be defined by the points defining an outer bound 320 and an inner bound 330. A steerable laser can be instructed to scan with increased density (e.g. a slower scan speed and a constant pulse rate) within region 620 defined by region bounds 608.

A laser steering parameter can be one or more laser pulse locations 610. Pulse locations 610 can provide instructions to a steerable laser to move to corresponding positions in the FOV and generate one or more laser pulses. In such embodiments the laser can be generating a laser beam while being steered from one location to another and can dwell for some time at the laser pulse locations. In other embodiments the steerable laser can use these points 610 to generate discrete pulses at the defined locations. In such embodiments the laser beam can be generated at discrete pulse locations and can dwell at the pulse location for some time. In FIG. 6C a plurality of laser pulse locations form a pattern of pulses 630. A laser steering parameter can be one or more path waypoints 612, which define points in a FOV where a steerable laser (e.g. 115 in FIG. 1A) can implement direction changes. FIG. 6D illustrates two exemplary paths 640 and 650 that can be defined by path waypoints (e.g. waypoints 612) and used to instruct steerable laser 110. It would be obvious to a person of skill in the art that several laser steering parameters can produce equivalent or nearly equivalent regions of non-uniform pulse density. For example, selecting various combination of laser steering parameters can cause region 620 in FIG. 6B, pattern of pulses 630 in FIG. 6C and combination of paths 640 and 650 to produce similar regions of increased or non-uniform laser pulse density.

Figure 7:
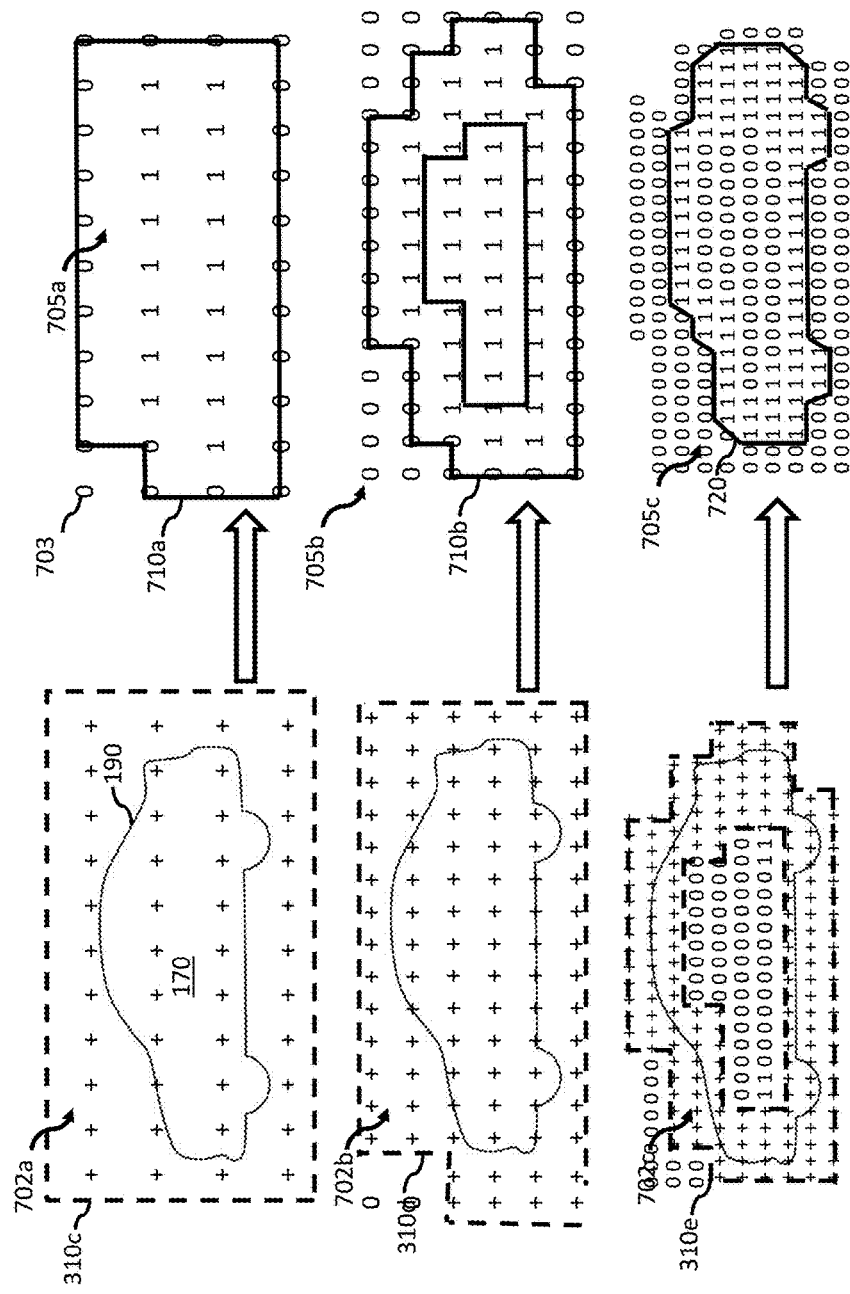
FIG. 7 illustrates a process for iteratively improving laser steering parameters and object boundary estimation according to aspects of the technology.

FIG. 7 illustrates a process for iteratively refining laser steering parameters and thereby progressively localizing the boundary of an object in the field of view. An initial set of laser steering parameters are used to generate laser pulse distribution 702a. FIG. 7 illustrates an example of iterative boundary localization (IBL), wherein the boundary of an object (e.g. boundary 190 of vehicle 170) is localized to iteratively smaller or more specific subset of the FOV over the course of several scans of the FOV. A set of reflection data 705a is gathered based on aspects of reflected light measured by a reflection detector (e.g. 450 in FIG. 4) including time-of-flight calculator 455 and intensity calculator 460. In the embodiment of FIG. 7 the set of reflection data is simplified to be 0 for reflections that are outside the boundary of vehicle 170 and 1 for laser pulses with a TOF indicating placement within the boundary 220. For the purpose of this disclosure a boundary region can be a region of a field of view encompassing the boundary of an object in the FOV. For example, if laser ranging data indicates a distinct change in TOF consistent with an object (e.g. vehicle 170) a boundary region 710a can be calculated that encompasses all locations in which the boundary of the object can be. In this sense the boundary region can encompass all possible locations of the boundary of the object in the FOV. Based on the set of reflection data 705a a boundary region 710a can be determined, wherein the boundary region can be selected based on the perimeter of a plurality of points known to contain boundary 190. The boundary region 705a can be smaller than the original dense scan region 310c generated by the laser pulse distribution. This size reduction of the boundary region relative to the dense scan region can be due to some of the reflection data indicating that it is not close to the boundary 190 of vehicle 170, such as reflection data point 703. Boundary region 710a can be used to generate laser steering parameters used to instruct a steerable laser to generate laser pulse distribution 702b. Dense scan region 310d formed by a second set of laser pulses 702b can have a similar shape to boundary region 710a. The process can be repeated with the second set of laser pulses 702b yielding a second set of reflection data 705b. The second set of reflection data 705b can indicate a smaller boundary region 710b that can be used to refine laser steering parameters and thereby generate a third set of laser pulses 702c. Laser pulse distribution 702c can lie within the perimeter of dense scan region 310e. After a number of iterations the boundary 720 of an object (e.g. vehicle 170) can be estimated from the $N^{th}$ set of reflection data (e.g. third set of reflection data 705c). In the example of FIG. 7 the final boundary estimate 720 is achieved by selecting a perimeter midway between points indicating placement inside the object boundary and points outside the object boundary. Iterations of refining the laser steering parameters can be continued until the distance between points outside and inside the boundary satisfied a distance requirement (e.g. the boundary is localized to within 50 mm in all locations). In one embodiment the most recent set of reflection data can be combined with some or all of one or more previous sets of reflection data to form a combined set of reflection data. The set of laser steering parameters can be modified or selected based on the combined set of reflection data. Similarly, the combined set of reflection data can be processed to determine a modified boundary region that functions to identify a region that contains a boundary of an object. The modified boundary region can then be used to generate or refine laser steering parameters that dynamically steer a laser beam (e.g. configure a steerable laser) to generate a dense scan region with the shape and location of the modified boundary region.

Figure 8:
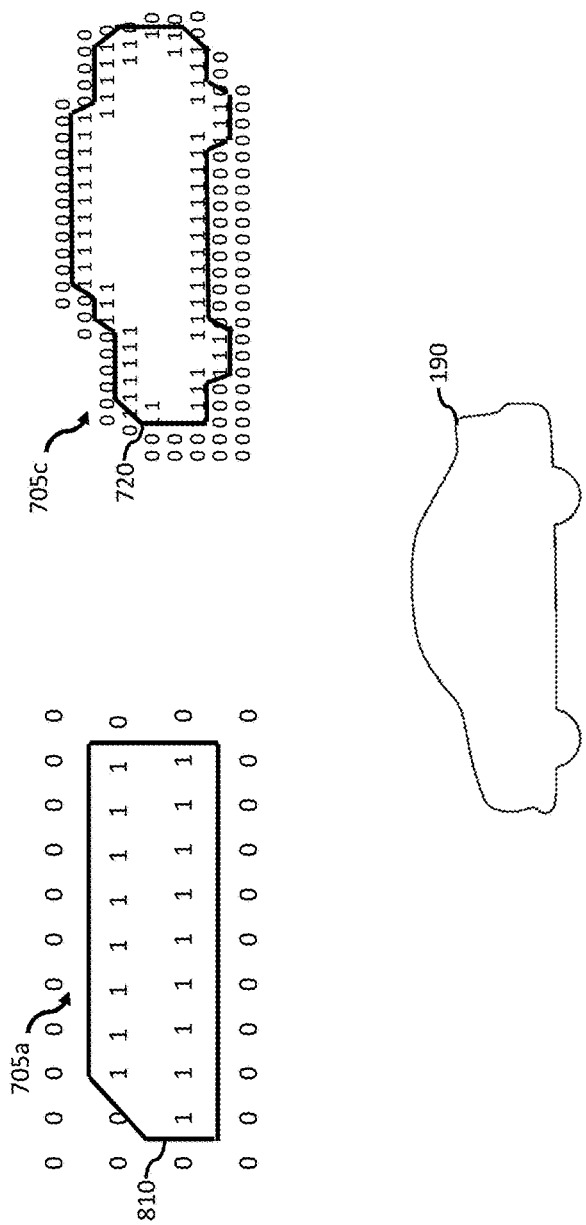
FIG. 8 illustrates exemplary object boundary estimation based on dynamically steering a laser range finder, according to an embodiment of the present disclosure.

FIG. 8 illustrates application of a common boundary estimation criterion to the initial data set 705a and the third set of data 705c, thereby yielding boundary estimates 810 and 720 respectively. It can be appreciated that iteratively refining the laser steering parameters generates a boundary estimate 720 that is an improvement over the initial result 810.

Figure 9:
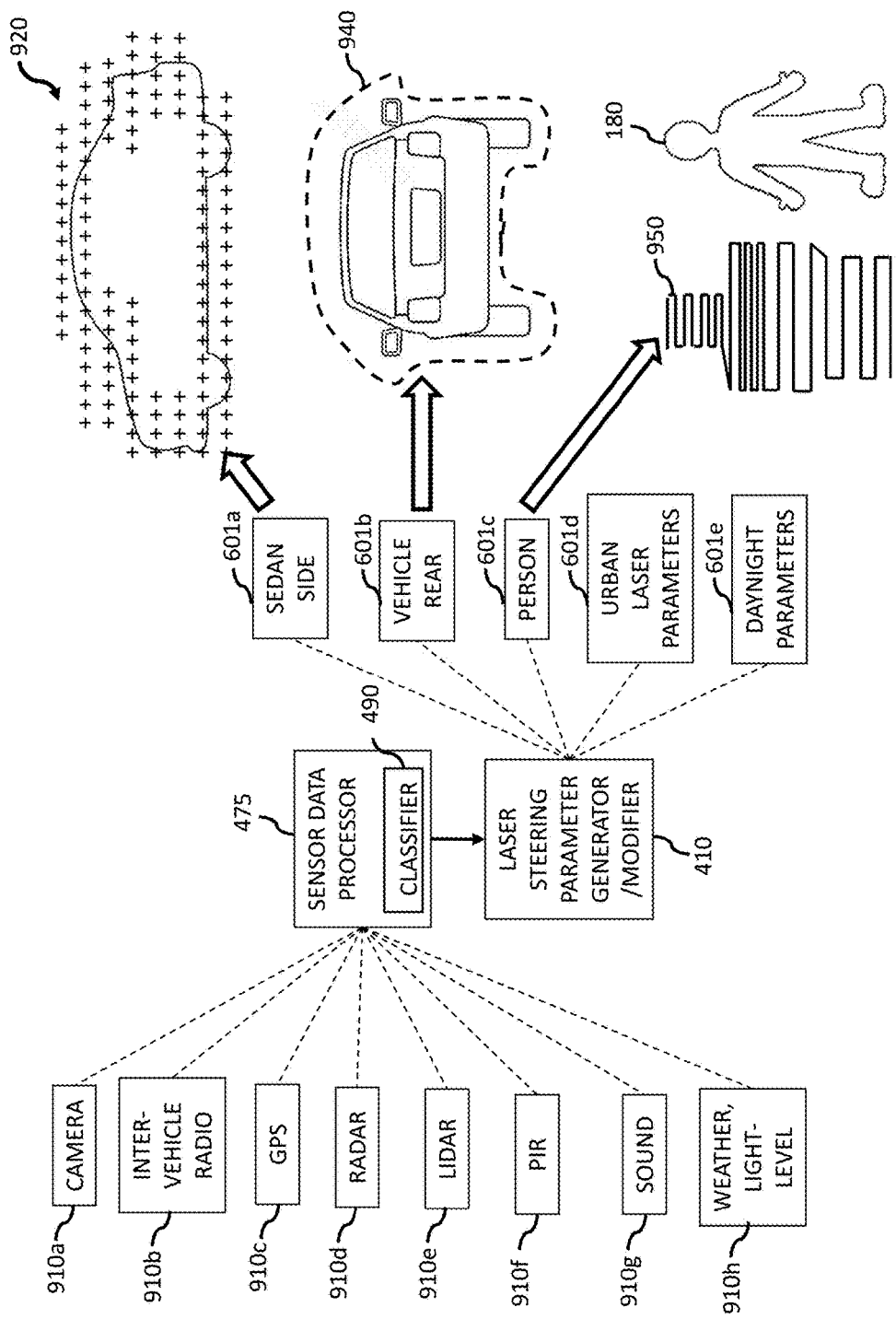
FIG. 9 is a functional diagram illustrating several components of an exemplary dynamically steered laser range finder in accordance with an embodiment of the present disclosure.

FIG. 9 illustrates a functional diagram wherein sensor data from a one or more of a variety of sources can be used to generate laser steering parameters for a steerable laser. A uniform laser scan pattern in a FOV 130 can be augmented, refined or replaced by one or more sets of laser steering parameters based on sensor data from or regarding the local environment. Examples can include event-driven laser steering parameter selection such as processing image data from a camera 910a, detecting a person with classifier 490 and thereby generating laser steering parameters 601c. Laser steering parameters 601c include a scan path 950 adapted to the shape of a person and can be applied in a portion of or location within the FOV 130 indicated by first data. Laser steering parameters can also be based on the probability of events. For example, GPS sensor data from a GPS receiver 910 can indicate that the laser range finding system (e.g. 110 in FIG. 1B) is in an urban environment. The system (e.g. 110 in FIG. 1B) can be programmed store and implement a particular set of laser steering parameters (e.g. urban laser steering parameters 601d) operable to dynamically steer a laser to account for an increased probability of urban hazards such as pedestrians, cross-traffic, and obstructed or narrow streets. Similarly, sensor data processor 475 can receive weather data from weather sensors (e.g. rain sensors or temperature sensors) or light-level sensors. Sensor data process 475 or classifier 490 can process the weather data and instruct laser steering parameter generator 410 to generate a set of laser steering parameters such as day/night parameters 601e based on the weather data. For example, in wet conditions laser pulses can be concentrated in a region of the FOV designed to detect obstacles further away to account for increase stopping distance.

In general a wide variety of sensor data can be gathered form a variety of sources such as camera 910a, inter-vehicle transceiver 910b, GPS receiver 910c, RADARS 910d, LIDAR 910e, passive infrared sensor (PIR) 910f, sound sensor 910g and weather/environmental sensor 910h. This sensor data can be processed by a data processor 475, classified by a classifier 490 and supplied to a laser steering parameter generator 410. Laser steering parameter generator/modifier 410 can generate a many sets of laser steering parameters based on sensor data, such as set 601a containing a predefined patterns of laser pulse points (e.g. pattern 920) corresponding to classification indicating a passenger vehicle side view. Another exemplary set of laser steering parameters 601b can define a region 940 corresponding to a classification or sensor data indicating the rear of a vehicle. Region 940 can be scanned with a dense pattern of laser pulses in order to determine whether characteristic features associated with the rear of a vehicle are present.

Operation

Figure 10A:
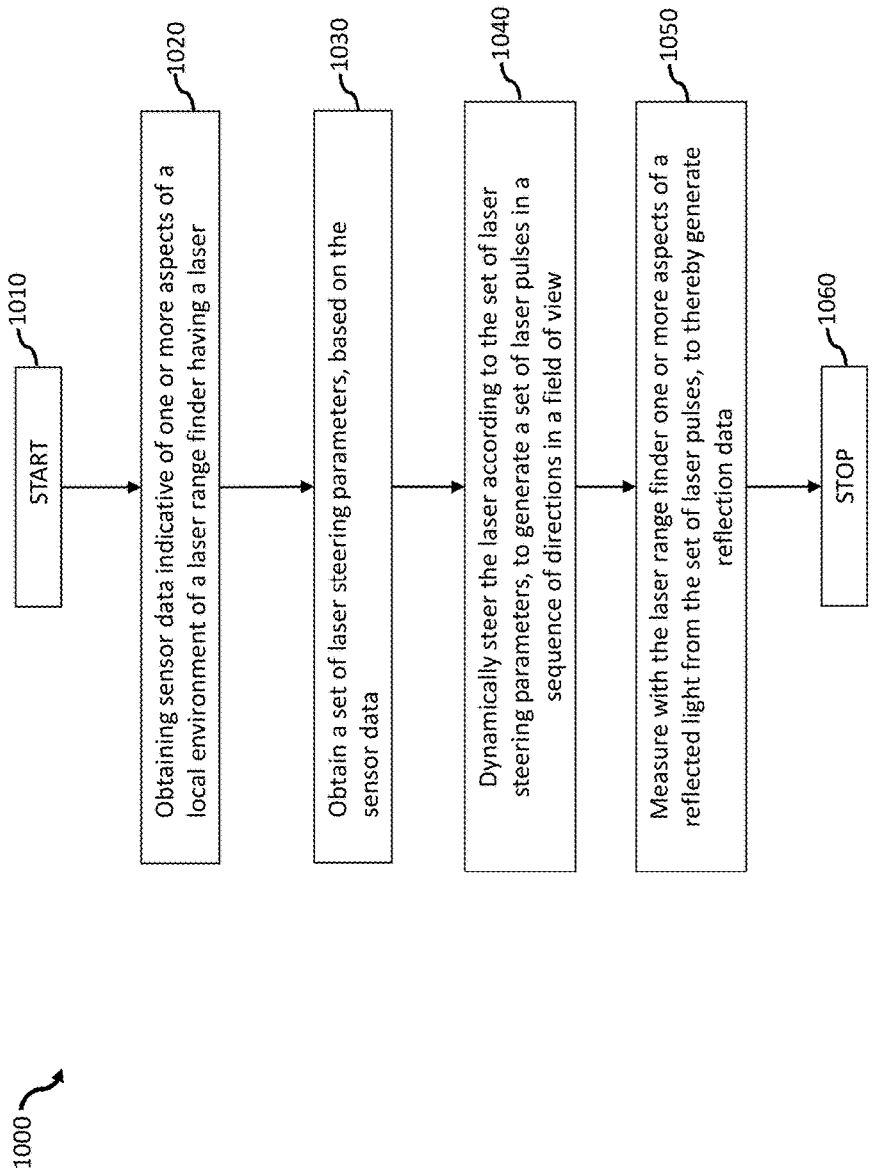
FIG. 10A-10D illustrates flow diagrams of processes for selecting laser steering parameters and dynamically steering a laser range finder, according to embodiments of the present disclosure.

FIG. 10A is flow diagram of a process 1000 of selecting laser steering parameters based on sensor data and dynamically steering a laser based on the laser steering parameters, according to an embodiment of the present disclosure.

At block 1010 method 1000 starts. At block 1020, sensor data indicative of one or more aspects of a local environment of a laser range finder having a laser is obtained. At block 1030, a set of laser steering parameters, based on the sensor data is obtained. At block 1040, the laser is dynamically steered according to the set of laser steering parameters, to generate a set of laser pulses in a sequence of directions in a field of view. At block 1050, the laser range finder measures one or more aspects of a reflected light from the set of laser pulses, thereby generating reflection data. At block 1060 method 1000 stops.

Figure 10B:
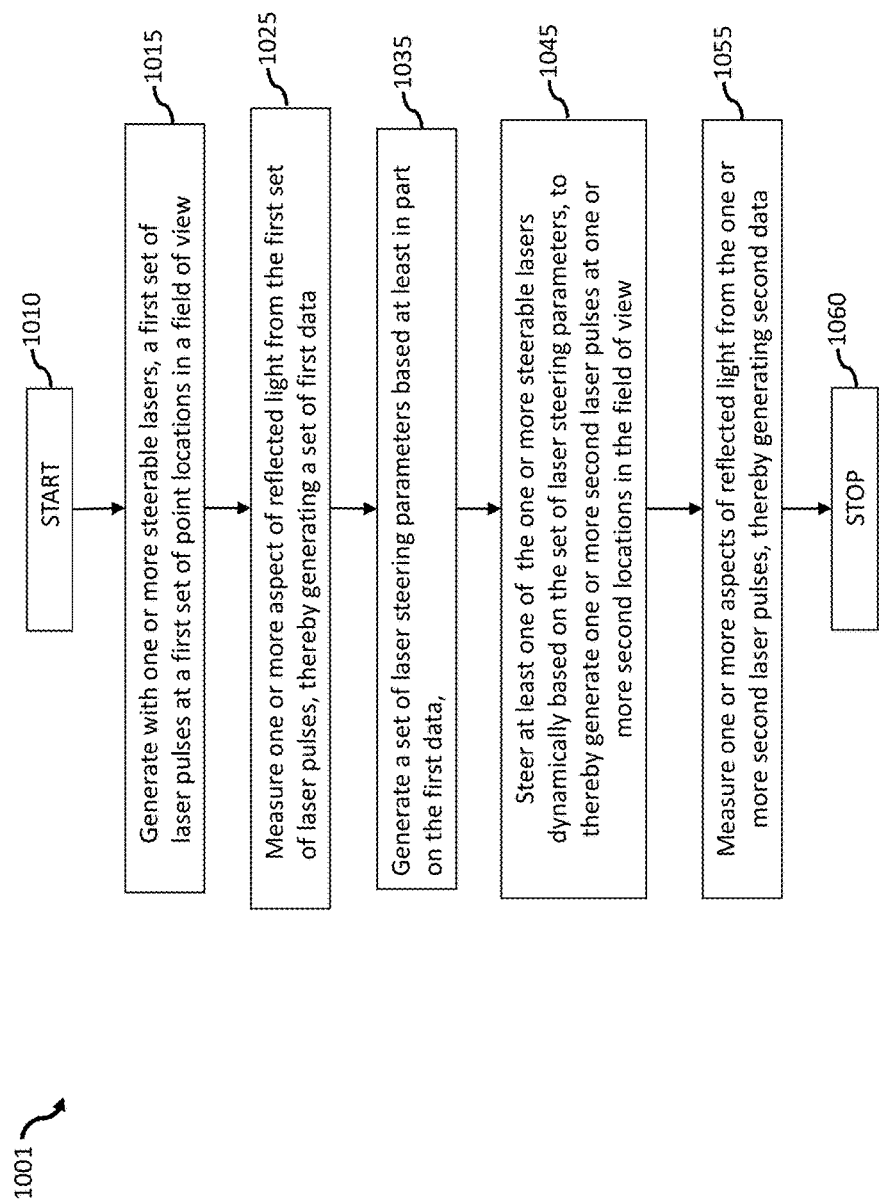

FIG. 10B is flow diagram of a process 1001 of selecting laser steering parameters based on data and dynamically steering a laser based on the laser steering parameters, according to an embodiment of the present disclosure. At block 1015 a laser range finder having one or more steerable lasers, generates a first set of laser pulses at a first set of directions in a field of view. At block 1025 the laser range finder measures one or more aspect of reflected light from the first set of laser pulses and thereby generating first data. At block 1035, the laser range finder generates a set of laser steering parameters based at least in part on the first data. At block 1045 the laser range finder dynamically steers at least one of the one or more steerable lasers, based on the set of laser steering parameters, thereby generating one or more second laser pulses at one or more second locations in the field of view. At block 1055, the laser range finder measures one or more aspects of reflected light from the one or more second laser pulses to generate second data. In one example, sensor data from the local environment can be inter-vehicle communication data from a first vehicle that causes a LIDAR in a second vehicle to obtain or generate a set of laser steering parameters and dynamically steer or configure a laser in a LIDAR to non-uniformly scan a FOV.

In a related second group of embodiments a method to complete a dynamically steered non-uniform LIDAR scan of a FOV within a target time is disclosed. A time target to complete a LIDAR scan of a FOV can be combined with sensor data from the local environment to generate laser steering parameters operable to configure a LIDAR to dynamically steer. Laser steering parameters (e.g. laser instructions) can be selected based on information from the local environment as well as based at least in part on a time target to complete the scan. In this way the density of laser ranging measurements can be tailored to ensure that the whole FOV or a defined portion of the FOV is scanned within the target time. During a first scan of the FOV a region of the FOV can be identified. During a second scan of the FOV the identified region can receive a dense scan with a smaller point spacing than the average laser pulse spacing. The shape of the regions and the scan point density can be selected based on requirements to complete the scan in a reasonable time.

Laser steering parameters (e.g. laser instructions) can be selected based on information from the local environment as well as based at least in part on a time target to complete the scan. In this way laser steering parameters can configure a LIDAR to both dynamically steer a laser to generate a sequence of laser pulses (e.g. based on a classification, discovered boundary or location of an object), and ensure that the scan is completed within a target time or a target number of laser pulses. During a first scan of the FOV a region of the FOV can be identified. Laser steering parameters can be generated based at least in part on a target time and based in part on the identified region. During a second scan a laser can be dynamically steered according to the laser steering parameters to perform a dense scan with smaller point spacing than the average laser pulse spacing.

In a related embodiment, first data received by a processing subassembly of a laser range finder (e.g. 520 in FIG. 5) can identify one or more regions of a FOV containing objects of interest (e.g. vehicles, cyclists or pedestrians). The processing subassembly can configure a steerable laser assembly based on a target time to complete a non-uniform laser ranging scan of the FOV. In some cases the first data can identify dense scan regions and the target time can be used to generate laser steering parameters for the dense scan regions that control laser pulse density (pulses per angular range), scan velocity, dwell time in each region.

In one example a laser range finding system (e.g. a LIDAR) identifies a time of flight boundary (e.g. an object edge) based on laser reflections, and generates a set of laser steering parameters to investigate the boundary using a complex laser trajectory. The target time can be used to generate a laser steering parameter that is a criteria for when the laser should cease to localize the boundary with additional dynamically steered laser pulses. For example, in order to complete a laser ranging scan in 100 milliseconds a laser range finder system can generate a laser steering parameter that dictates that a boundary is sufficiently localized if it lies in a 0.5 degree azimuthal angular range. The laser steering parameter can be based on the target time if it is calculated, selected or configured based on the value or existence of a target time.

In one embodiment a method performed by a laser range finding system comprises: First, obtaining first data indicative of one or more aspects of an environment local to the laser range finder comprising a laser, secondly obtaining a time target for completion a laser ranging scan. Thirdly the method obtains a set of laser steering parameters based on the first data and based at least in part on the time target. Fourthly the method performs a scan of a field of view by dynamically steers the laser according to the set of laser steering parameters, to generate a set of laser pulses in a sequence of directions. Fifthly the method measures one or more aspects of reflected light from the set of laser pulses, thereby generating reflection data. Finally the method completes the laser ranging scan within the target time.

Figure 10C:
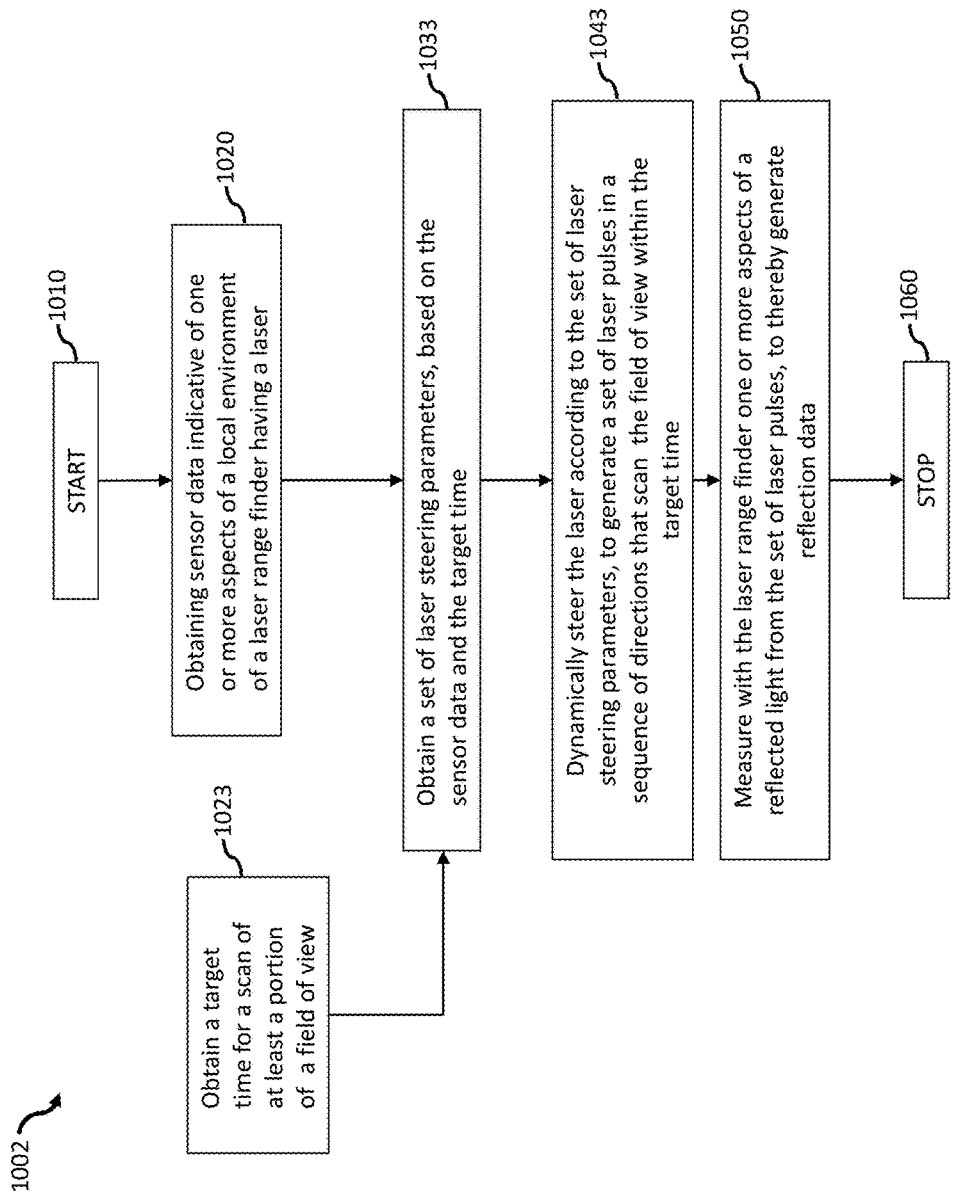

FIG. 10C is flow diagram of a method 1002 for selecting laser steering parameters based on sensor data and a time target to complete a scan and dynamically steering a laser based on the laser steering parameters, according to an embodiment of the present disclosure.

At block 1020, sensor data indicative of one or more aspects of a local environment of a laser range finder having a laser is obtained. The sensor data can be obtained in wireless signals (e.g. from other vehicle), obtained from sensors on the same vehicle as the laser range finder, obtained by the laser range finder, or obtained from a memory containing sensor data. At block 1023 a time target for a scan of at least a portion of a field of view is obtained. The time target can be a total time for the scan of the whole FOV (e.g. 100 ms). At block 1033 a set of laser steering parameters is obtained, based on the sensor data and the target time. The set of laser steering parameters can be obtained by calculation, selection or memory access. For example, in response to identifying person 160 and vehicle 170 in FIGS. 1A and 1n response to obtaining a time target that a scan of the FOV should take 0.1 seconds a laser range finder can determine a laser pulse density and a trajectory that scans two dense scan regions surrounding person 160 and vehicle 170 in FIG. 1B. In one example sensor data indicating objects of interest in the FOV can be used to generate laser steering parameters to define the size of dense scan regions. The time target can furthermore be used to generate a laser steering parameter defining an angular velocity (and hence laser pulse dense) within the dense scan regions.

At block 1043, the laser is dynamically steered according to the set of laser steering parameters, to generate a set of laser pulses in a sequence of directions that scan the field of view within a target time. At block 1050 one or more aspects of a reflected light from the set of laser pulses are measured to generate reflection data.

In a related third group of embodiment a method to dynamically configure a LIDAR by identifying objects or regions of interest in a FOV and dynamically apportioning LIDAR resources (e.g. number or density of laser pulses), based on number of relative importance of identified objects is disclosed. In one embodiment a laser range finding system obtains sensor data from an environment local to the LIDAR and thereby identifies a plurality of objects. The laser range finding system then assigns one or more weights to each of the plurality of objects, wherein the weights function to non-uniformly apportion laser range measurements in the FOV of the LIDAR. The laser range finding system uses the weights to generate laser steering parameters (e.g. instructions to configure a dynamically steerable laser in the LIDAR) and dynamically steers a steerable laser in the LIDAR according to the laser steering parameters. The method can thereby dynamically steer a LIDAR to generate a non-uniform density pattern of laser ranging measurements based on the number of relative importance of discovered objects.

In one example, a LIDAR with a dynamically steerable laser may gather sensor data from a FOV that indicates one important object and no other objects of any importance. Laser steering parameters can be generated to steer the laser in a region surrounding the object with a density of one laser pulse for each 0.2 degrees of horizontal sweep in the FOV and a density of one pulse per degree of horizontal sweep outside the region containing the object. If at a later time three objects of equal importance (e.g. weighting) are detected in the FOV, the laser steering parameters can be modified to generate one pulse per 0.5 degrees of horizontal sweep in the regions surrounding each of the three objects. Hence embodiments of this disclosure can apportion laser pulses based on assigned priority or weight of objects. Weights can be relative weightings, wherein the weight assigned to a first object is based at least in part on the weight assigned to a second object. For example, weights can be normalized by initially assigning a weight to each object form a plurality of objects and later dividing each object weighting by the combined weights for each of the plurality of objects. Objects that exhibit interesting or changing behavior (e.g. movement, appearing in FOV, or an interesting classification) can be assigned increased weights and hence an increased density of laser ranging measurements based on the set of laser steering parameters. The weight assigned to each of a plurality of objects or regions in a FOV can be used to generate a set of laser steering parameters with individually tailored density, dense scan region shapes, laser beam trajectories, intensities, spot sizes or periodicity with which the region or object is revisited by a steerable laser in a LIDAR.

Figure 10D:
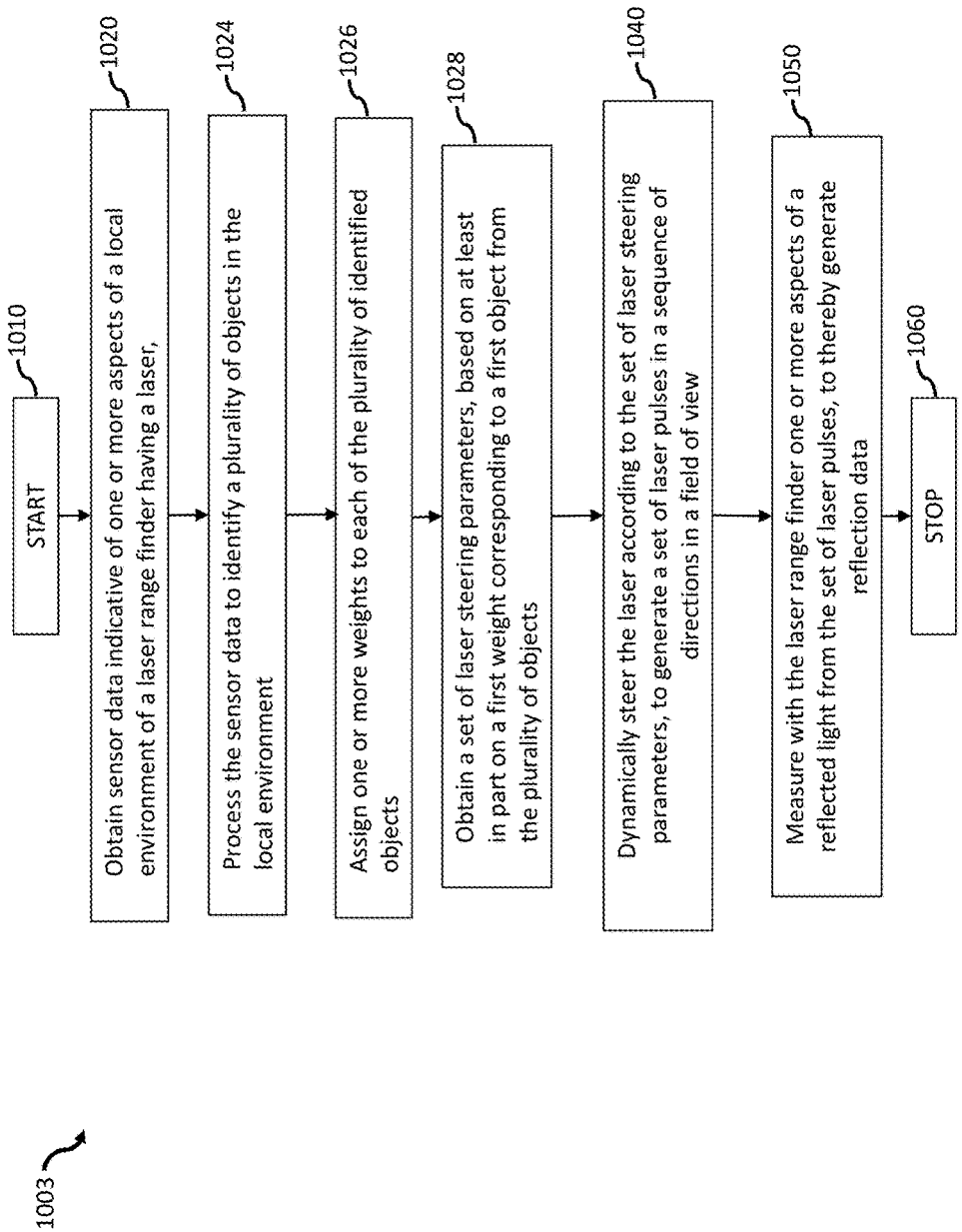

FIG. 10D is flow diagram of a method 1003 for selecting laser steering parameters based on one or more weights applied to identified objects and dynamically steering a laser based on the laser steering parameters, according to an embodiment of the present disclosure.

At block 1020, sensor data indicative of one or more aspects of a local environment of a laser range finder having a laser is obtained. The sensor data can be received in wireless signals, sensed by the laser range finder, sensed by other sensors on a common vehicle or looked up based on a location of the vehicle from a database of sensor data.

At block 1024, the sensor data is processed to identify a plurality of objects in the local environment. At block 1026, one or more weights are assigned to each of the plurality of identified objects. The weight assignment can be based on processing the sensor data to identify movement, object classification, object trajectory. The weight assignment can be based on a lookup operation (such as assigning a weight of 5 to all objects with ranges <10 meters from a laser range finder). In another example a first object, can be identified as a car, sensor data can be vehicle-to-vehicle (V-V) communication signals and upon processing the V-V communication signals the object (i.e. the car) can receive a weight of 10. Another object (e.g. a pedestrian) can receive a weight of 15 based on normalized weighting relative to the car, based on the contents of the V-V communication signals indicating the presence of the pedestrian, based on a recent arrival of the pedestrian in the FOV or based on a trajectory of the pedestrian (e.g. into the path of laser range finder conducting method 1003).

At block 1028, a set of laser steering parameters is obtained, based on at least in part on a first weight corresponding to a first object from the plurality of objects. In several embodiments the laser steering parameters can be calculated by processing the weights corresponding to the plurality of identified objects. For example, the weights can be processed to normalize, prioritize or rank the weights to identify particular corresponding objects in need of increased laser pulse density. At block 1040, the laser is dynamically steered according to the set of laser steering parameters, to generate a set of laser pulses in a sequence of directions in a field of view. At block 1050, the laser range finder measures one or more aspects of a reflected light from the set of laser pulses are to generate reflection data. At block 1060 method 1003 stops.

Figure 11:
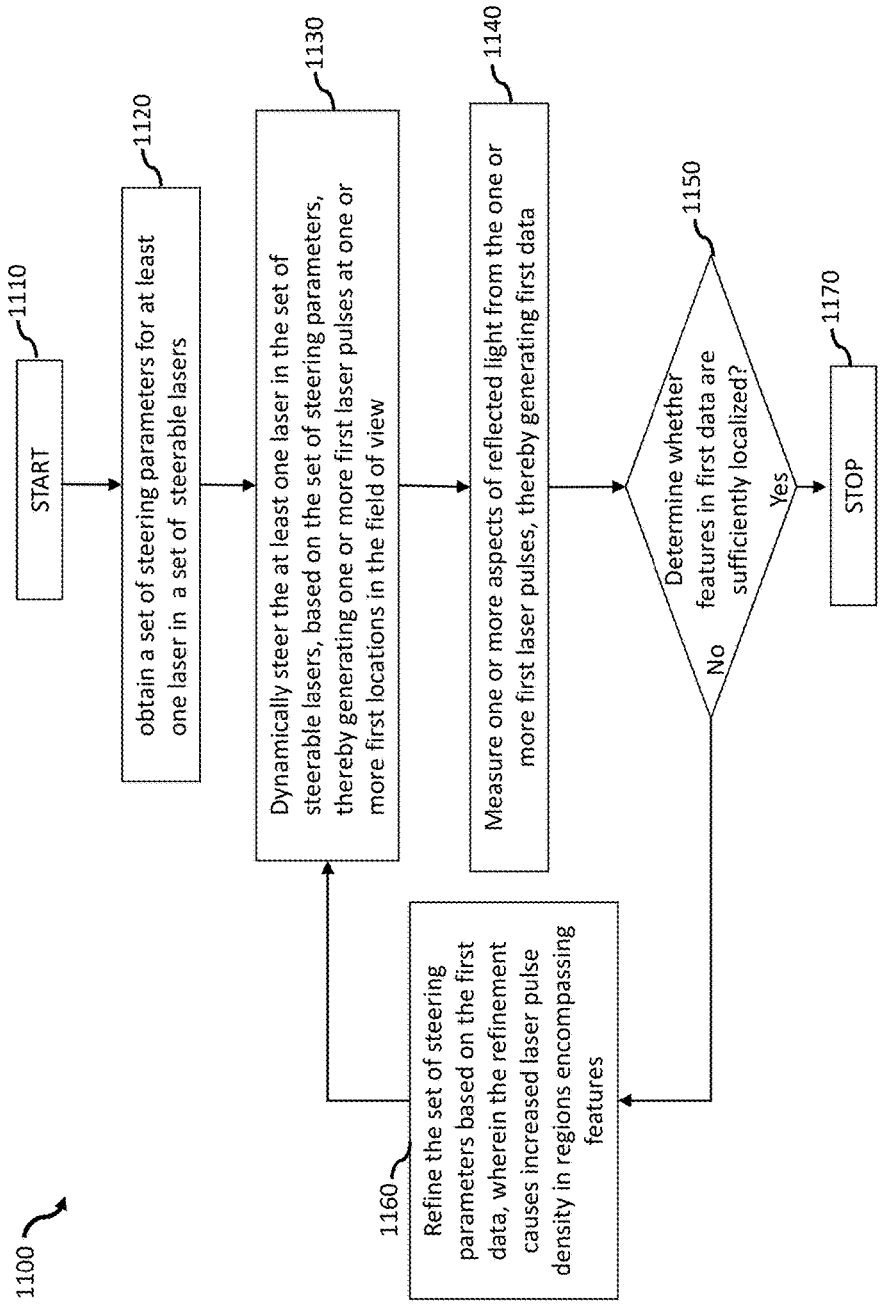
FIG. 11 illustrates a flow diagram of a process of refining a set of laser steering parameters based on measured data, according to an embodiment of the present disclosure.

FIG. 11 illustrates a flow diagram of a process 1100 of refining a set of laser steering parameters based on measured data, according to an embodiment of the present disclosure. At block 1110 method 1100 begins. At block 1120 a set of laser steering parameters for at least one laser in a set of steerable lasers is obtained. At block 1130 at least one laser in the set of steerable lasers is dynamically steered, based on the set of laser steering parameters, thereby generating one or more first laser pulses at one or more first locations in the field of view. At block 1140 one or more aspects of reflected light from the one or more first laser pulses is measured, thereby generating first data. At block 1150 method 1100 assesses if features in first data are sufficiently localized. If it is determined that features in first data such as boundaries or edges are sufficiently localized method 1100 stops at step 1170. Otherwise method 1100 proceeds to block 1160 where the set of laser steering parameters based on the first data are refined, wherein the refinement can increase the laser pulse density in regions encompassing features.

Figure 12A:
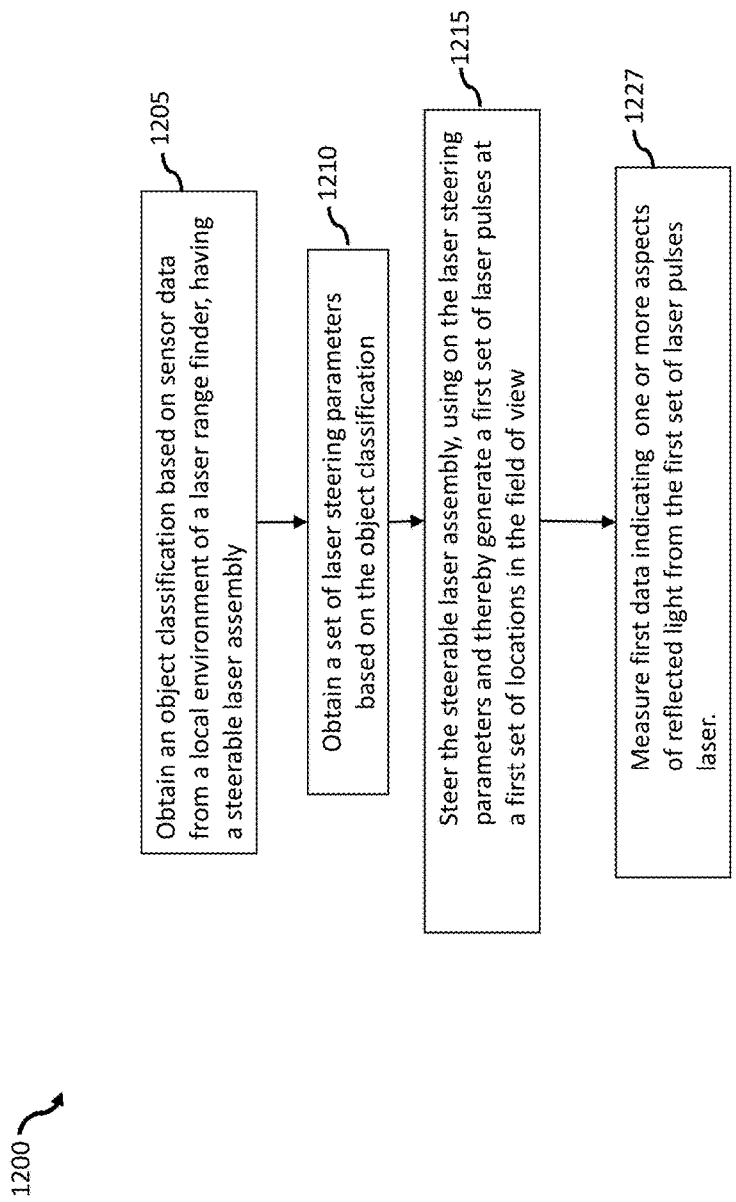
FIG. 12A-12B illustrates flow diagrams of processes for selecting laser steering parameters based on classification, according to an embodiment of the present disclosure.

FIG. 12A illustrates a flow diagram of computer implemented method 1200 of selecting a set of laser steering parameters based on classification of an object in the local environment, according to an embodiment of the present disclosure. At block 1205 an object classification based on sensor data from the local environment is generated. At block 1210 a set of laser steering parameters based on the object classification is obtained. For example, if an object in the local environment is classified as a vehicle a set laser steering parameters can be calculated or retrieved from memory. At block 1215 method 1200 instructs a steerable laser assembly to steer based on the laser steering parameters and thereby generate a first set of laser pulses at a first set of locations in the field of view. At block 1227, first data indicating one or more aspects of reflected light from the first set of laser pulses laser is measured.

Figure 12B:
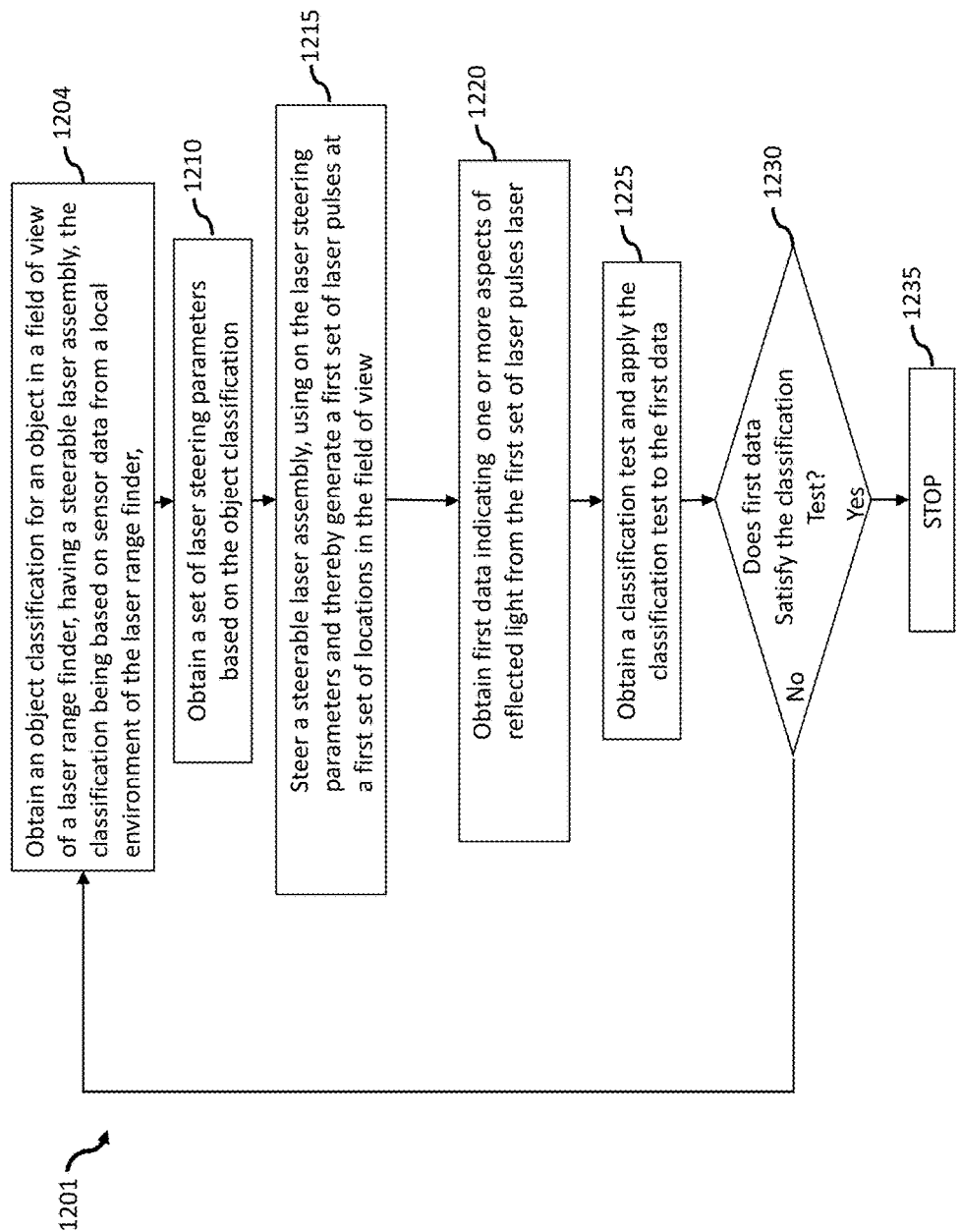

FIG. 12B illustrates a flow diagram of a method for steering a laser range finder according to an object classification and performing a classification test on the resulting range data to determine whether the laser reflection data (and the object) satisfy the object classification test. At block 1204, an object classification is obtained for an object in a field of view of a laser range finder, having a steerable laser assembly. The object classification is based on sensor data from a local environment of the laser range finder. At block 1210, a set of laser steering parameters are obtained based on the object classification. At block 1215 method 1200 instructs a steerable laser assembly to steer based on the laser steering parameters and thereby generating a first set of laser pulses at a first set of locations in the field of view. At block 1220, first data indicating one or more aspects of reflected light from the first set of laser pulses laser is obtained. At block 1225 a classification test is obtained and applied to the first data. The classification test can have test vectors for characteristics of the object classification (e.g. characteristics of a car, a person, or a building).

At block 1230 the classification test is assessed on the first data. If the first data satisfies the classification test method 1200 stops at 1235. Otherwise method 1201 returns to block 1204 and generates another classification. Method 1201 can be performed multiple times with increasingly detailed classification tests to identify ever more detailed types and models of objects (e.g. classifications of vehicles).

Progressive Boundary Localization

FIGS. 13, 14A, 14B, 15 and 16 illustrate several embodiments of a progressive boundary localization (PBL) method. The PBL method can dynamically steer a laser range finder based in part on range data indicating regions with time-offlight differences (e.g. indicating object boundaries) and thereby enhance the accuracy of the boundary locations by dynamically steering a laser to produce additional laser pulses within the regions.

In a first PBL embodiment a method for performing a laser scan of a range of orientations while localizing time of flight (TOF) boundaries can comprise the steps of: steering a LIDAR device in the range of orientations while emitting a sequence of laser pulses, receiving with the LIDAR device a set of reflections corresponding to the sequence of laser pulses and measuring for each of the sequence of laser pulses a corresponding TOF and a corresponding direction. The method further comprises the step of at one or more times during the laser scan, in response to identifying a pair of laser pulses that are nearest neighbors and for which the corresponding TOFs have a difference greater than a TOF threshold, steering the LIDAR device to generate a new laser pulse in the sequence of laser pulses with a new direction based on the direction of at least one laser pulse in the pair of laser pulses and such that upon generation the pair of pulses cease to be nearest neighbors. The method can further comprise the step of completing the laser ranging scan such that upon completion of the laser ranging scan all pairs of laser pulses in the sequence of laser pulses that are nearest neighbors for which the corresponding TOFs have a difference greater than the TOF threshold have a difference in directions less than some minimum separation.

Figure 13:
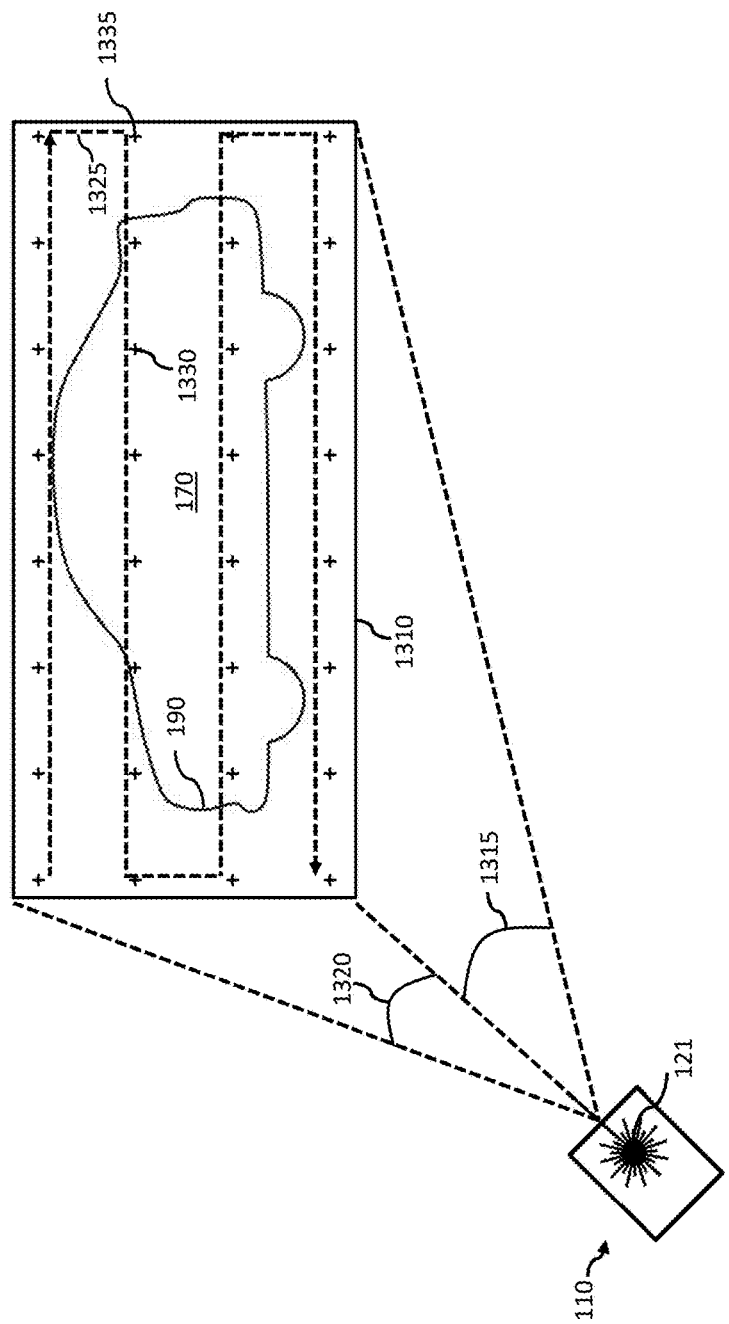
FIG. 13 illustrates several aspects of a progressive boundary localization method.

Turning to FIG. 13 in one embodiment of a PBL method a laser range finder 110 can comprise one or more a dynamically steerable lasers (e.g. laser 121) that can scan a FOV 1310 comprising an azimuthal angular range 1315 and an elevation angular range 1320. The dynamically steerable laser 121 can receive and process a plurality of laser steering parameters to sweep a laser beam through a plurality of orientations, illustrated by path 1325 in FOV 1310. While sweep path 1325 steerable laser 121 can generate a sequence or set of laser pulses each with a corresponding direction illustrated by "+" symbols in FIG. 13. Some of the laser pulses (e.g. pulse 1330) can intersect with objects (e.g. vehicle 170, indicated by boundary 190). Other pulses (e.g. pulse 1335) may not intersect with the vehicle.

Turning to FIG. 14A, the laser range finder can receive a set of laser reflections corresponding to the sequence of laser pulses and can measure for each laser pulse in the sequence of laser pulses a corresponding direction and a corresponding time of flight (e.g. 100 nS) or range (e.g. 30 m). The set of TOFs and set of directions corresponding to the sequence of laser pulses is illustrated as data matrix 1405. Data matrix 1405 can also be stored as a list of directions and corresponding TOFs for each laser pulse in the sequence of laser pulses. For the purpose of illustration laser reflections from vehicle 170 have a TOF of 3 and laser reflections from outside the boundary 190 of vehicle 170 have a TOF of 9. A challenge is to identify the location of boundary 190 from data matrix 1405. One approach is to identify nearest neighbors for each laser reflection and to identify if a TOF boundary lies between the nearest neighbor pairs. Each laser pulse (e.g. the laser pulse illustrated by data point 1410) can have a plurality of nearest neighbors in a plurality of directions or a plurality of ranges of directions (e.g. direction 1415 and 1420).

Turning to FIG. 14B several pairs of laser pulses (e.g. pairs 1424a-c) can be identified such that the difference in the TOF between laser pulses in each pair is greater than a threshold value. For example, pair 1425a contains a first laser pulse within the vehicle perimeter with a TOF of 3 and a second laser pulse outside the vehicle perimeter with a TOF of 9. The difference in the TOF values can be greater than a TOF threshold of 5, thereby indicating the presence of a TOF boundary (e.g. the edge of a vehicle) in the angular range between the directions associated with each of the laser pulses in each pair.

Figure 15:
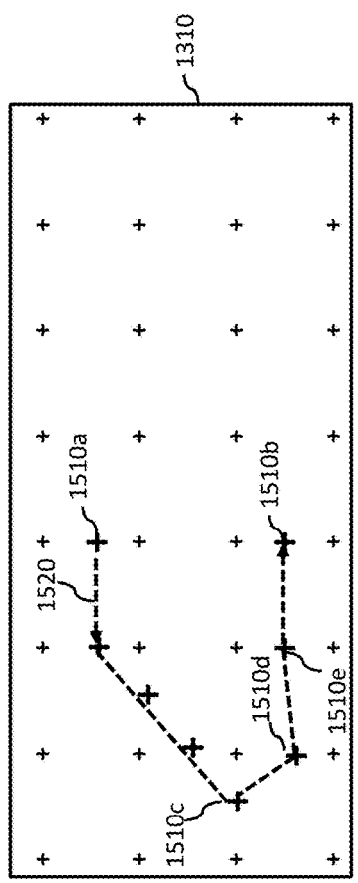
FIG. 15 illustrates several aspects of a progressive boundary localization method.

FIG. 15 illustrates the original FOV 1310 and the original sequence of laser pulses. In response to identifying the pairs for which the TOF difference is greater than a threshold value (e.g. pairs 1425a-c in FIG. 14B), one or more second laser steering parameters can be dynamically generated to steer the steerable laser along a path 1520 that generates additional laser pulses in the intervening spaces corresponding to each of the pairs. For example, laser pulses 1510a-b can be generated as the steerable laser moves along path 1520. Path 1520 can be a complex shape (e.g. roughly outlining the boundary 190 of vehicle 170). In one aspect, the second set of laser steering parameters to generate path 1520 can vary two angular velocities simultaneously between neighboring laser pulses 1510d and 1510e. In another aspect, path 1520 can cause the steerable laser to change direction from a negative azimuthal angular velocity before laser pulse 1510c to a positive azimuthal angular velocity after laser pulse 1510c. The PBL method enables the intervening laser pulses 1510a-e to be located in parts of the FOV 1310 estimated to contain an object boundary (i.e. that have TOF differences greater than the TOF threshold.

The direction of each of the intervening pulses 1510a-e is indicated by the 2-D location in the FOV 1310. The direction of intervening pulse 1510a can be based one or more of the directions of the corresponding pair of laser pulses 1425a. For example, path 1520 can be designed to place pulse 1510a midway between the laser pulses in pair 1425a. Path 1520 can place intervening pulses 1510a-e at specified angular direction relative to one of the pulses in each of the pairs of laser pulses with TOF difference. For example, the first sequence of laser pulses produced by steering the LIDAR 110 along path 1325 in FIG. 13 can have an angular spacing of 1 degree in elevation and 1 degree azimuthal. Intervening laser pulses 1510a-e can placed in a direction in the FOV 1310 with a separation of 0.3-0.5 degrees from one of the laser pulse directions in the corresponding pairs of laser pulses. The intervening laser pulses 1510a-e can be located a defined angular separation from a first pulse in a corresponding laser pulse pair and in a direction towards the second laser pulse in the pair, thereby ensuring that each intervening laser pulse destroys the nearest neighbor relationship of the corresponding laser pulse pair (e.g. 1425a in FIG. 14B). In this way nearest neighbor pairs 1425a-c with a TOF difference greater than a TOF threshold may no longer be nearest neighbor pairs when the intervening laser pulses are generated.

Intervening laser pulses (e.g. pulses 1510a-b) can be added to the sequence of laser pulses. In one aspect intervening laser pulse 1510a causes laser pulse pair 1425a in FIG. 14B to no longer be a nearest neighbor pair. Therefore, as intervening laser pulses are added to the sequence of laser pulses the nearest neighbor pairs can be modified by new intermediate laser pulses.

Figure 16:
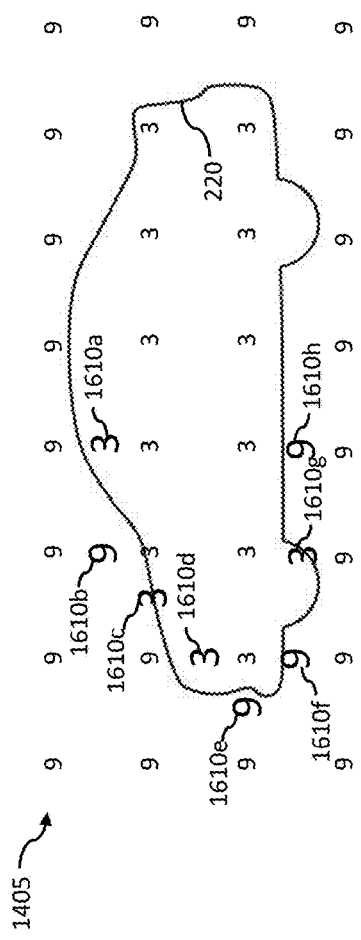
FIG. 16 illustrates several aspects of a progressive boundary localization method.

Turning to FIG. 16 the laser range finding system can calculate a TOF 1610a-h for each of the intervening laser pulses. FIG. 17A-E illustrates an embodiment of a PBL method wherein a LIDAR scans a FOV and generates a sequence of range measurements that progressively localize time-of-flight boundaries. In the embodiment of FIG. 17A-E nearest neighbor pairs of laser pulses are identified in a sequence of laser pulses, such that the TOF difference between pulses in each nearest neighbor pair is greater than a TOF threshold and then iteratively adding intervening laser pulses with directions that destroy the nearest neighbor relationship of the corresponding laser pulse pairs. The LIDAR can dynamically steer and generate intervening laser pulses, thereby refining the location of the TOF boundary, until each nearest neighbor pair with a TOF difference greater than the TOF threshold are separated by less than a threshold distance (e.g. a direction difference less than 0.5 degrees).

In FIG. 17A a laser range finding system can scan a 2-D (elevation, azimuthal) range of orientations while generating a sequence of laser pulses 1705. In FIG. 17B the laser range finder system can receive a sequence of laser reflections 1707 corresponding to the sequence of laser pulses 1705 and can measure or calculate a direction and TOF corresponding to each of the outgoing sequence of laser pulses. The laser range finder system can identify one or more of the sequence of laser pulses (e.g. pulse 1709 in FIG. 17A) for which the difference in TOF to a nearest neighbor pulse is greater than a threshold value. For example, the TOF difference between laser pulse 1708, within the vehicle 170 and nearest neighbor pulses 1709a-c outside the vehicle perimeter can be greater than a threshold (e.g. a TOF threshold of 5). FIG. 17B illustrates three pairs 1710a-c of laser reflections for which the TOF difference (i.e. the difference between a first TOF in the pair and a second TOF from the pair) is greater than a threshold.

In FIG. 17C the laser range finder system can generate a set of laser steering parameters and use these to guide the system along a path 1712 to generate intervening laser pulses e.g. 1715. The intervening laser pulses and path 1712 can have directions in the FOV based on one or more of the laser pulses in the pairs of laser pulses 1710a-c. In FIG. 17D time of flight data can be measured for the intervening laser pulses and they can be added to the sequence of laser pulses 1705. A TOF test can again be performed that identifies those nearest neighbor pairs of laser pulses for which the TOF difference is greater than a TOF threshold. The TOF threshold can be modified each time the TOF test is performed in order to localize iteratively smaller TOF differences. In FIG. 17D three new pairs of laser pulses 1720a-c are generated that fail the TOF test (i.e. have TOF differences greater than a TOF threshold). In one aspect of several embodiments the location of the intervening pulses can be seen to prevent the original laser pulse pairs 1710a-c from reoccurring during subsequent applications of the TOF test, thereby ensuring that the boundary (e.g. boundary 190 in FIG. 17A) is localized to a smaller area in successive iterations of the TOF test. In FIG. 17E the laser range finder system uses the identified pairs of laser pulses to generate a new path 1725 with more intervening laser pulses (e.g. 1727). FIG. 17F illustrates that the TOF test can be applied again to identify pairs of nearest neighbor laser pulses (1730a-c) between which the TOF boundary 190 lies. The TOF test can be applied until each pair of nearest neighbor pulses that fails the TOF test has an angular separation e.g. 1740 less than a threshold separation or distance (e.g. an angular separation between points in each pair of less than 0.5 degrees).

In several embodiments, a LIDAR can apply a boundary localization test to each point in an existing set of laser pulses with corresponding directions and TOF values. The localization test can define several angular ranges. Consider that laser reflection 1410 in FIG. 14A can be located at 0 degrees elevation and 0 degrees azimuth. An angular range can be all negative elevation angles along direction 1415. An exemplary 2-D angular range relative to point 1410 can be elevation angles with a range 0-1 degree and azimuthal angles in a range 0-1 degree, thereby defining a box 1417. The localization test can identify for each laser pulse whether there exists a nearest neighbor for each of the angular ranges for which the TOF difference is greater than a TOF threshold and for which the angular separation (e.g. the square root of the sum of the squares of the angular separations along each of the elevation and azimuthal axes) is greater than a threshold separation. When such a nearest neighbor exists the laser pulses in the sequence fails the localization test and the PBL method places an intervening laser pulses in the region between the laser pulses and the nearest neighbor and adds the intervening laser pulse to the sequence thereby destroying the nearest neighbor relationship between the laser pulses and the original nearest neighbor. In one aspect a PBL method, immediately after generating an intervening laser pulse a LIDAR can apply the localization test to the new intervening laser pulse. In this way a LIDAR can iteratively localize a TOF boundary, such that all pairs of laser pulses between which the TOF boundary lie are separated by no more than a threshold angular separation.

Figure 18:
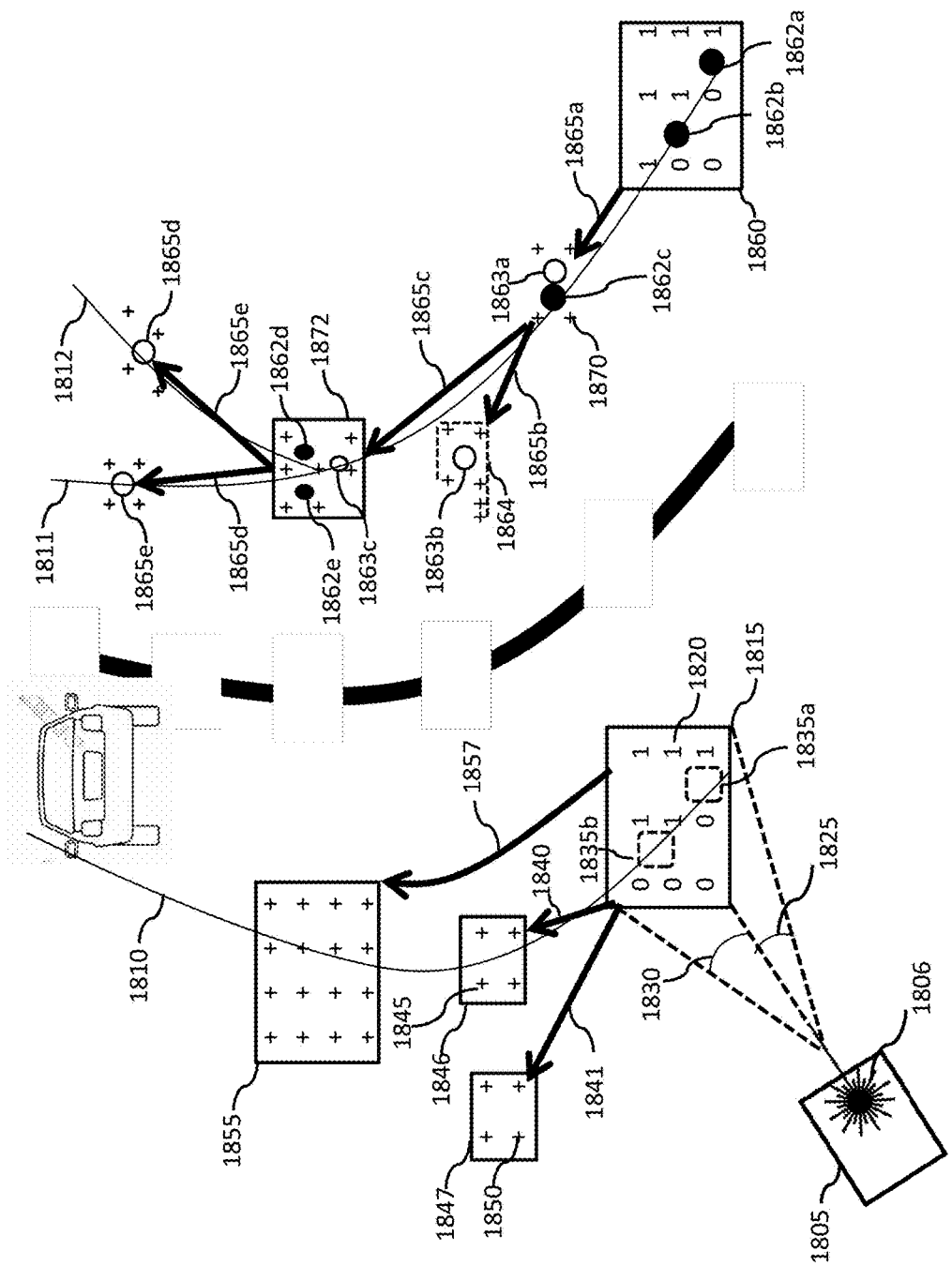
FIG. 18 illustrates several aspects of an extrapolation-based progressive boundary localization method.

FIG. 18 illustrates a PBL method wherein a LIDAR identifies a first portion of a TOF boundary in a FOV and estimates a direction (i.e. an angular offset in the FOV) to reach a search zone (e.g. an angular range) wherein the LIDAR searches for a second portion of the TOF boundary.

Several embodiments of FIG. 18 can be considered extrapolation-based progressive boundary localization (EPBL) methods. Using EPBL one or more locations on a TOF boundary identified by a LIDAR in a first search region within a FOV can be used to extrapolate or predict an estimated boundary location outside of the first search region. The LIDAR can then dynamically steer to generate a second search region based on the estimated boundary location. The extrapolation of the estimated boundary location can be based on the shape of a line through the one or more locations identified on the boundary (e.g. a straight line fit through two locations or a curve fitted through 3 or more locations). In other embodiments the extrapolation of a predicted or estimate boundary location outside the first search region can be based on a classification of the type of boundary. For example, many objects that a LIDAR on an autonomous vehicle can encounter have common shape characteristics within various object classifications such as common road intersection patterns, trucks shapes, overpasses, pedestrians, cyclists or buildings. An extrapolation of an estimated boundary location can be based on processing one or more known boundary locations in the context of one or more predicted object classifications. For example, a newly discovered TOF boundary may be one or many object types (e.g. a tree or a pedestrian at the corner of a road intersection). An exemplary EPBL embodiment could apply a 50% probability that the boundary is the trunk of a tree and a 50% probability that the boundary is the body of a person and estimate a boundary location outside a first search region based on the blended classification and the one or more known boundary locations. Subsequent search regions generated based on the estimated boundary location can cause the predicted classification to favor either the tree or the person and future extrapolation of estimated boundary locations can be weighted according to the set of known boundary locations and the updated classification weightings.

Various embodiments provide for calculating a confidence value or standard deviation associated with the direction (i.e. the angular offset to reach a new search zone defined by an estimated boundary location or vector). For example, everyday objects can have boundaries or edges with simple shapes (straight lines or simple curves) arranged in a direction relative to an observation point. Hence while it may be impractical for a rotating LIDAR to try to dynamically track and scan the boundary of object at an arbitrary orientation, it may be more practical to use a dynamically steerable LIDAR. In comparison to a steerable RADAR that tracks an objects movement from one scan to another and can predict a direction for the object, the disclosed PBL method can estimate the edges of an object within a single scan by finding a first portion of an edge and predict a direction for the edge (based on curve fitting, object classification or extrapolation). The method can then scan a laser beam in a pattern at a second location some distance along the predicted direction of the boundary in the FOV. Turning to FIG. 18 a LIDAR 1805 can scan a dynamically steerable laser 1806 in a first 2-D angular range 1815 (e.g. defined by an elevation angular range 1830 and a azimuthal angular range 1825). The total FOV of LIDAR 1805 can include several boundaries such as road edges 1810, 1811 and 1812. LIDAR 1805 can scan a path that comprises a sequence of orientations in the 2-D angular range. While scanning the path LIDAR 1805 can generate a sequence of laser pulses and measure a corresponding sequence of laser reflections. LIDAR 1805 can calculate a TOF (e.g. TOF 1820) or a distance corresponding with each of the sequence of outgoing laser pulses. The TOF values can have differences that indicate approximate location of a first portion of boundary 1810. For example, the TOF values (e.g. TOF 1820) can indicate angular regions 1835a-b that encompass a part of the boundary 1810. In one embodiment the LIDAR 1805 can calculate one or more regions in angular range 1815 that intersects the boundary. In other embodiments LIDAR 1805 can calculate one or more location estimates for points on the boundary 1810. For example, the PBL method can estimate that points on boundary 1810 are located midway between nearest neighbor points that indicate they are on opposite sides to the TOF boundary based on a TOF difference. One or more first locations or regions on the boundary 1810 can be used by the LIDAR to calculate a vector 1840 or 1841 used to steer the LIDAR 1805 to a second region estimated to overlap a second portion of boundary 1810. Shift vector 1840 can be a 2-D direction shift (e.g. a 10 degree elevation angle shift and a −10 degree azimuthal angle shift) to change the orientation of steerable laser 1806 from the first angular range 1815 to a second angular range 1846. In one aspect a shift vector 1841 can point to a search region 1847 that does not span the boundary 1810. In this case, in response to identifying that a search region (e.g. region 1847 including laser pulse 1850) does not contain a boundary, a new larger search region 1855 can be defined in an effort to reacquire the boundary 1810. One advantage of the EPBL method of FIG. 18 is that a second search region need not surround or adjoin a first search region. Instead a first search region can identify a direction of a TOF boundary. The direction can be used to generate a vector 1840 (i.e. a 1-D or 2-D angular shift) that functions to shift LIDAR 1805 to a new search location. In a related embodiment several locations on a first portion of a boundary calculated from a first search area can be used to interpolate a shape and direction of a boundary (e.g. a line or a curve). For example, three locations identified on a boundary 1810 from a first sequence of laser pulses including laser pulse 1820 can be used to define a curve or an arc 1857 on which other portions of the boundary 1810 are expected to lie.

In a related embodiment, a LIDAR can scan a path including a sequence of orientations in a first 2-D search region 1860 of a FOV. While scanning the path, the LIDAR can generate a plurality of laser pulses, receive a corresponding sequence of laser reflections and calculate a TOF corresponding to each of the outgoing laser pulses. The LIDAR can identify the presence of a TOF boundary (e.g. the edge of a vehicle or the edge 1811 of a roadway), by identifying one or more nearest neighbor pairs of laser reflections for which the TOF difference is greater than a TOF threshold. The LIDAR can calculate a set of boundary locations (e.g. locations 1862a and 1862b) based on the TOF measurements from the first search region 1860. The LIDAR can process one or more locations in the set of boundary locations (e.g. locations 1862a and 1862b) to predict an estimated boundary location 1863a, located outside the first search region. The LIDAR can generate a set of laser steering parameters, based on the estimated boundary location and dynamically steer a laser 1806 based on the laser steering parameters to generate a second plurality of laser pulses (e.g. including laser pulse 1870) in a second search region. In this way a LIDAR scan can be guided by identifying and adding directions in a FOV (e.g. locations in a FOV) that lie on a TOF boundary, predicting and estimated boundary location outside a first search region and scanning a second search regions with laser pulses based on the predicted trajectory of the TOF boundary. The method can be performed iteratively in the course of a single scan by building up a set of confirmed boundary locations, predicting estimated boundary locations and scanning a second search region around the estimated boundary location. In one embodiment of an EPBL method illustrate in FIG. 18, a first search region 1860 is used to generate boundary locations 1862a-b, that are then used to extrapolate the estimate boundary location 1863a or vector 1865a pointing to a second search region. A LIDAR scans a second search region to identify another boundary location 1862c that is added to the set of boundary locations. The updated set of boundary locations can be used to extrapolate a new estimated boundary location 1863b or an associated vector 1865b leading to a third search region that can be defined by path 1864. Path 1864 can have a complex shape involving a number of right angle turns or direction reversals with the FOV, thereby requiring dynamic steering of the LIDAR. In FIG. 18 the third search region (e.g. defined by path 1864) does not intersect or contain the TOF boundary 1811. For example, all laser pulses along path 1864 can have reflections that indicate a common TOF associated with one or other side of boundary 1811. In one aspect, in response to identifying that a search region does not contain a boundary location (i.e. does not intersect a TOF boundary) an EPBL method can generate a new estimated boundary location 1863c and dynamically steer a laser 1806 to generate a new search region 1872. The new search region 1872 can have a wider angular range designed to reacquire the boundary location surrounding the new estimated boundary location 1863c. The new estimated boundary location 1863c can be based on one, some or all of the locations in the set of boundary locations as well as the estimated boundary location 1863b that failed to generate a new boundary location. Search region 1872 can yield reflections that indicate a divergence or splitting of a TOF boundary. Such TOF boundary splitting can occur where objects overlap in the FOV of the LIDAR 1805. Consider that many common objects that a vehicle-based LIDAR may encounter can comprise a series of intersecting straight-line or curved boundaries, such as the intersecting architectural lines of an overpass or a freeway exit. In response to identifying two intersecting or diverging boundaries in a search region 1872 (e.g. indicated by boundary locations 1862*d* and 1862*e*), the LIDAR can generate distinct estimated boundary locations 1863*d* and 1863*e* (or vectors 1865*d* and 1865*e*) for multiple distinct TOF boundaries 1811 and 1812.

In another embodiment of a EPBL method a LIDAR 1805 can track several TOF boundaries 1810 and 1811 simultaneously, by several distinct sets of boundary locations and periodically generating a new search regions for each based on a new extrapolated estimated boundary location. An EPBL method that tracks several boundaries at once can perform different functions in parallel such as extrapolating an estimated boundary location for a first boundary while scanning a new search region for a second boundary. Similarly an EPBL method can perform a wide angle 2-D scan of a FOV to search for new TOF boundaries while extrapolating boundary locations and tracking one or more previously discovered boundaries.

Figure 19:
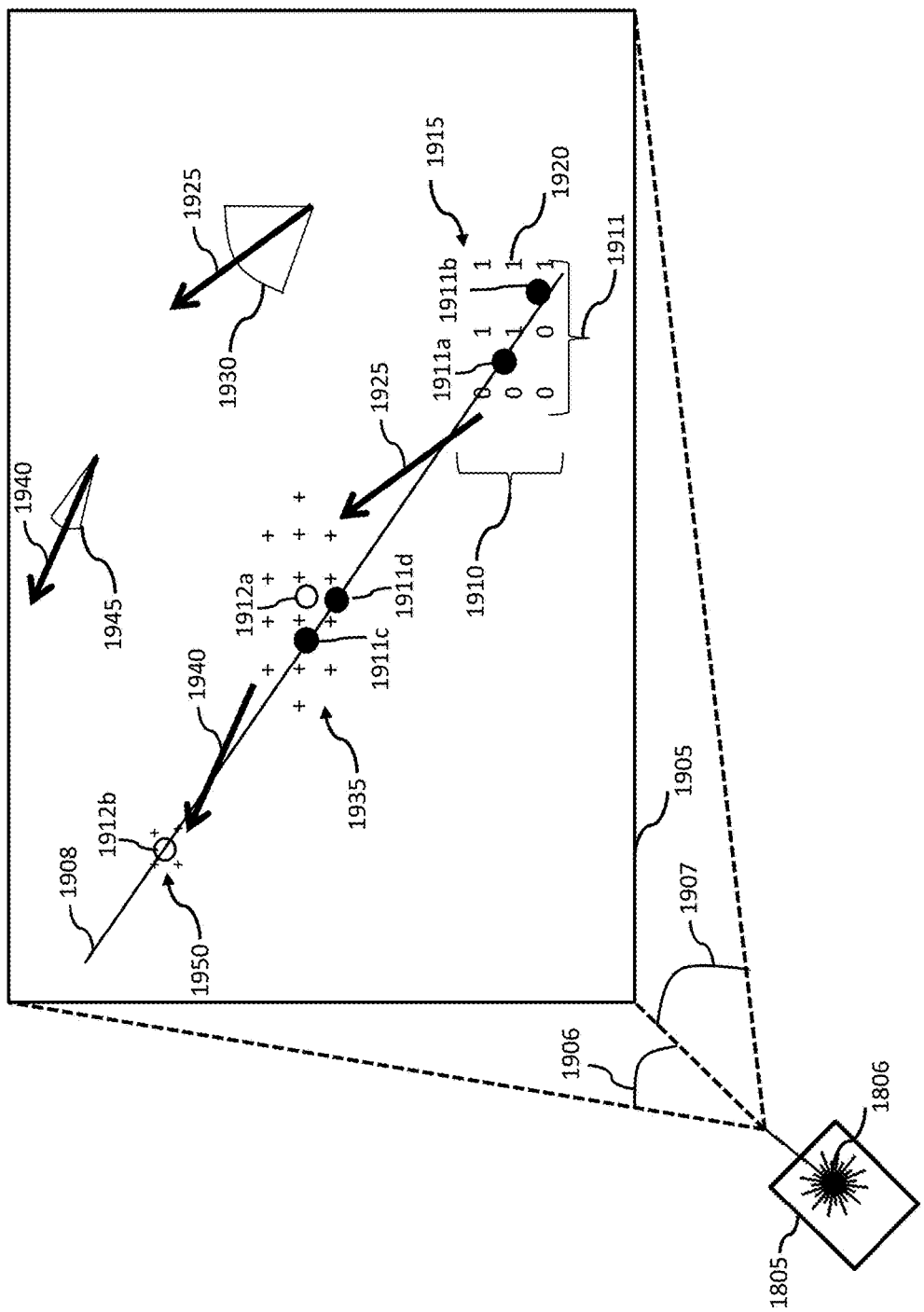
FIG. 19 illustrates several aspects of an extrapolation-based progressive boundary localization method.

FIG. 19 illustrated an embodiment wherein an angular range 1930 is associated with a vector 1925 extrapolated from a set of boundary locations 1911*a* and 1911*b*. This angular range or confidence value can be based on how well the boundary locations fit a particular shape. For example, the angular range or confidence value can be based on the mean square error of line or curve fit to the set of boundary location used to generate vector 1925 or estimated boundary location 1912*a*.

Turning in detail to FIG. 19 a LIDAR 1805 can have a FOV 1905 comprising a 2-D angular range comprising a range of possible elevation angles 1906 and a range of possible azimuthal angles 1907. An EPBL method performed by a LIDAR can scan a first search region comprising an elevation angular range 1910 and an azimuthal angular range 1911, to produce a first set of laser pulses. The LIDAR can measure a set of reflection 1915 corresponding to the outgoing sequence of laser pulses and can measure a TOF (e.g. 1920) corresponding with each laser pulse in the sequence. The LIDAR can calculate a set of locations (e.g. location 1911*a* and 1911*b*) on a TOF boundary 1908 and can further extrapolate a vector 1925 (and confidence range 1930) to an estimated boundary location 1912*a*. The LIDAR can dynamically steer a laser 1806 to generate a second set of laser pulses 1935 based on the vector 1925 or the estimated boundary location 1912*a*. The size of the second set of laser pulses 1935 can be based on the confidence value 1930. For example, if processing the set of boundary locations indicates a straight-line boundary with a small mean square error line fit, the angular range or confidence value associated with vector 1930 can be small and consequently the size of the second set of laser pulses 1935 can be small. Conversely, if the set of boundary locations indicate a boundary with a complex shape (e.g. a tree) the angular range 1930 can remain high, or the confidence value associated with estimated boundary location 1912*a* can remain low, thereby causing laser 1805 to dynamically scan a larger search region 1935. Over time as the set of boundary locations grows to include 1911*c* and 1911*d* the angular range 1945 associated with subsequent vectors 1940 indicating the location of subsequent estimated boundary locations 1912*b* can be reduced as the overall shape of the TOF boundary 1908 becomes evident. Hence the size of subsequent search region 1950 can be sized according to the confidence level of the LIDAR in the estimated boundary location 1912*b*. In one aspect a dynamically steered LIDAR can have a FOV with at least two dimensions (e.g. an elevation dimension indicated by an elevation angle and an azimuthal dimension indicated by an azimuthal angle).

Figure 20:
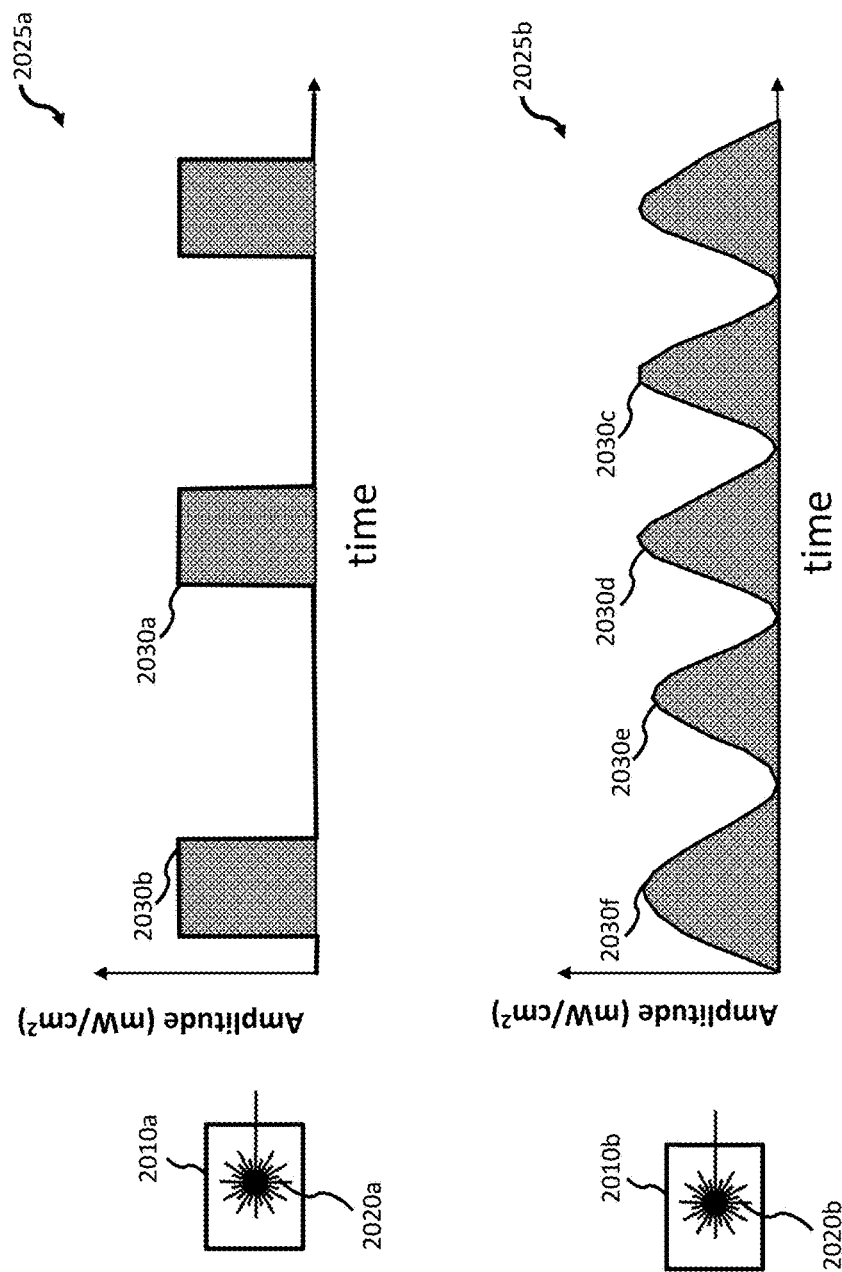
FIG. 20 illustrates an exemplary laser range finding system operable to generate pulsed laser range finding and an exemplary laser range finding system operable to generate a continuous wave laser beam.

FIG. 20 illustrates two laser range finding systems 2010*a* and 2010*b*. Each of the laser range finding systems comprise a steerable laser assembly 2020*a* and 2020*b* operable to dynamically steer a laser beam according to laser steering parameters. Laser ranging systems (e.g. LIDARs) can have a pulsed laser or a continuous laser. Steerable laser assembly 2020*a* has a pulsed laser and generates a discrete time series of laser pulses (e.g. 2030*a* and 2030*b*) illustrated in graph 2025*a*. For example, pulses can be 5 nanoseconds in duration and occur every 1 millisecond. Steerable laser assembly 2020*b* is a continuous laser and generates a continuous wave illustrated in graph 2025*b*. Continuous laser ranging systems often modulate the amplitude (e.g. sinusoidal modulation) of a continuous laser and measure the phase of the reflected wave to calculate the range for a location (e.g. direction) in the field of view. It can be appreciated looking at the waveform of 2025*b* that the amplitude peaks of the amplitude modulated waves can be considered pulses of laser light. For the purposes of this disclosure a continuous wave laser generates one or more pulses (e.g. 2030*c*) corresponding to the peaks of the continuous amplitude modulated laser. Steerable laser assembly 2020*b* can generate several pulses at a particular location. For example, pulses 2030*c* and 2030*d* can be generated at a first location (e.g. direction) in the field of view of system 2010*b* while pulses 2030*e* and 2030*f* can be generated at a subsequent time and location.

A Low-Profile Vehicle-Integrated LIDAR

LIDARs often require direct visibility to objects being ranged. For this reason LIDARs are often mounted high above the vehicle to obtain an unobstructed field of view. Several embodiments of the present disclosure can be used to provide a low profile LIDAR system with a vehicle-integrated laser distribution system. A laser beam from a LIDAR can be transmitted into a cavity region underneath a body panel of a vehicle and thereby guided beneath the body panel (e.g. roof) to a lens operable to transmit or refract the beam into a curtain of coverage around the vehicle. The interior reflectors and lenses can form a laser beam guide. The laser beam guide can augment the limited direct field of view of a fully or partially embedded LIDAR by providing a well-controlled indirect beam path (e.g. requiring several reflections). The output laser angle from the beam guide is a function of the input beam angle from the LIDAR. In this way the beam guide can utilize and modify existing cavities behind body panels common in automotive design to guide and distribute laser beams for laser ranging. The beam guide can extend LIDAR coverage into hard to reach parts of the FOV (e.g. parts of the FOV obscured by the roof or sides of a vehicle) while allowing the LIDAR to remain low profile or embedded in the vehicle structure.

In a first embodiment a thin laser beam guide can be housed below a vehicle roof panel and comprise a narrow airgap and a set of optical reflectors that are substantially horizontal and opposing. The laser beam guide can be elongated in one or more directions, thereby contouring to the shape beneath a typical vehicle roof panel. A LIDAR can be located below the roof panel (thereby out of sight) and produce a laser beam that is guided towards the edges of the roof by the laser beam guide. Once at the edge of the vehicle roof a laser beam can be launched into the field of view at an output angle determined in part by the input angle of the beam generated by the LIDAR. In the first embodiment the laser beam guide can further comprise an output lens at the outside edge of the beam guide that can function to refract the laser beam downwards and provide laser coverage for the region close to the vehicle.

In a second embodiment the beam guide can comprise a prismatic lens located around the perimeter of the vehicle roof. In the second embodiment the LIDAR can transmit laser beams to a light guide comprising of one or more reflectors and the prismatic lens. The reflectors can be located on the outside of a roof panel and serve to guide a laser beam parallel to the plane of the vehicle roof towards a location on the prismatic lens determined by the initial angle of the laser beam. In a third embodiment a vehicle with a solid state LIDAR, having a limited field of view (e.g. 50 degrees) can use a vehicle-integrated laser distribution system to guide laser beams from a portion of the FOV, thereby providing enhanced peripheral ranging from a single LIDAR.

Several aspects provide a system to minimize the obstructed portion of a LIDAR FOV by providing an indirect path for reflection and/or transmission of laser beams to objects beyond the direct field of view. Objects can be outside of the direct FOV either due to obstructions such as vehicle body panels or due to the design limitations of the direct field of view. In one aspect, one or more of the reflectors or lenses in the laser distribution system can be repositionable (e.g. motorized). This can enable the laser distribution to redistribute the resources of a LIDAR for tasks such as parking or reversing.

Vehicle-Integrated Laser Range Finder Advantages

Several embodiments can reduce the profile of a LIDAR (e.g. height above the vehicle roof), while maintaining laser ranging capability in regions below the horizon of the roofline, using a lens at the roof edge to refract laser light. In some embodiments, the LIDAR can be completely hidden below a roof panel. Placement of the LIDAR partially or fully below a vehicle roof panel offers improved fuel economy, aesthetic appeal and does not limit roof-rack options.

The disclosed techniques enable the LIDAR to be fully or partially embedded behind a vehicle body panel, thereby reducing the risk of damage or theft.

In another advantage, the disclosed technologies can be implemented to extend the FOV of a solid state LIDAR. Solid state LIDAR can have a smaller field of view (e.g. 40-60 degrees in the horizontal or azimuthal plane) relative to mechanical or rotating LIDAR (e.g. 360 degrees). Embodiments of the present disclosure can guide laser light to and from locations obscured by parts of the vehicle to the FOV of the LIDAR. Guiding a laser beam to locations beyond the unobstructed FOV of a LIDAR, provides greater utilization of the LIDAR and can reduce the total number of LIDARs required to provide full coverage around a vehicle. The proposed techniques enable laser light to be guided in a thin layer (e.g. a beam guide) behind a body panel. The beam guide has the advantage of keeping optical components (e.g. reflectors, lenses, and LIDARs) in a clean (e.g. dust-free), dedicated and hidden environment. The proposed technologies can make better use of a single LIDAR and potentially eliminates the need for others.

In another advantage, the present techniques can utilizes existing panels as substrates for reflectors and existing cavities behind vehicle body panels as the transport region for the laser beam thereby providing laser guidance and direction changes with minimal additional weight or complicated light conducting mediums. In another advantage, the disclosed technology provides a means to confine a laser beam in a narrow region behind a body panel, guide the laser beam towards the edge of the body panel and transmit the laser beam into the region surrounding the vehicle at an output horizontal angle based on the initial beam horizontal angle at the LIDAR. This ability to select the output angle of the laser based on the input angle is advantageous for creating a second field of view that can be used to augment the unobstructed field of view of the LIDAR. In comparison the narrow nature of a fiber optic core makes recovering the input angle at the output of a fiber optic cable practically impossible.

In another advantage, the reflectors and lenses that form the beam guide can be placed in the traditional location of molding strips or the position of a rear brake light. In another advantage, the laser distribution system provides means to distribute laser light around a vehicle in a controlled (e.g. sealed) environment such that the laser intensity can be greater than eye safe limits (e.g. ANSI-Z136) and transmit the laser beam at a lower, eye-safe intensity (e.g. an expanded beam) into the surrounding environment.

In another advantage, the disclosed laser distribution system can provide an indirect FOV and a direct FOV that provide ranging of a common object from two different directions, thereby reducing shadowing and improving object recognition. For example, a laser distribution system mounted behind a vehicle bumper can have a direct field of view in front of the vehicle and can guide laser beams from part of the FOV using a reflector assembly inside the bumper to lenses at the sides of the vehicle, thereby providing ranging of some of the region in front of the vehicle, within the direct field of view, from two different perspectives.

In another advantage the disclosed technology provides guiding a laser beam for laser ranging in a beam guide from a LIDAR to a lens. The beam guide can be a cavity and the cavity can serve multiple alternative vehicle functions such as carrying heated or cooled air around the vehicle (i.e. as the beam guide can be an air-conditioning duct). For example, the laser distribution system could be integrated with the ducts to distribute air to the front or rear windshield of a vehicle.

In another advantage, embodiments of the present disclosure generate laser pulses from a plurality of relatively inexpensive lasers positioned around a vehicle and use a beam guide to channel laser reflections to a centralized laser detector (e.g. photodetector) capable of performing laser ranging. In this way the more expensive laser detector array (e.g. avalanche photo-diode array or single photon avalanche detector array) can receive reflections from several remote FOVs through a process of guiding reflections behind the vehicle body panels.

A vehicle for the purpose of this disclosure is a machine operable to generate a force to transport itself. Exemplary vehicles include, but are not limited to: cars, minivans, buses, motorcycles, trucks, trains, robots, forklifts, agricultural equipment, boats, drones and airplanes.

Passenger vehicles are a subset of vehicles designed to carry one or more people. Exemplary passenger vehicles include, but are not limited to: cars, minivans, buses, motorcycles, trucks, trains, forklifts, agricultural equipment, boats, and airplanes. FIG. 21A illustrates that a LIDAR 2120*a* (e.g. model HDL-64E available from Velodyne LIDARs of Morgan Hill, Calif.) can have a FOV 2115 comprising the set of all directions along which the LIDAR can emit a laser. The FOV 2115 can be described by a range of angles 2116 in a vertical plane (e.g. the elevation angle range or angle relative to the horizon) and a range of angles 2118 in the azimuthal plane. FOV 2115 for LIDAR 2120*a* is therefore the set of all possible directions (i.e. combinations of elevation angle and azimuthal angles) for which the LIDAR can generate a laser beam. Angular ranges 2116 and 2118 can be with respect to axis of rotation of LIDAR 2120a.

Figure 21B:
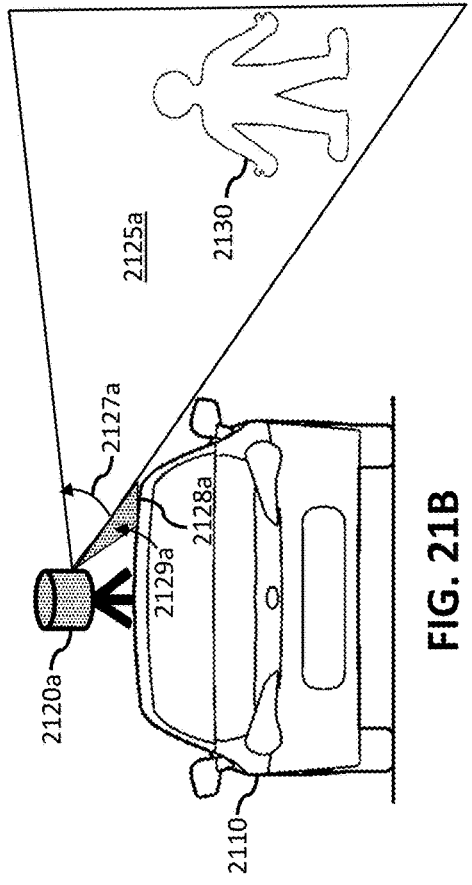
FIGS. 21B and 21C illustrate several placements of a LIDAR relative to a vehicle and the associated impact of placement on aspects of the field of view, according to an aspect of the present disclosure.

Turning to FIG. 21B, LIDAR 2120a can be mounted above vehicle 2110. The LIDAR can generate a laser beam or pulses in one of many directions that travel in a straight line beyond the bounds of the vehicle. A laser emitted in an unobstructed direction can travel in a straight line to an object beyond the vehicle and can be reflected along the same straight line path. In FIG. 21B, a laser emitted in a large portion 2125a of the FOV, characterized by angular range 2127a, has direct line-of-site to objects (e.g. person 2130) beyond the vehicle. The LIDAR FOV can also have an obstructed portion 2128a (e.g. characterized by angular range 2129a). For example, the roof of a vehicle can form an artificial horizon for a LIDAR by obscuring direct line of sight to objects in elevation angular range 2129a. A laser beam emitted along an obstructed direction cannot travel in a straight line to an object beyond the bounds of the vehicle. For the LIDAR 2120a illustrated in FIG. 21B a portion 2128a of the FOV, characterized by elevation angular range 2129a is obstructed by the vehicle 2110.

A LIDAR can comprise one or more lasers operable to transmit laser beams or pulses and one or more reflection detectors (e.g. photodetectors). In several LIDAR designs the laser(s) and the reflection detector(s) are co-located (e.g. model HDL-64E from Velodyne LIDARS) and thereby share a common field of view. For the purpose of this disclosure an unobstructed FOV, or unobstructed portion of a FOV can be defined as the set of all unobstructed directions in the FOV (e.g. the set of all directions formed by combining an angle in the range 2127a with an angle in the range 2118 in FIG. 21A). An unobstructed direction can be a direction in the FOV of the LIDAR for which an emitted laser beam or a received laser reflection can travel beyond the bounds of the vehicle. Conversely, for the purpose of this disclosure the obstructed FOV is the set of all direction in the FOV for which the laser beam cannot extend beyond the bounds of the vehicle (e.g. the set of all directions in the range 2129a and 2118 in FIG. 21A).

In other LIDAR designs (e.g. bistatic LIDAR) the laser(s) and the reflection detector(s) are separated (e.g. where the laser(s) are on the outside of a vehicle and the reflection detectors are located on the roof of a vehicle). In this situation the LIDAR can have distinct laser FOV and reflection detector FOV. A laser FOV can be considered the set of all directions that a laser in a LIDAR can transmit a laser beam. Alternatively a LIDAR ranging region can be considered the portion of 3D space surrounding the LIDAR through which each laser can transmit a laser beam. For a bistatic LIDAR the laser (e.g. laser transmitter) FOV can be divided into an obstructed and unobstructed portion comprising those directions where a laser can and cannot extend beyond the bounds of a vehicle respectively. Similarly, for a bistatic LIDAR the reflection detector FOV can comprise an obstructed and unobstructed portion. The obstructed portion of a reflection detector FOV can be the subset of all directions in the detector FOV for which laser reflections from beyond the vehicle are obscured (e.g. by the vehicle, or objects mounted to the vehicle) and can therefore not reach the reflection detector. Conversely, the unobstructed portion of a reflection detector FOV can be the subset of all directions in the reflection detector FOV for which laser reflections from beyond the vehicle are unobstructed and can therefore reach the reflection detector in a straight line from reflection locations.

In order to be effective many LIDAR need a large portion of the FOV to be unobstructed. In FIG. 21B the placement of LIDAR 2120a above the roof of vehicle ensures that the unobstructed FOV is greater than the obstructed FOV (e.g. angular range 2127a is greater than 2129a) and hence person 2130 can be detected, even when person 2130 is close to the vehicle and appears at relatively low angles relative to the horizon (e.g. −50 degrees relative to the horizon or 50 degrees below the horizon.

Figure 21C:
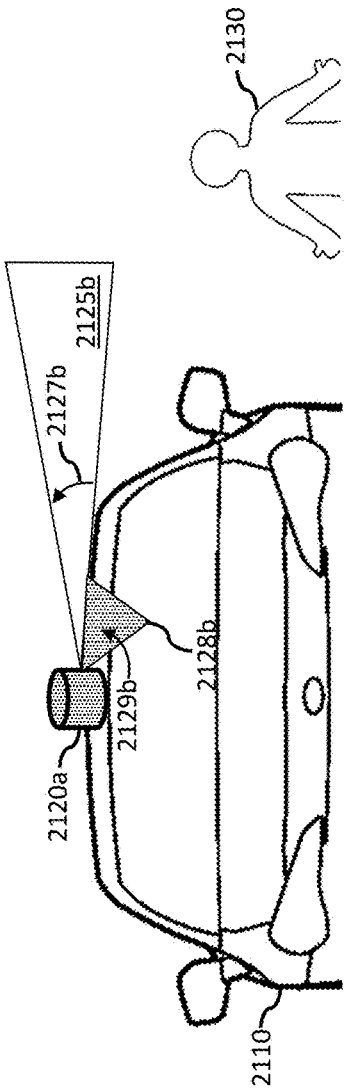
Figure 21A:
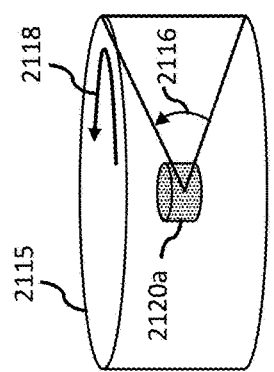
FIG. 21A illustrates a laser LIDAR with an associated field of view according to an aspect of the present disclosure.

FIG. 21C illustrates LIDAR 2120a located directly on the roof of vehicle 2110, thereby reducing the unobstructed FOV and increases the obstructed FOV. By lowering the LIDAR closer to the roof of vehicle 2110 the obstructed portion 2128b, characterized by angular range 2129b, becomes larger relative to the unobstructed portion of the FOV 2125b, characterized by angular range 2127b. Low profile placement of LIDAR 2120a can therefore contribute to a large obstructed FOV (i.e. blind spots) and thereby fail to detect person 2130. A challenge for vehicle designers is to provide a large unobstructed portion of the FOV while satisfying competing requirements (e.g. wind resistance, ergonomics, vehicle aesthetics and wear on the LIDAR) that benefit from closer integration of the LIDAR with the vehicle.

In FIG. 21A the FOV 2115 of LIDAR 2120a can be the set of all directions along which LIDAR 2120a can emit or receives a laser beam or pulse. FOV 2115 in FIG. 21A has a corresponding laser measurement region encompassed by FOV 2115 (i.e. 3-D region of space surround a LIDAR through which laser beams from the LIDAR can travel). In the context of the present disclosure a laser measurement region is the set of all locations in space through which a laser emitted in the FOV can provide a laser range measurement. Therefore the laser measurement region can be the set of location through which a laser emitted in the FOV travels until it reaches a surface operable to be non-transmitting to the laser beam. After travelling through a laser measurement region beyond the vehicle a laser beam from LIDAR 2120a laser beams can strike a set of reflection locations.

Now consider that LIDAR 2120a can generate a laser in one of many directions that travel in a straight line beyond the bounds of the vehicle. However, LIDAR 2120a can also emit a laser beam in a direction in the FOV that travels in an indirect path beyond the bounds of the vehicle, including at least one direction change after exiting the LIDAR. The reflected light from an indirectly illuminated object can be received by the LIDAR along the same indirect path.

For the purpose of this disclosure an unobstructed FOV can be divided into two subsets of directions; an indirect FOV and a direct FOV. For the purpose of this disclosure a direct FOV is defined as the set of all directions in a FOV for which a laser beam can travel in a straight line to or from a point beyond the bounds of the vehicle (i.e. direct paths).

For the purpose of this disclosure an indirect FOV is defined as the set of all directions in a FOV for which a laser beam can travel by an indirect path to or from a location in space beyond the bounds of the vehicle (e.g. requiring at least one direction change such as a reflection of refraction). It can be appreciated that an unobstructed FOV can be the union (i.e. combination) of the direct FOV and the indirect FOV. In addition, with careful design a LIDAR can be closely integrated into a vehicle (e.g. close to the roof as illustrated in FIG. 21C) and various embodiment of this disclosure can be used to convert some or all of the obstructed portion of the FOV into an indirect FOV, thereby increasing the unobstructed FOV.

Similar to direct and indirect portions of the FOV the laser measurement region surrounding a LIDAR, through which laser beams travel, can be divided into a direct measurement region and an indirect measurement region. In the context of the present disclosure a direct laser region is the region of 3-D space beyond a vehicle encompassed by the direct FOV of a laser in a LIDAR. The direct measurement region is in the unobscured line of sight of the LIDAR. For example, person 2130 in FIG. 21B is in the direct FOV 2125*a* of LIDAR 2120*a*. Person 2130 is therefore located in the direct measurement region of 3-D space surrounding LIDAR 2120*a*. Similarly, an indirect measurement region is a measurement region of 3-D space beyond a vehicle in which a laser beam in the indirect portion of a FOV can perform a laser measurement. For example, consider a laser that is emitted from a LIDAR, diffracted by a lens at the edge of vehicle 2110 and thereby travels through an indirect measurement region that includes person 2130 in FIG. 21C.

In the context of the present disclosure the set of direct reflection locations can be defined as the set of all locations encompassed by the direct portion of laser FOV in a LIDAR (i.e. those locations that a laser beam travelling in a straight with a direction in the FOV can strike. The set of ranging locations changes with the placement of the LIDAR. For example, in FIG. 21B some of the locations in the set of direct ranging locations include locations on person 2130. In another example FIG. 21C illustrates that locations on person 2130 are not within the set of direct reflection locations of LIDAR 2120*a*, because the roof of the vehicle 2110 to block person 2130 from the FOV. Hence in FIG. 21C a laser travelling in a straight line direction within the FOV cannot reach points on person 2130. In several embodiments of the present disclosure a vehicle-integrated laser distribution system can provide reflections from indirect reflection locations (i.e. points beyond the set of point encompassed by the FOV).

Solid state LIDAR can have a narrow FOV (e.g. 50 degree azimuthal range) and therefore require thereby several (6-8) LIDAR to provide adequate coverage of directions and reflections in the local environment. Embodiments of the present disclosure provide for spreading the points in the narrow FOV using a beam guide, thereby provide a greater range of reflection locations outside the range of direct ranging locations.

Several embodiments of this disclosure provide a vehicle-integrated laser distribution system, that increases the indirect FOV, using a laser beam guide embedded on or behind the vehicle panels or frame. This approach can thereby offset the reduction in direct FOV, that can occur when the LIDAR is more closely integrated by providing dedicated and sometimes complicated indirect laser paths forming an indirect FOV. In some cases the indirect FOV can be increased by guiding the emitted laser beam to a lens with a wider unobstructed FOV, while in other embodiments the lens increases the indirect FOV by refracts the laser beam.

In one aspect solid state LIDARs can have a more limited field of view and embodiments of the present disclosure provide for guiding laser beams to and from remote parts of a vehicle and thereby distributing laser pulses beyond the FOV of the LIDAR. For example, a small range of angles from the FOV can be distributed into a wider range of output angles by an integrated laser distribution system and be used to perform ranging in a remote location (e.g. at the edge of a wheel-arch) on a vehicle. The wider range of output angles provides for larger laser pulse spacing which can be useful when object detection is preferred over dense object profiling. For example, such a vehicle-integrated laser distribution system could be used to devote several small portions of a LIDAR FOV to serve as object detectors (e.g. curbs, lane markers) in the wheel arch areas.

Figure 21D:
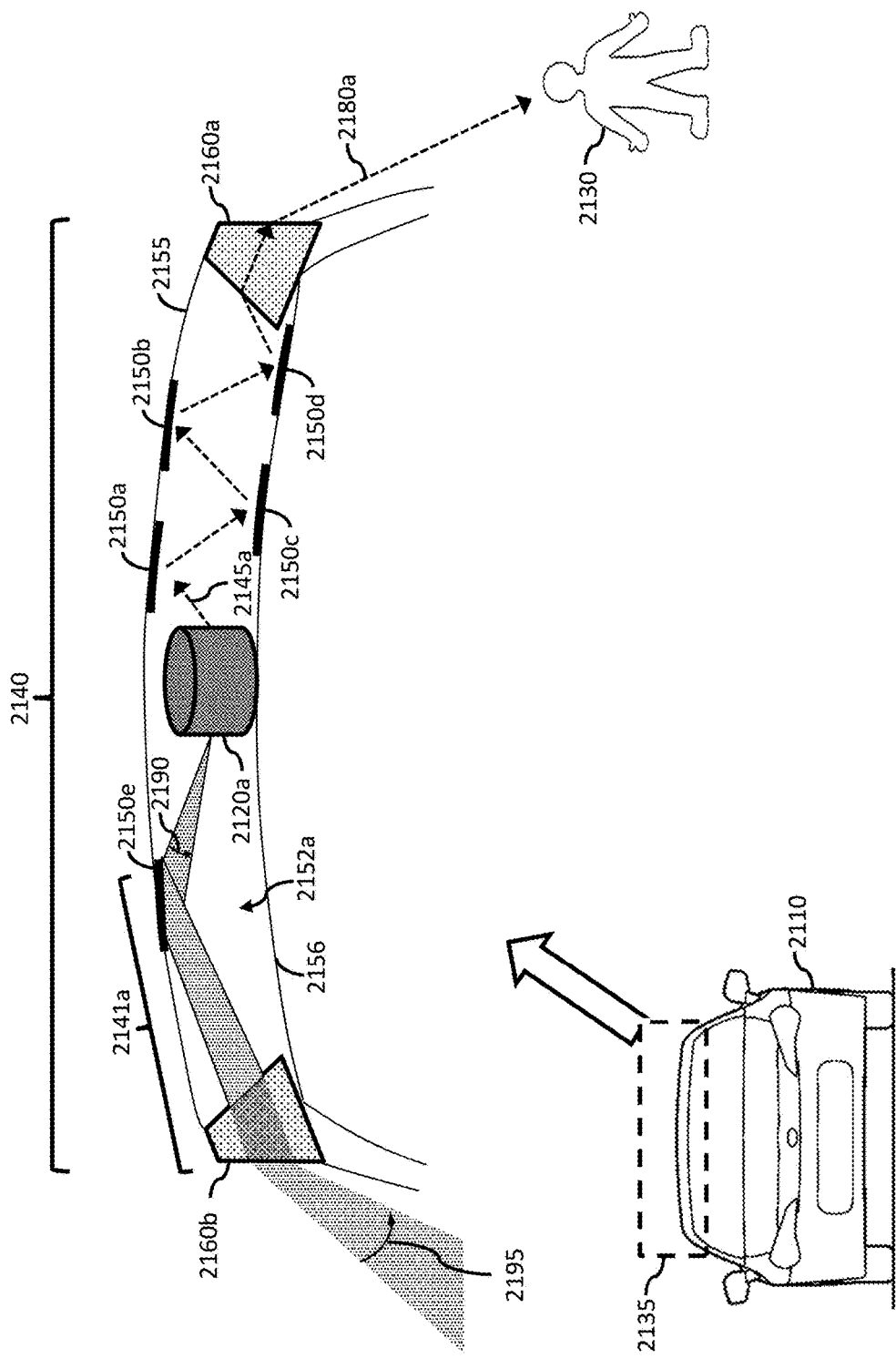
FIG. 21D is an exemplary diagram of an integrated laser distribution system, embedded in the roof of a vehicle, including a laser range finder and a laser beam guide, according to an embodiment of the present disclosure.
Figure 21E:
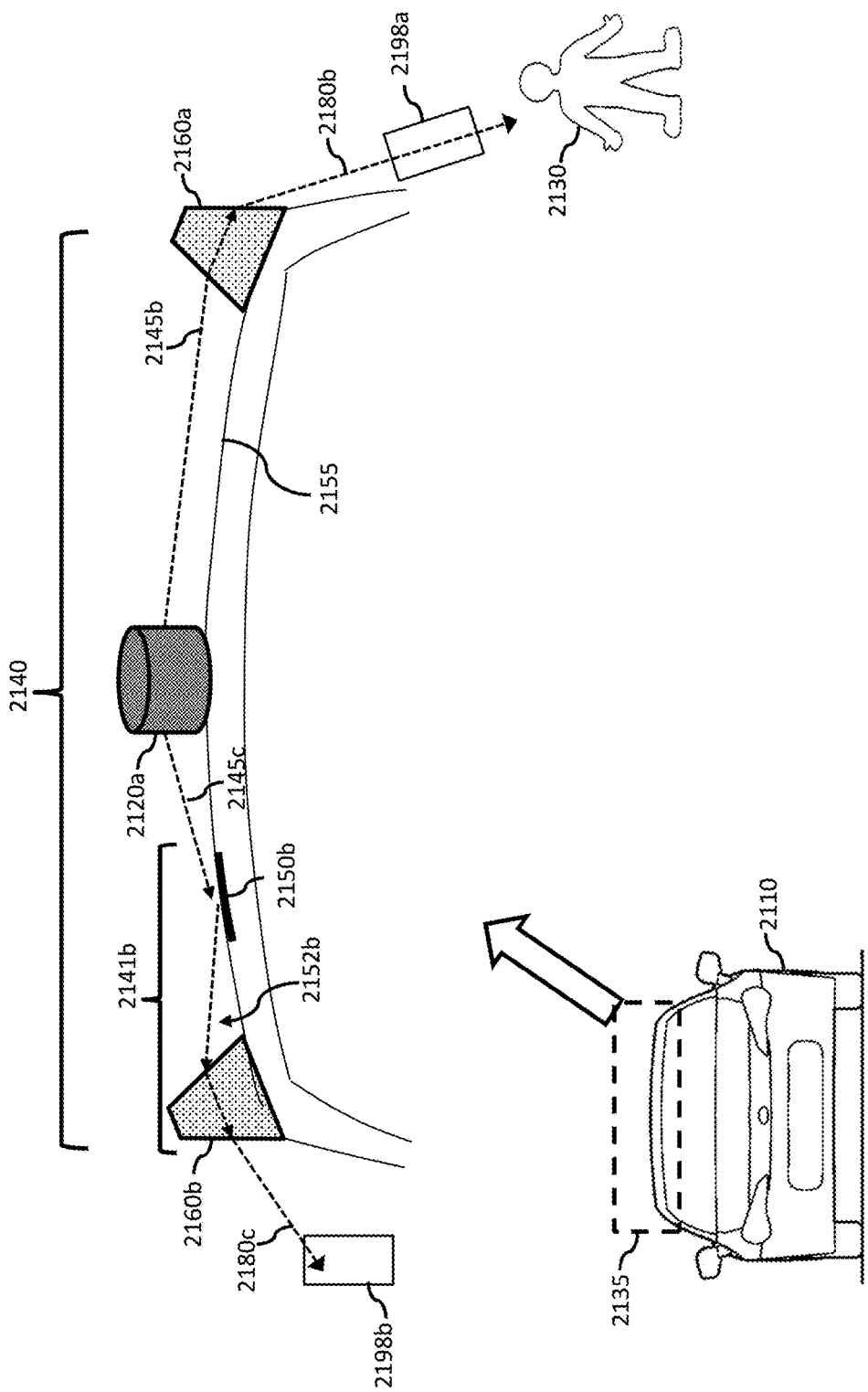
FIGS. 21E and 21F are exemplary diagrams of vehicle-integrated laser distribution systems, attached to the roof of a vehicle, including a laser range finder and a beam guide, according to an embodiment of the present disclosure.
Figure 21F:
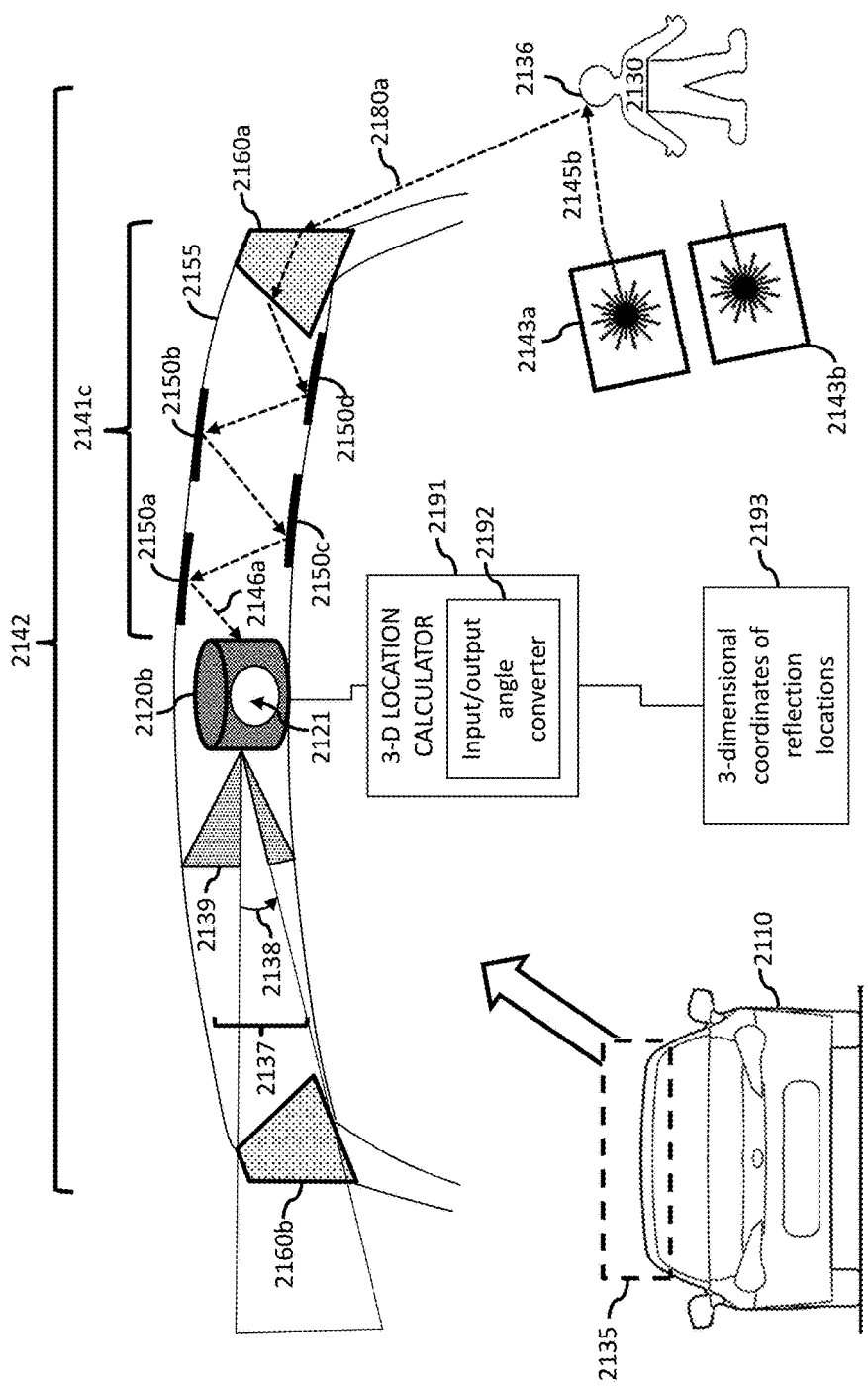

FIG. 21D-F illustrate various embodiments of vehicle-integrated laser range finding systems. In general a vehicle-integrated laser range finding system can comprise a light detection and ranging system (e.g. a LIDAR) and a beam guide designed to be integrated into a vehicle that functions to guide at least some of the laser beams used by the LIDAR. The effect of the beam guide can be to enable the LIDAR to be placed in a more integrated, inconspicuous, protected, multifunctional location (e.g. a location servicing mutually exclusive FOV portions). A LIDAR can both transmit and receive laser beams. One subset of vehicle-integrated laser range finding systems can be vehicle-integrated laser distribution systems, wherein laser beams transmitted by the LIDAR can be distributed through a vehicle integrated beam guide. A second subset of vehicle-integrated laser range finding systems can be vehicle-integrated laser reflection acquisition system, wherein laser reflections from reflection locations in a local environment to the LIDAR are guided by a vehicle-integrated beam guide to a laser detector in the LIDAR. The LIDAR in a vehicle-integrated laser range finding system can be a scanned LIDAR (e.g. HDL-64E from Velodyne Inc. of Morgan Hill, Calif.), a flash LIDAR, a monostatic LIDAR or a bistatic LIDAR. In several embodiments the beam guide can function to guide laser beams in a narrow range of angles (e.g. 10 degrees of elevation angle) in a light transmitting region of the beamguide (e.g. a fully or partially enclosed cavity, or a defined portion of space on the outside of a vehicle) from the LIDAR to a lens at a remote end of the beam guide (e.g. at the edge of the roof of a vehicle). At the remote end, the beam guide can have a lens that spreads the narrow angular range into a wider or larger angular range than the input angular range at the LIDAR. In this way a beam guide in a vehicle-integrated laser distribution system can serve three functions; firstly accept laser beams in a narrow range of angles; secondly to guide the laser beams to the output end of the beamguide while conserving the narrow angular range and thirdly to transmit the laser beams with a wider range of output angles. Several embodiment also function to transmit the laser beams into laser ranging regions that are exclusive form the laser ranging regions accessible by the LIDAR alone.

Conversely, a beam guide in a vehicle-integrated laser reflection acquisition system can serve three functions; firstly to accept laser beams in a wide first angular range at a first end that is remote from a LIDAR (e.g. at a lens at an edge of a roof panel); secondly to focus the laser beams into a narrower angular range and to guide the laser beams to the LIDAR end of the beam guide; and thirdly to provide the laser beams to the LIDAR in the narrow angular range while preserving a relationship between the direction of each laser beam angle in the wide angular range at the first end and the direction in the narrow angular range at the LIDAR.

In one embodiment, a vehicle-integrated laser range finding system comprises a light detection and ranging system (LIDAR) located on a vehicle, the LIDAR comprising a laser configured to generate a plurality of laser beams, and a laser detector configured to detect the plurality of laser beams; and a beam guide disposed on the vehicle, wherein the beam guide is separate from the laser detector, the beam guide comprising: at least one optical element to guide at least some of the plurality of laser beams between a first end and a second end of the beam guide; and at least one optical element to change corresponding beam directions for the at least some of the plurality of laser beams. For the purpose of this disclosure an optical element is a solid component that is designed to transmit or reflects an incident laser beam while changing an aspect of the laser beam. Exemplary optical components that transmit an incident laser beam include lenses, partially transparent mirrors, prisms, Fresnel lenses, optical diffusers, optical splitters, optical delay lines. Optical elements that transmit laser beams can also refract the laser beam (e.g. change the direction). Exemplary optical components that reflect an incident laser beam include, reflectors, partially transparent mirrors, metalized polymer surfaces, polished metal surfaces, roughened or facetted reflective surfaces and electro-activated mirrors. Exemplary aspects of a laser beam that can be changed by an optical element include, beam direction, beam intensity, beam trajectory, beam divergence angle and constituent electromagnetic frequencies (e.g. a prism refracts different frequencies by different amounts). A laser in a LIDAR can be configured by arranging lasers at fixed elevation angles, setting angular velocities for a laser trajectory, setting a laser pulse rate, duration or intensity.

FIG. 21D is an exemplary diagram of a vehicle-integrated laser distribution system 2140, embedded in the roof portion 2135 of a vehicle 2110. Vehicle-integrated laser distribution system 2140 can function to distribute laser beams (e.g. 2145a) from a laser range finder (e.g. LIDAR 2120a). The roof mounted laser distribution system of FIG. 21D guides input laser beams (e.g. 2145a) emitted from LIDAR 2120a, using a set of reflectors (e.g. 2150a, 2150b, 2150c, 2150d and 2150e) arranged within a light transmitting region 2152a (e.g. an enclosed cavity) underneath a roof panel 2155. The light transmitting region is a portion of the beam guide wherein laser beams can be guided from one end of the beam guide to another. Input beams (e.g. 2145a) can be guided to a set of lenses (e.g. 2160a and 2160b) located at the edge of the roof where the beam can be transmitted, magnified, or refracted (e.g. refracted beam 2180a). A beam guide (e.g. 2141a) can comprise one or more of the reflectors a cavity to transport a laser beam and a lens at a location remote (e.g. the perimeter of a roof panel or a rear brake light assembly). In general, a range of input beam angles 2190 can be reflected (e.g. at 2150e) and refracted or transmitted (e.g. at lens 2160b) to form a corresponding set of output beam angles 2195, in regions outside the direct field of view of the LIDAR. In the embodiment of FIG. 21D reflected light from the laser beams can travel along the reverse path and thereby provide an indirect FOV to LIDAR 2120a. The roof mounted laser distribution system 2140 of FIG. 21D can utilize several aspects of the existing body structure of passenger vehicles. For example, reflectors (e.g. 2150a and 2150b) can be mounted to the flat opposing surfaces of body panels 2155 and 2156. Lenses 2160a and 2160b can be located at the edge of the roof where many vehicles already have rear lights or molding strips (e.g. long often black strips) for hiding the joints of roof panels. LIDAR 2120a can be embedded below the roof panel 2155. In some embodiments LIDAR 2120a can have little or no direct FOV when embedded and laser distribution system 2140 provides an indirect FOV.

FIG. 21E illustrates a vehicle-integrated laser distribution system 2140, attached on top of the roof of a vehicle, including a LIDAR 2120a and a beam guide 2141b, according to an embodiment of the present disclosure. The beam guide 2141b comprises a light transmitting region 2152b, a lens 2160b and a reflector 2150b to guide laser beams in the light transmitting region from the LIDAR to the lens. In the embodiment of FIG. 21E input laser beam or pulse 2145b is refracted by lens 2160a to form output beam 2180b. Output beam 2180b travels through a region 2198a that is beyond the range of regions accessible from the direct FOV of LIDAR 2120a (e.g. due to the design limitations of the LIDAR FOV). Input beam 2145c is reflected at reflector 2150b and then transmitted through lens 2160b as output beam 2180c. Output beam 2180c travels through a region 2198b that is outside of the direct ranging region of LIDAR 2120a or outside of the direct FOV of LIDAR 2120a (e.g. due to the artificial horizon formed by the roof panel 2155).

FIG. 21F is an exemplary diagram of a vehicle-integrated laser reflection acquisition system 2142, embedded in the roof portion 2135 of a vehicle 2110. Vehicle-integrated laser reflection acquisition system 2142 can function to acquire laser reflections (e.g. laser reflection 2146a) from objects around a vehicle. In one embodiment a vehicle-integrated laser reflection acquisition system 2142 comprises a LIDAR 2120b and a beam guide 2141c. LIDAR 2120b comprises a laser detector 2121 having a FOV 2137 comprising a set of directions in which the laser detector can detect laser reflections. LIDAR 2120b is positioned on vehicle 2110 such that FOV 2137 comprises a direct portion of the FOV 2138 and an indirect portion 2139 that is obstructed (e.g. by the roof panel) from directly receiving laser reflections from beyond the vehicle.

LIDAR 2120b is a bi-static LIDAR and further comprises one or more lasers 2143a and 2143b, located remotely from the detector 2121, to transmit laser pulses to a plurality of reflection locations beyond the vehicle. This bi-static arrangement enables one or more lasers to be mounted at a variety of points on the vehicle with different FOVs. The lasers can reach a variety of overlapping or mutually exclusive reflection locations around the vehicle, thereby providing coverage that can be adapted to various purposes (e.g. parking) or hazard locations (e.g. blindspots). In FIG. 21F beam guide 2141c is disposed on the vehicle, separate from the laser detector 2121, and configured (e.g. with reflectors 2150a-d and lenses 2160a-b) to receive laser reflections (e.g. reflection 2180a) corresponding to the laser pulses from reflection locations and to change, for each of the laser reflections, a corresponding input direction (e.g. input elevation angle) and to thereby guide the laser reflections to the laser detector 2121 with output directions at the laser detector in the indirect portion of the FOV.

It can be appreciated that the vehicle-integrated laser range finding system of FIG. 21F provides an indirect reflection path for laser reflections from reflection locations outside of the direct FOV 2138 of LIDAR 2120b. Hence, laser reflections received in the indirect portion (e.g. portion 2139) of FOV 2137 arrive at the laser detector 2121 in directions that are related to their reflection locations (e.g. location 2136) but have been changed by the beam guide. Circuitry such as 3-D location calculator 2191, including input/output angle converter 2192 can be used to calculate 3-dimensional coordinates of reflection locations corresponding to the laser reflections. This circuitry can include computer processors, mircocontrollers, and analog circuits. The 3-D location calculator 2191 can be configured with a transfer function that relates the arrival direction or input angles of laser reflections at the beam guide (e.g. at lens 2160a) to the angle or direction in the indirect portion of the FOV of laser detector 2121. The 3-D location calculator can process reflection data from laser reflections, including the reflection direction at the detector, identify an indirect subset of laser reflections with directions in the indirect portion of the FOV (i.e. those reflections in need of angular conversion), process the indirect subset of laser reflections according to the transfer function and thereby generate 3-dimensional coordinates 2193 of the reflection locations. The 3-dimensional coordinates 2193 of the reflection locations can be displayed in a point cloud.

In several embodiments, optical elements in the beam guide can be reconfigured based on a variety of factors such as vehicle location (e.g. urban streets or parking). The beam guide can therefore be reconfigured to change the relationship between input angles of laser beams at a first end (e.g. at lens 2160a) and a second end (e.g. at detector 2121). In a vehicle-integrated laser distribution system the beam guide can be reconfigured to change the relationship between directions in a laser FOV of a transmitted laser beam into the beam guide and the output direction of that laser beam form a second end of the beam guide remote from the laser. The 3-D location calculator can reconfigure the transfer function in response to the reconfiguration of the beam guide and calculate 3-dimensional coordinates 2193 of the reflection locations accordingly. For example, a set of reflectors in a beam guide can be reconfigured to provide obstacle avoidance while an autonomous vehicle is parking in a garage. The 3-D location calculator can access a computer memory to retrieve data to reconfigure a transfer function used to relate laser reflections to 3-dimensional coordinates of reflection locations for the reconfigured beam guide. In another embodiment the transfer function in the 3-D location calculator can be replaced with a new transfer function obtained by calculation or from memory based on data indicating the new state of a reconfigured beam guide.

Figure 22B:
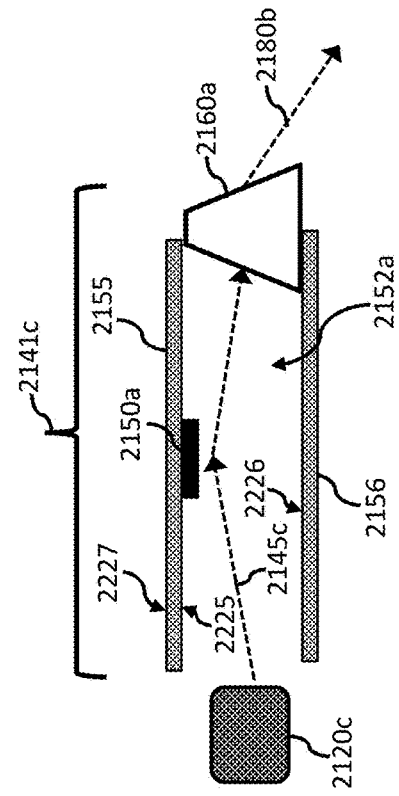
FIGS. 22A, 22B and 22C illustrates several exemplary beam guides according to several embodiments of the present disclosure.
Figure 22A:
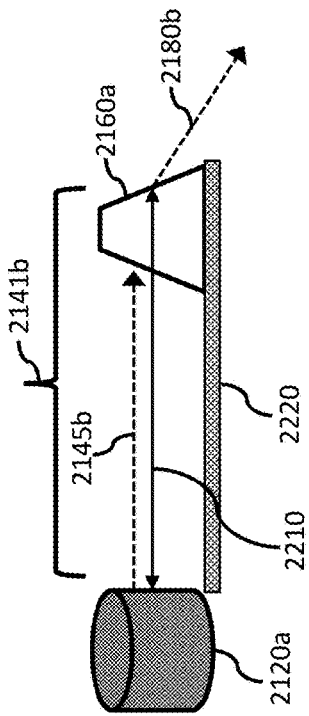

FIG. 22A illustrates a beam guide 2141b that functions to guide a laser beam in an incident direction (e.g. 2145b) to a lens 2160a and thereby transmit an output beam 2180b from the lens. Beam guide 2141b can further function to generate the output beam 2180b in a direction such that beam 2180b strikes an indirect reflection location that is outside the direct ranging region but inside the indirect ranging region (i.e. a point that cannot be reached by a laser from the LIDAR travelling in straight line direction in the set of directions forming the FOV). For the purpose of this disclosure the straight-line distance between where the laser beam (e.g. 2145b) exits the LIDAR (e.g. 2120a) to the point that the laser beam is transmitted from the lens is the defined as the guided distance (e.g. distance 2210). In some embodiments, the beam guide functions to provide an enclosed or semi-enclosed region to guide the laser beam along the guided distance 2210. Unlike sealed light assemblies (e.g. headlight or rear brake lights on passenger vehicles) the beam guide can function to guide the laser beam over large guided distance around a vehicle (e.g. 30 centimeters, 1 meter or from the front of a vehicle to the rear of a vehicle). Similarly, the beam guide can function to distribute the laser beam from a centralized source or gather laser beams from around large and diverse portions of the vehicle. In the embodiment of FIG. 22A beam guide 2141b with lens 2160a is attached to substrate 2220. Incident laser beam can travel close or parallel to the substrate. Substrate 2220 can be an exterior panel of the vehicle (e.g. roof panel 2155 in FIG. 21E). In FIG. 22B beam guide 2141c comprises two vehicle panels (e.g. panel 2156 and roof panel 2155) a reflector 2150a and a lens 2160a. In the beam guide of FIG. 22B the incident laser beam 2145b from solid state LIDAR 2120c, travels behind the front surface 2227 of a body panel (e.g. 2155). The front surface of the body panel can be defined as the surface between the vehicle and the environment surrounding the vehicle. In another aspect at least one non-light transmitting interior surface (e.g. an opaque or reflective surface 2225) is located behind the front surface (e.g. 2227) of a body panel (e.g. 2155). In beam guide 2141c a reflector is attached to or embedded in interior surface 2225 behind the front surface 2227. Reflector 2150a serves to guide a range of input beams with a range of incident angles e.g. 2145b to form a corresponding range of output beam angles. Lens 2160a can refract or simply transmit laser beam 2180b. Lens 2160a can function to seal the gap between panels 2156 and 2155 at the end of the beam guide. Interior surface 2225 of panel 2155 and reflector 2150a can be formed by functionalizing panel 2155 with opaque or reflective coatings or tapes. Cavity 2152a can be defined as the space or the region between the interior surfaces 2255 and 2226 located behind the exterior surface 2227 of body panel 2155. In the embodiment of beam guide 2141c the cavity is elongated along the path of the laser beam (e.g. in the direction formed by a line between the laser input point at the LIDAR and the out point at the lens). The cavity can be thin (e.g. 1 mm to 10 centimeters) in the direction normal to the interior surface 2225 and can have substantially uniform thickness if surfaces 2225 and 2226 remain parallel along the direction of travel of the laser beam. Cavity 2152a can be at least partially enclosed by body panels 2155 and 2156, thereby keeping the cavity free from dirt, or obstacles that can obstruct laser distribution or gathering. For example, enclosing the LIDAR 2120b in cavity 2152a enables the laser distribution path (e.g. for beam 2145c) to be kept free of dust and foreign objects through the life of a vehicle. Lens 2160a can be an elongated strip at the edge of body panel 2155 with a larger surface area than the aperture of LIDAR 2120b, thereby providing increased immunity from dirt and debris building up on the lens exterior.

Figure 22C:
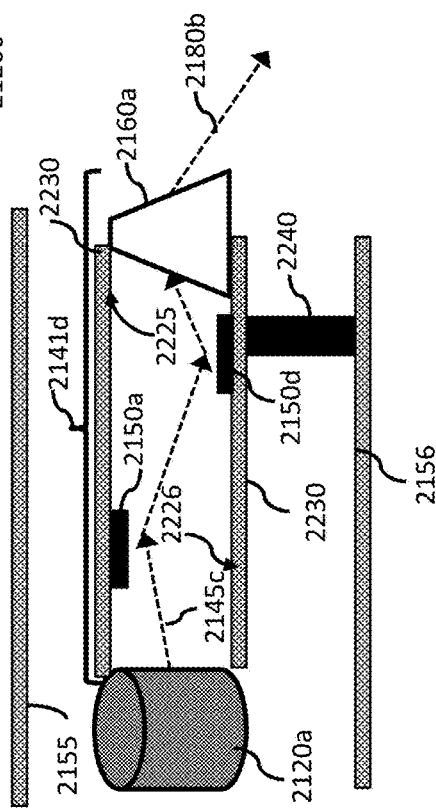

Turning to FIG. 22C auto manufacturers have increasingly implemented sealed headlight units comprising reflectors, and lenses. Beam guide 2141d illustrates a sealed or semi-sealed beam guide comprising two or more non-transmitting surfaces 2225 and 2226, lens 2160a and one or more reflectors (e.g. 2150a and 2150d) located on the substrate 2230. Non-light transmitting surfaces 2225 and 2226 can be part of one or more substrates 2230 (e.g. molded polymer or formed metal). Substrate 2230 can be sealed to the lens similar to sealed headlights, thereby providing a watertight seal designed to keep dirt and moisture from entering into the sealed beam guide 2141d. At the entrance to the beam guide LIDAR 2120a can make close contact with the substrate 2230. Substrate 2230 can be attached to the vehicle frame (e.g. at 2240) using a variety of attachment technologies (e.g. rivets, screws, spacers). In one example sealed beam guide 2141d can be a single metalized polymer substrate similar to a headlight reflector, and designed to guide an incident laser beam to a lens.

In several embodiments a beam guide comprises a cavity in which light can travel, the cavity being located between two or more substantially opposing non-light transmitting surfaces located behind the front surface of a vehicle body panel. The beam guide further comprises an opening at a first end to accept a laser beam with an input angle and a lens at a second end to transmit the laser beam, wherein upon transmission of the laser beam from the lens the laser beam travels in an output direction (e.g. direction of beam 2180b) that is based on the input direction (e.g. the direction of beam 2145c) and strikes a point outside the set of direct ranging points. The laser beam can be guided along the cavity by one or more reflective portions of the two or more substantially opposing non-light transmitting surfaces.

Figure 23:
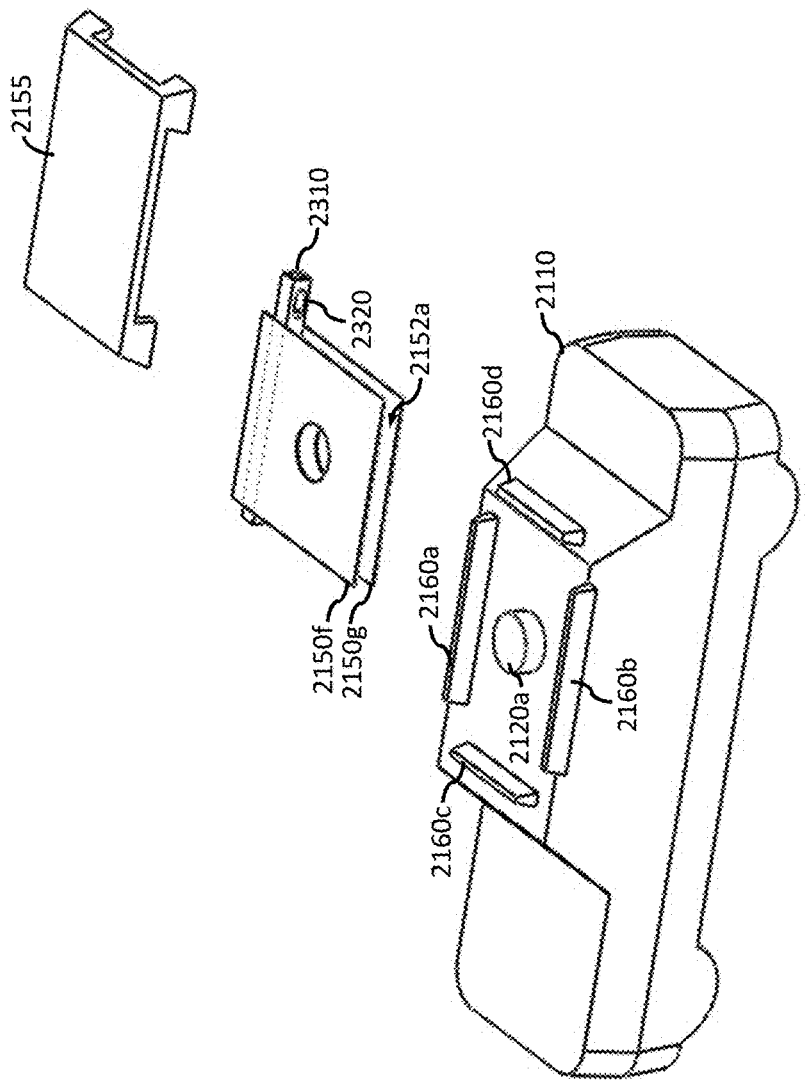
FIG. 23 is an exploded view of a variety of components of a vehicle-integrated laser distribution system in accordance with an embodiment of the present disclosure.

FIG. 23 is an exploded view of a variety of components of a vehicle-integrated laser distribution system in accordance with an embodiment of the present disclosure. Four elongated lenses 2160*a*, 2160*b*, 2160*c* and 2160*d* are arranged at the edges of the vehicle roof. Lenses can be integrated behind the windows or windshields of the vehicle. For example, many vehicles integrate a lens for a third rear brake light inside the rear windshield, where it is protected by the windshield. Lens 2160*d* could be similarly placed behind the windshield. In one embodiment one or more lenses can be existing lenses for brake lights or headlights. A set of reflectors can be arranged in two substantially opposing subsets (e.g. 2150*f* and 2150*g*) arranged on opposing side of a narrow (e.g. 1 inch) cavity. Reflector subsets 2150*f* and 2150*g* can be metalized plastic similar to those used in headlight reflectors. In some embodiments reflector subset 2150*f* can be attached to roof panel 2155. For example, reflector subset 2150*f* can be reflective tape adhered to locations on roof panel 2155. Reflector subsets 2150*f* and 2150*g* can be polished metal portions of the vehicle body (e.g. panels) or frame (e.g. A pillar or B pillar). Cavity 2152*a* can contain a wide variety of traditional structural support elements such as metal roof support 2310. In one aspect holes or openings 2320 in the vehicle roof supports (e.g. 2310) can be strategically placed to permit laser beams to travel in the laser distribution system.

Figure 24A:
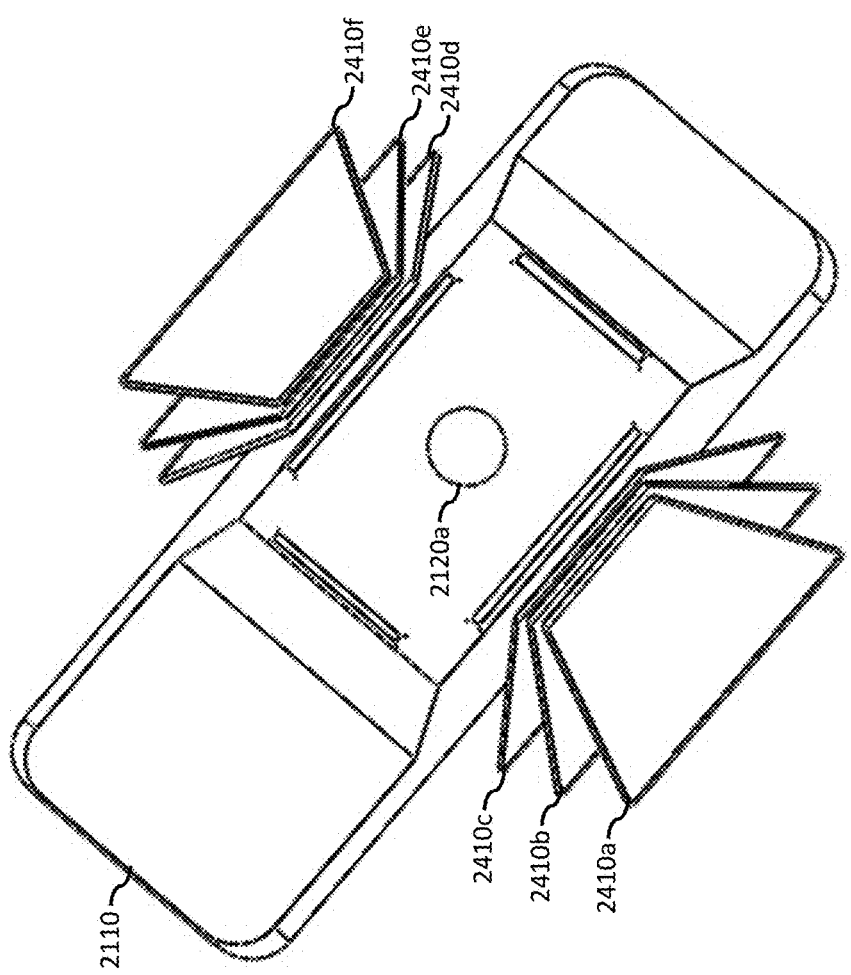
FIG. 24A illustrates a plurality of planes, each representing directions along which the indirect reflections from objects that are outside the direct FOV of a laser LIDAR can be provided to the LIDAR using various components of a vehicle-integrated laser distribution system in accordance with an embodiment of the present disclosure.
Figure 24B:
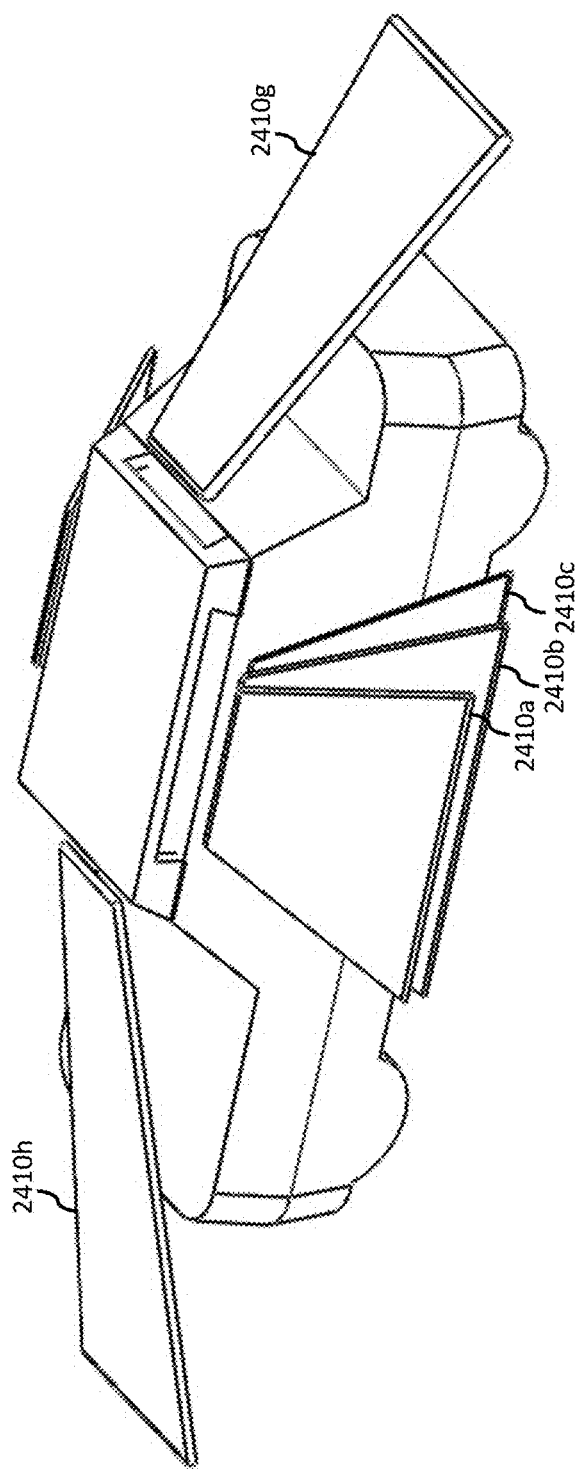
FIG. 24B illustrates a plurality of planes, each representing directions along which the indirect reflections from objects that are outside the direct FOV of a laser LIDAR can be provided to the LIDAR using various components of a vehicle-integrated laser distribution system in accordance with an embodiment of the present disclosure.

FIG. 24A illustrates a plurality of planes (e.g. 2410*a*, 2410*b*, 2410*c*, 2410*d*, 2410*e* and 24100, each representing a plurality of directions along which the indirect reflections from objects that are outside the direct FOV of a laser LIDAR 2120*a* can be provided to the LIDAR using various components of a vehicle-integrated laser distribution system, in accordance with an embodiment of the present disclosure. Each plane (e.g. 2410*a*) comprises a plurality of output directions at a variety of angles in the azimuthal plane and a constant angle in the elevation plane. Planes 2410*a-f* also illustrate portions of the ranging region (i.e. the 3-dimensional space) through which laser pulses and reflections can travel beyond the vehicle to and from ranging locations). FIG. 24B illustrates additional plane 2410*h* operable to provide laser reflections at low elevation angles in front of the vehicle and plane 2410*g* operable to provide reflections from low elevation angles behind the vehicle. These low elevation planes (e.g. 2410*a*) can be particularly beneficial for parking (e.g. in garages and compact parking spots). Low elevation angle planes (e.g. 2410*a*) also have the advantage that they emanate from a high point and can therefore image the entire way to the ground without the need to subtend a wide arc in the manner that a side mounted LIDAR would.

Figure 25:
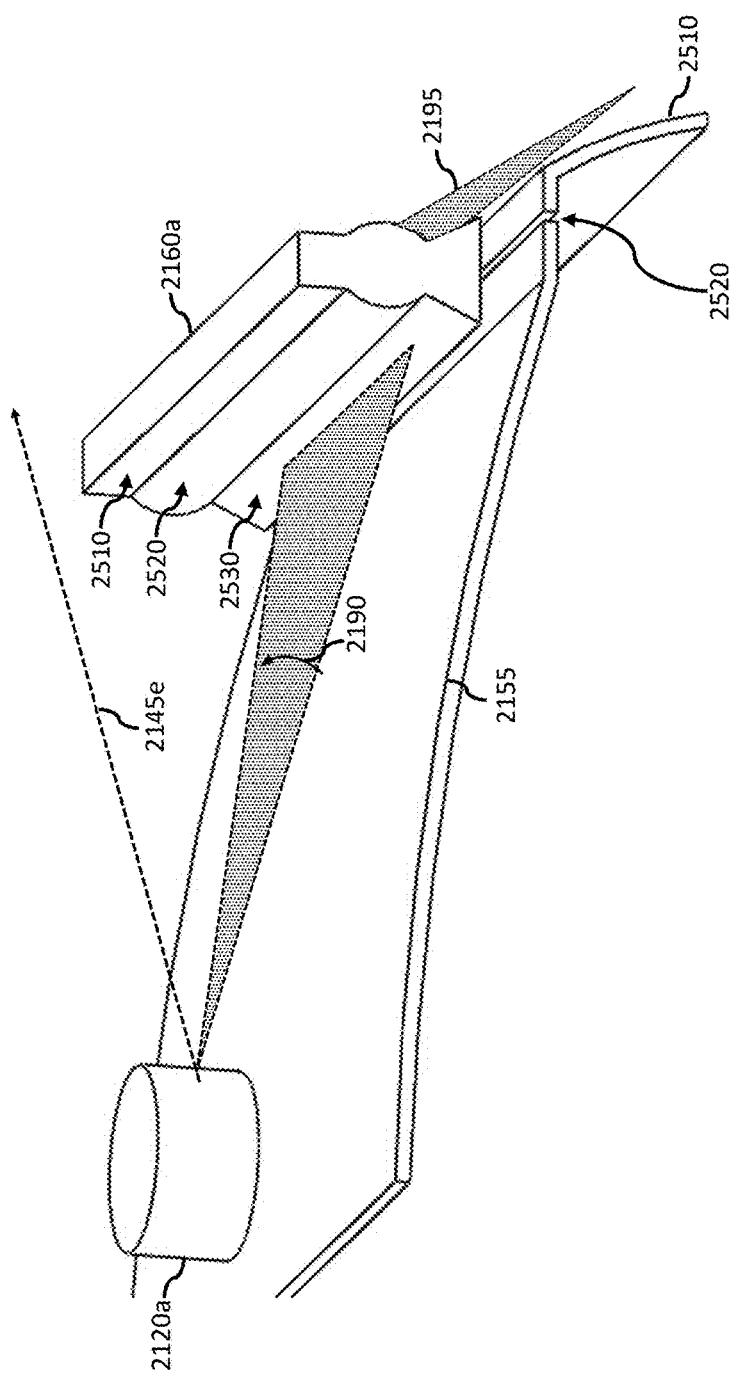
FIG. 25 is a block diagram of several components of an integrated laser distribution system, according to an embodiment of the present disclosure.
Figure 26:
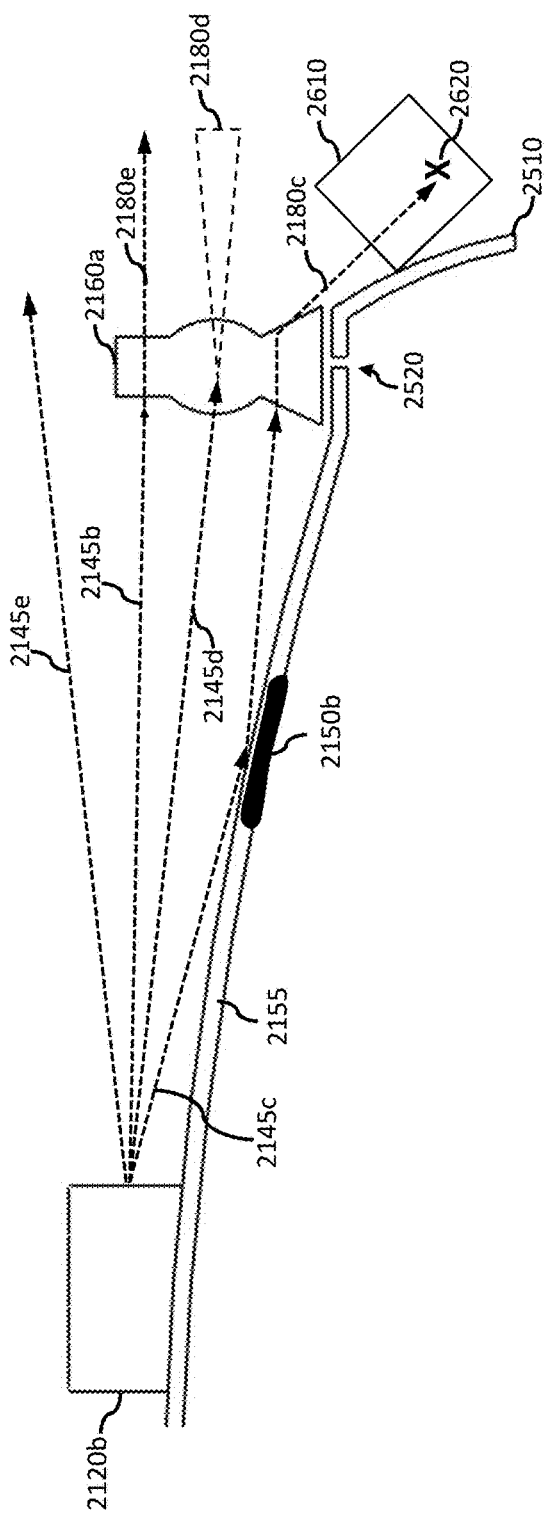
FIG. 26 is a diagram of several laser beam paths in an integrated laser distribution system, according to an embodiment of the present disclosure.

FIG. 25 illustrates several components of a vehicle-integrated laser distribution system, including a LIDAR and an elongated lens. Elongated lens 2160*a* can be placed at the edge of a vehicle body panel (e.g. 2155). It is common in passenger cars to have molding strips at the junction between a roof panel 2155 and a side panel 2510 and to cover the joint between the panels. Elongated lens 2160*a* can be located in the junction region 2520 between roof panel 2155 and side panel 2510. This choice of placement enables a laser beams to be guided above the roof panel as illustrated in FIG. 25 or beneath the roof panel (e.g. 2145*a* in FIG. 21D). With reference to FIG. 25 and FIG. 26 lens 2160*a* can have a variety of features operable to transmit laser beams in a variety of ways. For example, flat section 2510 can transmit an input laser beam 2145*b* as an output beam 2180*e* with the same direction and thereby contribute to the direct FOV. Input laser beam 2145*d* can be magnified by section 2520 of lens 2160*a* and thereby create a larger laser spot size 2180*d*. The larger spot size 2180*d* can be useful for object detection by providing reflections from more of an object than a small spot size. Input laser beam 2145*c* can be reflected by reflector 2150*b* and can be refracted by section 2530 of lens 2160*a* and create output beam 2180*c*. FIG. 26 illustrates a vehicle-integrated laser distribution system comprising a lens, a LIDAR and a reflector 2150*b* integrated into the roof panel 2155. In FIG. 26 output beam 2180*c* can travel through indirect laser measurement region 2610 outside of the direct FOV and can reflect from an indirect reflection location (e.g. 2620). In this way lens 2160*a* integrated into vehicle 2160*a* can extend the range of reflection locations to locations outside the FOV of LIDAR 2120*a*, or compensate for a portion of the FOV that has been obscured by the vehicle. In this way lens 2160*a* can turn an otherwise obstructed portion of a FOV into an unobstructed portion by providing an indirect path for laser reflections. Input beam 2145*e* can travel in the direct FOV beyond the vehicle. In one embodiment of the laser distribution system of FIG. 26 a majority of the FOV can be comprised of a direct FOV similar to traditional rotating LIDAR. At one or more angles of elevation a range of azimuthal angles (e.g. 2190 in FIG. 25) can interact with the vehicle integrated laser distribution system and thereby be distributed in a complex manner to adapted to the vehicle shape (e.g. diverting the beam around parts of the vehicle, concentrating or expanding the angular resolution to provide enhances resolution in certain areas such as blindspots).

Figure 27A:
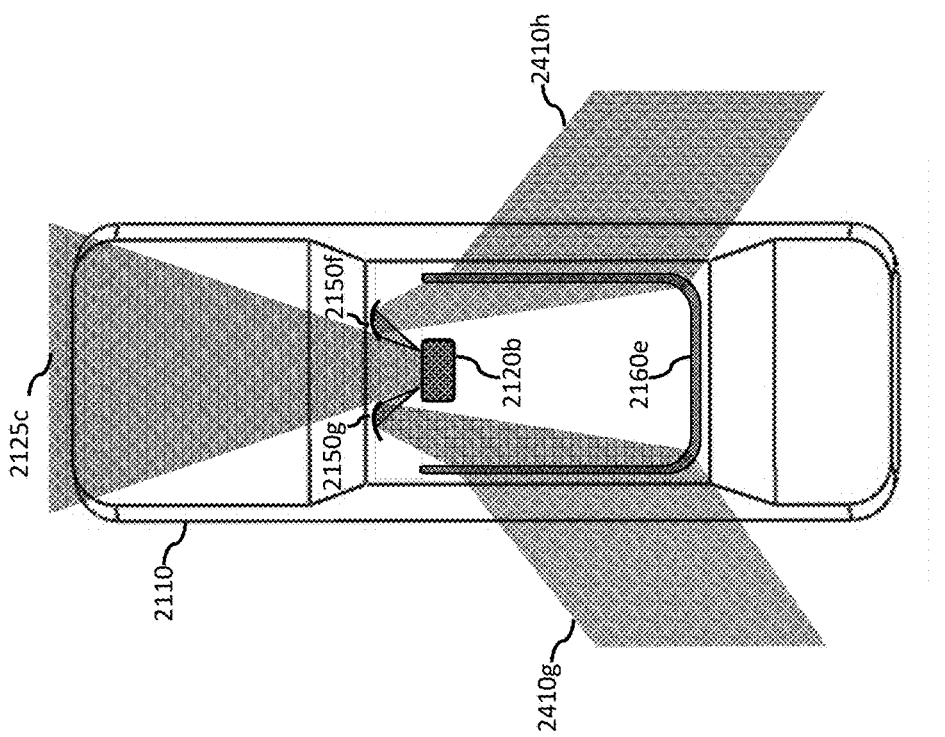
FIG. 27A is an exemplary diagram of an vehicle-integrated laser distribution system, embedded in the roof of a vehicle, including a laser range finder and a beam guide, according to an embodiment of the present disclosure.

FIG. 27A is an exemplary diagram of an vehicle-integrated laser distribution system, embedded in the roof of a vehicle, including a laser range finder and a beam guide, according to an embodiment of the present disclosure. LIDAR 2120*b* can be a solid state LIDAR with no moving parts such as the model S3 from Quanergy Inc. of Sunnyvale Calif. Solid state LIDARs often have a restricted azimuthal angular range in the FOV (e.g. +25 degrees and −25 degrees from the forward facing direction). As a result LIDAR 2120*b* may not be able to provide coverage behind towards the rear of vehicle 2110 within the direct FOV. LIDAR 2120*b* can function to provide ranging in a direct FOV 2125*c* and provide indirect ranging for objects in planes 2410*g* and 2410*h* that are beyond the direct FOV but capture important blind spots (e.g. for vehicle lane changes). A laser distribution system can comprise LIDAR 2120*b*, a set of reflectors 2150*g* and 2150*f* and curves lens 2160*e*. Reflector 2150*g* can function to reflect some of the FOV of LIDAR 2120*b*, thereby guiding laser beams substantially parallel and in close proximity to vehicle panel 2156, towards lens 2160*e*, where they can be transmitted into plane 2410*g*. For example, a particular azimuthal range (e.g. 20-25 degrees relative to the forward facing direction of LIDAR 2120*b*) and one or more elevation angles (e.g. +20 degrees relative to the horizon) can be reflected by reflector 2150*g*, refracted by lens 2160*e* and used to create indirect laser ranging plane 2410*g*. In this way a beam guide can provide a narrow (e.g. enclosed 1 inch) region to guide laser pulses with a narrow angular range (e.g. 5-10 degrees) within a vehicle that can be expanded to a much larger angular range (e.g. 30-60 degrees) in an indirect laser measurement region surrounding the vehicle.

In several embodiments one or more reflectors in the set of reflectors can be repositionable (e.g. motorized). While many LIDAR have a fast spinning mirror to create the azimuthal angular range, mirrors in the laser distribution system can be repositioned for the purpose of changing the laser measurement regions or planes (e.g. 2410*g*) provided in the indirect FOV. The reflectors can be repositioned in response to changes in the state of the vehicle (e.g. shifting into reverse, traveling above a speed threshold). Reflectors can also be repositioned in response to location data or sensor data (e.g. camera images or radar data), corresponding to particular tasks (e.g. parking) or hazards (e.g. curbs or vehicle wing mirrors). For example, in response to data indicating that vehicle 2110 is parking the laser distribution system can reposition reflectors 2150g for the task of parking. Reflector 2150g can be repositioned such that input laser beams are directed at a section (e.g. 2530) of lens 2160e operable to refract the laser beam at a low elevation angle (e.g. towards the ground). In this way a laser distribution system can be dynamically adapted to watch for situation specific hazards (e.g. objects in a garage while parking). The same laser distribution system can adapt reflectors (e.g. 2150g and 2150h) for driving on the highway by raising the elevation of planes 2410g and 2410h to provide blind spot coverage extending a longer distance from vehicle 2110. Planes 2410g and 2410h can also be extended to provide rear-view coverage.

Figure 27B:
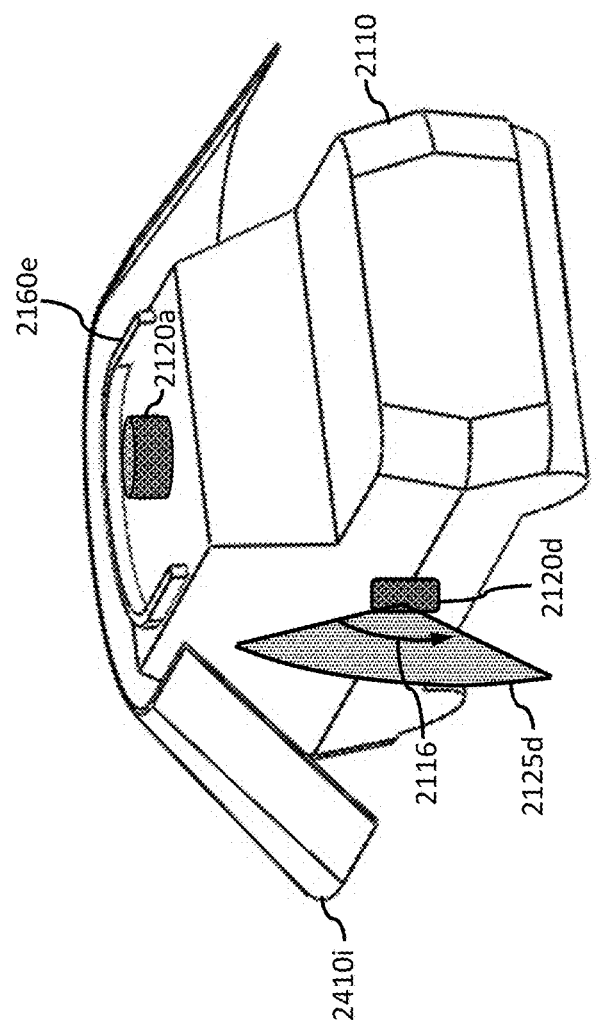
FIGS. 27B and 27C illustrate an exemplary vehicle-integrated laser distribution system, with wide azimuthal coverage at low elevation angles, embedded in the roof of a vehicle, according to an embodiment of the present disclosure.

FIG. 27B is a diagram of an integrated laser distribution system comprising LIDAR 2120a and lens 2160e. Lens 2160e refracts light in a narrow range of elevation angles in the FOV of LIDAR 2198a into a curtain shape plane 2410i. Curtain shaped plane 2410i can have a small output angular range (e.g. 2195) corresponding to the input angular range (e.g. 2190) operable to strike the lens 2160e. However Lens 2160e can provide a wide azimuthal range (e.g. 2180 degrees as illustrated in FIG. 27B). In this way plan 2410i can be very efficient at detecting the range of objects close to vehicle 2110, requiring only a small elevation range. The elevation range can be selected from the obstructed portion ( ) of the FOV. Hence the design of FIG. 27B provides efficient repurposing of a portion of the obstructed FOV to image objects (e.g. people, curbs or objects in a cluttered home garage) close to the sides of the vehicle 2110. In comparison, a side-mounted LIDAR (e.g. 2120d) requires a large elevation angular range (e.g. 2116) and a large azimuthal range (not illustrated) to provide ranging in the same region (e.g. 2125d) of the vehicle 2110.

Figure 27C:
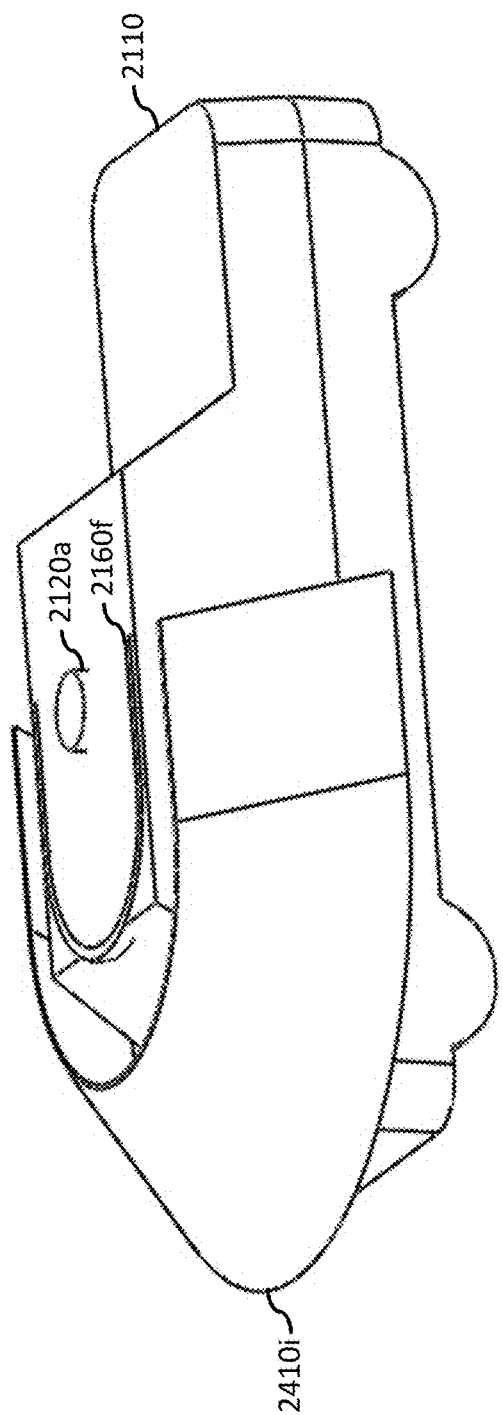

FIG. 27C illustrates another embodiment of a laser distribution system comprising a LIDAR 2120a embedded partially beneath the roof of vehicle 2110 and a lens 2160f to provide laser ranging in a plane 2410i beyond the direct FOV of the LIDAR. In the embodiment of FIG. 27C lens 2160f and a portion of the LIDAR FOV are embedded beneath the roof of vehicle 2110. This design enables lens 2160f to be integrated below the roofline (e.g. behind a rear windshield). This design also enables the laser distribution system to use the lens associated with a brake light as some or all of lens 2160i. A portion of the FOV of LIDAR 2120a can be distributed below the roof panel of vehicle 2110 to lens 2160f. Another portion of the LIDAR FOV can be above the roof panel and provide a direct FOV.

Figure 28:
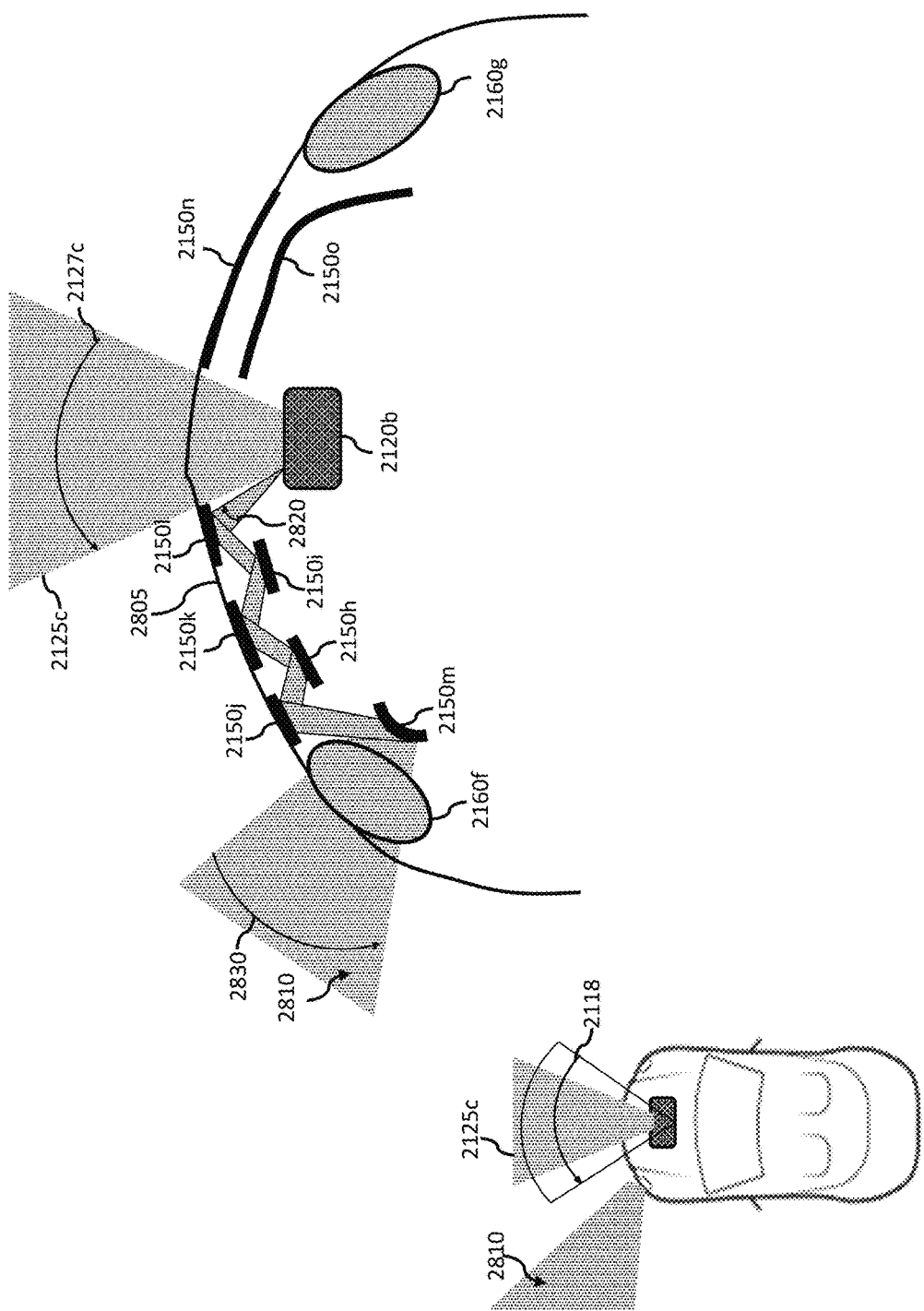
FIG. 28 is an exemplary diagram of a vehicle-integrated laser distribution system behind the bumper/hood panels of a vehicle and providing an indirect field of view to a LIDAR.

FIG. 28 is an exemplary diagram of an integrated laser distribution system behind the front panels (e.g. bumper, hood and grille) of a vehicle and providing an indirect FOV for a LIDAR. Solid state LIDAR 2120b can have a FOV characterized by an angular range 2118 in the azimuthal plane and an angular range in the elevation plane (not shown in FIG. 28). A direct FOV characterized by angular range 2127c can provide direct ranging of objects in laser measurement region 2125c. A subset (e.g. subset 2820) of angular range 2118 can be devoted to providing indirect ranging in one or more indirect laser measurement regions (e.g. 2810) that are inaccessible by the direct FOV (i.e. the range of angles that the off-the-shelf LIDAR can provide). The indirect FOV can comprise the set of directions with azimuthal angle in the range 2820 and elevation angles in the FOV of LIDAR 2120b (e.g. +20 degrees to −20 degrees from the horizon). In the embodiment of FIG. 28 laser beams in the azimuthal range 2820 are guided by a set of reflectors (e.g. 2150h, 2150i, 2150j, 2150k and 2150l) located behind the front panel 2805 (e.g. the front bumper) of vehicle 2110. Laser beams in azimuthal range 2820 are guided substantially parallel to the front panel 2805. The set of reflectors can be a disposed on a plastic substrate similar to the reflectors in a headlight assembly. In the embodiment of FIG. 28 the guided laser beams in azimuthal angular range 2820 can be reflected by a final reflector 2150m and lens 2160f to generate an output azimuthal angular range 2830 into region 2810. Some of the reflectors (e.g. 2150h, 2150i, 2150j, 2150k and 2150l) can have fixed positions and can therefore be permanently positioned when the vehicle is constructed. For example, reflectors can be embedded into the foam impact absorbers (e.g. foam blocks) within a vehicle bumper. Other reflectors such as 2150m at the input or output of the beam guide can be repositionable (e.g. by manual positioning or by motorized placement). These movable or motorized reflectors provide for dynamically reconfiguring the angular range 2830 and thereby generating different regions 2810. In several embodiments region 2810 can be exclusive from the region (e.g. 2125c) accessible by the direct FOV (characterized by angular range 2127c) and in some cases can be outside of the region directly assessable by the entire FOV of LIDAR 2120b (characterized by angular range 2118). In another embodiment continuous reflectors 2150o and 2150n can be arranged on opposite sides of a thin cavity beneath body panel 2805 and can project a laser beam through lens 2160g.

Figure 29A:
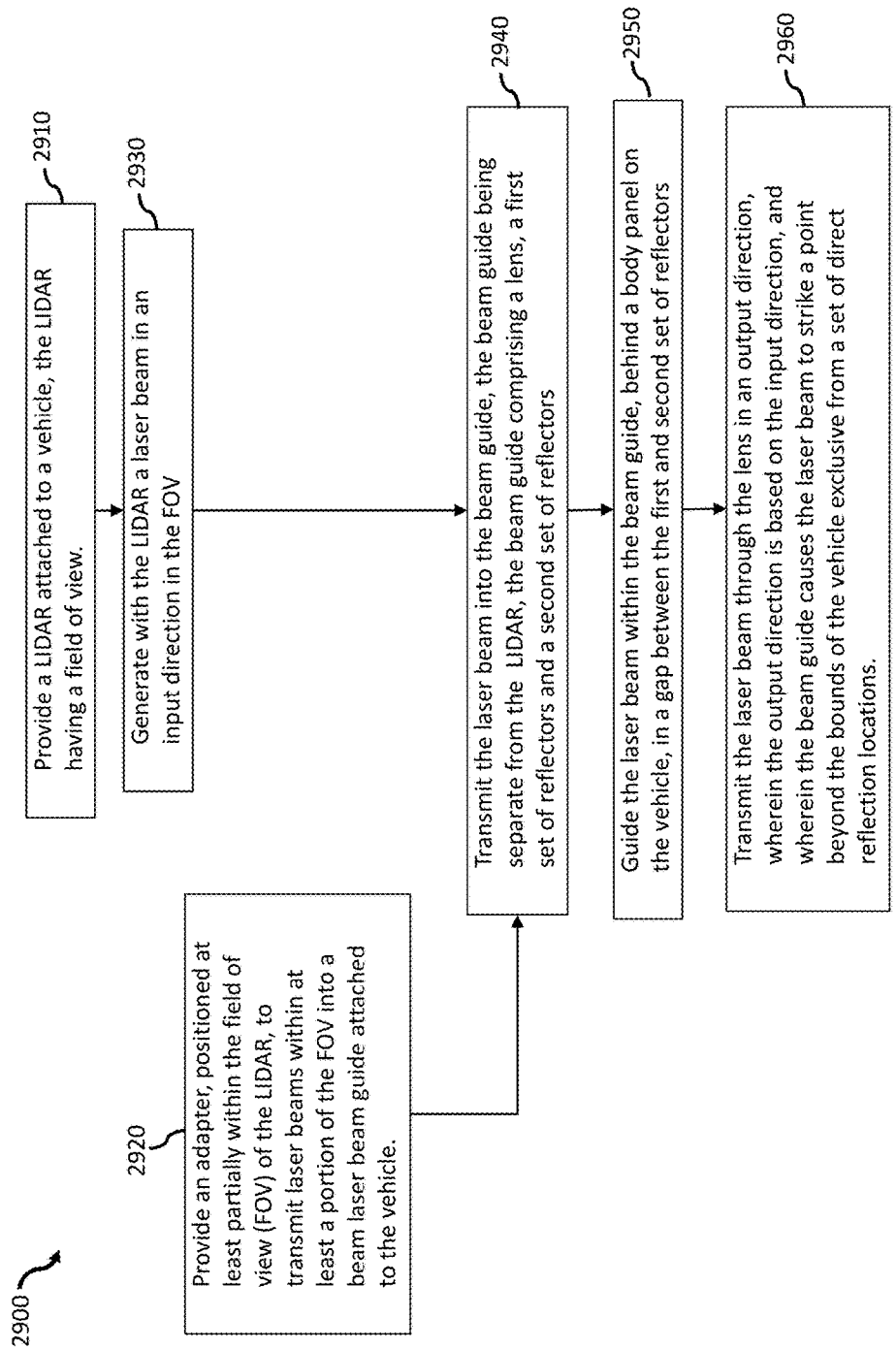
FIGS. 29A and 29B illustrates a process for providing a laser range finder with extended coverage using a vehicle mounted beam guide according to aspects of the technology.

FIG. 29A illustrates a process 2900 for providing a laser range finder with extended coverage (i.e. increasing the total laser measurement region or the unobstructed FOV) using a vehicle mounted beam guide according to aspects of the technology.

At block 2910 a LIDAR is provided, attached to a vehicle, the LIDAR having a field of view. At block 2920 an adapter is provided, the adapter being positioned at least partially within the FOV of the LIDAR. The adapter can function to transmit laser beams from at least a portion of the FOV into a beam laser beam guide attached to the vehicle.

At block 2930, a laser in the LIDAR generates a laser beam with an input direction within the FOV.

At block 2940 the laser beam is transmitted into a beam guide, the beam guide being separate from the LIDAR, the beam guide comprising a lens, a first set of reflectors and a second set of reflectors.

At block 2950 the laser beam is guided behind a body panel on the vehicle in a laser transmitting medium between the first and second set of reflectors. In some embodiments of method 2900 the first and second set of reflectors can each comprise a single reflector. In other embodiments each reflector in the first set of reflectors is a planar surface on substrate (e.g. polymer or metal) that is common to the first set of reflectors. In other embodiments each reflector in the first and second set of reflectors are surfaces or portions on a common substrate (e.g. a single molded polymer substrate with the first and second sets of reflectors attached to opposing surfaces). In some embodiments the first set of reflectors can comprise a single first reflector, the second set of reflectors can comprise a single second reflector and the first and second sets of reflectors can share a common substrate (e.g. a beam guide formed from a single polymer or metal substrate with two reflectors comprising elongated reflective strips that guide a laser beam). In some embodiments the first and second set of reflectors can guide the laser beam across a significant portion of a body panel such as at least 50 centimeters.

At block 2960 the laser beam is transmitted through the lens in an output direction, wherein the output direction is based on the input direction, and wherein the beam guide causes the laser beam to strike a reflection location beyond the bounds of the vehicle exclusive from the set of direct reflection locations (i.e. exclusive from the set of direct ranging points where laser range measurements can be performed by a laser beam travelling in a straight line from the LIDAR).

Figure 29B:
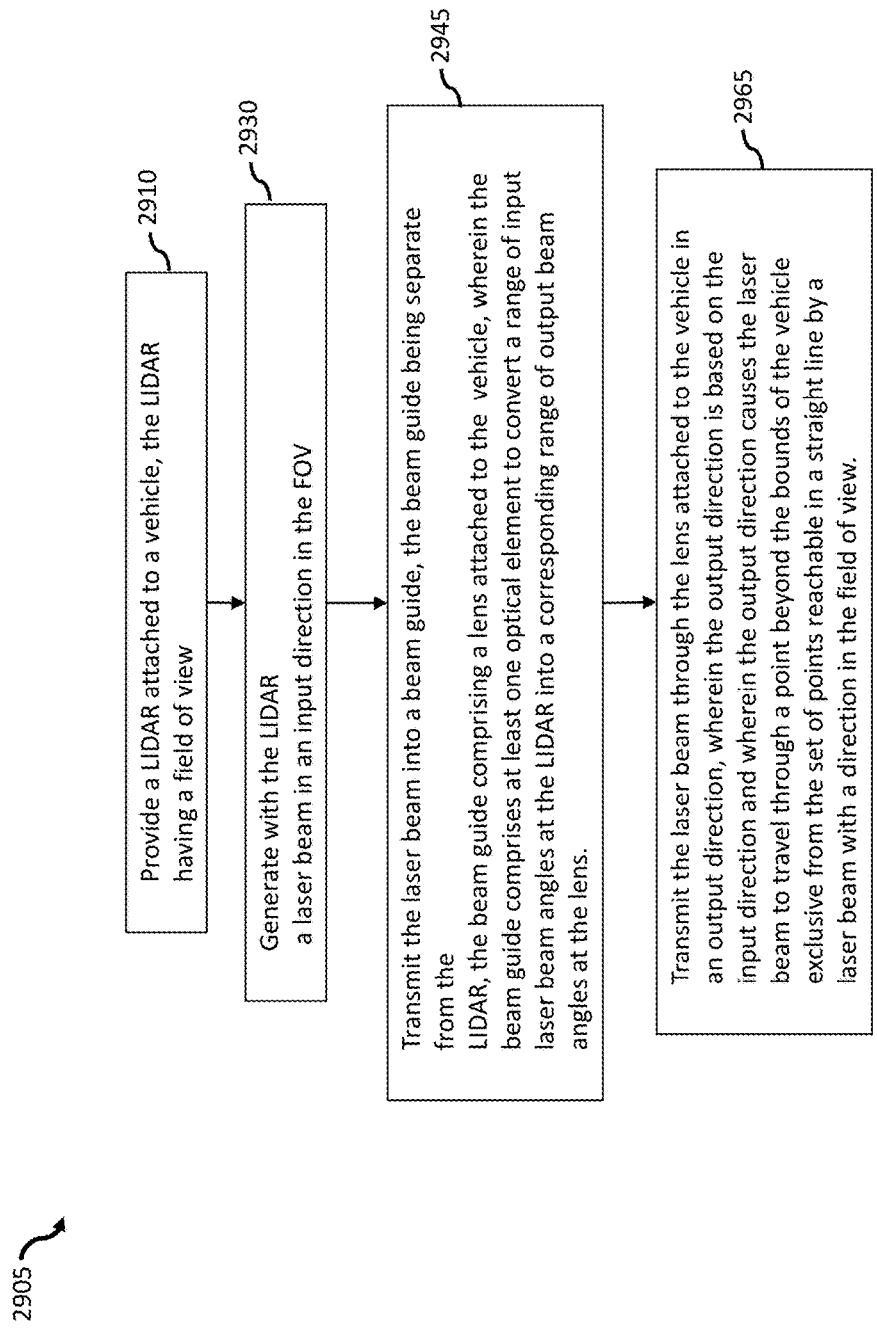

FIG. 29B illustrates an alternative process 2905 for providing a laser range finder with extended coverage using a vehicle mounted beam guide according to aspects of the technology.

At block 2945, the laser beam is transmitted into a beam guide, the beam guide being separate from the LIDAR, the beam guide comprising a lens attached to the vehicle, wherein the beam guide comprises means to convert a range of input laser beam angles at the LIDAR into a corresponding range of output beam angles at the lens. The means can be a reflector in the beam guide, a lens refracting the laser beam, a plurality of reflectors or a plurality of lenses or prisms. At block 2965 the laser beam is transmitted through the lens attached to the vehicle in an output direction, wherein the output direction is based on the input direction and wherein the output direction causes the laser beam to travel through a point beyond the bounds of the vehicle exclusive from the set of points reachable in a straight line by a laser beam with a direction in the field of view.

Figure 38A:
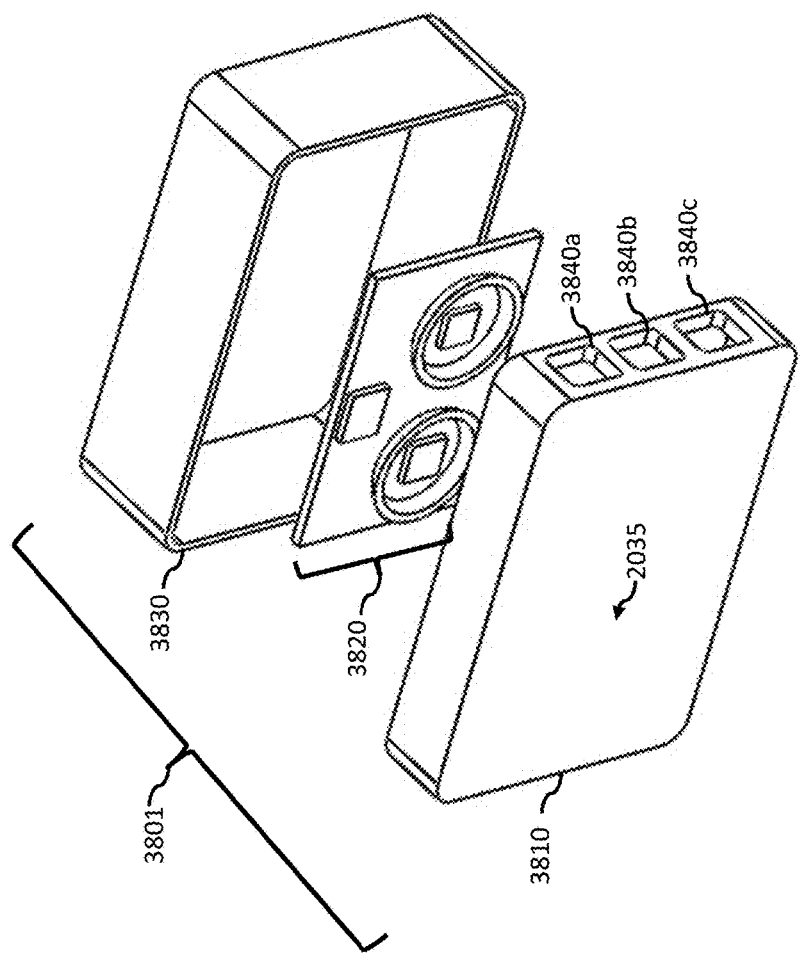
FIGS. 38A, 38B and 38C illustrate various views of a solid state LIDAR with an attached adapter to divert laser beams in a portion of the directions in the field of view into beam guides, thereby enabling indirect ranging in accordance with an embodiment of the present disclosure.

FIG. 38A illustrates a LIDAR 3801 comprising LIDAR electronic circuitry 3820, adapter 3810 and rear housing 3830. LIDAR 3801 can have a FOV comprising the set of all directions in which LIDAR 3801 can transmit laser beams. Adapter 3810 can be positioned infront of the LIDAR electronics 3820 and can function to adapt, configure or customize LIDAR 3801 to a specific set of beam guides (e.g. the beam guides disposed in a specific model or shape of vehicle) as part of a vehicle-integrated laser distribution system or vehicle-integrated laser reflection acquisition system. LIDAR electronics 3820 can include an optical phased array (OPA) to generate a laser beam in a range of directions forming the FOV. LIDAR 3801 can transmit a first subset of laser beams directly into the surroundings to perform direct laser ranging of objects infront of the LIDAR electronics 3820. Adapter 3810 can have a front surface 3835 with portions that are transparent to the laser beam emitted by LIDAR electronics 3820, that function to facilitate direct laser ranging.

Adapter 3810 can function to transmit a second subset of laser beams into one or more laser beam guides. One or more openings or transparent windows 3840a-c, transparent to the laser beam (e.g. glass) can transmit laser beams into one or more beam guides (e.g. beam guide 2141a in FIG. 21D or beam guide 2141b in FIG. 22A). One advantage of adapter 3810 is that a vehicle manufacturer can select from a variety of standard or custom adapters to match the number and arrangements of laser beam guides in the integrated laser distribution system. A family of standardized or customized adapters can be designed to work with a common LIDAR electronic circuitry 3820. In this way, a LIDAR maker can develop and refine single a LIDAR electronics assembly and vehicle manufacturers can use basic knowledge of the FOV associated with the LIDAR electronics 3820 (e.g. the total number of points per scan, or the azimuthal and elevation angular ranges in the FOV) to develop or select an adapter 3810. Similarly, a vehicle manufacturer can use an adapter 3810 to guide the design of various beam guides (e.g. the placement of reflectors e.g. 2150l in FIG. 28) to capture the laser beams from the adapter 3810. Adapter 3810 can have features similar to a radio frequency connector for guiding radio frequencies or microwaves. Adapter features can include connector shells to ensure spatial registration of the beam guides relative to the adapter and attachment points to mount the adapter to the vehicle and/or to the LIDAR.

Figure 38B:
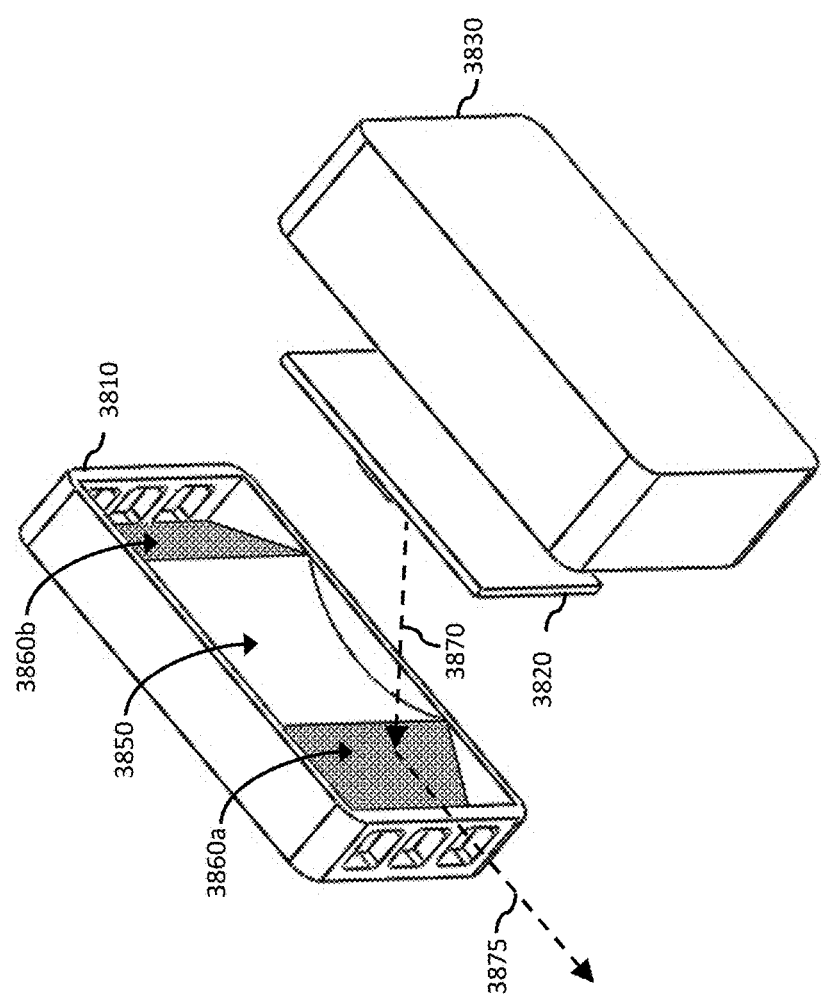

FIG. 38B illustrates a LIDAR adapter 3810 can have a surface 3850 operable to transmit a laser beam in a direct FOV and one or more surfaces (e.g. 3860a and 3860b) operable to reflect or refract a laser beam 3870 in an output direction 3875 into a beam guide.

Figure 38C:
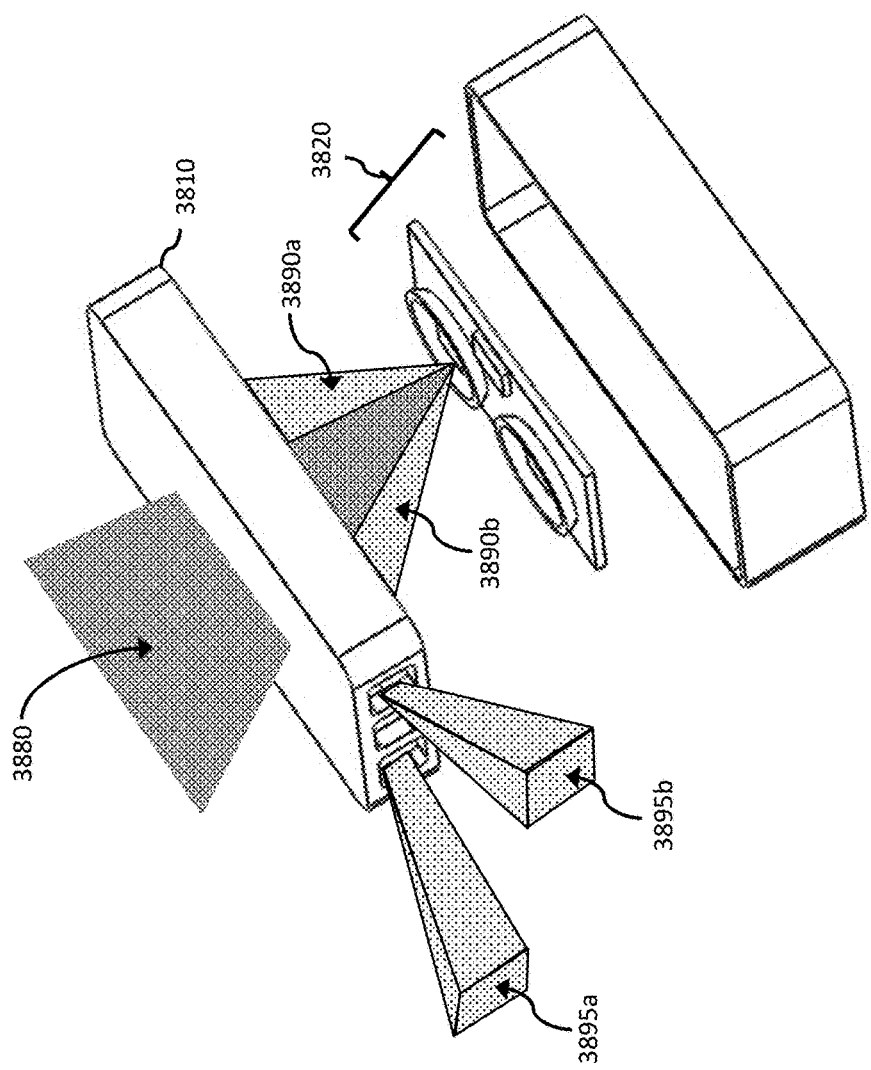

FIG. 38C illustrates that adapter 3810 can provide a direct portion of the FOV 3880 and indirect portion of the FOV 3890a and 3890b can be reflected or refracted at surfaces (e.g. 3860a and 3860b in FIG. 38B) and guided to form angular ranges 3895a and 3895b operable to be transmitted into laser beam guides.

FIG. 39 illustrates a field of view of a LIDAR, with a direct field of view and an indirect field of view providing laser reflections from several regions associated with the vehicle outside of the ranging region provided by direct line of site of the LIDAR. A laser beam from LIDAR 110 can be transmitted in a direction within the direct FOV 3980 and travel in a straight line direction to points (e.g. 150d or 150e) within the set of all direct ranging points. The FOV 3910 of LIDAR 110 also contains an indirect FOV comprising laser beams guided to regions 3890a and 3890b. For example, in FIG. 39 azimuthal angles in the range 0-10 degrees and 50-60 degrees can strike reflectors (e.g. 3860a and 3860b in FIG. 38B) respectively and be transmitted through openings in the adapter (e.g. 3840a in FIG. 38A) into a laser beam guide. Reflections from points outside of the set of direct ranging points (i.e. the set of all points that a laser travelling in a straight line can reflect from) can provide indirect ranging regions such as blind spots 3920a and 3920b, forward low elevation 3920c and rear reflections 3920d. Indirect regions 3890a and 3890b can be selected to overlap with obstructed portions of the integrated LIDAR design. Hence adapter 3810 in FIG. 38A can provide effective repurposing of obstructed portion of the FOV of a LIDAR, thereby reducing the total number of LIDARs needed to provide complete vehicle coverage.

Laser Range Finder with Dynamically Positioned Detector Aperture

Figure 30A:
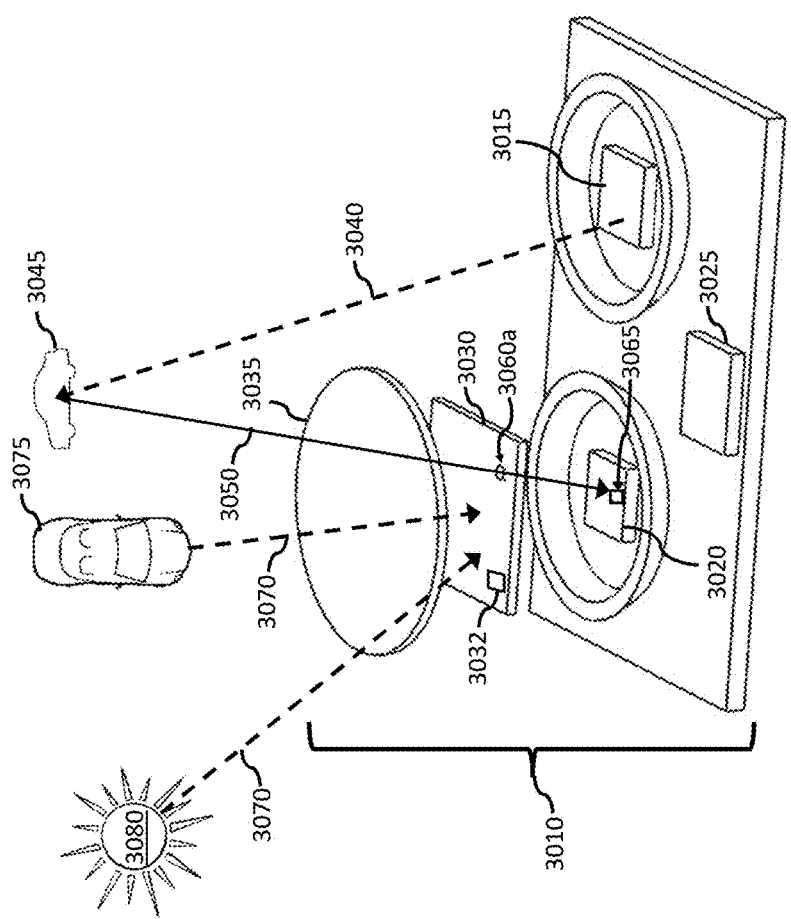
FIGS. 30A and 30B illustrate several aspects of a laser ranging system with a dynamically positioned aperture based on the location of reflected laser beams in the field of view of a photodetector.

FIG. 30A illustrates a related technology in which a dynamically steered laser range finder 3010 (e.g. a LIDAR or 3D laser scanner) uses a spatial light modulator 3030 to create an electronically controlled aperture (e.g. opening) in the field of view of the laser receiver, that is electronically positioned based on data indicating the direction of a corresponding steerable laser. One challenge for LIDAR, is discerning laser reflections within a laser detector field of view (FOV) that can contain a variety of light emitting or high brightness objects. Mechanically steered LIDAR (e.g. HDL-64E from Velodyne LIDARs or Morgan Hill Calif.) can point the laser transmitter (e.g. a laser diode) and focus the laser detector (e.g. a PIN photodiode) at a small region of space along the direction the laser travels. This effectively focuses the LIDAR laser detector in a particular direction relative to the laser transmitter. The mechanical LIDAR transmitter and laser detector can then be rotated around an axis to sweep out a 360 degree field of view. The advantage of this approach is that the laser detector is always pointed in the direction to receive the laser reflection. As a consequence the laser detector in a mechanical LIDAR can be designed with considerable immunity to bright light sources (e.g. the sun or vehicle headlights) outside of the instantaneous direction that the laser detector is pointing.

In contrast, the laser detector in a solid state LIDAR (e.g. the model S3 from Quanergy Inc. of Sunnyvale Calif.) can receive light from a wider instantaneous field of view. For example, a solid state LIDAR with a 50 degree FOV in the azimuthal plane can steer a laser beam within the FOV but may receive light from all points of the FOV at once. In this situation the laser detector can be susceptible to light sources from all parts of the FOV at once. This can lead to photon saturation and can preclude the use of more cost effective laser detector electronics such as charge coupled device (CCD) arrays. CCDs typically have low photon saturation charge. Because the photon saturation charge of CCD is small, if this saturation level is reached then the light intensity will be saturated. Photodiode arrays (PDA) have greater photon saturation than CCDs and are used in many LIDARs today. Increasingly LIDARs are being used in autonomous vehicles and it is considerably advantageous to improve immunity of the LIDAR laser detector to bright light sources (e.g. headlights and sun) as well as other laser sources (e.g. other LIDARs and denial-of-service attacks).

Figure 30B:
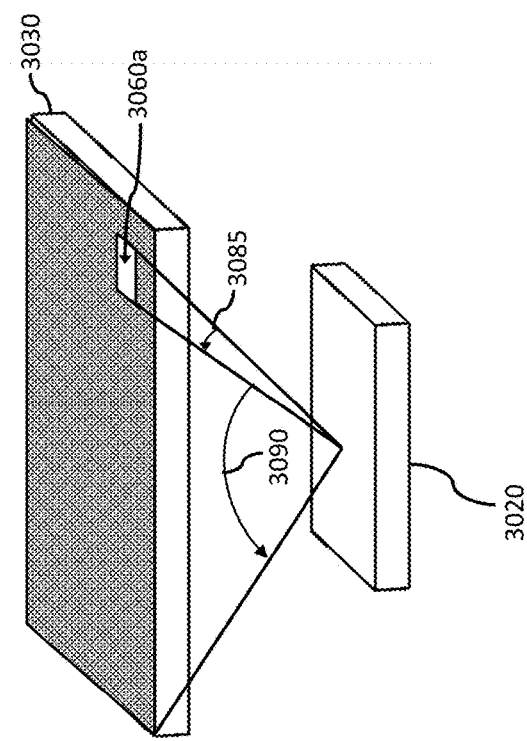

In one embodiment of the present technology an electronically steerable aperture is provided for a LIDAR laser detector that dynamically limits the portion of the laser detector FOV that can receive light based on the anticipated position of a corresponding laser. The electronically steerable aperture can be a spatial light modulator (SLM) comprising a plurality of segments with electronically controllable optical transparency (e.g. liquid crystal array segments). A subset of segments can be darkened in order to block light from parts of the FOV of the laser detector beyond the portion that is estimated to contain the reflected light from a corresponding laser. Turning to FIG. 30A and FIG. 30B a dynamically steered laser range finder 3010 can have a steerable laser transmitter 3015, such as an optical phased array (OPA). Steerable laser transmitter 3015 can comprise a laser, a laser splitter, a multimode interference coupler, an optical phase shifter (e.g. linear ohmic heating electrodes) an out of plane optical coupler to combine the split, phase-shifted beams into an output laser beam pointed in a steerable direction. Dynamically steered laser range finder 3010 can have a photodetector 3020 (e.g. a PIN photodiode, avalanche photodiode or CCD array). A spatial light modulator (SLM) can be placed in front of the photodetector 3020 (e.g. in the FOV of photodetector 3020). The SLM can comprise a plurality of segments with electronically controllable transparency (e.g. segment 3032). In an exemplary SLM the segments can be formed with several components commonly found in an LCD array such as a glass substrate with indium tin oxide (ITO) electrodes to define the bounds of each segment, a liquid crystal layer, light polarizers and color filters operable to select a wavelengths range containing the laser wavelength. Dynamically steered laser range finder 3010 can contain a lens operable to focus light from the surrounding area onto the photodetector 3020. Dynamically steered laser range finder 3010 can contain control circuitry 3025. Control circuitry 3025 can function to receive or generate laser steering parameters indicating how the laser should be steered (e.g. directions, paths, or regions to scan with the laser). Control circuitry 3025 can further function to generate commands or signals to the steerable laser transmitter 3015 instructing the steerable laser transmitter to generate a laser beam in a direction. Control circuitry 3025 can further function to generate an aperture 3060a with the SLM 3030. The aperture can comprise a non-zero subset of the segments (e.g. 3032) that block light from a first portion of the FOV of photodetector 3020 from reaching photodetector 3020 and thereby transmit light from a small second portion of the FOV that is selected to transmit light based on data indicating the direction of the laser. In the embodiment of FIG. 30A the blocked portion of the FOV can be generated by applying a voltage to a non-zero subset of the electronically controlled segments thereby rotating the liquid crystal relative to one or more polarizer layers and blocking light from passing through the segment. Hence, a large subset of the segments can be electronically controlled to block light from parts of the FOV and thereby block light beams (e.g. 3070) from objects such as vehicles 3075 and the sun 3080.

FIG. 30B illustrates a photodetector 3020 and a SLM 3030. A portion of the FOV of photodetector 3020, represented by the range of angles 3085 can receive light through an aperture 3060a in the SLM. Another portion of the FOV of photodetector 3020, characterized by the range of angles 3090 is blocked by the darkened subset of segments surrounding the transmitting portion of the aperture 3060a.

Figure 31:
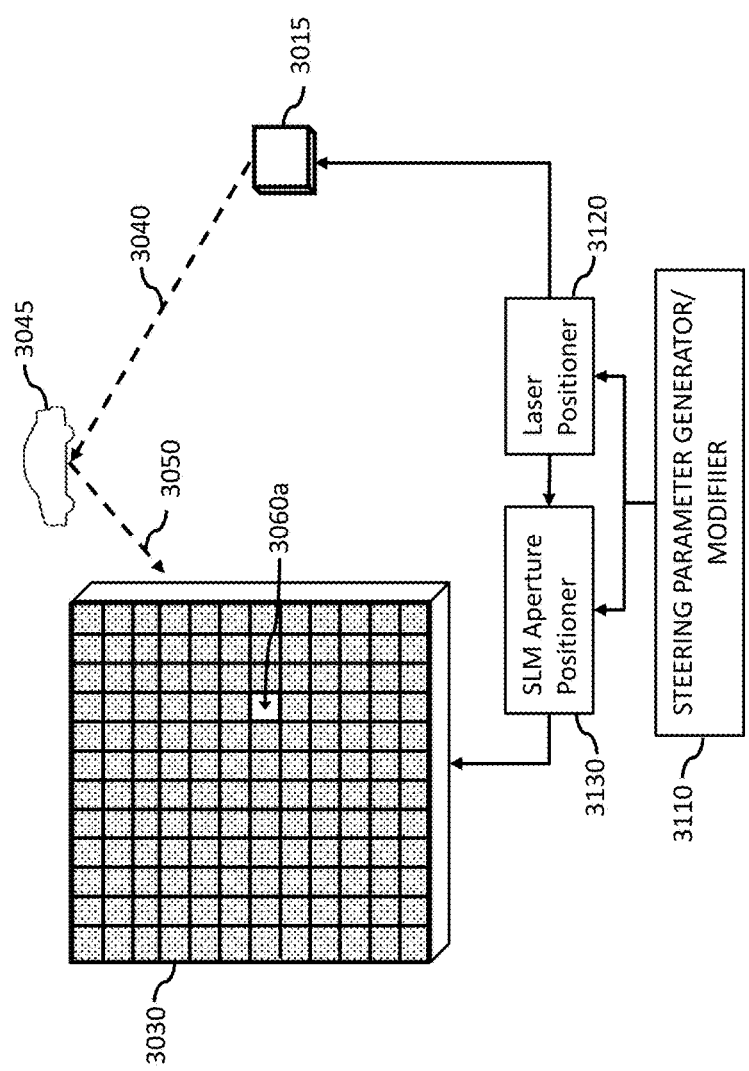
FIG. 31 illustrate several aspects of a laser ranging system with a dynamically positioned aperture based on the location of reflected laser beams in the field of view of a photodetector.

FIG. 31 illustrates several components of dynamically steered laser range finder 3010. Control circuitry 3025 can include a laser steering parameter generator/modifier 3110 operable to receive or generate laser steering parameters for steerable laser transmitter 3015. For example, laser steering parameter generator 3110 can receive high level instructions to generate a laser beam with 10 milliradian beam divergence, a spot size of 5 millimeters radius and scan the laser beam from left to right and from top to bottom within a transmitter FOV at a scan rate of 10 Hz. Alternatively, laser steering parameter generator/modifier 3110 can generator or modify laser steering parameters such as a laser a scan path, a series of way points, a series of laser pulse locations or the bounds of a region in the transmitter FOV in which the laser transmitter is to perform a laser scan with a specified point density or scan rate. In one aspect laser steering parameter generator/modifier can receive or generate high level instructions (e.g. a desired laser scan pattern) and can transmit the desired laser scan parameters to a laser positioner circuit 3120 operable to generate the signals necessary to generate a laser beam at the desired locations. In another aspect the same information indicating the current or near-future direction of the steerable laser can be provided to an SLM aperture positioner circuit 3130. SLM aperture positioner circuit 3130 can be a driver circuit for the plurality of electronically controllable segments in SLM 3030. SLM aperture positioner circuit 3130 can comprise one or more transistors, or integrated circuits. In one aspect of several embodiments the SLM aperture positioner 3130 can combine indications of the laser position in the FOV from either laser positioner 3120 or parameter generator 3110 with feedback from laser detector 3020 regarding the amount of light (e.g. degree of photon saturation) reaching the laser detector. In this way, during periods of intense ambient light, SLM aperture positioner can narrow the aperture to include only the region of the FOV with a high probability of containing the reflection from laser beam 3040. In one embodiment control circuit 3025 can include laser steering parameter generator/modifier 3110, laser positioner 3120 and SLM aperture positioner 3130. In one embodiment control circuit 3025 can control the SLM aperture through the use of a simple lookup table for aperture position (e.g. 3060a) corresponding to a laser beam direction (e.g. direction of beam 3040 within the laser FOV).

Figure 32:
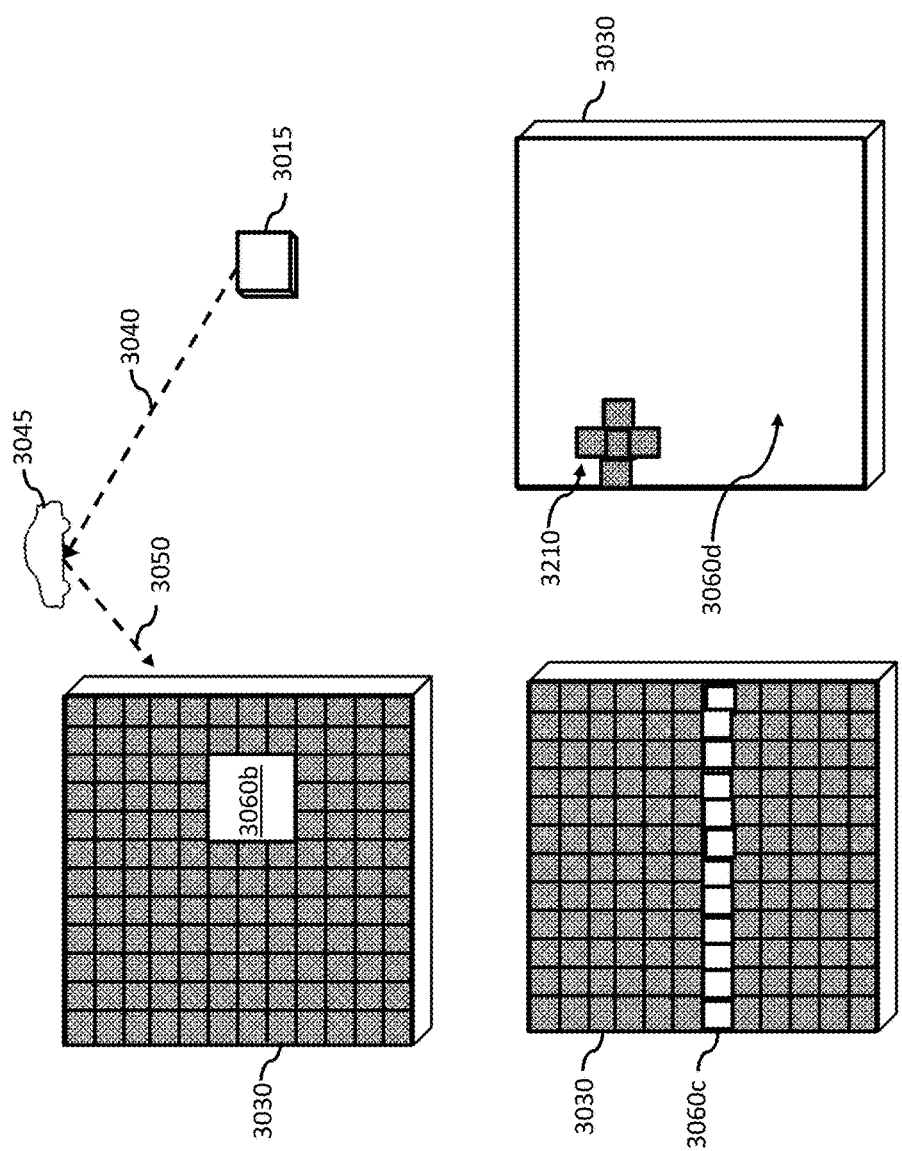
FIG. 32 illustrates several apertures that can be dynamically generated based on the position of a laser beam in a field of view of a photodetector.

FIG. 32 illustrates some alternative aperture shapes. Aperture 3060b is wider than 3060a in FIG. 31 and can therefore permit light in a wider range of angles 3085 to reach the laser detector. Aperture 3060b can be useful of the direction of the reflected laser pulse 3050 is only approximately known or if incident laser beam 3040 has a wide beam divergence. Aperture 3060c illustrates a slot aperture, useful if the laser is being scanned from left to right across the FOV of the laser detector at a constant elevation angle. Aperture 3060d is a very wide aperture with only a non-zero subset of 5 segments 3210 that are electronically controlled to block light from a small portion of the FOV. Aperture 3060d can be useful when SLM 3030 is required to block light from a specific part of the FOV (e.g. the sun or an oncoming car's headlights).

Figure 33:
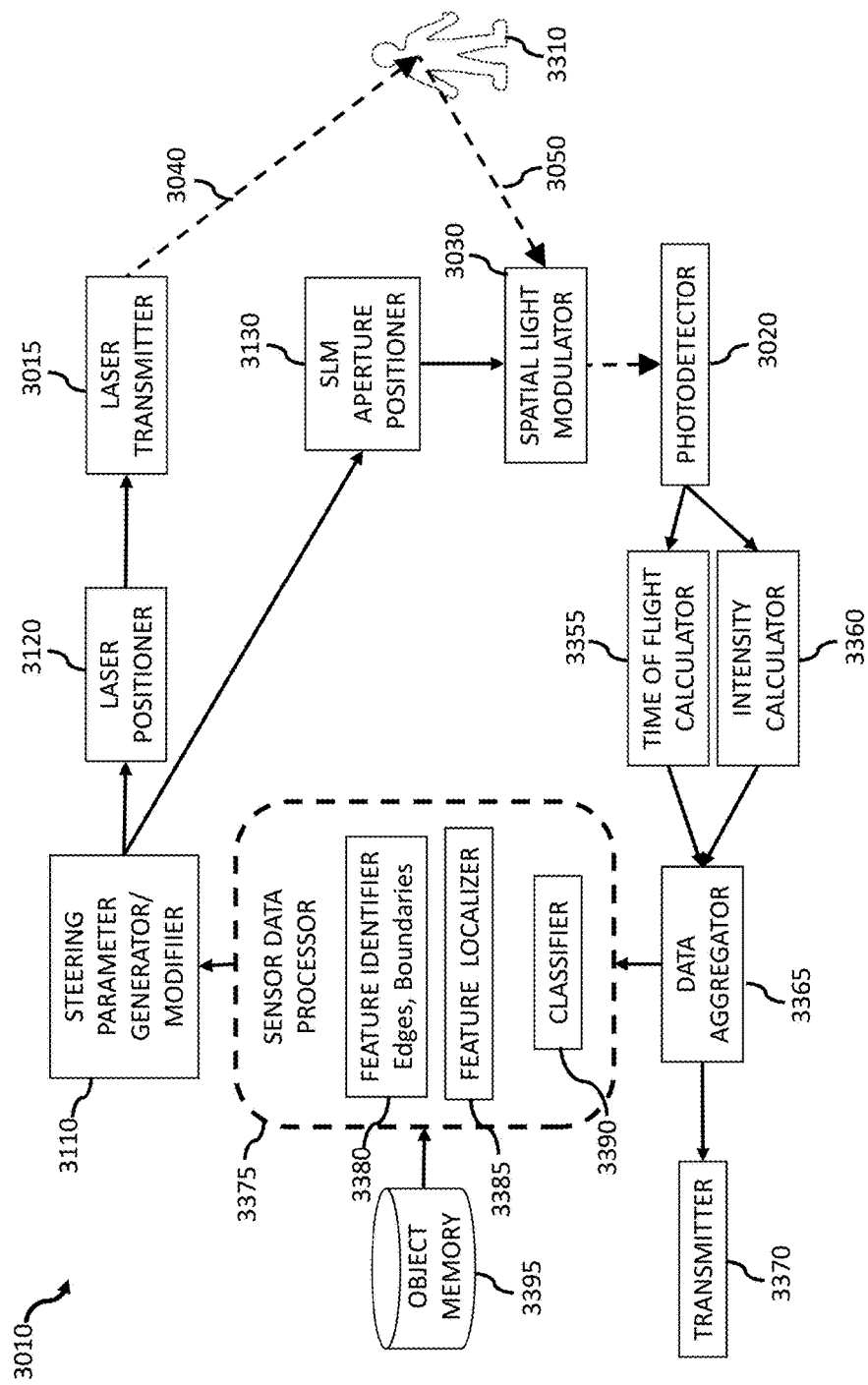
FIG. 33 is a functional diagram illustrating several components of an exemplary laser range finder in accordance with an embodiment of the present disclosure.

FIG. 33 illustrates several components of an exemplary laser range finder 3010 in accordance with an embodiment of this disclosure. Laser range finder 3010 can contain a laser steering parameter generator 3110 to generate laser steering parameters based on processed sensor data from sensor data processor 3375. Laser range finder 3010 can contain a laser positioner 3120 to generate a laser pulse or steer a laser beam at one or more locations in the FOV based on the laser steering parameters. Electronically steered laser positioner 3120 can include one or more optical delay lines, acoustic or thermally based laser steering elements. Laser range finder 3010 can contain a laser transmitter 3015 to produce one or more laser beam 2440 at one or more locations in the FOV determined by the laser positioner 3110. The laser generator can be one or more laser diodes, near infrared lasers. Laser positioner 3120 and laser transmitter 3015 can be combined onto a chip-scale optical scanning system such as DARPA's Short-range Wide-field-of-view extremely agile Electronically steered Photonic Emitter (SWEEPER). Laser range finder 3010 can generate on or more pulses with incident laser beam 3040. Laser range finder 3010 can receive one or more laser reflections 3050 from incident laser beam 3040. SLM aperture positioner can receive data from laser steering parameter generator 3110 indicating the direction of laser beam 3040. In various embodiments data regarding the position of laser beam 3040 can be data about an upcoming or future laser pulse, can indicate a region of the FOV that in which the laser pointed or will be pointed in the future or can be a instruction regarding where to place the aperture. Laser range finder 3010 can contain a photodetector 3020 to detect reflected light from the laser pulses or continuous laser beam. Photodetector 3020 can include one or more photodiodes, avalanche photodiodes, PIN diodes, charge coupled device (CCD) arrays, amplifiers and lenses to focus the incoming light from a narrow part of the FOV where the reflected light is anticipated to come from.

Laser range finder 3010 can contain a time of flight calculator 3355 to calculate the time of flight associated with a laser pulse striking an object and returning. The time of flight calculator 3355 can also function to compare the phase angle of the reflected wave with the phase of the outgoing laser beam and thereby estimate the time-of-flight. Time of flight calculator can also contain an analog-to-digital converter to convert an analog signal resulting from reflected photons and convert it to a digital signal. Laser range finder 3010 can contain an intensity calculator 3360 to calculate the intensity of reflected light. Time of flight calculator can also contain an analog-to-digital converter to convert an analog signal resulting from reflected photons and convert it to a digital signal.

Laser range finder 3010 can contain a data aggregator 3365 to gather digitized data from time of flight calculator 3355 and intensity calculator 2460. Data aggregator can gather data into packets for transmitter 3370 or sensor data processor 3175. Laser range finder 3010 can contain a transmitter 3370 to transmit data. Transmitter 3370 can send the data to a computer for further analysis using a variety of wired or wireless protocols such as Ethernet, RS232 or 802.11.

Laser range finder 3010 can contain a sensor data processor 3375 to process sensor data and thereby identify features or classifications for some or all of the FOV. For example, data processor 3375 can identify features in the FOV such as boundaries and edges of objects using feature identifier 3380. Data processor 2475 can use feature localizer 3385 to determine a region in which the boundaries or edges lie. Similarly a classifier 3390 can use patterns of sensor data to determine a classification for an object in the FOV. For example, classifier 3390 can use a database of previous objects and characteristic features stored in object memory 3395 to classify parts of the data from the reflected pulses as coming from vehicles, pedestrians or buildings.

Figure 34:
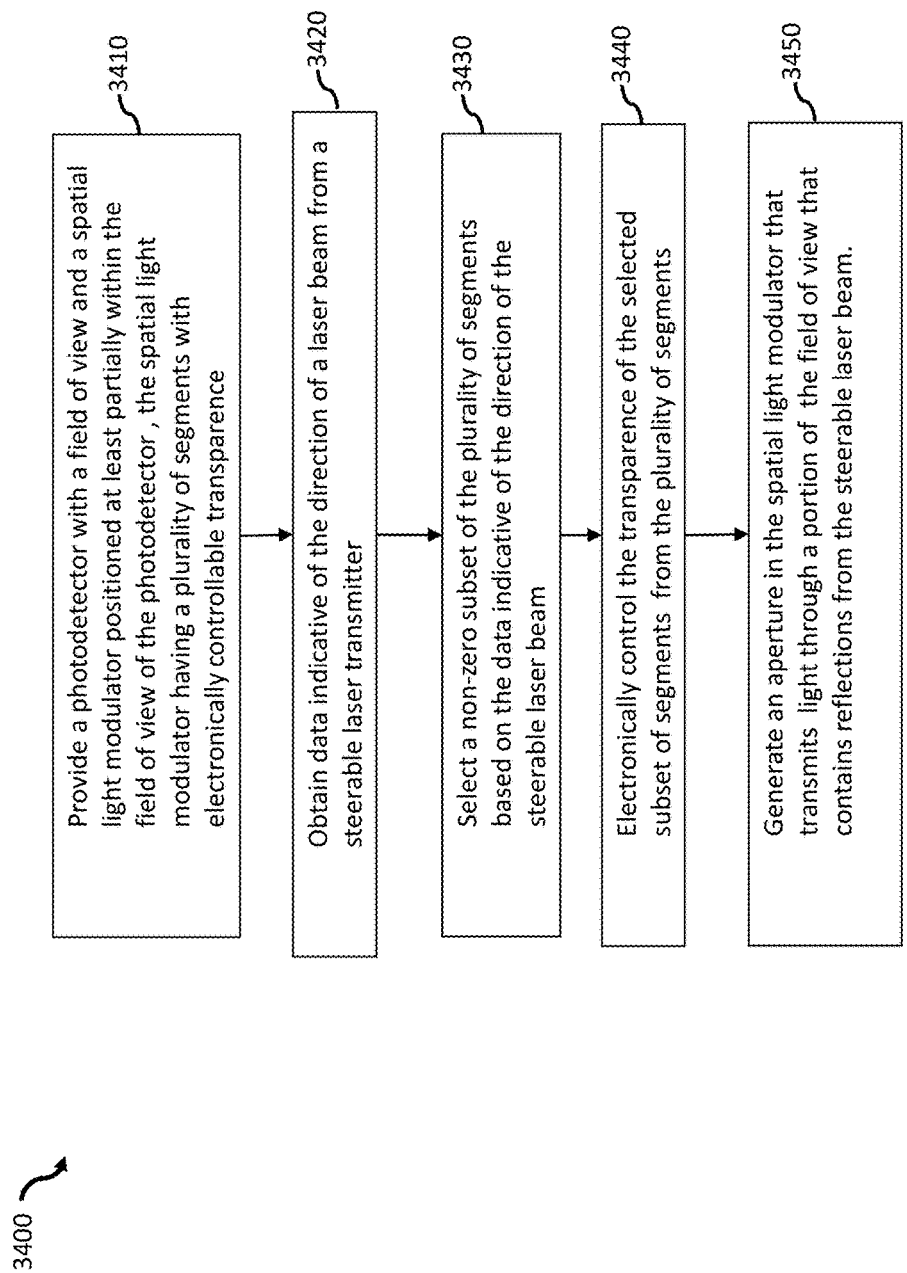
FIG. 34 illustrates a method for generating an aperture in a spatial light modulator based on data indicating the location of a laser beam in a field of view.

FIG. 34 illustrates a process 3400 for operating a spatial light modulator 3030 to generate an aperture, based on data indicating the position of laser beam reflections in the FOV of a laser range finder 3010 and specifically the FOV of a photodetector 3020. At block 3410 a photodetector 3020 is provided with a field of view (e.g. a set of directions in which the photodetector can receive light). A spatial light modulator is provided at a location at least partially within the field of view. The spatial light modulator comprises a plurality of segments (e.g. LCD sections) with electronically controllable transparency.

At block 3420 data is obtained indicating the direction of a laser beam. The laser beam can be generated by an electronically steerable laser transmitter such as an optical phased array (OPA). At block 3430 a non-zero subset of the plurality of segments is selected, based on the data indicative of the direction of the laser beam. At block 3440 the transparency of the selected subset of segments is electronically controlled. At block 3450 an aperture in the spatial light modulator is generated that transmits light through a portion of the field of view that contains reflections from the laser beam. The aperture can be a transparent section in the spatial light modulator surrounded at least in part by one or more non-light transmitting segments from the plurality of segments.

Keepout Mask Area

Figure 35:
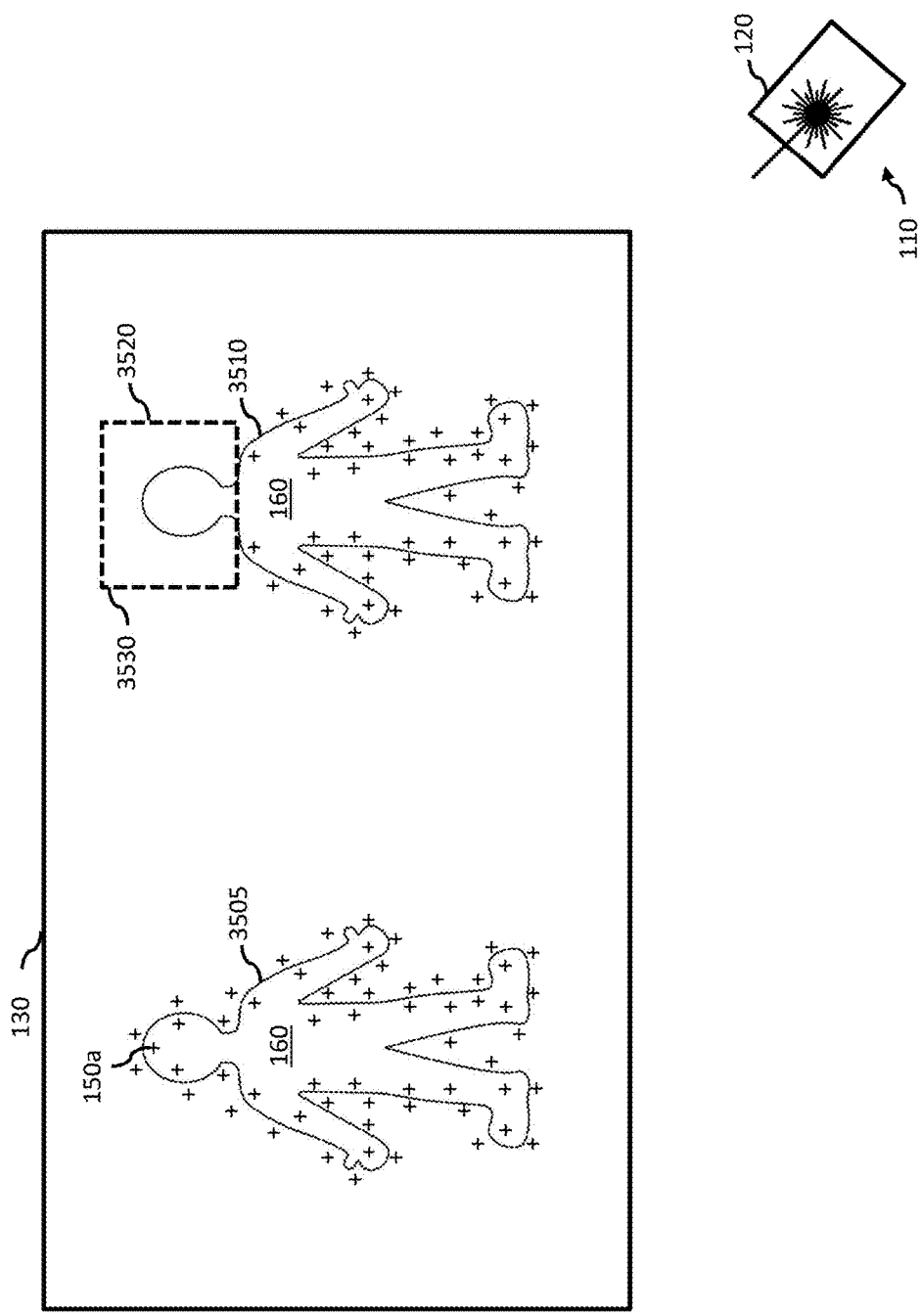
FIG. 35 is an exemplary diagram of a laser range finder and a plurality of laser pulse locations in a field of view, according to an embodiment of the present disclosure.

In a related technology FIG. 35 illustrate a laser range finder 110 that can be dynamically steered to avoid transmitting the laser beam into a region of the field of view containing the, body, head or eyes of one or more people. Laser range finders (e.g. LIDAR and 3-D scanners are gaining popularity due in part to their ability to develop up-to-date depth maps for autonomous vehicles. LIDAR has also been proposed as a means to estimate occupancy and peoples locations in smart buildings. Correspondingly there is the potential for people to experience increased instances of sporadic transmission of lasers towards their eyes (e.g. a person sitting in a cubical during a workday with an indoor LIDAR system). In autonomous vehicle there is interest in increasing the laser intensity to improve LIDAR range (e.g. from 100 m to 200 m).

Recently, advancements in electronically-steerable lasers and phased array laser beam forming have made it possible to dynamically steer a laser within a FOV. A steerable laser can be mechanically-steerable (e.g. containing moving parts to redirect the laser) or electronically-steerable (e.g. containing an optical phased array to form a beam in one of many directions). For the purpose of this disclosure a steerable laser is a laser assembly (e.g. including positioning components) that can change the trajectory or power level of a laser beam. For the purpose of this disclosure a steerable laser is dynamically steerable if it can respond to inputs (e.g. user commands) and thereby dynamically change the power or trajectory of the laser beam during a scan of the FOV. For the purpose of this disclosure dynamically steering a laser is the process of providing input data to a steerable laser that causes the laser to dynamically modulate the power or trajectory of the laser beam during a scan of the FOV. For example, a laser assembly that is designed to raster scan a FOV with a constant scan rate and pulse rate is acting as a steerable laser but is not being dynamically steered. In another example the previous steerable laser can be dynamically steered by providing input signals that cause the steerable laser to generate a variable laser power at locations in the FOV, based on the input signals (e.g. thereby generating an image on a surface in the FOV). A trajectory change can be a direction change (i.e. a direction formed by a plurality of pulses) or a speed change (i.e. how fast the laser is progressing in a single direction across the FOV). For example, dynamically changing the angular speed across a FOV of a pulsed laser with a constant direction causes the inter-pulse spacing to increase or decrease thereby generating dynamically defined laser pulse density.

In the context of the present disclosure many rotating LIDAR do not comprise dynamically steerable lasers since neither the power nor the trajectory of the laser beam is dynamically controllable within a single scan. However a rotating or mechanical LIDAR can be dynamically steered, For example, by providing input data that causes the laser to dynamically vary the laser pulse rate within a scan of the FOV, since the net result is a system that can guide or steer the laser to produce a non-uniform density laser pulse pattern in particular parts of the FOV.

Recently, electronically scanned LIDAR such as the model S3 from Quanergy Inc. of Sunnyvale, Calif. have been developed. These solid-state electronically scanned LIDAR comprise no moving parts. The absence of angular momentum associated with moving parts enables dynamic steering of one or more lasers in electronically scanned solid-state LIDAR systems.

In many laser range-finding systems the laser is periodically pulsed and the exact pulse location in the FOV cannot be controlled. Nevertheless such a periodic pulse laser can be used with the present disclosure to produce a complex shaped region of higher pulse density than the area surrounding the region by increasing the laser dwell time within the region. In this way a periodically pulsed laser will produce a greater density of pulses in the complex shaped region. Other laser range finding systems transmit a continuous laser signal, and ranging is carried out by modulating and detecting changes in the intensity of the laser light. In continuous laser beam systems time of flight is directly proportional to the phase difference between the received and transmitted laser signals.

In one aspect of this technology a dynamically steerable laser range finder can begin a scan of a FOV at a low elevation angle (e.g. 20 degrees below the horizon) and below the eye-level of most people. The dynamically steered laser range finder can slowly increase the elevation angle while scanning the azimuthal range (e.g. sweeping side to side while slowly rising). At a point in the scan a sensor data processor can identify a region of the FOV estimated to contain a person based on the initial data form the scan (e.g. seeing a person's legs and torso based on process initial data). The sensor data processor can define a keepout region corresponding to an estimate location of the head of a person. Circuitry (e.g. the data processor or laser steering parameter generator or a laser detector operably coupled to a remote processor) can generate instructions, based at least in part on the keepout region location and thereby dynamically steer the steerable laser based on the instructions to avoid transmitting laser pulses at one or more identified people's heads. In one alternative embodiment one or more sensor technologies (e.g. a camera, ultrasound or radar) can be used to estimate the presence and location of a person in the FOV of the LIDAR and the estimated location can be used to generate the keepout region. Laser steering parameters (e.g. instructions) can be generated or modified based on the location of the keepout region. In another alternative embodiment the LIDAR can estimate the location of a person based on a previous scan. In another embodiment a location in the FOV can be identified that could contain a human head or eyes (e.g. behind a car windshield or at eye-level). In one embodiment one or more processors can calculate one or more keepout regions based on indications of regions likely to contain peoples head and eyes.

This technique can be implemented to achieve the following exemplary advantages: Laser exposure to the head and eye region can be reduced. Laser intensity can be increased in regions determined to be free of people or animals. The laser can be dynamically steered to provide a safer environment.

FIG. 35 illustrates two different non-uniform density laser pulse patterns 3505 and 3510. Non-uniform density pulse pattern 3505 contains several laser pulses (e.g. 150*a*) that are aimed at the head of person 160. Non-uniform density pulse pattern 3510 is based in part on keepout region 3520. Laser pulses in non-uniform pulse density pattern 3510 are generated to avoid directed pulses into keepout region 3520. For the purpose of this disclosure a keepout region is a portion of the FOV of a laser. The keepout region can be used to generate instructions to the steerable laser to avoid generating pulses within a region of the FOV based on the keepout region. The keepout region can be defined in terms of boundary coordinates (e.g. a point in the FOV defining corner 3530, such as X=10, Y=20). The keepout region can be expressed as a set of angular ranges in the FOV (e.g. +15 degree to +10 degrees in the azimuthal plane and +0 to +5 degrees in the elevation plane, thereby defining a square shape region). The keepout region can be a shape from a predefined at of shapes (e.g. a head shaped keepout region). These predefined shapes can be scales (e.g. made bigger), and positioned in the FOV based on sensor data indicating the presence of people or animals in the FOV.

Keepout region 3520 can be sized and positioned based on the current estimate location of a person's head or an expected future location of their head. For example, Sensor data processor 3375 in FIG. 33 can receive data from several camera images and identify a person moving in the foreground of the image. Sensor data processor 3375 in FIG. 33 can estimate the trajectory (e.g. walking speed) of the person and generate a keepout region designed to encompass the region of the FOV likely to contain the persons head at some future time. Sensor data processor 3375 in FIG. 33 can transmit the keepout region to a laser steering parameter generator/modifier 3110 that can convert the keepout region into a set of instructions operable to dynamically steer steerable laser 3015. The instructions can cause the steerable laser to avoid the keepout region or a similar shaped region based on the keepout region and thereby avoid transmitting the laser at the persons head. In one embodiment sensor data processor 3375 in FIG. 33 can process sensor data and access a list of laser instructions and directly modify the laser instructions, based on a computed set of criteria. In this way the keepout region need not be explicitly defined during instruction generation but can be implicitly defined by the set of criteria used to generate instructions that in turn generate a laser scan patterns with a keepout region. For example, data processor 3375 in FIG. 33 can process sensor data from a camera and thereby instruct a laser steering parameter generator to remove a list of points from the non-uniform density laser pulse pattern 3510 to generate pattern 3520 (e.g. define zero laser energy or instruct the laser to not power, or mask a laser amplifier at particular locations in the FOV). The resulting laser steering parameters (e.g. instructions) can generate a non-uniform density laser pulse pattern (e.g. 3510) that avoids a particular region (i.e. an implicitly defined keepout region), even though the bounds of the keepout region are not explicitly identified by sensor data processor 3375 in FIG. 33. In another alternative embodiment the proposed method for controlling a steerable laser can be used to define keepout regions based on a wide variety of identified objects (e.g. people, animals, vehicle windshields, the windows of houses).

Figure 36A:
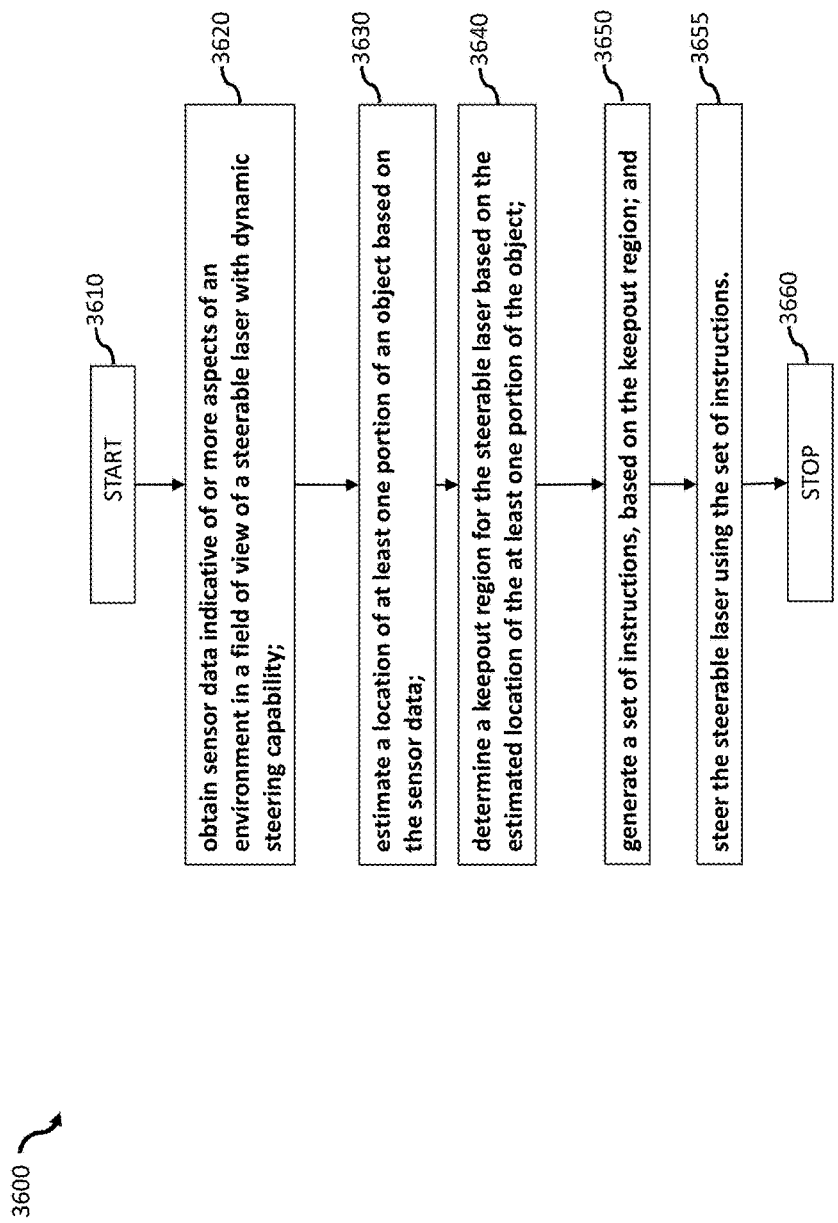
FIG. 36A-36C illustrate methods for steering a laser based on a keepout region, according to an embodiment of the present disclosure.

FIG. 36A illustrates a method 3600 operable to steer a laser based on an object to be avoided with laser pulses. At block 3610 method 3600 begins. At block 3620 sensor data indicative of or more aspects of an environment in a field of view of a steerable laser with dynamic steering capability is obtained. At block 3630 a location of at least one portion of an object is estimated based on the sensor data. At block 3640 a keepout region for the steerable laser is determined based on the estimated location of the at least one portion of the object. At block 3650 a set of instructions is generated, based on the keepout region. At block 3655 the steerable laser is steered using the set of instructions. At block 3660 method 3600 ends.

Figure 36B:
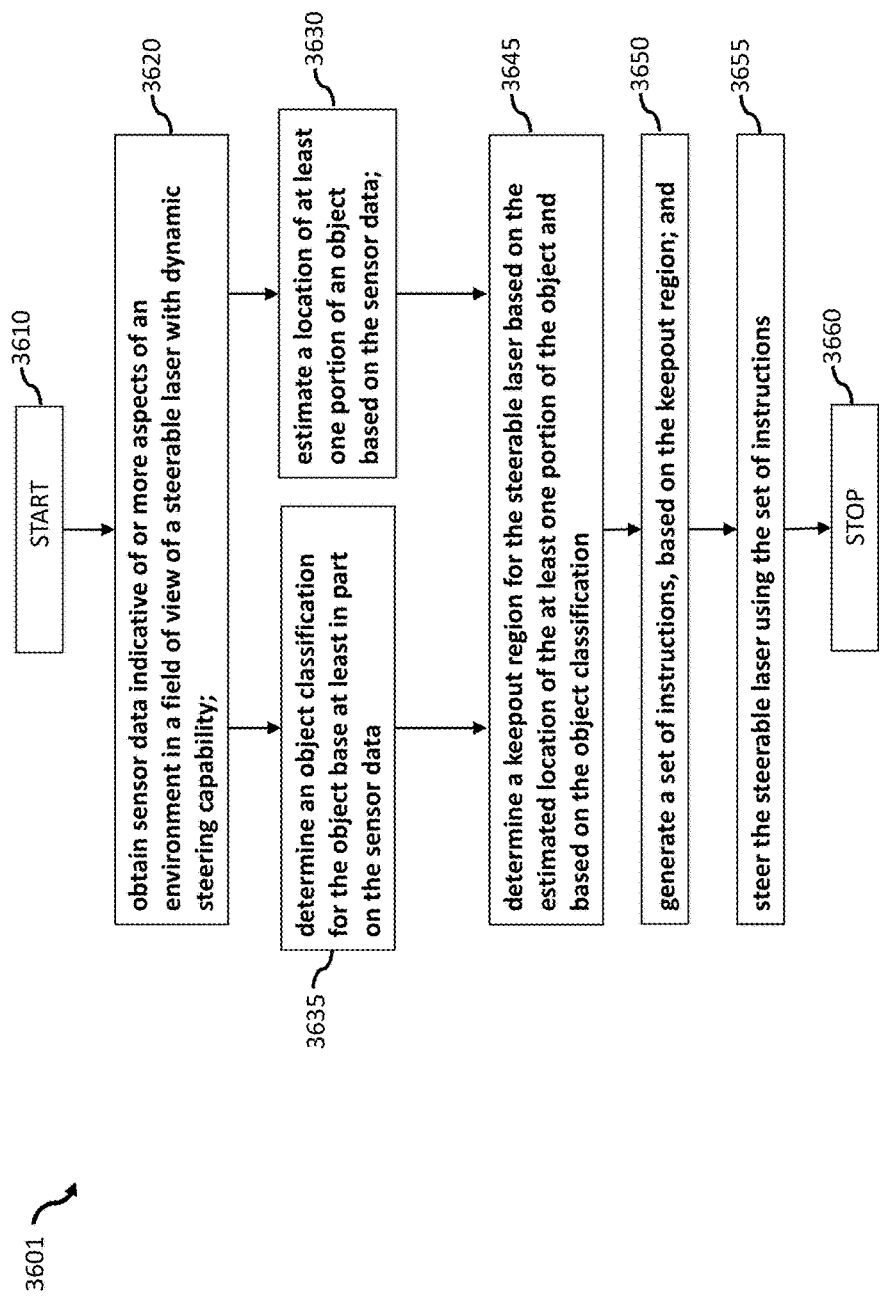

FIG. 36B illustrates a method 3601 operable to steer a laser based on an object to be avoided. At block 3610 method 3600 begins. At block 3620 sensor data indicative of or more aspects of an environment in a field of view of a steerable laser with dynamic steering capability is obtained. At block 3630 a location of at least one portion of an object is estimated based on the sensor data. At block 3635 an object classification for the object is determined based on the sensor data. Exemplary classifications can include a person, an animal, a vehicle, or a building. At block 3645 a keepout region for the steerable laser is determined based on the estimated location of the at least one portion of the object and based on the object classification. For example, a keepout region can be tailored to an expected shape for a person or a vehicle. In a related embodiment classification can be an environment classification such as an urban environment or a rural environment. For example, an environmental classification can be urban setting and the sensor data can indicate a heading or direction of travel for a vehicle. The combination of the urban classification and the heading of travel can be used to generate a keepout region in a portion of the FOV expected to contain pedestrians on footpaths. At block 3650 a set of instructions is generated, based on the keepout region. At block 3655 the steerable laser is steered using the set of instructions. At block 3660 method 3601 ends. In one example the keepout region is based on a trajectory of a moving object to incorporate a future or anticipated location of an object. In another example a keepout region is calculated based on the speed of a detected object.

Figure 36C:
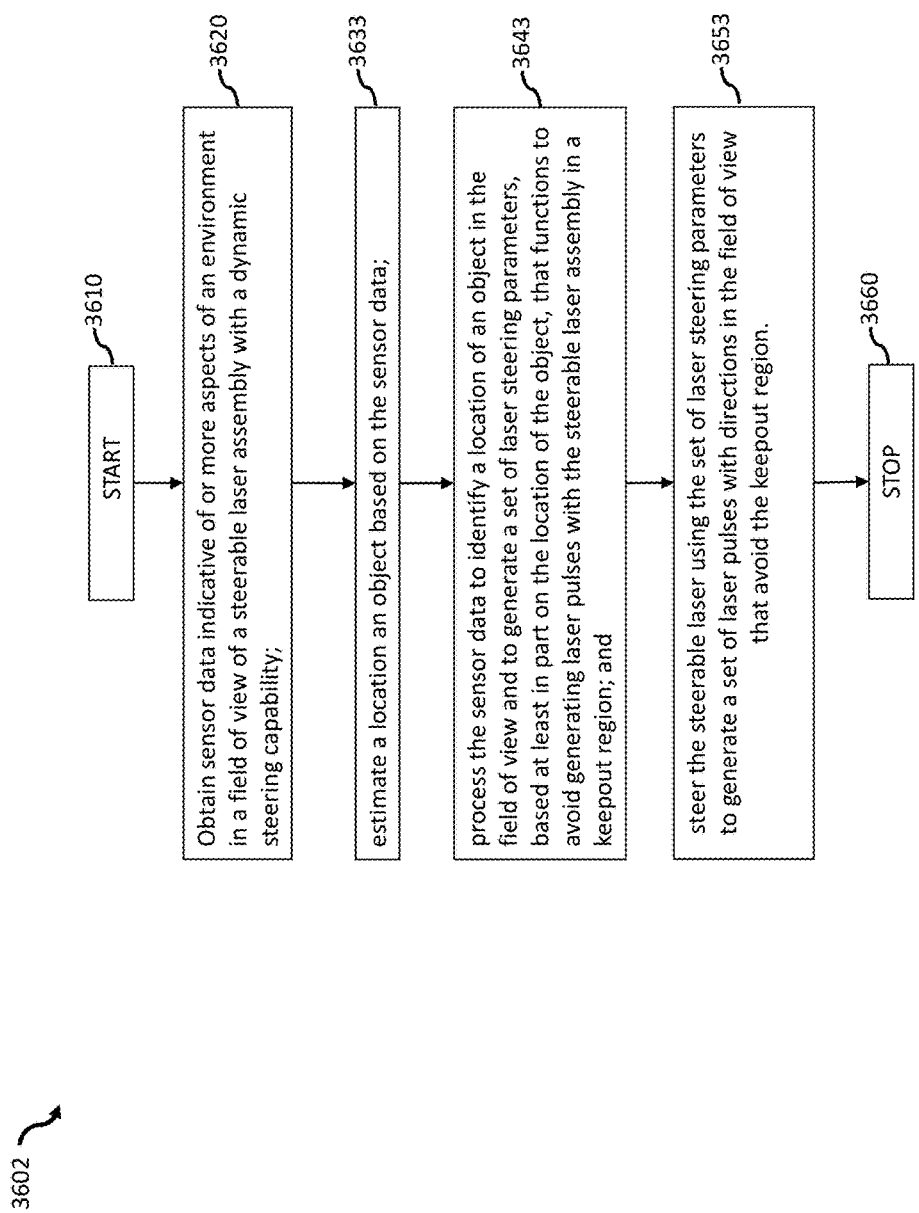

FIG. 36C illustrates a method 3602 operable to steer a laser based on an object to be avoided. At block 3610 method 3600 begins. At block 3620 sensor data indicative of one or more aspects of an environment in a field of view of a steerable laser with dynamic steering capability is obtained. At block 3633 a location of an object is estimated based on the sensor data. At block 3643 the sensor data is processed to identify a location of an object in the field of view and to generate a set of laser steering parameters based at least in part on the identified location of the object. At block 3653 the steerable laser is steered using the set of laser steering parameters to generate a set of laser pulses with directions in the field of view that avoid the keepout region. At block 3660 method 3602 ends. In a related embodiment sensor data (e.g. laser range measurements) can indicate a distance to an object. Method 3600, 3601 or 3602 can further comprise the step of processing the sensor data to determine the distance to the object in the field of view; and generating the set of laser steering parameters, based at least in part on the distance to the object, such that the set of laser steering parameters function to define a size of the keepout region based at least in part on the distance to the object. For example, if the sensor data indicates a person at 20 m from the LIDAR the keepout region can be defined by an elevation and azimuthal angular range of 5 degrees and 10 degrees respectively, centered at the location of the person in the FOV. If the person later moves to a distance of 10 m from the LIDAR the keepout region can be increased to 10 degrees and 25 degrees in the elevation and azimuthal directions respectively.

Figure 37:
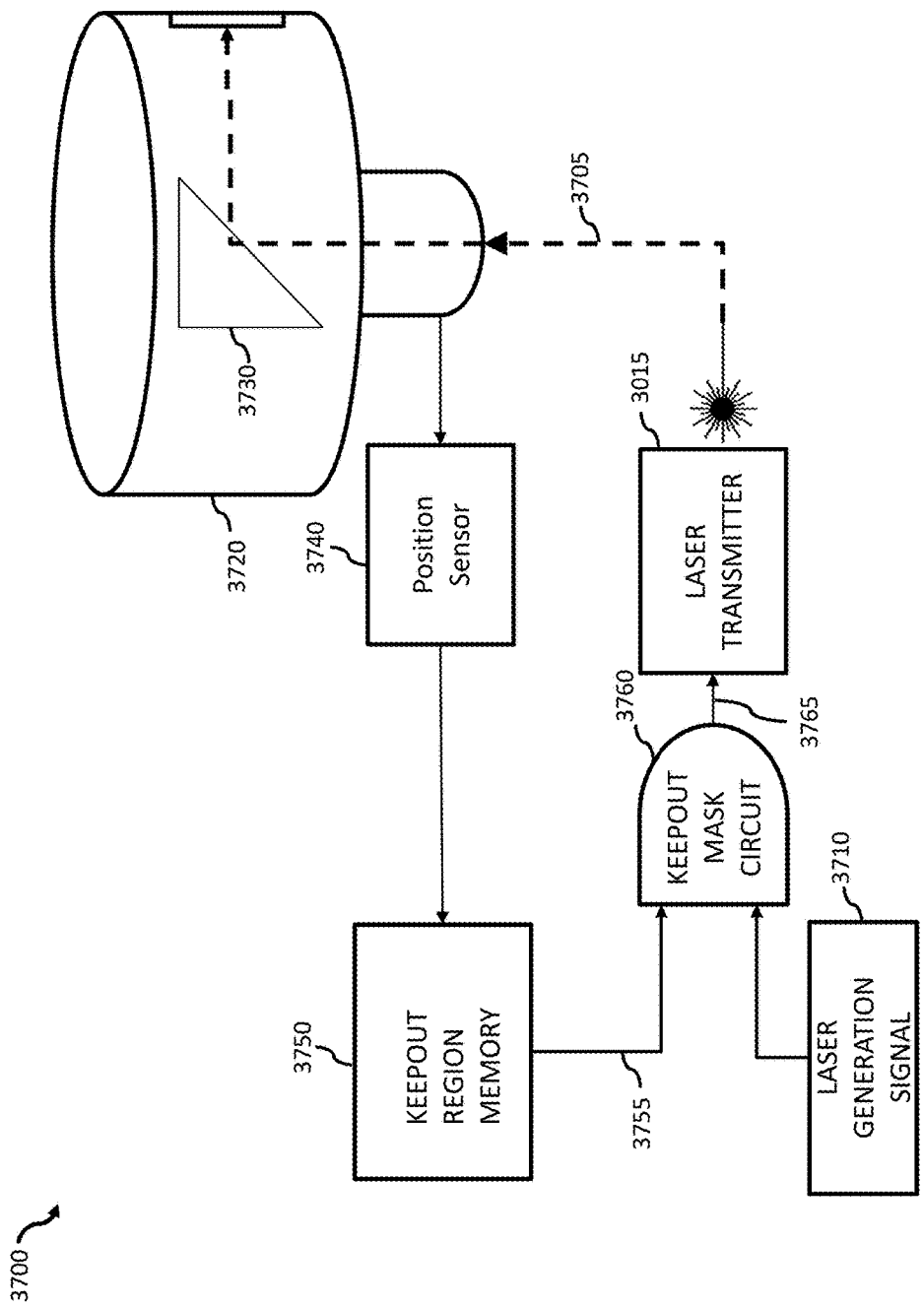
FIG. 37 illustrates a keepout mask circuit operable to receive signals based on one or more keepout areas and to provide a masked input signal to a laser transmitter.

FIG. 37 illustrates a keepout mask circuit operable to receive signals based on one or more keepout areas and to provide a masked input signal to a laser transmitter. In a typical rotating LIDAR a laser generation signal 3710 is supplied to a laser transmitter/generator 3015. Laser generation signal 3710 can function to cause laser transmitter 3015 to generate one or more laser pulses 3705. Laser generation signal 3710 can be a low power signal (e.g. 5V) generated by closing a switch used to turn the laser transmitter ON/OFF. A low power laser generation signal can be used to as an input to an amplifier at the laser transmitter 3015, thereby generating a more powerful electrical signal operable to generate laser pulses. Laser pulses 3705 can travel into a rotating LIDAR head 3720, including optics 3730 (e.g. a mirror, reflector or prism). The angular position of the rotating LIDAR head 3720 can be measured by position sensor 3740. In the embodiment of FIG. 37 a keepout mask circuit 3760 can function to dynamically mask the laser generation signal based on a mask signal and thereby generate keepout regions in the transmitted FOV of the LIDAR. Position sensor 3740 can supply an indication of the LIDAR head position to a keepout region memory. The keepout region memory can be part of a processor that can use the LIDAR head position to generate a mask signal 3755. In one embodiment each position sensor value can have a corresponding mask signal value (e.g. "0" for masked and "1" for unmasked).

The keepout region memory can store the mask signal values corresponding to some or all possible position sensor values. Keepout region memory 3750 can be updated by laser steering parameter generator/modifier 3110 or sensor data processor 3375 in FIG. 33. Keepout mask circuit 3760 can receive keepout mask signals 3755 and laser generation signals 3710 and can generate masked laser generation signals 3765. Masked laser generation signals 3765 can cause laser transmitter 3015 to transmit laser pulses when the position sensor indicates that LIDAR head 3720 is pointed outside certain keepout regions and conversely can stop laser pulses when the LIDAR head is pointing into keepout regions. System 3700 is particularly useful in situations where the distribution of laser pulses into the FOV is not dynamically controllable, such as the case with a rotating LIDAR head. Instead the LIDAR head position is sensed and the laser transmitter is dynamically gated by keepout mask circuit 3760. In a related embodiment a solid state LIDAR can analyze a scene, identify a person in the scene and generate a complex shaped 2-D keepout region. For example, in complex 2-D shaped region in a FOV designed to provide a safety margin around a person walking in front of a vehicle, a solid state LIDAR can provide keepout mask signals to a laser generator during corresponding times in a scan of the FOV.

LIDAR with Direction Feedback

Figure 40:
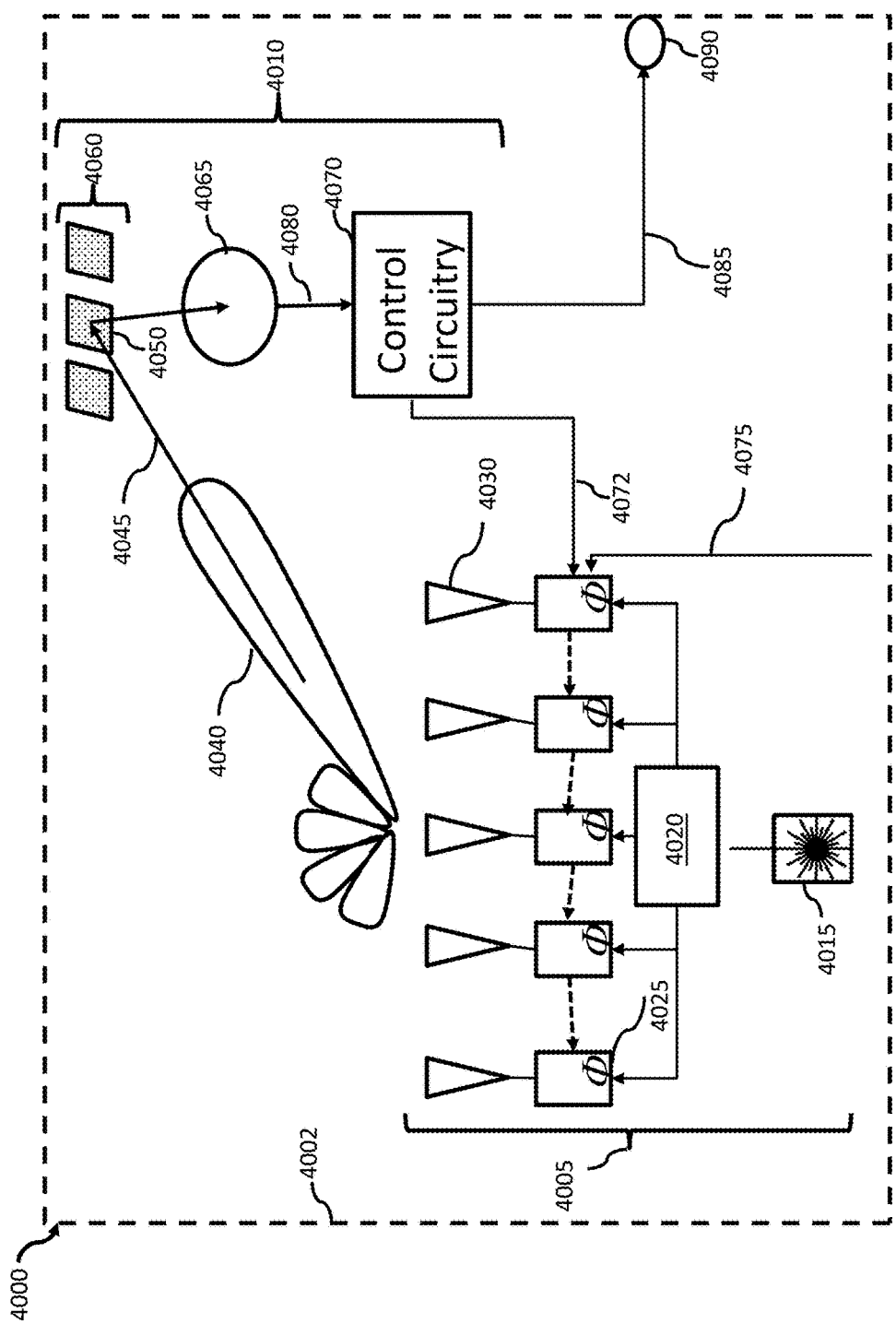
FIG. 40 illustrates several components to provide direction feedback control of an electronically steered LIDAR, in accordance with an embodiment of the present disclosure.

Turning to FIG. 40 a direction-detecting solid-state LIDAR 4000 can comprise an optical phased array (OPA) 4005, and direction feedback subassembly 4010 in a common LIDAR enclosure 4002. In most situations a laser detector in a LIDAR receives laser reflections from objects outside the LIDAR enclosure 4002. The direction feedback subassembly 4010 can function to directly detect the outgoing laser beam in one or more calibration directions. In several embodiments the direction feedback subassembly 4010 can include control circuitry to adjust the OPA and thereby provide a self-calibrating feedback-based solid-state LIDAR. The direction feedback subassembly circuitry can directly detect laser intensity in the one or more calibration directions and adjust the OPA to change the output laser direction. In one aspect the feedback circuitry can adjust the electrical signals to the phase shifters in the OPA to compensate for environmental factors such as temperature or humidity as well as manufacturing variations. In another aspect the electronic circuitry can function to confirm that the OPA and the laser detector in the circuitry are capable of both transmitting a laser beam in the one or more calibration directions and receiving the laser beam.

Turning in detail to FIG. 40, OPA 4005 can comprise a laser generator 4015 such as a laser diode and a laser splitter 4020 operable to divide a laser beam into a plurality of sub-beams. A plurality of phase shifters 4025 (e.g. a liquid crystal, thermal or phase shifter or Indium phosphide phase shifter) can delay each of the sub-beams by varying amounts. The resultant phase shifted sub-beams can be combined through a series of waveguides or antennas 4030 to produce a directed laser beam with a primary far field lobe 4040. In one aspect a direction feedback subassembly 4010 can comprise a reflector 4050 to reflect a laser beam transmitted by the OPA 4005 in a particular calibration direction 4045. Alternatively, a plurality of reflectors 4060 can reflect a laser beam in a plurality of calibration directions. Recent advancements in reflective liquid crystal materials have made electronically switchable mirrors possible (e.g. the e-Transflector product line available from Kent Optoelectronics of Hopewell Junction, N.Y.). In one aspect one reflector 4050 or reflector array 4060 can be electronically switchable mirrors. These electronically switchable mirrors can function to reflect the laser beam towards reflector 4065 when switches ON and function to be transparent to a laser beam (e.g. in direction 4045), when turned OFF, thereby passing a laser beam beyond the enclosure 4002. In this way, an embodiment of direction feedback subassembly 4010 with electronically switchable mirrors can function to measure the directional accuracy of OPA in the reflective state (i.e. the ON state) of the switchable mirrors 4050 or 4060. Laser detector 4065 can be a dedicated photodiode or can be at least a part of the laser detector for the LIDAR 4000. Laser detector 4065 can receive a reflected laser beam and generate a reflection signal 4080 indicating the intensity of the laser reflection. The intensity of the laser reflection and the reflection signals can be compared with an expected value by control circuitry 4070. Alternative control circuitry 4070 can generate a perturbation signal 4085 to the phase shifters 4025 that cause the phase shifters to vary the main lobe direction 4040 and thereby identify an offset adjustment signal 4072 that causes the maximum intensity in the calibration direction 4045, thereby indicating that the main lobe 4040 is pointed in the calibration direction 4045. In a related embodiment laser detector 4065 can detect the laser intensity in the calibration direction and similar directions directly. The offset adjustment signal 4072 can function to adjust the OPA to account for variations due to temperature or aging of the LIDAR.

Similarly, control circuitry can function to adjust the OPA to provide maximal intensity in the calibration direction when a corresponding input calibration signal 4075 commands the OPA to point in the calibration direction 4045. In one embodiment control circuit 4070 can assert a malfunction indicator signal 4085 (e.g. a 0-12V value) if, in response to the input calibration signal 4075 the OPA does orient the laser beam in the calibration direction 4045. The malfunction indication signal 4085 can connect the control circuit or the laser detector 4065 to a malfunction indicator pin 4090 on the enclosure 4002 of LIDAR 4000. In one embodiment both the input calibration signals 4075 and the offset adjustment signal can be generated by the control circuitry 4070.

Figure 41:
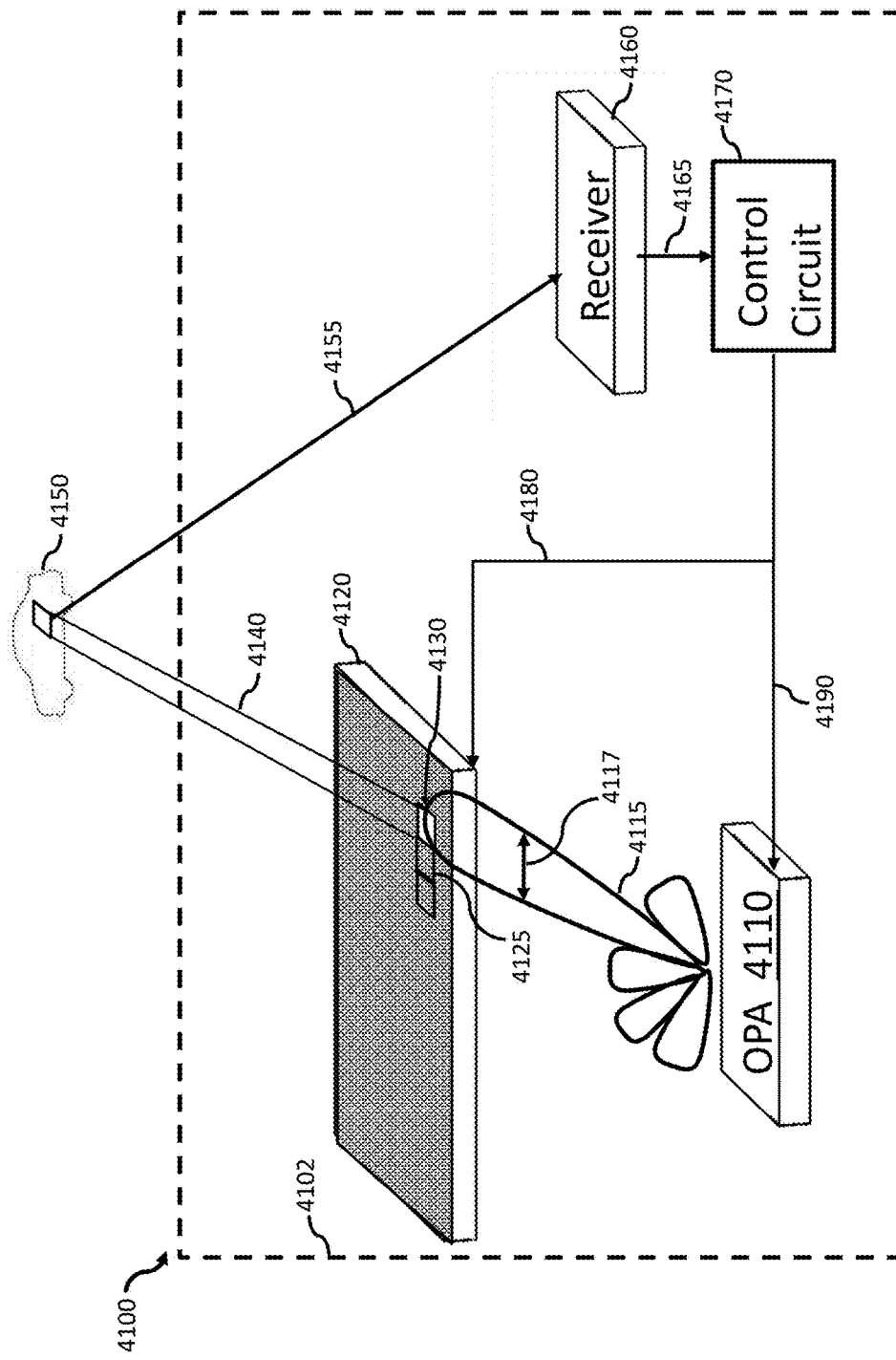
FIG. 41 illustrates several components of an electronically steed LIDAR with a selective light modulator, in accordance with an embodiment of the present disclosure.

FIG. 41 illustrates a solid state LIDAR 4100 inside an enclosure 4102. OPA 4110 can generate a near-field beam pattern and a primary far-field lobe 4115 with a beam-width 4117. LIDAR 4100 can further comprise a selective light modulator (SLM) 4120 such as an LCD array that can selectively make pixels such as 4130 and 4125 transparent and opaque. SLM 4120 can function to collimate or narrow the beam-width of far-field lobe 4115, thereby generating a collimated beam 4140. Collimated laser beam 4140 can have a smaller spot size than the uncollimated far-field lobe 4117 and can hence reflect from a distinct region of reflection target 4150. Laser detector 4160 can receive reflected laser pulse 4155 and generate reflected signal 4165. In one aspect control circuitry 4170 can control OPA 4110 to adjust the far-field lobe direction to generate the maximum laser intensity for a particular aperture (e.g. subset of transparent pixels such as 4130 in the SLM). In another aspect the aperture in the SLM can be varied for a given OPA setting to achieve enhanced laser resolution for selectively transmitting subsets of the full far-field beam-width. For example, an OPA may be capable of generating 10000 distinct laser beam directions. The SLM can comprise 400×600 LCD pixels and can thereby provide 240000 distinct collimated laser beams 4140. In one embodiment the OPA is adjusted to particular laser direction and a sequence of SLM aperture shapes transmit subsets of the far-field laser cross-section thereby enhancing the laser resolution.

Planning a Laser Ranging Scan with Smart Test Vectors

Laser ranging systems generate a limited number of laser pulses per second. Often many pulses are directed at mundane parts of the FOV (e.g. an empty section of roadway) while at the same time another portion of the FOV is undergoing an important change. The methodical scan pattern performed by many LIDAR is a disadvantage considering that interesting, important or highly indicative parts of the FOV are often non-uniformly distributed and can be well known. In other instances an interesting object in the FOV (e.g. a truck) can be acting in a mundane, predicted or unchanged manner (e.g. constant relative location). A dynamically steered laser ranging system (e.g. a solid state LIDAR) may identify the interesting object and repeatedly devote a disproportionate number of the laser scan locations to the interesting object (e.g. a higher density of laser ranging locations) despite the object behaving in a largely unchanged manner. For example, continually scanning ten vehicles in a FOV with a high density of measurement locations can consumer a large portion of the available scan time. In one aspect it is better to identify a few locations representative of the present locations of each the ten vehicles and apply simple test vectors or rules to identify if a dense scan of each vehicle is necessary. Several embodiment of the disclosed method provide for planning and executing a non-uniformly spaced set of laser ranging measurements (e.g. a main scan of the FOV) based on first testing a set of previously identified important locations. Properties of ranging data from a set of test locations can be assessed early and in some cases often during a scan of the field of view.

Several embodiments of the present disclosure can be used to characterize the objects in the FOV and thereby generate a set of rules (e.g. test vectors operable to indicate the presence of an object edge in a small test region), evaluate the rules at some later time and thereby plan a larger laser ranging scan based on the results. In several embodiments of the present technology laser reflections from a small set of important (i.e. highly indicative) test locations are gathered early in a scan of a FOV and evaluated to determine parameters (e.g. patterns and areas of high pulse density) for a larger scan of the FOV.

Four aspects of several embodiments are: Firstly to identify a small test subset of the FOV (e.g. a set of 100 test locations) wherein reflected laser pulses are highly indicative (i.e. representative) of the location of important objects, secondly to laser scan the small test subset of the FOV early in a scan. Thirdly a set of rules (e.g. test vectors or criteria) can be evaluated using the reflections from the set test locations and fourthly a larger main scan of a larger portion of the FOV can be planned based on the results of the set of rules.

A key beneficial aspect of several embodiments is to use a steerable laser assembly to dynamically scan the set of test locations in rapid succession, thereby gathering the test data early in a scan and planning the remainder of the scan accordingly. Similarly, a steerable laser assembly provides the capability to use learning from the test locations to generate complex shaped regions of variable laser pulse density based on the test data. In contrast a traditional non-dynamically steerable laser range finder (e.g. HDL-64E from Velodyne LIDARs of Morgan Hill, Calif.) performs a predetermined scan pattern. The non-dynamic scan pattern is not adjustable to favor important locations associated with test vectors (e.g. the edges of a car or the placement of a pedestrians arms and feet) over mundane laser scan locations (e.g. the ground or the side of buildings). However, a dynamically steered laser system can firstly scan at a set of test locations associated with test vectors and subsequently plan a scan of the field of view in a non-uniform manner based on the results.

In one embodiment a laser ranging system comprises a computer processor and a steerable laser assembly that can receive laser steering parameters from the computer processor and steer one or more laser beams accordingly. The laser ranging system generates a plurality of test vectors, based on a previous laser ranging scan. Each test vector is a criterion that can be satisfied by aspects of laser reflections (e.g. the time of flight) from one or more locations in a set of test locations. For example, a test vector may be a criterion that is satisfied if the edge of an object (e.g. a time of flight dislocation) is located between two locations in the set of test locations. In another example a test vector can be formulated for a small test region (e.g. 39-41 degrees azimuth and 9-11 degrees in elevation), based in part on the presence of the boundary of an object in the test region at some earlier time. The test vector can be a criterion that is satisfied if reflections from at least some of the test locations in the test region indicate reflection from the background (i.e. beyond an object) while at least one reflection from a test location in the test region indicates reflection from the object.

The laser ranging system first steers one or more lasers with the steerable laser assembly to generate laser pulses at the set of test locations and evaluates the test vectors based on aspects of the reflected laser pulses, thereby generate a set of results (e.g. TRUE or FALSE for each test vector). The laser ranging system then plans a larger scan of the FOV (e.g. a scan with 100,000 points) based on the set of results gathered by evaluating the set of test vectors. For example, the computer processor in the laser ranging system can identify a failed test vector from the set of results (e.g. a car tire that has changed position and no longer satisfies a test vector) and plan the larger scan to include a dense scan region operable to search for a feature (e.g. the new position of the car tire) in the FOV.

In several embodiments a set of test locations and an associated set of rules (e.g. test vectors) can be generated from laser ranging data provided by previous scans of the FOV. In other embodiments test locations can be selected based in part on other sensors such as cameras. A new laser scan of the FOV can be planned in advance, by first scanning the set of test locations and evaluating the set of rules (e.g. test vectors). In several embodiments, at the beginning of a scan a dynamically steerable laser assembly (e.g. based on an optical phased array or mechanical laser beam steering optics) can steer a laser beam according to a first set of laser steering parameters to generate test data at a set of test locations. A set of predetermined test vectors can be evaluated and thereby generate a set of test results indicating that each test vector is either TRUE (i.e. the test vector is satisfied) or FALSE (the test vector is unsatisfied).

The test vectors can identify aspects of a laser ranging point cloud indicative of position or orientation of various objects in the field of view at some previous time (e.g. during a previous laser scan). For example, a laser ranging system on an autonomous vehicle can identify a plurality of edges and vertices associated with a nearby car. Test vectors can be generated based on the location of edges and vertices on the nearby car. Similarly a test vector can be generated based on the placement of the edge of a tire on the nearby car relative to a lane marker (e.g. a lane divider stripe).

In one exemplary embodiment, upon identify that a test vector is failed (e.g. evaluates to FALSE) a set of laser steering parameters can be generated to perform a laser scan in a search region of the FOV and thereby generate a replacement or updated test vector based on the laser ranging scan. The laser scan of the search region can have non-uniform spacing (e.g. decreased angular separation in one or more directions in the FOV, thereby producing a higher density of measurement directions) relative to other areas of the FOV. For example, if a laser ranging system identifies that an edge associated with the side of a nearby car is no longer encompassed by one or more locations in the set of test locations, the system can identify a search region and perform a dense laser scan of the search region to reacquire the edge location and generate an updated test vector.

In another embodiment of a scan planning method, a scan of a FOV can begin with a first set of laser steering parameters that function to move a steerable laser assembly in the FOV and thereby generate a set of test data at a set of test locations. The set of test locations can be uniformly or non-uniformly spaced in the FOV. This set of test locations functions to seed a larger main scan of the FOV. A set of rules is selected and functions as a transfer function between the test data and a second set of laser steering parameters operable to dynamically steer a laser beam with the steerable laser assembly to perform the main scan. In one simple example the set of test locations can be 100 locations arranged in a 10×10 grid in the field of view. The main scan can be planned such that test locations that indicate a large change in range relative to some previous measurement, or relative to neighboring test locations cause a higher density of points in the corresponding location during the main scan.

In another example a computer implemented method can begin by obtaining a set of tests, each operable to be evaluated using at least some of a set of test data indicating one or more aspects of laser reflections from a set of test locations within a field of view. A laser range finder can then generate one or more test laser pulses and generate the set of test data by measuring the one or more aspect of laser reflections from the one or more laser pulses. The computer implemented method can then generate a scan set of laser steering parameters, based at least in part on evaluating each of the set of tests using at least some of the set of test data. The method can then steer at least one laser beam using a steerable laser assembly in the laser range finder, based on the scan set of laser steering parameters, and thereby generate a scan set of laser pulses at a set of scan locations in the field of view.

The techniques described in this specification can be implemented to achieve the following exemplary advantages: The performance of a laser ranging system can be improved by planning a non-uniformly distributed scan of a field of view based on a small set of up-to-date test locations. The non-uniform distribution of scan locations can be used to search for new objects, and increase resolution of objects exhibiting changes.

The performance of a laser ranging system can be improved by identifying and maintaining an up-to-date list of important test locations. A corresponding set of rules can be maintained, thereby providing a rapid basis for comparison of new test data with previous ranging measurements. The disclosed scan planning method also provides for using other sensing technologies (e.g. cameras and ultrasound) to identify important locations in the FOV that warrant characterization. Hence the proposed scan planning method provides for distilling the complex behaviors of objects in the FOV into a small set of test locations and rules that provide a rapid basis for planning a non-uniform laser ranging scan.

Embodiments of the scan planning method can improved the efficiency of LIDAR systems. Current laser ranging systems spend considerable resources methodically scanning mundane locations (e.g. open road). Existing dynamically steered laser ranging systems can continuously identify an object and devote considerable time and laser resources to repeatedly scanning an unchanging object. Embodiments of the disclosed technology rapidly tests a small set of test locations to determine if the object or region of interest warrants a dense scan as part of planning a subsequent main scan.

Embodiments of the scan planning method enable faster planning of a laser ranging scan by generating the test vectors prior to gathering the test data from the set of test locations. For example, multiple test vectors can be established along a common edge of an object and thereby provide a basis for rapid determination of direction changes.

The disclosed techniques can improve the reaction time of system (e.g. braking or steering) that rely on the laser ranging system. Generating the set of test locations and set of rules before beginning a scan provides upfront knowledge of where the most important locations in the FOV should be. Several embodiments provide for scanning these test locations first. For example, a mechanically scanned LIDAR rotating at 10 Hz scans the FOV every 100 ms. Hence in a worst-case-scenario where the set of test locations for the test vectors occur at the end the mechanical LIDAR scan, the time required to evaluate the set of test vectors includes a 100 ms data acquisition portion. In contrast, the disclosed technology can provide for scanning the set of test locations first thereby reducing the time to evaluate the test vectors (e.g. react to a rapid change in direction by another car) by almost 100 ms. For comparison, the average visual reaction time for humans can be 250 ms.

The disclosed system can scan the points associated with the test vectors multiple times throughout a scan of the FOV and adjust the laser steering parameters according to the results. Unlike a system that identifies objects of interest and scans those objects at a higher frequency the disclosed technology provides for performing a more computationally efficient evaluation of a smaller set of test vectors multiple time throughout the course of a scan of the FOV. For example, an exemplary laser ranging system can scan 200,000 in the course of a 100 ms scan of the 360 degree FOV. If the laser ranging system identifies a fast moving vehicle and attempts to scan the vehicle every 10 ms with 10,000 points it must devote half of the total scan points to the task of scanning the vehicle. The disclosed system instead provides for scanning the set of test locations every 10 ms and only scanning the vehicle when test vectors indication deviation from a position or path.

In another advantage a plurality of test vectors can be associated with an object classification. For example, an autonomous vehicle can identify a specific type of nearby vehicle (e.g. a school-bus) and can provide a plurality of test vectors to an associated laser ranging system.

A considerable advantage of embodiments of the scan planning methods is to reduce the effect of motion artifacts for moving objects. One challenge with scanning a LIDAR in a uniform, or non-dynamic manner is that various parts of a moving object are scanned at various times throughout the scan. Consider that a left to right and top to bottom uniform scan of a FOV over 100 ms can scan the roof of a vehicle first and the tires of the vehicle last. The vehicle can have moved significantly in the course of the scan (e.g. at 30 mph the vehicle moves 1.3 m in the course of the scan). The disclosed technology provides for using a set of test vectors to identify a moving object and thereby dynamically steer a laser to scan all points on the moving object in a short window of time (e.g. consecutively). This provides for reducing motion artifacts.

In another advantage the disclosed technology provides for prioritizing the order in which portions of the FOV are scan based on those areas demonstrating the most change. For example, a laser range finding system may have 100 test vectors, 10 of which are unsatisfied, with 9 unsatisfied test vectors being associated with a first portion of the FOV and 1 unsatisfied test vector being associated with a second portion of the FOV. The disclosed technology enables the generation of laser steering parameters that prioritize the first portion of the FOV (i.e. an area more in need of updating) operable to perform a non-uniform laser pulse density scan within the first portion followed by the second portion of the FOV.

The disclosed techniques can improve the cost effectiveness of a laser range finder. A lower price laser range finder may have fewer lasers or a slower laser pulse rate. The disclosed techniques enable a laser range finder with a smaller total number of laser pulses per second to distribute those laser pulses in a dynamic and intelligently selected manner.

Figure 42:
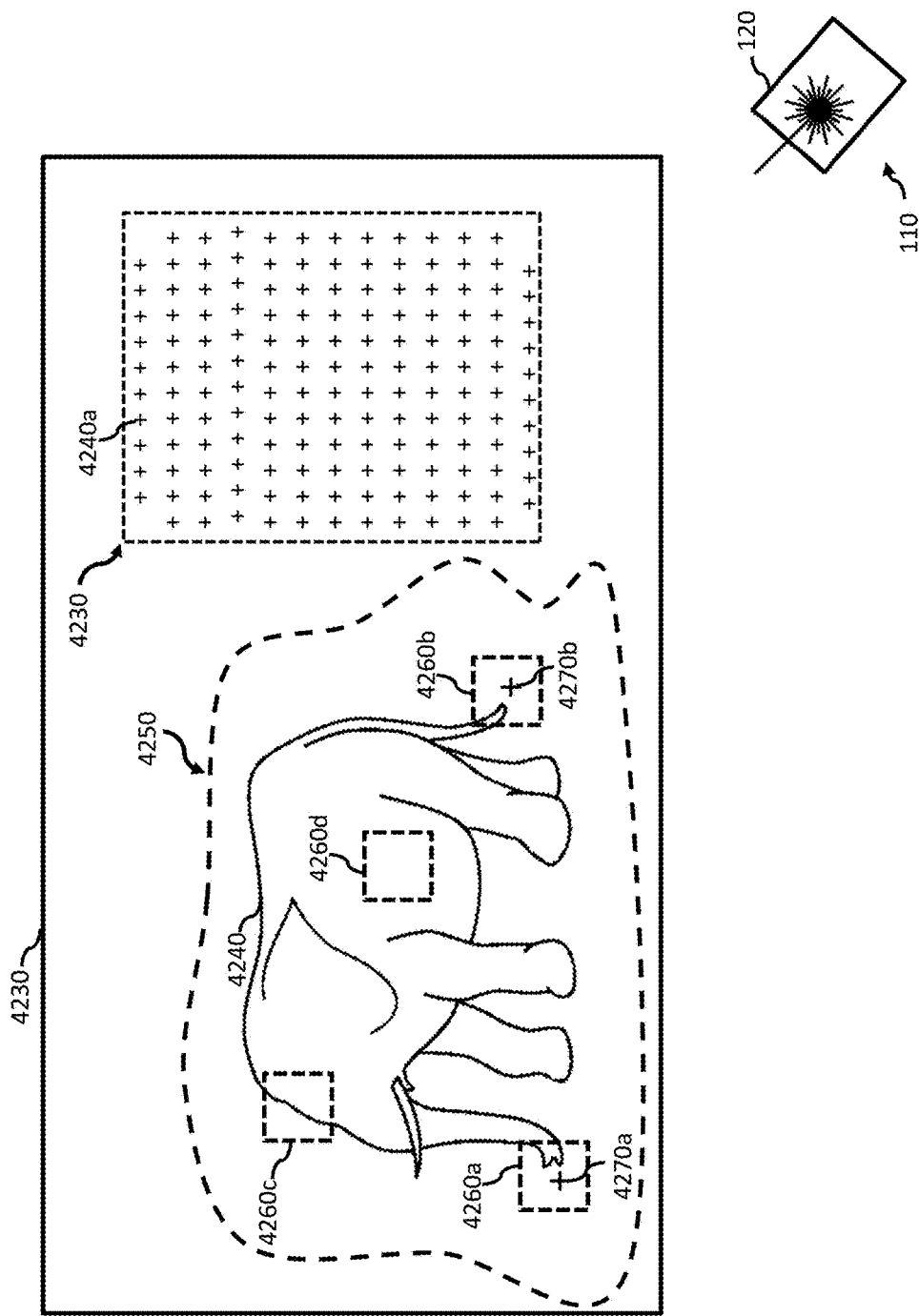
FIG. 42 illustrates a plurality of test regions associated with an elephant in the field of view of a laser range finding system in accordance with an embodiment of the present disclosure.

FIG. 42 illustrates a laser range finder 110 comprising a dynamically steerable laser assembly 120. Dynamically steerable laser assembly 120 is operable to receive instructions based on laser steering parameters and thereby move a laser beam in a complex non-linear pattern in a field of view FOV 4230. In several applications (e.g. autonomous vehicles) the objective of laser range finder 110 can be to track the location of interesting objects (e.g. elephant 4240). Laser range finder 110 can use dynamic laser steering to perform laser ranging in a complex-shaped scan region (e.g. 4250) associated with the elephant. In this way the density of laser scan locations (e.g. the number per unit angle of the field of view, such as 4 scan locations per radian) can be increased for objects of interest such as elephant 4240 and decreased for mundane regions such as the ground surrounding the elephant. One method of operating laser range finder 110 can be to increase the density of laser pulses based on regions of the FOV exhibiting distinct boundaries (e.g. elephant 4240) relative to the background. One disadvantage with this approach is that elephant 4240 can remain stationary in the FOV and a large number of laser ranging measurements can be consumed in the process of repeatedly scanning the region 4250 with an increased density of ranging measurements.

Test Locations

In several applications, the laser range finder 110 (e.g. guiding an robot) is more interested in when the elephant changes position, with the lowest possible latency, than confirming all points on the elephant in consecutive scans. This, "low-latency movement sensing" objective can be performed more efficiently by identifying a small set of test points with high predictive power regarding the location or direction of the elephant. A primary aspect of several embodiment of this disclosure is to identify an up-to-date set of highly predictive test locations. A set of test locations (e.g. 4270a close to the tip of the elephants trunk) can act like a fingerprint, thereby providing reflection data that is highly indicative (e.g. has a high correlation factor) of a much larger set of points (e.g. on the body of the elephant). Test locations in the FOV can be scanned and ranging data gathered before performing a main scan of the FOV. In a similar manner to how a fingerprint is identified by fulfilling a set of characteristic criteria, a set of rules corresponding to the set of test locations can be obtained. In some cases the set of rules can be obtained prior to gathering the set of test points. The set of rules can be evaluated based on test data from the set of test locations to generate a set of results. The set of results can be used to plan a larger scan (e.g. a scan of the remainder of the FOV or a portion of the FOV with a higher density of laser pulses).

In one example, steerable laser assembly 120 can first be steered according to a first set of laser steering parameters to generate a set of test laser pulses at a set of test locations (e.g. 4270a and 4270b) within a set of test regions 4260a and 4260b. Test data can be gathered from aspects of reflections at the set of test locations and a set of rules can be applied to the test data. The test results can indicate that elephant 4240 has not moved since a previous scan and therefore a main scan can be planned in a manner that does not generate a high density of measurements in a scan region associated with the elephant. At a later time, the set of test locations can be remeasured and updated test data from test locations 4270a and 4270b can indicate that the elephant has moved and a second set of laser steering parameters can be generated perform a search for the elephant (e.g. high density in region 4250).

Consider that exemplary LIDAR HD-64E from Velodyne LIDARs of Morgan Hill Calif. can generate 2.2 million laser pulses per second. A single scan (e.g. a main scan) of the FOV can take 100 milliseconds and includes 220,000 locations. While HDL-64E is not dynamically steerable, a similar LIDAR with a dynamic steering capability and utilizing an embodiment of the present scan planning method can: first scan a set of 1000 important test locations in less than 0.5 milliseconds and then plan and perform the remainder of the scan of the FOV in more intelligent, non-uniform manner.

In the related field of image process (e.g. facial recognition) features can be derived from an image in an intelligent manner such that they provide correlation or predictive power over larger portions of the data. Facial recognition often selects features to provide maximum relevance and lowest redundancy in the task of differentiating faces. In the case of the elephant it may not be important that a feature identifies the object as an elephant or even differentiates the elephant from other elephants. Instead for the task of range finding; an effective feature can have high correlation and specificity to changes in range for a larger, well-defined portion of the FOV. A feature can be a pattern of ranging data (e.g. the pattern of ranging data associated with the trunk of the elephant). One or more test vectors can be associated with the feature. Each test vector can function as a test of whether the feature is present within a test region. For example, after performing a dense scan of the elephant, laser range finder 110 can identify features (e.g. the tip of the trunk and tail). At the beginning of a subsequent scan system 110 can first scan within the identified small test regions 4260a and 4260b and verify the location of the elephant by processing the test data from the test regions.

For some time the elephant can satisfy the test vectors associated with the features and test regions. At a later time the features may move location in the FOV and fail to satisfy one or more test vectors. One or more test regions can be updated as the elephant moves. A feature can undergo changes (e.g. the perspective of the feature may change when the elephant turns towards the laser ranging system). In this case aspects of the feature and aspects of the associated test vectors can be updated.

Test Regions/Test Locations

Turning in-depth to FIG. 42 an intelligent choice of test regions (e.g. 4260a) or test locations (e.g. 4270a) can be a first step in planning a larger scan. In some embodiments test locations can be uniformly distributed throughout some or all of the FOV 4230. In other embodiments test regions or test locations can be non-uniformly distributed and can benefit from dynamic steering to reach the test locations without having to perform many intervening measurements outside the set of test locations. In some embodiments a set of test locations can be specified and provided to the steerable laser assembly. In other embodiments the steerable laser assembly sweeps a laser along a path and generates pulses continuously. Hence, with a continuously pulsing laser generator and a sweeping laser positioner it may be difficult or impractical to specify an exact location for the test pulses. For this reason it can be more convenient to specify test region in which the laser beam should be steered and thereby generate test laser pulses at a set of test locations (e.g. 4270*a* and 4270*b*). In this case the exact set of test locations can become known upon dynamically steering a laser beam in the set of test regions.

Effective test regions (e.g. 4260*a*) or test locations (e.g. 4270*a*) provide ranging data (e.g. distance and reflectivity) that is highly predictive of a larger portion of the FOV (e.g. an object). An objective of several embodiments is to find these locations with high correlation to objects in the FOV. Test regions and test locations can be selected using a variety of techniques, such as boundary detection, image processing or feature recognition. Boundary detection is one simple way to select test regions and test locations based on sensing object boundaries. The boundary of elephant 4240 can be recognized from camera imagery and test region 4260*c* can be placed on the boundary of the elephants head. Feature recognition is often used in machine learning to classify objects in images. In image processing and machine learning features are often predicted to provide the highest specificity (e.g. to differentiate the elephant form a horse). Test regions can be selected based on identified features (e.g. the elephant's trunk and tail). Test regions can be selected based on supervised machine learning, where for example, the laser range finder 110 is trained to recognize particular features (e.g. the corner of a car bumper or the trunk of the elephant) and place test regions accordingly. Interestingly, the laser range finder 110 can also use unsupervised learning to generate features and locate test regions. For example, a reward function can be established to identify a measure of how well a test region (or a set of test locations in a test region) predicts the location (i.e. range) and direction of an object (i.e. the direction can be estimated from a change in the object cross-section presented within the FOV). Over the course of several seconds the laser range finder 110 can identify test regions that maximize the reward function for a variety of objects undergoing changes. For example, test region 4260*d* in the center of the elephant may have high correlation with changes in the range of the elephant but low correlation to small movements of the elephant from left to right. Hence region 4260*d* may be a poor choice of test region. Test regions 4260*a* and 4260*b* may contain defining features (e.g. the trunk and tail) but movement of the trunk and tail may cause changes in range that do not correlate with changes in the overall position of the elephant. Test region 4260*c* may be a good choice of test region (e.g. have a high reward value) because it correlates with changes in range and lateral (left, right) motion. Test region 4260*c* is also places on the elephants head and can thereby provide early indication that the head has moved and a direction change may ensue. The best way to select test region 4260*c* may be through unsupervised machine learning of those points in the FOV that have the best correlation to changes in larger regions. In one example laser range finder 110 can identify a correlation between test location 4260*c* and scan region 4250 using unsupervised learning and can subsequently perform a scan of the FOV where the density in scan region 4250 is based at least in part on the result of a rule applied to test region 4260*c*.

Another approach to selecting test locations or test regions is to utilize historical learning. For example, laser range finder system 110 can use previous similar instances (e.g. when a computer vision system reported that an elephant was in the FOV) to select and position test locations. Yet another approach is to select test locations or test regions based on the geographic location of laser range finder system 110. For example, a GPS system can report to laser range finder 110 that it is located in the garage of an owner's home. This information can be used to select test regions corresponding to historical features (e.g. bicycles, workbenches, and the boundary of the garage door). In this way laser range finder 110 can develop a set of test locations and associated rules with common geographic locations (e.g. GPS locations or Wi-Fi signals indicating locations). In another example the geographic location can cause laser range finder 110 to select a classification for the location (e.g. urban) and thereby select a set of test regions (e.g. at a location typically associated with a pedestrian waiting to cross a crosswalk). The set of test regions (e.g. 4260*a* and 4260*b*) and test locations (e.g. 4270*a*) can be conveyed to the steerable laser assembly 120 using a first set of laser steering parameters. Other scenarios that can be used to generate test locations or test regions could include; an obstacle in a blindspot, a lane departure of another vehicle, a new vehicle in the FOV, sudden changes in traffic flow, approaching vehicles at an intersection, approaching obstacles when backing up, debris on the road, hazardous road conditions including potholes, cracks or bumps or hazardous weather conditions.

Figure 43:
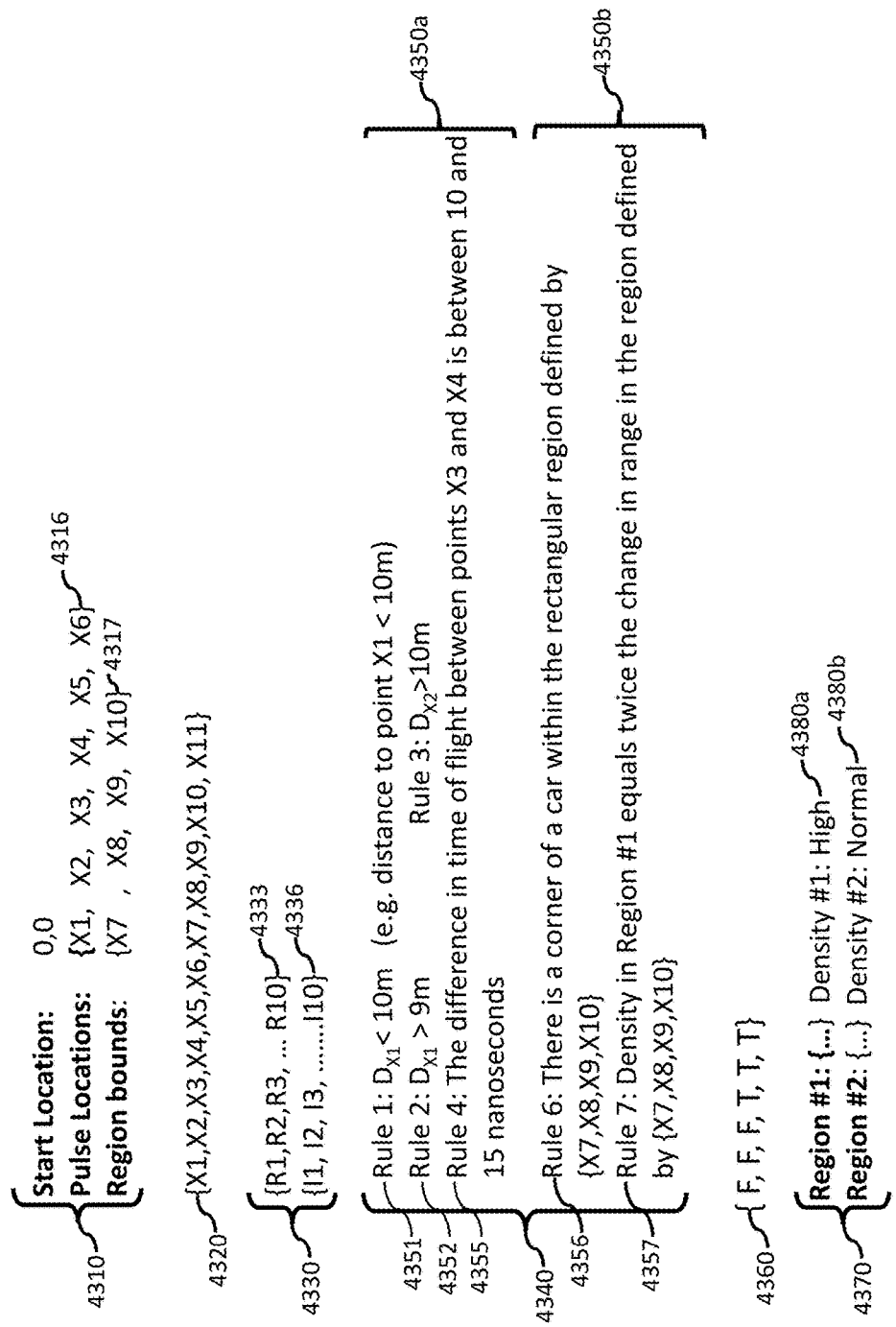
FIG. 43 illustrates a several exemplary sets of laser steering parameters, a set of test locations, a set of test data, a set of rules and a set of test results, according to an embodiment of the present disclosure.

FIG. 43 illustrates several exemplary sets of data generated or used by an exemplary embodiment of a scan planning method based on test vectors. FIG. 44 illustrates several vehicles in the FOV of a laser range finder 110 that is performing an exemplary embodiment of a scan planning method. FIG. 43 illustrates an exemplary first set of laser steering parameters 4310. The first set of laser steering parameters 4310 can function to instruct steerable laser assembly 120 to dynamically steer one or more laser beams and thereby perform ranging at a set of test locations 4320 or within a set of test regions. A laser steering parameter (e.g. 4316) in the first set of laser steering parameters 4310 can specify one or more test locations (e.g. X1, X2). Other laser steering parameters (e.g. 4317) can specify the bounds of a test region and thereby generate one or more points within the test region (e.g. location X11 within the set of test locations 4320). The first set of laser steering parameters 4310 can include a start location 602 in FIG. 6A, a region width 604, a region height 606, scan path waypoints e.g. 612, laser scan speed e.g. 614, laser pulse size e.g. 616, and a number of pulses 618 in FIG. 6A. The first set of laser steering parameters can be generated by a computer processor such as laser steering parameter generator 410 in FIG. 4A. Alternatively the first set of laser steering parameters (e.g. 4310) can be stored in a memory within the laser range finder (e.g. a non-volatile memory containing laser steering parameters operable to generate 100 test locations in uniform 10×10 grid). The overall function of the first set of laser steering parameters can be to generate ranging measurements (e.g. time of flight and intensity of reflected pulses) at a set of test locations 4320. In order to rapidly gather measurements from the set of test locations, the first set of laser steering parameters can steer steerable laser assembly 120 in FIG. 42 in a dynamic and non-uniform manner. Laser range finder system 110 in FIG. 42 can use a time of flight calculator 455 and an intensity calculator 460 in FIG. 4A to measure one or more aspects of reflected laser pulses from the set of test locations 4320, thereby generating a set of test data 4330, including a set of ranges 4333 and a set of reflection intensities 4336.

In several embodiment of the scan planning method a set of rules (e.g. 4340) are selected and evaluated based on a subset of the test data. The set of rules 4340 can function to convert the test data 4330 to a set of results 4360, such as a binary value (e.g. satisfied, unsatisfied, TRUE or FALSE) or analog values (e.g. a measure of the change at one or more test location relative to a previous time or a measure of the difference in range between neighboring test locations). Some rules (e.g. 4351, 4352, 4355) can be test vectors; a criterion operable to satisfied or unsatisfied (i.e. determined to be true or false) based on one or more aspects of reflections from laser pulses from a subset of the set of test locations. For example, rule 4351 is a test vector that is satisfied if the range at test location X1 is less than 10 meters. Similarly rule 4352 is a test vector that is satisfied if the test data set entry for the range at X1 is greater than 9 meters. Location X1 is on the rear bumper of vehicle 4420 in FIG. 44A and rules 4351 and 4352 can only be simultaneously satisfied if there is an object within a 9-10 meter range. Hence test vectors 4351 and 4352 can function as test that when satisfied indicate that vehicle 4420 is within 9-10 meters of system 110 in FIG. 42. For example, rule 4357 states that the density in a first region during a main scan should be equal to twice the change in measured range in a region defined by vertices X7, X8, X9 and X10. Hence if the change in range in the region bounded by the vertices X7-X10 is small then the density of ranging measurements selected during the subsequent main scan according to the set of laser steering parameters is also low.

Figure 44B:
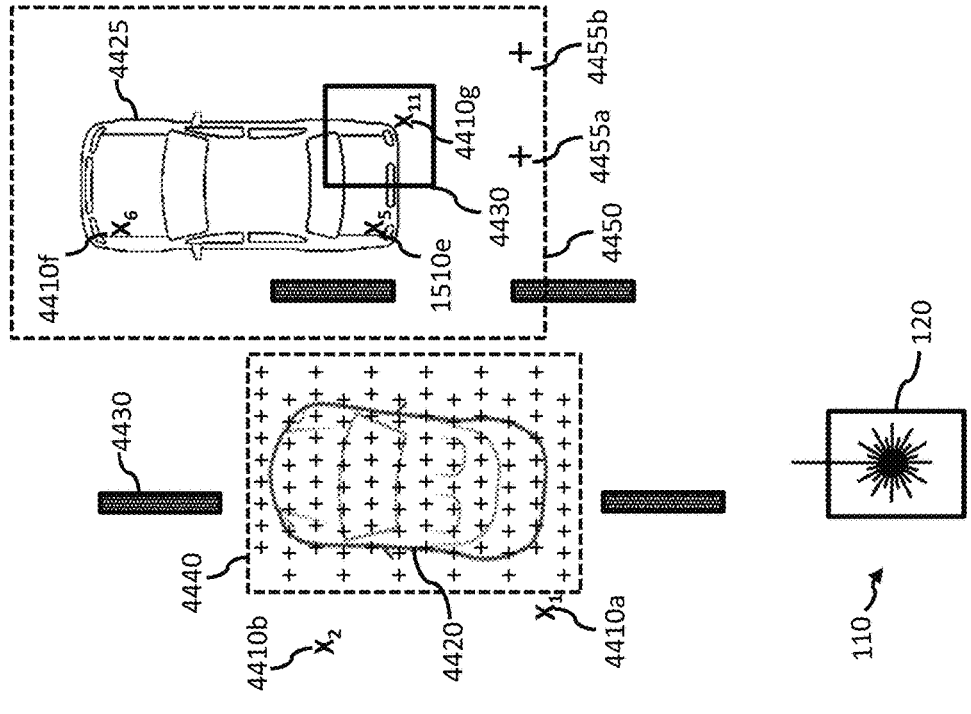
FIGS. 44A and 44B is an exemplary diagram illustrating the application of an exemplary scan planning method by a laser range finding system in accordance with an embodiment of the present disclosure.
Figure 44A:
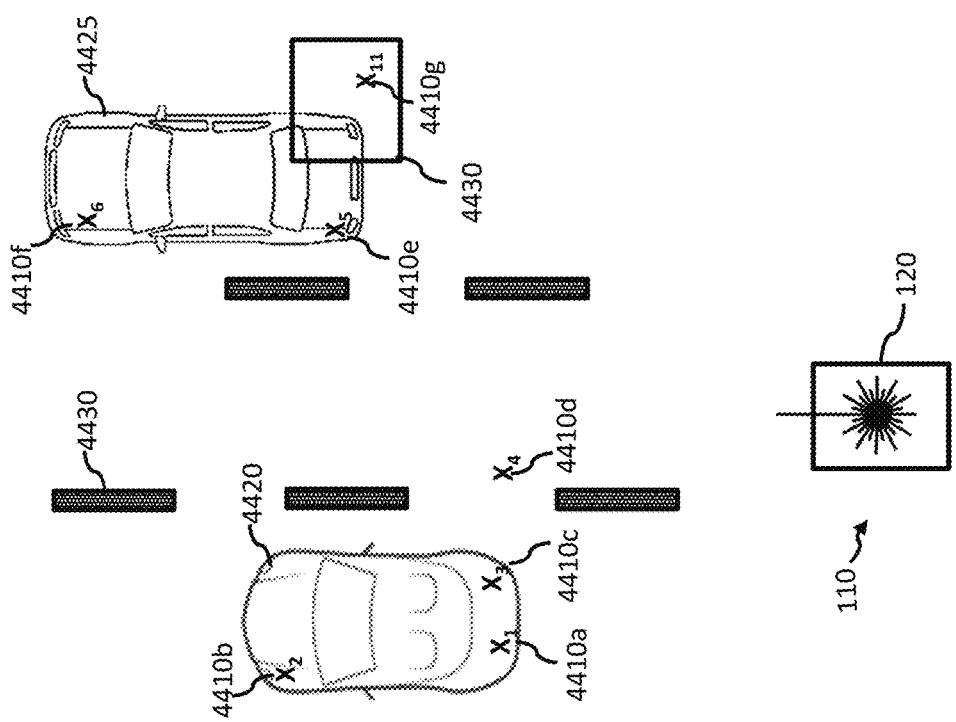

Several subsets of rules can test the location of a feature (e.g. feature 4350a localizing a boundary of a first car 4420 in FIG. 44A and feature 4350b localizing the boundary of a second car in FIG. 44A). Rules can be a transfer functions (e.g. 4357) that define a relationship between and input subset of the test data and a second set of laser steering parameters. An exemplary second set of laser steering parameters 4370, can include parameter 4380a to generate a region with a higher density of laser pulses than a second region (e.g. a normal density region generated by laser steering parameter 4380b).

FIG. 44A illustrates an exemplary embodiment wherein a steerable laser assembly 120 dynamically steer a laser beam according to a first set of laser steering parameters (e.g. 4310 in FIG. 43) to generate test data from a set of test locations including 4410a, 4410b, 4410c, 4410d, 4410e, 4410f, 4410g. The laser range finder 110 can be on a vehicle that is moving at a relatively constant speed relative to vehicle 4420 and 4425 in neighboring lanes. Several locations (e.g. 4410c and 4410d) can be used to test the location of vehicle 4420 relative to the side of a lane indicated by lane markers 4430. Hence a test vector (e.g. 4355 in FIG. 43) can be evaluated to determine if vehicle 4420 has moved significantly closer to the edge of the lane.

In FIG. 44B and with reference to FIG. 43 vehicle 4420 is in the process of changing lanes. An exemplary ranging scan planning method, based on test locations can firstly perform laser ranging at a set of test locations (e.g. 4320) early in a scan to generate test data (e.g. 4330) from the test locations. In the embodiment of FIG. 44B several test vectors (e.g. 4351 and 4352) associated with the boundary feature 4350a of vehicle 4420 are evaluated and are not satisfied, thereby providing a fast indication that vehicle 4420 has moved within the FOV. The exemplary scan planning method in FIG. 44B can generate a second set of laser steering parameters (e.g. 4370), based on the test data from the test locations. The second set of laser steering parameters can include a dense scan region (e.g. 4440) operable to locate the vehicle 4420, and provide the basis for an updated set of test regions, test locations, and set of rules (e.g. 4340). In the embodiment of FIG. 44B vehicle 4425 maintains a constant relative position to the laser range finder 110 and hence satisfies the associated rules (e.g. 4350b). The second set of laser steering parameters can generate a lower density of laser pulses (e.g. 4455a and 4455b) surround vehicle 4425, when the associated rules are satisfied. For example, scan region 4450 can be a portion of the FOV scanned according to the second set of laser steering parameters. Scan region 4450 can be associated with several features of vehicle 4425 and can be associated with a subset (e.g. 4350b) of the set of rules 4340 for evaluating the test data (e.g. 4330). Hence when the subset 4350b of the set of rules is satisfied the second set of laser steering parameters can produce a lower density of laser ranging locations (e.g. laser pulses) in the corresponding scan region 4450.

FIG. 45A-E illustrate various aspects of a laser scan planning method according to an exemplary embodiment. Turning to FIGS. 45A and 45B a steerable laser assembly can dynamically steer one or more laser beams along paths 4505 and 4510 inside the FOV 4520. The laser beam(s) can be steered according to a first set of laser steering parameters to travel along paths 4505 and 4510. Paths 4505 and 4510 can be selected to perform laser ranging (e.g. discrete laser pulses) in a test region (e.g. the region between inner perimeter 4530 and outer perimeter 4535 in FIG. 45B). Paths 4505 and 4510 can be selected to generate laser reflection data from a set of test locations. The set of test locations (e.g. including 4540a and 4540b in FIG. 45B) may not be precisely known before the steerable laser assembly scans. However paths 4505 and 4510 can be selected to generate a set of test points with a high probability of satisfying a set of rules at some initial time. In the example of FIG. 45A-E vehicle 4515 can be moving from left to right across the FOV 4520. The average or instantaneous speed of the vehicle can be estimated and paths 4505 and 4510 can be selected in order to generate a set of test data from a set of test locations in FIG. 45B operable to satisfy a set of rules based on the anticipated location of vehicle 4515 at some later time. For example, a test vector in the set of rules can state that test location 4540b should have a range consistent with the distance to the front bumper of vehicle 4515, while test location 4540a should have a longer range consistent with the background surrounding the vehicle. Hence a test vector can be satisfied when points 4540a and 4540b have a difference in range consistent with the boundary of vehicle 4515. In this way the first set of laser steering parameters can be modified based on the expected position of vehicle 4515 to generate a small set of up-to-date test locations (e.g. 1000 locations). A corresponding set of rules can then be evaluated to plan a larger scan using a second set of laser steering parameters.

In FIG. 45C vehicle 4515 has changed velocity. Therefore the test data corresponding to the set of test locations (i.e. based on the predicted speed of the vehicle) can fail to satisfy a number of the corresponding rules. For example, the previous test vector requiring a difference in range between points 4540a and 4540b may fail. It can be appreciated that the test vector can be obtained prior to generating the test data from the set of test locations and subsequently applied to several subsets of the test data to try to achieve satisfaction of the test vector. For example, one embodiment of the scan planning method could obtain a set of rules prior to gathering test data and later determine if any two laser ranging locations in a subset of the set of test locations can satisfy one or more of the test vectors. For example, a test vector stipulating a change in range at front bumper of vehicle 4515 could be evaluated several times with a first location from a test region expected to be within the vehicle boundary and a second location from a test region expected to be outside the vehicle boundary.

FIG. 45D illustrates a scan region 4550 that is scanned in a dense manner (e.g. drawing a laser beam through region 4550 at a slower speed or generating a higher laser pulse rate). Scan region 4550 can be generated according to a second set of laser steering parameters. Scan region 4550 can correspond to specific failing rules in a set of rules applied to the data from the set of test locations (e.g. 4540*a* and 4540*b*) in FIG. 45C. In this way the small set of test locations scanned in a dynamically steered manner can determine in part a subsequent dense scan of a region (e.g. region 4550).

In one aspect of several embodiments scan region 4550 can be correlated with the location of vehicle 4515 and thereby the locations (i.e. directions) in the field of view associated with the vehicle can be scanned in rapid succession. Scanning the points associated with vehicle 4515 in a concentrated manner instead of spreading these points over the course of uniform scan reduces the impact of the vehicles motion on scan data. These motion artifacts associated with scanning a moving object in a field of view are one of the largest sources of location error in a non-dynamically steered laser scan. For example, consider that vehicle 4515 is moving at 30 miles per hour from left to right across the field of view. During the course of a 10 Hz (i.e. 100 ms) uniform scan of the FOV, vehicle 4515 has moved 1.4 meters. This motion error makes it difficult to estimate the exact boundaries of vehicle 4515. An embodiment of the proposed scan planning method could identify a subset of locations associated with the vehicle, based in part on the test data and scan these in a sequential manner. In general therefore embodiments of the disclosed methods can identify moving objects based on evaluating test vectors and thereby generate a second set of laser steering parameters to perform ranging at a scan set of locations in a sequence that reduces motion artifacts (e.g. distortion due to motion of the scanned object). Locations outside of the scan region 4550 can be scanned with a lower density of laser ranging locations (e.g. 4540*c*). FIG. 45E illustrates that following a dense scan of scan region 4550 a new set of updated test locations 4550 can be generated. In some embodiments many of the same rules can be applied to test data form the updated set of test locations by updating the subset of test locations used to evaluate each rule in the set of rules.

Figure 46B:
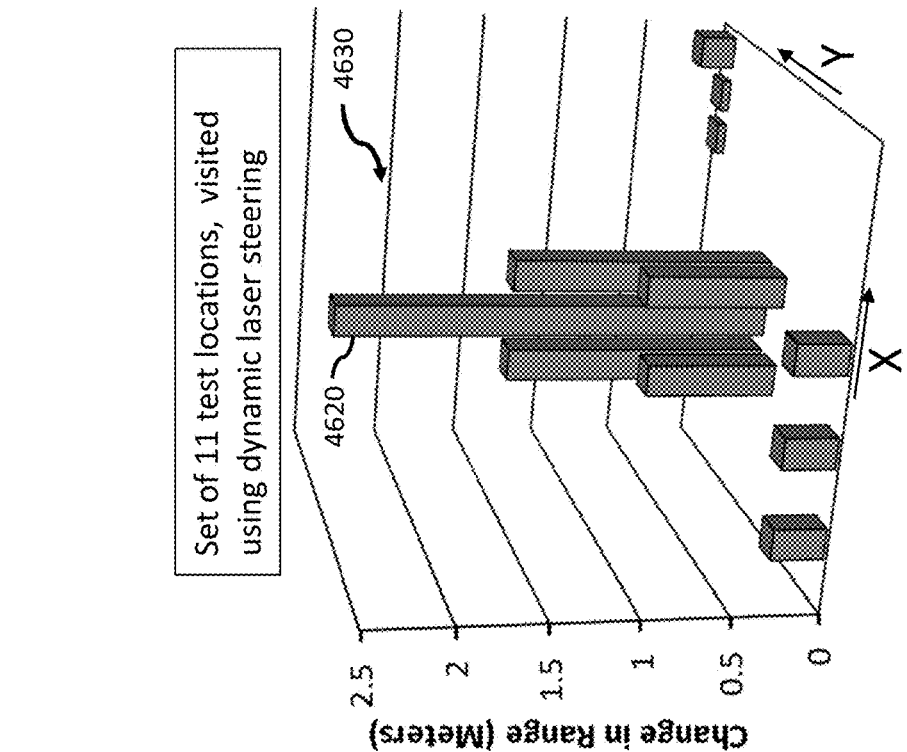
FIG. 46B illustrates test data gathered from a non-uniformly distributed set of test locations in a field of view, in accordance with an embodiment of the present disclosure.
Figure 46A:
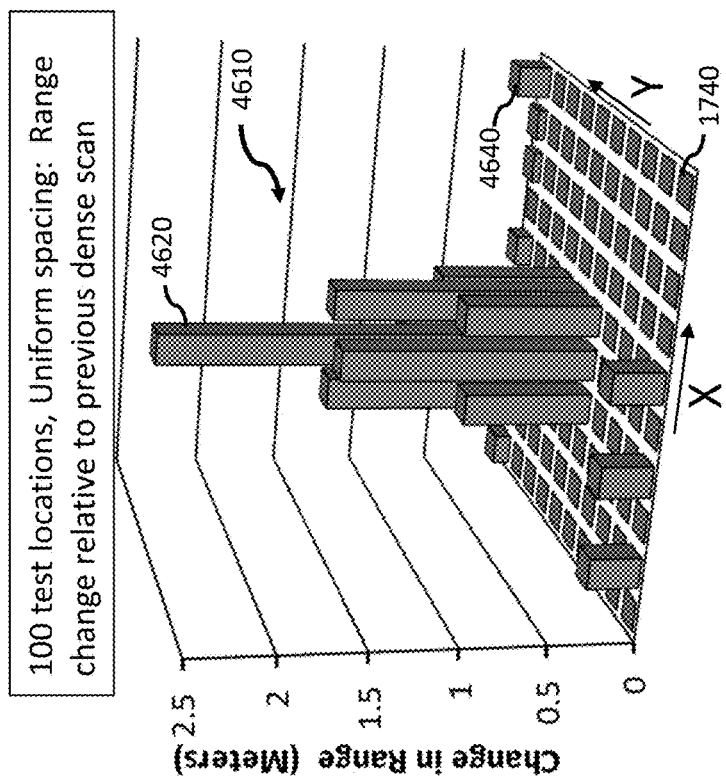
FIG. 46A illustrates test data gathered from a uniformly distributed set of test locations in a field of view, in accordance with an embodiment of the present disclosure.

FIG. 46A illustrates a simple example where a steerable laser assembly scans a laser beam in a uniform pattern to generate a 10×10 grid of test locations in a FOV. The range measured 4610 at each of the 100 test locations can be compared with an equivalent location in a previous scan (e.g. a large scan of 200,000 points). The change in range at each test location (e.g. location 4620) can be calculated and used as a guide to distribute laser scan locations in a subsequent non-uniform density scan. For example, test location 4620 indicates a large change in range relative to a previous scan and can therefore receive a higher density of laser ranging measurements in comparison to a region where the test location (e.g. 4640) indicates little change.

FIG. 46B illustrates a simpler situation, where the change in range is calculated for a set of test location and a set of rules can be used to guide a larger scan. In FIG. 46B the test locations (e.g. test location 4620) are scanned in a dynamically steered manner, in comparison to the uniformly steered manner of FIG. 46A. In both FIG. 46A and FIG. 46B a set of test data is gathered before a large scan from a small number of test points (e.g. 100 in FIG. 46A and 11 in FIG. 46B) can be used to plan the larger scan to a more productive manner.

Figure 47:
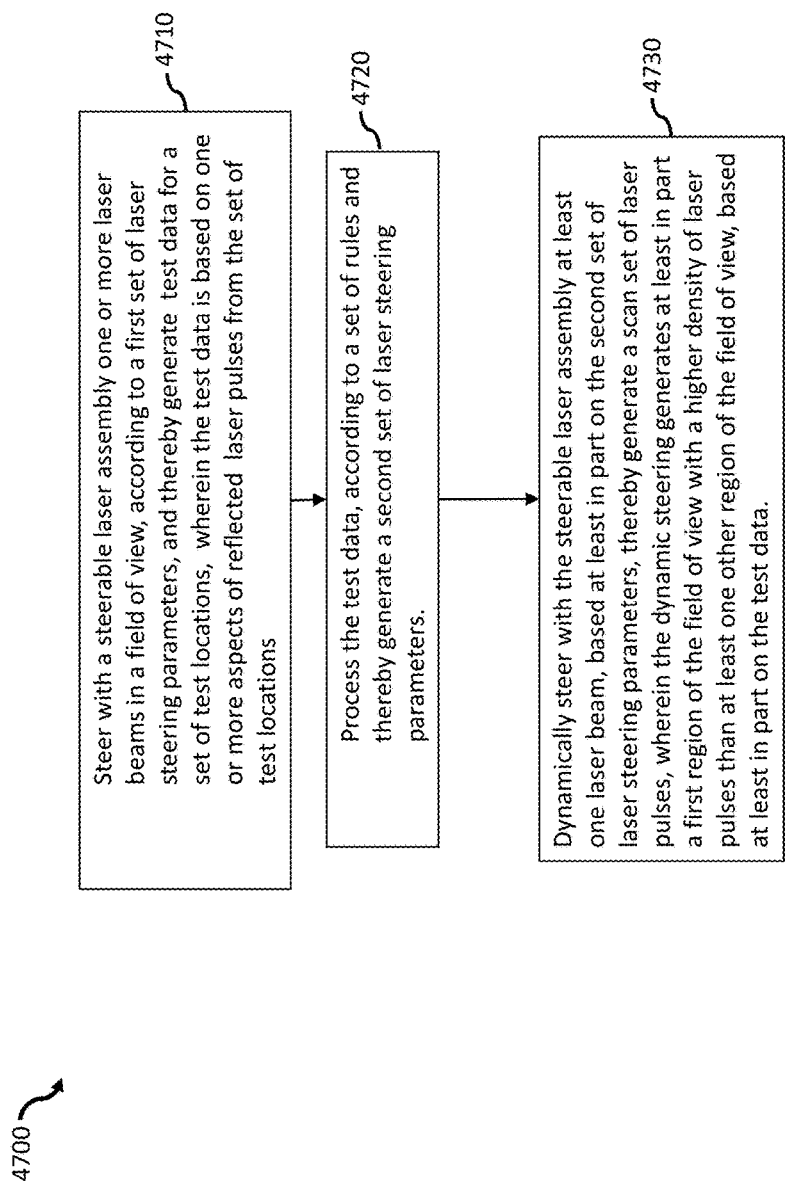
FIG. 47 illustrates a flow diagram of a process of generating a non-uniform scan of a field of view based on processing test data from a set of test locations, according to an embodiment of the present disclosure.

FIG. 47 illustrates a method for generating a laser ranging scan with a non-uniform spatial distribution of laser ranging measurements based at least in part on test locations. At step 4710 a steerable laser assembly steers one or more laser beams in a field of view, according to a first set of laser steering parameters, and thereby generating test data for a set of test locations.

The test data is based on one or more aspects of reflected laser light from the set of test locations. At step 4720 the test data is processed, according to a set of rules and thereby generate a second set of laser steering parameters. At step 4730 the steerable laser assembly dynamically steers at least one laser beam, based at least in part on the second set of laser steering parameters, thereby generating a scan set of laser pulses, wherein the dynamic steering generates at least in part a first region of the field of view with a higher density of laser pulses than at least one other region of the field of view, based at least in part on the test data.

Figure 48A:
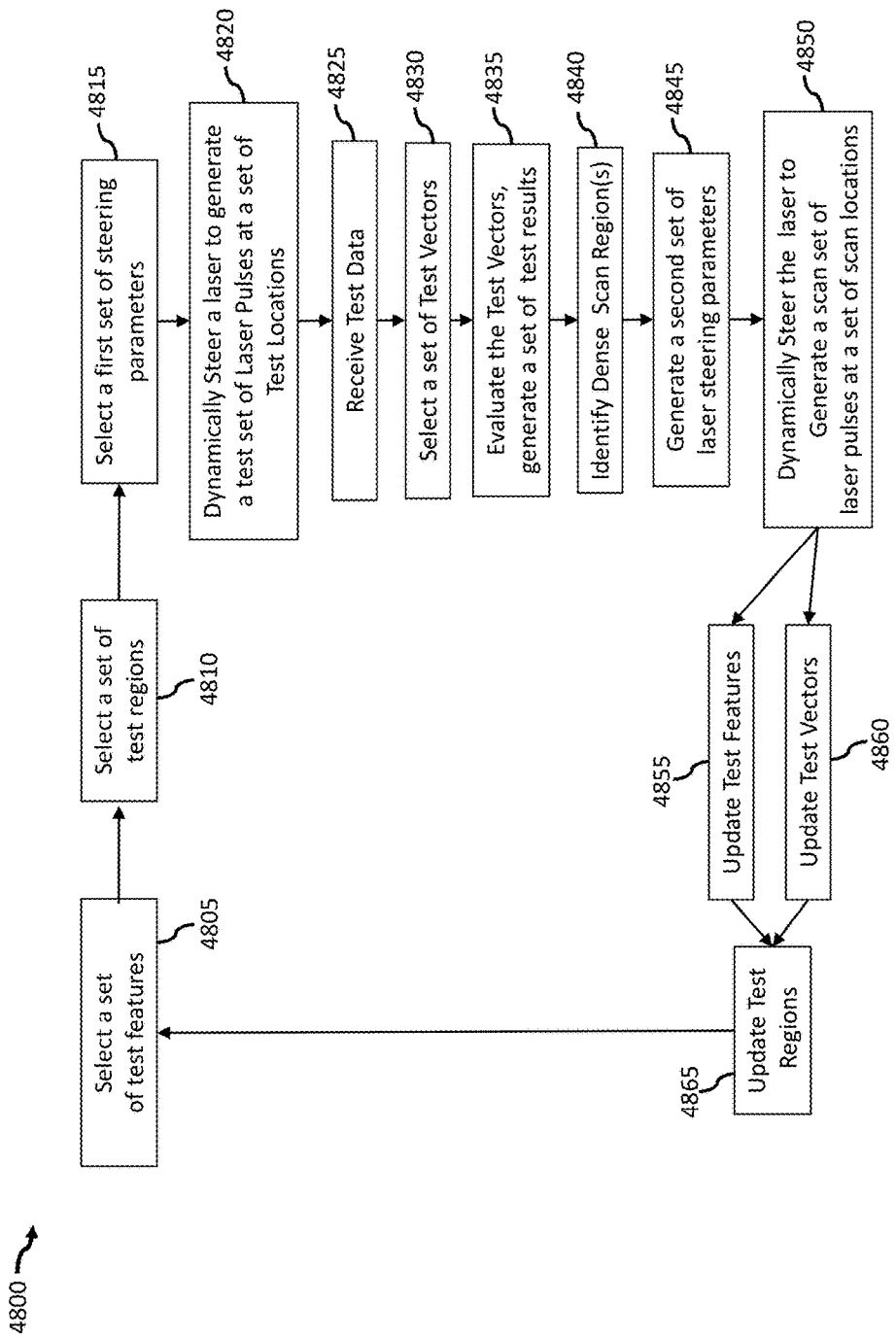
FIG. 48A illustrates a flow diagram of a process of generating a non-uniform scan of a field of view based on processing test data from a set of test regions, and thereby updating the test regions, according to an embodiment of the present disclosure.

FIG. 48A illustrates a method 4800 for performing a laser ranging scan (e.g. a main scan) with non-uniform spatial distribution of laser ranging measurements based at least in part on analyzing laser reflections from a set of test locations. At step 4805 a set of features are selected. At step 4810 a set of test regions are selected. At step 4815 a first set of laser steering parameters are selected. At step 4820 a laser beam is dynamically steered according to the first set of laser steering parameters to generate a set of test laser pulses at a set of test locations. At step 4825 test data is received, corresponding to one or more aspects of reflected laser pulses at the set of test locations. At step 4830 a set of test vectors are selected. At step 4835 the set of test vectors are evaluated based on the test data from the set of test locations thereby generating a set of test results. At step 4840 one or more dense scan regions are selected to receive a higher density of scan locations in a subsequent laser ranging scan. At step 4845 a second set of laser steering parameters are generated, based at least in part on the set of test results. At step 4850 the laser is dynamically steered according to the second set of laser steering parameters, thereby generating a scan set of laser pulses at a set of scan locations. At step 4855 the set of features are updated. At step 4860 the set of test vectors are updated. At step 4865 the set of test regions are updated.

Figure 48B:
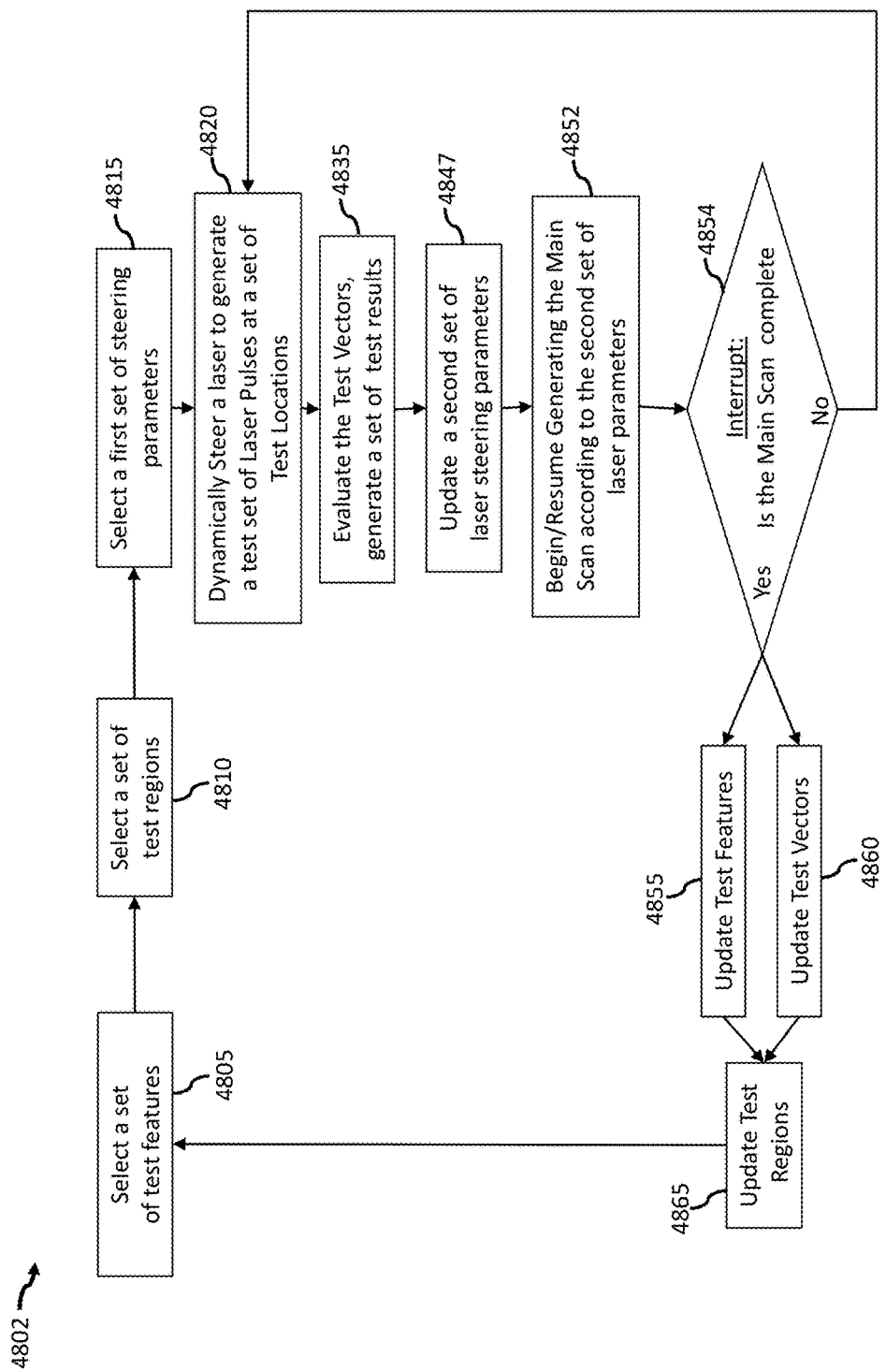
FIG. 48B illustrates a flow diagram of a process of generating a non-uniform scan of a field of view based on periodically gathering test data from a set of test regions, and thereby updating set of laser steering parameters used to generate the non-uniform scan, according to an embodiment of the present disclosure.

FIG. 48B illustrates a method 4802 for performing a laser ranging scan (e.g. a main scan) with non-uniform spatial distribution of laser ranging measurements, based at least in part on analyzing laser reflections from set test locations. In comparison to method 4800 method 4802 can be used to interrupt the main scan (i.e. the scan based on the second set of laser steering parameters) when an interrupt criterion is satisfied and remeasure the set of test locations according to the first set of laser steering parameters. Method 4802 thereby provides for scanning and measuring the set of test locations several times throughout a main scan of the set of scan locations. For example, method 4802 can periodically reassess important locations and revaluate the set of test vectors during the process of scanning a more mundane region of space (e.g. an unpopulated stretch of road). Hence method 4802 provides a way to implement the competing goals of quickly identifying changes in important locations and scanning the whole FOV, including many mundane areas, for signs of new important objects and locations. In one aspect method 4802 provides a means to arbitrate between the competing goals of performing a comprehensive main scan while periodically "cutting to the chase" and searching for important changes.

At step 4854 a main scan already in progress is interrupted based on satisfaction of an interrupt criterion. The interrupt criterion can be a value reached by an interrupt timer (e.g. the timer could satisfy the interrupt criterion every 20 milliseconds), or a number of scan points since the last interrupt (e.g. interrupt every 20,000 scan pulses are generated during the main scan). The interrupt criterion can also be based on an aspect of the data gathered during the main scan. For example, the main scan can be initiated according to the second set of laser steering parameters. Initial ranging data gathered during the main scan can indicate considerable range variations relative to a previous scan. Step 4854 can thereby satisfy interrupt criterion based on a measure of the variation and trigger method 4802 to quickly re-measure the set of test locations and update the second set of laser steering parameters.

At step 4847 the second set of laser steering parameters can be updated based on set of test results from the evaluated test vectors. At step 4852 a main scan of the field of view can be started or resumed based on the second set of laser steering parameters. For example, the second set of laser steering parameters can define a path (e.g. 4505 in FIG. 45A) along which steerable laser assembly 120 in FIG. 44A is dynamically steered. The path may take 50 milliseconds to traverse completely. At step 4852 a main scan that has traversed the first 20% of the path can resume and complete another 20% of the path defined in the second set of laser steering parameters before interrupting at step 4854 and gathering updated laser reflections form the set of test locations.

One challenge with laser ranging systems on autonomous vehicles (e.g. self-driving cars) is the need to perform laser ranging at long distances. For example, a laser pulse generated by range finder system 110 in FIG. 44A takes approximately 1.3 microseconds to reflect from an object 200 meters away. A non-dynamically steered laser can therefore only generate 750,000 ranging measurements per second. Such a non-dynamically steered laser with a 10 Hz scan rate (e.g scanning the entire FOV 10 times per second) could only produce 75,000 ranging measurements per second.

Method 4802 can increase the number of ranging measurement while maintaining the 200 m maximum. Method 4802 can interrupt the main scan at step 4854 if ranging measurements indicate reflections at or beyond 200 m. Method 4802 can revaluate test data from the set of test locations and thereby update the second set of laser steering parameters at step 4847 to move the laser beam faster, thereby producing a modified (e.g. lower) density of ranging measurements. In this way method 4802 (in some cases combined with variable pulse generation rate) can increase or decrease the pace of the main scan. For example, system 110 in FIG. 44A can have a target to generate 100,000 measurements within 100 milliseconds in a main scan. A disproportionate amount of time can be spent waiting for reflections from objects at the edge of the detection range of system 110. Hence method 4802 can interrupt and modify the second set of laser steering parameters if it falls behind schedule.

FIG. 5 illustrates several components of laser range finder 510 operable to perform several embodiments of the scan planning method. System 110 can contain a processing subassembly 510, a steerable laser assembly subassembly 505 and a communication link 530 for linking the processing and steerable laser assemblies. Processing subassembly 520 can include one or more processors (e.g. sensor data processor 475 in FIG.) one or more transceivers (e.g. including receivers 415 and transmitters 470) such as Ethernet, RS485, fiber optic, Wi-Fi, Bluetooth, CANBUS or USB transceivers. Processing subassembly 520 can also include a computer-readable storage medium (e.g. flash memory or a hard disk drive) operable to store instructions for performing one or more embodiments of methods 4700 in FIG. 47, 4800 in FIG. 48A or 4802 in FIG. 48B. Steerable laser assembly 505 can include one or more laser generator 420 and a laser positioner 430 to steer a laser beam at one or more locations in the FOV based on the laser steering parameters. Laser positioner 430 can include one or more optical delay lines, acoustic or thermally based laser steering elements. In a solid state electronically-steered laser ranging subassembly laser positioner can function to receive instructions based on laser steering parameters and thereby delay portions of a laser beam (i.e. create a phase difference between copies of the laser beam) and then combine the portions of the laser beam to form an output beam positioned in a direction in the FOV. A mechanical laser positioner 430 can be a mirror and mirror positioning components operable to receive input (e.g. PWM input to a steeper motor) based on laser steering parameters and thereby steer the mirror to position a laser in a direction in the FOV. Steerable laser assembly 505 can also include data acquisition components 540, such as reflection detector 450, time of flight calculator 455 and light intensity calculator 460 in FIG. 4A. Steerable laser assembly 505 can include one or more transceivers (e.g. receivers 415 and transmitters 470 in FIG. 4A) such as Ethernet, RS485, fiber optic, Wi-Fi, Bluetooth, CANBUS, or USB transceivers. Communication link 530 can be a wired link (e.g. an Ethernet, USB or fiber optic cable) or a wireless link. Communication link 530 can transfer laser steering parameters or equivalent instructions from the processing subassembly 520 to the steerable laser assembly 505. Communication link can transfer ranging data from the steerable laser assembly to the processing subassembly 520.

When operable linked to steerable laser assembly 505 the processing subassembly 520 can perform one or more embodiments of the ranging scanning planning method of the present disclosure. Specifically processing subassembly 510 can generate and transmit a first set of laser steering parameters to steerable laser assembly 505, wherein the first set of laser steering parameters are operable to cause the steerable laser assembly 505 to dynamically steer one or more laser beams within a field of view and thereby generate a test set of laser pulses at a set of test locations in the field of view. Secondly processing subassembly 520 can receive from the steerable laser assembly test data comprising one or more aspect of reflected light from laser pulses at the set of test locations. Thirdly, processing subassembly 520 can select a set of test vectors, each test vector in the set of test vectors being a criterion operable to be evaluated based on one or more aspects of reflected laser pulses from a subset of the set of test locations. Fourthly, processing subassembly 520 can evaluate each test vector in the set of test vectors based on at least some of the test data, and thereby at least in part generating a set of test results corresponding to the set of test vectors. Finally, processing subassembly 520 can generate a second set of laser steering parameters based on the set of test results, and thereby instruct the steerable laser assembly to perform a main scan, including dynamically steering a laser beam with the steerable laser assembly to generate a non-uniformly spaced scan set of laser pulses, based at least in part on the results of the test vectors.

Adaptive Laser Scan Planning Based on Time of Flight

A growing area for LIDAR application is autonomous passenger vehicles (e.g. autonomous cars and trucks). At typical highway speeds (e.g. 65 mph) there is a need to provide range measurements up to 200 meters ahead of the vehicle. The maximum range of a LIDAR system is determined in part by the sensitivity of the reflection detector 450 in FIG. 4A and in part by how long the LIDAR is willing to wait for a reflection. A LIDAR designed with a 200 m maximum range must wait up to 1.3 microseconds for a laser pulse to travel a round trip distance of 400 m to and from an object at maximum range. At 200 m maximum range a single laser/detector pair can perform a maximum of 750,000 measurements per second. Some LIDAR models (e.g. HDL-64E from Velodyne LIDARs of Morgan Hill, Calif.) use multiple laser/detector pairs each focused on a particular elevation angle to produce more measurements.

Another approach to increasing the measurement rate (e.g. measurements per scan of the FOV) while maintaining a maximum range (e.g. 200 m) is to use variable laser pulse timing instead of periodic laser pulse timing. For example, a LIDAR system designed for 200 m maximum range may have a maximum pulse spacing of 1.3 microseconds, but many transmitted laser pulses can be reflected much earlier from objects closer than the maximum range. Accordingly the laser can be configured to produce a new laser pulse at the lesser of: a) every 1.3 microseconds, or b) when a reflection is detected. Variable pulse timing can ensure that the LIDAR performs a minimum of 750,000 measurements with some unknown maximum based on the arrangement of objects in the FOV. While this is an improvement, a LIDAR with variable pulse timing can still suffer from a slow measurement rate when performing measurements in large portions of the FOV without objects. A non-steerable LIDAR (e.g. a rotating LIDAR with constant angular velocity) proceeds on a predetermined path within the FOV and can do little to solve the problem of encountering large unfilled portions of the FOV that slow the measurement rate.

Recent advancements in dynamically steerable LIDAR (e.g. electronically steerable LIDAR) provide the ability to dynamically distribute measurement locations in the FOV. For example, when a region of the FOV is encountered with reflections close to or beyond the maximum range the density of measurement points can be decreased, thereby enabling the LIDAR to complete the can in a reasonable time (e.g. a target time) or to achieve a target number of measurements within some or all of the FOV. Therefore dynamic-steering provides the basis for a LIDAR to ensure a level of service (e.g. 10 scans of the FOV per second, or a minimum of 100,000 measurements per scan).

A non-steerable LIDAR can provide a consistent level of service (e.g. one scan of the FOV every 100 ms). A dynamically steerable LIDAR can provide a similar or higher level of service at a lower cost by dynamically steering more cost effective hardware. In one embodiment a method is disclosed to perform a laser ranging scan in which the dynamic steering of a laser is adapted, based on time of fight measurements from the scan, in order to complete the scan in a time target.

In other embodiments a computer implemented method can select a service-level criterion for a laser ranging scan of a portion of a FOV. The service-level criterion can be a time target for completing the scan or a target number of measurements within the scan. The method can commence the laser ranging scan according to a set of laser steering parameters. At some time after commencing the scan the method can modify the set of laser steering parameters based on time-of-flight measurements from the scan and then continue the scan according to the modified set of laser steering parameters, such that at the end of the scan the service-level criterion is satisfied.

In yet other embodiments, the method can select a service-level criterion indicative of a level of service offered by laser range finder (e.g. maximum scan time or minimum number of measurement points) and can also select a completion criterion for the scan (e.g. when a particular path has been traversed by the laser, or when a sweep of some or all of the FOV is complete). The adaptive laser scan planning method can modify an initial set of laser steering parameters throughout the course of a laser scan, based on the ranging data received, such that the modifications ensure the completion criterion and the service-level criterion are simultaneously satisfied at some time (e.g. at or before the target time).

An exemplary adaptive LIDAR (e.g. a laser range finder implementing the adaptive laser scan planning method) can be dynamically-steerable and have a time target to complete a scan of a FOV. During the course of the scan the adaptive LIDAR can adapt the measurement distribution, based in part on the time-of-flight data from the surroundings to achieve the time target. For example, an adaptive LIDAR can have a time target of 100 ms to scan a FOV (e.g. 360 degrees azimuth at a single elevation angle). At the midpoint of the scan (e.g. at 180 degrees) the adaptive LIDAR can recognize that it is behind schedule to meet the time target. This may be due to a portion of the FOV with reflections arriving close to or beyond the maximum measurement time (e.g. 1.3 microseconds corresponding to 200 m max range). Hence the exemplary adaptive LIDAR can alter the planned measurement distribution in the remainder of the scan to meet the time target.

Associated with many tasks (e.g. constructing a building or completing a standardized test) there can be a completion criterion and a service-level criterion. The completion criterion can be a test to determine if the task is completed (e.g. are all the questions on a test answered?). A service-level criterion can be a test of the service-level associated with the completed task (e.g. was the test completed in the allotted time, or were at least 80% of the answers to the questions correct?).

A dynamically steerable laser range finder can dynamically position a laser beam to perform intelligent and in-depth investigation of parts of the FOV based on non-uniformly distributed measurement locations. However a dynamically steerable laser range finder can be of limited use if it spends too much time investigating object boundaries or far away objects (e.g. requiring long measurement times) and consequently does not complete a scan (e.g. fails to scan a portion of the FOV) takes too long to complete a scan.

In several embodiments a computer implemented method is provided operable to be performed by a laser ranging system to modify laser steering parameters throughout the course of a scan to adapt the future distribution of measurements such that the scan satisfies a service-level criterion upon completion of the scan (i.e. satisfies a completion criterion). Hence the laser range finder can dynamically adapt to the surroundings.

Figure 49:
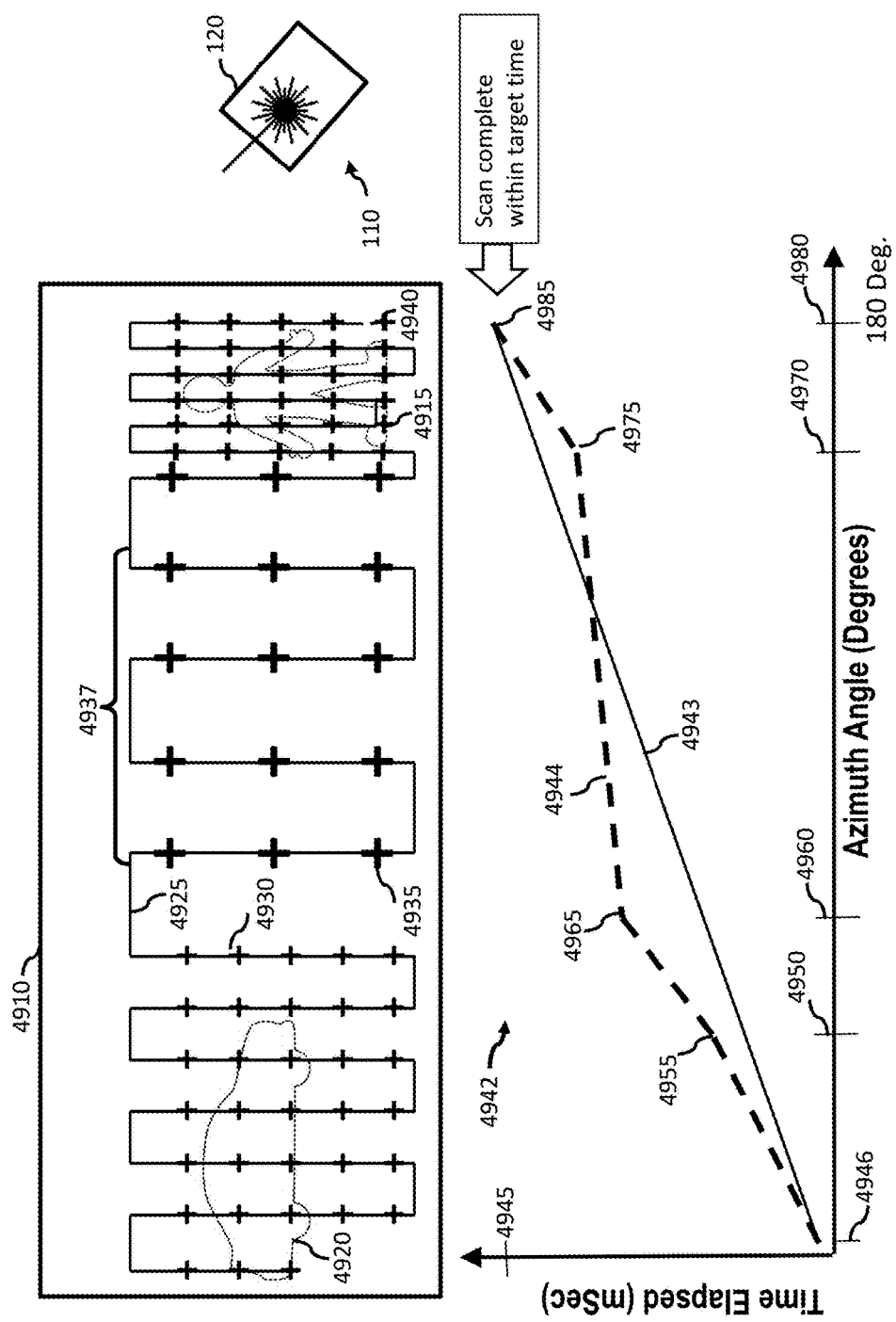
FIG. 49 illustrates an exemplary laser ranging scan performed according to an embodiment of the present disclosure.

Turning to FIG. 49 a laser range finder 110 includes a steerable laser assembly 120 operable to dynamically steer a laser beam within FOV 4910. According to an embodiment of the adaptive laser scan planning method a completion target or criterion can be selected (e.g. starting at an azimuthal angle of 0 degrees the completion target can be to complete a path to an azimuthal angle of 180 degrees). A service-level criterion can also be selected, For example, that the scan be competed in no more than 100 milliseconds or completed with no fewer than 100,000 points. A service-level criterion can also specify a required minimum measurement density (e.g. number of measurements per unit angle in the azimuth and elevation planes). FOV 4910 includes several interesting objects such as person 4915 and vehicle 4920. Between the interesting objects is a large region where laser reflections do not occur and therefore the performance of system 110 is impacted by waiting for reflections that do not arrive. According to an embodiment of the adaptive laser scan planning method, laser range finder 110 can scan a laser beam along a path (e.g. 4925) and thereby generate a plurality of laser ranging measurements. The dynamically steerable nature of steerable laser assembly 120 enables regions with a high density of laser pulses (e.g. laser pulses 4930 and 4940) and regions with a low density of laser pulses e.g. 4937. Additionally laser pulses can have a dynamically selected spot size (e.g. large spot size 4935). One feature of the exemplary adaptive laser scan planning method is that certain aspects of path 4925 are unknown at the beginning of the scan (e.g. the exact laser pulse density, spot sizes or pulse sizes). These aspects are adaptively selected in order to satisfy the service-level criterion at the completion of the scan. For example, the exact laser pulse density at a point in the scan can be selected based on whether the scan is ahead of schedule or behind schedule, relative to a target completion time.

Graph 4942 illustrates the progress of the scan (i.e. the azimuthal location of the laser beam as it scans from a start point to 0 degrees to the completion point of 180 degrees) versus elapsed time since the start of the scan. Line 4943 illustrates the time elapsed for a uniform scan of the FOV such that upon satisfaction of the completion criterion (e.g. reaching 180 degrees azimuth) the service-level criterion (e.g. performing the scan within target time 4945) is also satisfied. Line 4944 illustrates the actual performance of laser range finder 110 as it scans the FOV while modifying a set of laser steering parameters in order to complete the scan while satisfying the service-level criterion. The scan begins at azimuth angle 4946. Between azimuth angle 4946 and 4950 the scan encounters vehicle 4920 and uses an initial set of laser steering parameters to instruct steerable laser assembly 120 to generate a default density of laser pulses (e.g. laser pulse 4930). At time 4955 the elapsed time is marginally behind schedule (i.e. progress line 4944 is above line 4943). Between azimuth 4950 and 4960 laser pulses do not reflect form objects within the maximum range of the laser range finder 110. Hence measurements in range 4950 to 4960 are slow and the scan falls further behind schedule as illustrated by elapsed time 4965. The exemplary adaptive laser scan planning method reacts by modifying the set laser steering parameters to increasing the speed along path 4925, increasing the step size in the azimuth direction and increase the spot size. Increasing the speed and step size has the effect of decreasing the measurement density in the center region 4937. Increasing the spot size has the effect of providing more laser energy to help identify reflections from objects close to the maximum range. Steerable laser assembly 120 then steers one or more laser beams according to the modified set of laser steering parameters and between azimuth 4960 and 4970 the scan proceeds more quickly such that the scan is ahead of schedule at 4975. Between azimuth 4970 and the completion angle 4980 (e.g. 180) laser range finder 110 encounters another interesting object, person 4915. System 110 can be aware that it is ahead of schedule and close to the end of the scan and can therefore modify the laser steering parameters for a second time to increase the density of measurement points (e.g. laser pulse 4940), thereby completing the scan while satisfying the service-level criterion.

In another embodiment, a set of laser steering parameters can be generated or modified after commencing a laser ranging scan and based on the target time. For example, a laser steering parameter may originally calculate a density of 1 laser pulse per 1 degree of angular range for a dense scan region, based on a time target of 100 milliseconds for the scan. During the scan the laser range finder may identify that the scan is behind schedule and can modify the laser steering parameter to 1 laser pulse every 2 degrees in order to complete the laser ranging scan within the target time.

Figure 50:
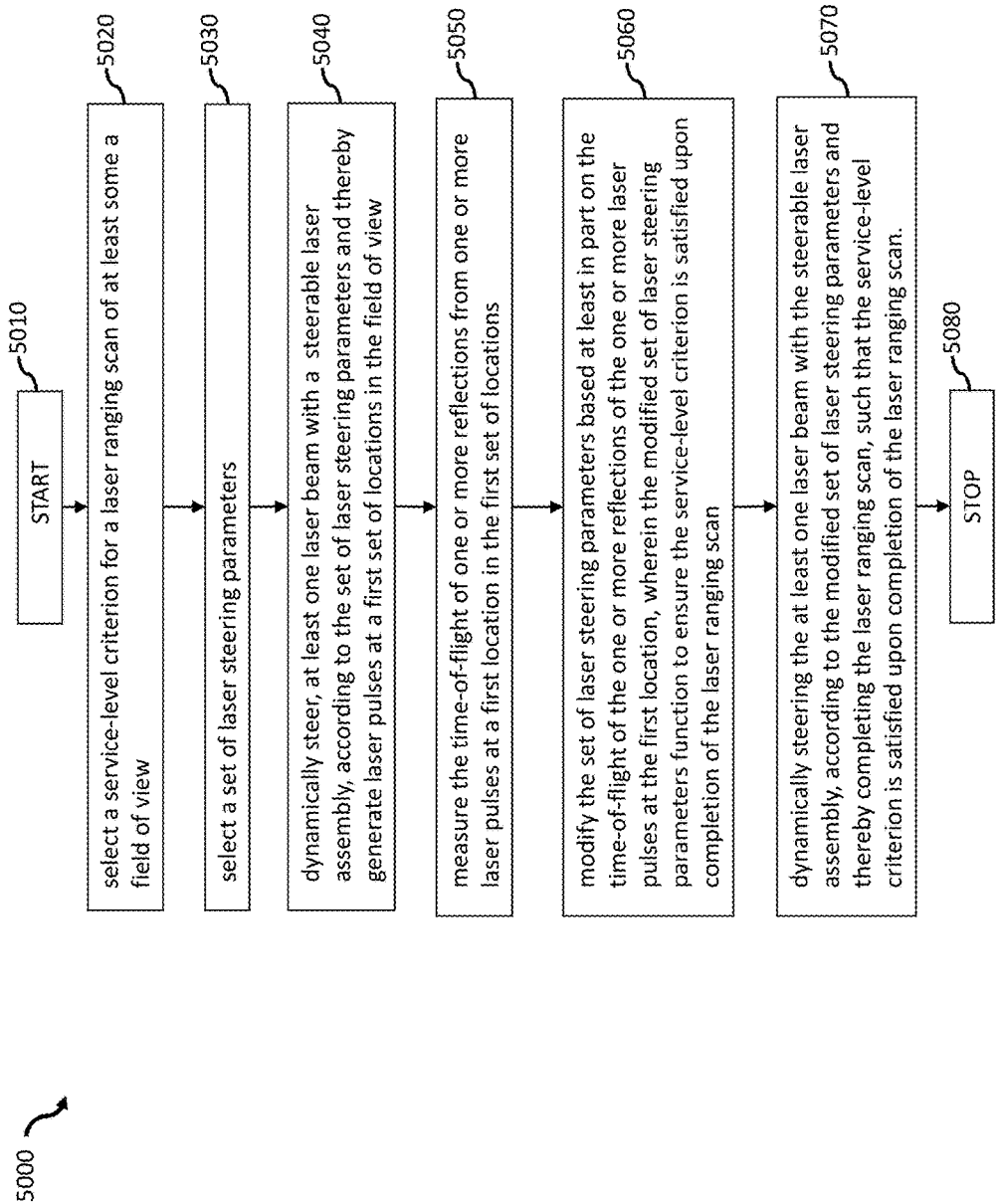
FIG. 50 illustrates a flow diagram for an exemplary method for laser scan planning using time of flight measurements, according to an embodiment of the present disclosure.

FIG. 50 illustrates an exemplary adaptive laser scan planning method 5000. At step 5010 method 5000 begins. At step 5020 a service-level criterion for a laser ranging scan of at least some a field of view is selected. At step 5020 a completion criterion for the scan can also be selected. Exemplary service-level criteria include a target time to complete the scan, a target number of measurements, a target laser pulse density (e.g. number of measurement points per unit of angle in the FOV). Exemplary completion criteria can include reaching the end of a path (e.g. a path defined in the initial set of laser steering parameters), reaching an endpoint location in the FOV, completing a scan of a defined portion of the FOV. At step 5030 a set of laser steering parameters is selected.

At step 5040 at least one laser beam is dynamically steered with a steerable laser assembly, according to the set of laser steering parameters and thereby generates laser pulses at a first set of locations in the field of view. At step 5050 the time-of-flight of one or more reflections from one or more laser pulses at a first location in the first set of locations is measured. At step 5060 the set of laser steering parameters is modified based at least in part on the time-of-flight of the one or more reflections of the one or more laser pulses at the first location, wherein the modified set of laser steering parameters function to ensure the service-level criterion is satisfied upon completion of the laser ranging scan. At step 5070 the at least one laser beam is dynamically steered with the steerable laser assembly, according to the modified set of laser steering parameters and thereby completes the laser ranging scan, such that the service-level criterion is satisfied upon completion of the laser ranging scan. At step 5080 method 5000 ends.

While the above description contains many specificities, these should not be construed as limitations on the scope of any embodiment, but as exemplifications of various embodiments thereof. Many other ramifications and variations are possible within the teachings of the various embodiments. Thus the scope should be determined by the appended claims and their legal equivalents, and not by the examples given.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be cojointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
a laser range finder mounted on a vehicle, the laser range finder having a field of view, and
a beam guide, the beam guide comprising:
  a first end to receive a laser beam from the laser range finder in an input direction,
  a lens located at a second end of the beam guide to transmit the laser beam beyond the vehicle with an output direction based on the input direction, wherein the lens and the laser range finder are separated by at least a portion of a cavity behind a body panel, and
  wherein the beam guide extends at least in part within the cavity located behind the body panel on the vehicle, and further wherein the laser beam travels in the cavity from the first end to the second end of the beam guide.

2. The system of claim 1 wherein the lens is shared by at least one light assembly on the vehicle.

3. The system of claim 1 wherein the lens refracts the laser beam into a region obscured from direct line of sight at the laser range finder by at least a portion of the vehicle.

4. The system of claim 1 wherein the beam guide further comprises at least one reflector in the cavity that functions to reflect the laser beam from the laser range finder and thereby change a direction of the laser beam from the input direction.

5. The system of claim 1 wherein the beam guide further comprises:
a motorized reflector with a variable position to reflect the laser beam by a variable amount and thereby at least in part determine the output direction of the laser beam; and
a controller to control the variable position of the motorized reflector.

6. The system of claim 1 further comprising one or more reflectors to reflect the laser beam into the cavity and thereby guide the laser beam to the perimeter of the vehicle roof.

7. The system of claim 1 further comprising:
a laser detector to detect a laser reflection of the laser beam, the laser reflection being carried in the beam guide from a reflection location, and
circuitry to calculate based on the laser reflection a 3-dimensional location indicative of the reflection location.

8. A system comprising:
a laser range finder mounted on a vehicle, the laser range finder having a field of view; and
a beam guide comprising:
  a first end to receive, from the laser range finder, a plurality of laser beams each with a corresponding input direction in an input angular range, and
  a lens, separate from the laser range finder, the lens being located at a second end of the beam guide,
    wherein the lens functions to transmit each of the plurality of laser beams beyond the vehicle with a corresponding output direction that is based on the input direction, wherein the lens and the laser range finder are separated by at least a portion of a cavity behind a body panel
  further wherein the beam guide extends at least in part within the cavity located behind the body panel on the vehicle, to guide the plurality of laser beams from the first end to the second end of the beam guide.

9. The system of claim 8 wherein the lens is located at a perimeter of the body panel and thereby provides a location for the plurality of laser beams to emerge from the cavity located behind the body panel.

10. The system of claim 8 further comprising an adapter positioned at least partially within the field of view of the laser range finder and comprising:
a first opening that functions to transmit a first non-zero subset of the plurality of laser beams into the beam guide each with corresponding directions in a first subset of the input angular range and
a second opening that functions to transmit a second non-zero subset of the plurality of laser beams into the beam guide each with corresponding directions in a second subset of the input angular range that is exclusive from the first subset of the input angular range.

11. The system of claim 8 further comprising an adapter, wherein the adapter is attached to the laser range finder and is attached to the beam guide, and
wherein the adapter comprises a mirror located at least partially within the field of view of the laser range finder.

12. The system of claim 8 wherein the beam guide further comprises at least one reflector in the cavity that functions to reflect the plurality of laser beams from the laser range finder and thereby guide the plurality of laser beams from the first end to the second end of the beam guide.

13. The system of claim 8 wherein the lens functions to spread the input angular range into an output angular range that is at least three times wider in at least one dimension than the input angular range.

14. The system of claim 8 wherein the field of view has a direct portion of the field of view comprising all directions in which the laser range finder can directly emit a laser beam beyond the vehicle and
wherein, the laser range finder further comprises:
a laser detector to detect a plurality of laser reflections, corresponding to the plurality of laser beams from reflection locations beyond the vehicle and outside of the direct portion of the field of view, and
circuitry to calculate using the plurality of laser reflections 3-dimensional locations indicative of the reflection locations.

15. A method for guiding a laser within a cavity behind a body panel of a vehicle, the method comprising:

generating with a laser range finder a laser beam;

at a beam guide comprising a first end, a second end with a lens and the cavity located behind the body panel of a vehicle, receiving the laser beam in an input direction at the first end, wherein the lens and the laser range finder are separated by at least a portion of the cavity behind the body panel;

guiding the laser beam in the cavity extending behind the body panel of the vehicle to the second end; and transmitting with the lens, the laser beam beyond the bounds of the vehicle in an output direction that is based at least in part on the input direction.

16. The method of claim 15 further comprising the steps of receiving at the laser range finder a reflection from the laser beam including the step of guiding the reflection from the laser beam in the cavity behind the body panel.

17. The method of claim 15 wherein the step of guiding the laser beam in the cavity behind the body panel of the vehicle further comprises the step of reflecting the laser beam with at least one reflector positioned in the cavity and thereby changing a direction of the laser beam from the input direction.

18. The method of claim 15 further comprising the step of prior to generating the laser beam reconfiguring at least one optical element in the beam guide by electronically controlling the at least one optical element with circuitry operably coupled to the laser range finder.

19. The method of claim 15 further comprising the steps of:

transmitting the laser beam using the beam guide to an object beyond the vehicle that is obscured from direct line of sight at the laser range finder by at least a portion of the vehicle;

receiving at the laser range finder, through the beam guide, a laser reflection from the object, corresponding to the laser beam; and calculating with the laser range finder a 3-dimensional location for at least a portion of the object using the laser reflection.

20. The system of claim 1, wherein the beam guide transmits the laser beam into a region of space that is obscured by at least a portion of the vehicle from a direct line of sight at the laser range finder.

\* \* \* \* \*